(12) United States Patent
Sasaki et al.

(10) Patent No.: US 8,164,619 B2
(45) Date of Patent: Apr. 24, 2012

(54) RECORDING MEDIUM, PLAYBACK DEVICE, AND INTEGRATED CIRCUIT

(75) Inventors: Taiji Sasaki, Osaka (JP); Hiroshi Yahata, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/889,957

(22) Filed: Sep. 24, 2010

(65) Prior Publication Data

US 2011/0187817 A1 Aug. 4, 2011

Related U.S. Application Data

(60) Provisional application No. 61/245,804, filed on Sep. 25, 2009.

(51) Int. Cl.
*H04N 15/00* (2006.01)

(52) U.S. Cl. .......................................................... 348/42

(58) Field of Classification Search .............. 348/42–49, 348/79; 386/108, 111; *H04N 15/00*
See application file for complete search history.

(56) References Cited

U.S. PATENT DOCUMENTS

| | | | |
|---|---|---|---|
| 5,923,869 A | 7/1999 | Kashiwagi et al. |
| 6,393,574 B1 | 5/2002 | Kashiwagi et al. |
| 6,470,460 B1 | 10/2002 | Kashiwagi et al. |
| 6,484,266 B2 | 11/2002 | Kashiwagi et al. |
| 6,502,198 B2 | 12/2002 | Kashiwagi et al. |
| 6,502,199 B2 | 12/2002 | Kashiwagi et al. |
| 6,502,200 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |

(Continued)

FOREIGN PATENT DOCUMENTS

JP    11-191895    7/1999

(Continued)

OTHER PUBLICATIONS

Written Opinion mailed Dec. 14, 2010 issued in International (PCT) Application No. PCT/JP2010/005768, together with English translation thereof.

*Primary Examiner* — Tung Vo

(74) *Attorney, Agent, or Firm* — Wenderoth Lind & Ponack, L.L.P.

(57) ABSTRACT

A recording medium records a main-view stream, a sub-view stream, and management information. The management information includes a system rate for each stream, and each stream is divided into a plurality of data blocks that form a plurality of extent blocks. In each extent block, main-view data blocks and sub-view data blocks are in a continuous interleaved arrangement. A main-view data block and sub-view data block forming a single pair each have a maximum size that is determined by the following conditions: (i) the system rate of the sub-view stream, (ii) whether the pair is the top pair within the extent block, and (iii) whether a long jump region exists between the recording areas of two extent blocks that are to be read continuously.

4 Claims, 100 Drawing Sheets

U.S. PATENT DOCUMENTS

| | | |
|---|---|---|
| 6,925,250 B1 | 8/2005 | Oshima et al. |
| 6,954,584 B2 | 10/2005 | Kashiwagi et al. |
| 6,985,411 B2 * | 1/2006 | Kanegae et al. ............ 369/30.04 |
| 7,194,194 B2 | 3/2007 | Kashiwagi et al. |
| 7,317,868 B2 | 1/2008 | Oshima et al. |
| 7,440,680 B2 * | 10/2008 | Koda et al. ................... 386/248 |
| 7,542,660 B2 * | 6/2009 | Kanegae et al. ............. 386/248 |
| 7,606,474 B2 * | 10/2009 | Fukuda et al. ................ 386/248 |
| 7,613,078 B2 * | 11/2009 | Kanegae et al. .......... 369/30.04 |
| 7,742,683 B2 * | 6/2010 | Takakuwa et al. ............ 386/239 |
| 7,783,158 B2 * | 8/2010 | Yoshio et al. ................ 386/243 |
| 7,801,418 B2 * | 9/2010 | Takakuwa et al. ............ 386/241 |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0067873 A1 | 3/2010 | Sasaki et al. |
| 2010/0165083 A1 | 7/2010 | Sasaki et al. |

FOREIGN PATENT DOCUMENTS

| | | |
|---|---|---|
| JP | 3935507 | 3/2007 |
| WO | 2010/032404 | 3/2010 |
| WO | 2010/076846 | 7/2010 |

* cited by examiner

FIG.3B

| PID = 0x1012 | Primary video stream |
| --- | --- |
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

| PID = 0x1013 | Primary video stream |
| --- | --- |
| 0x1260 | Depth map PG stream |
| 0x1261 | Depth map PG stream |
| 0x1460 | Depth map IG stream |
| 0x1B40 | Secondary video stream |

| PID = 0x1011 | Primary video stream |
| --- | --- |
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

301, 302A, 302B, 303A, 303B, 304, 305, 306

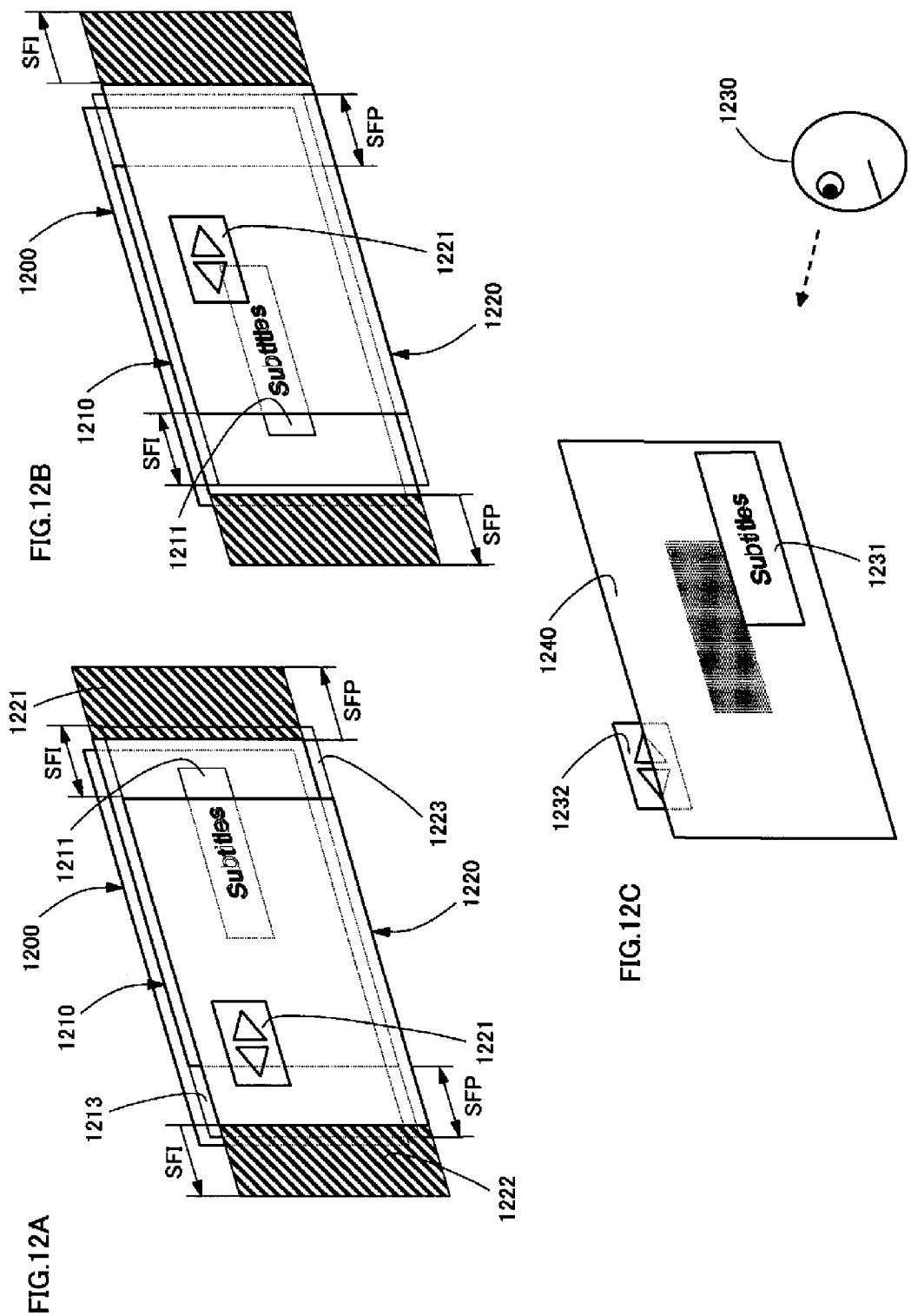

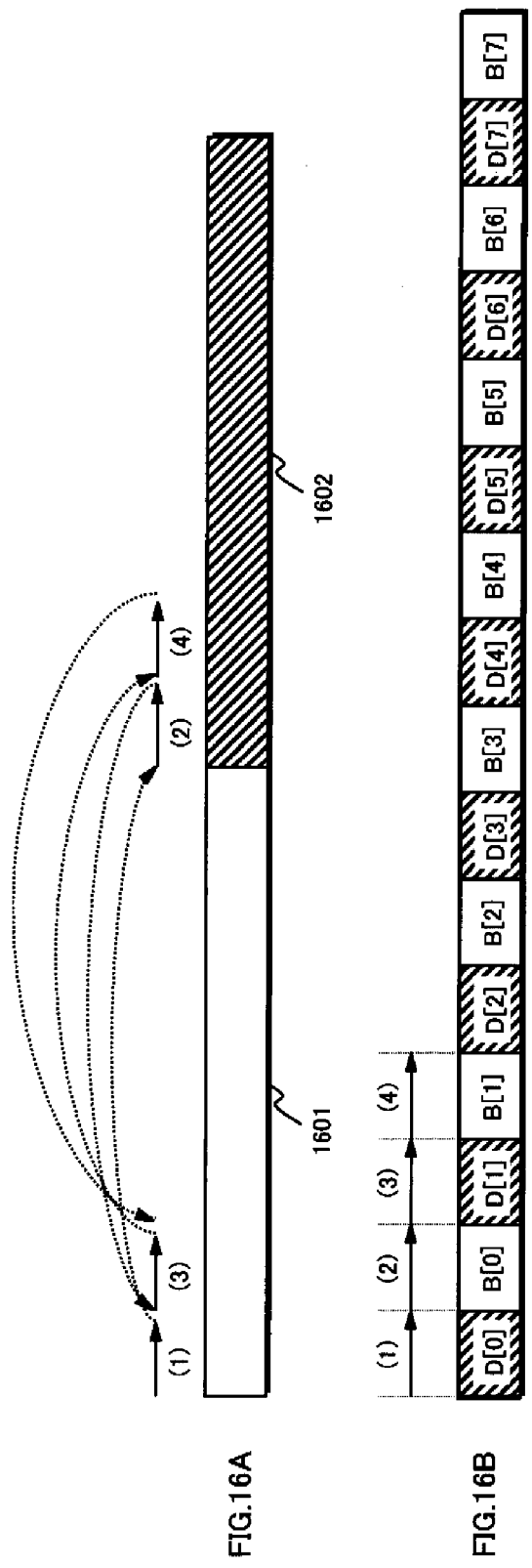
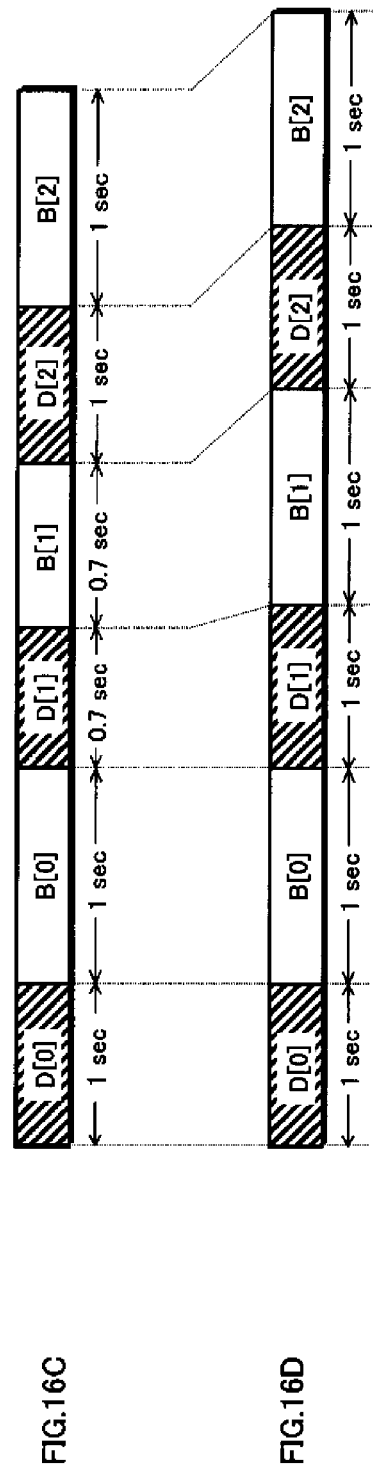
FIG.16A FIG.16B FIG.16C FIG.16D

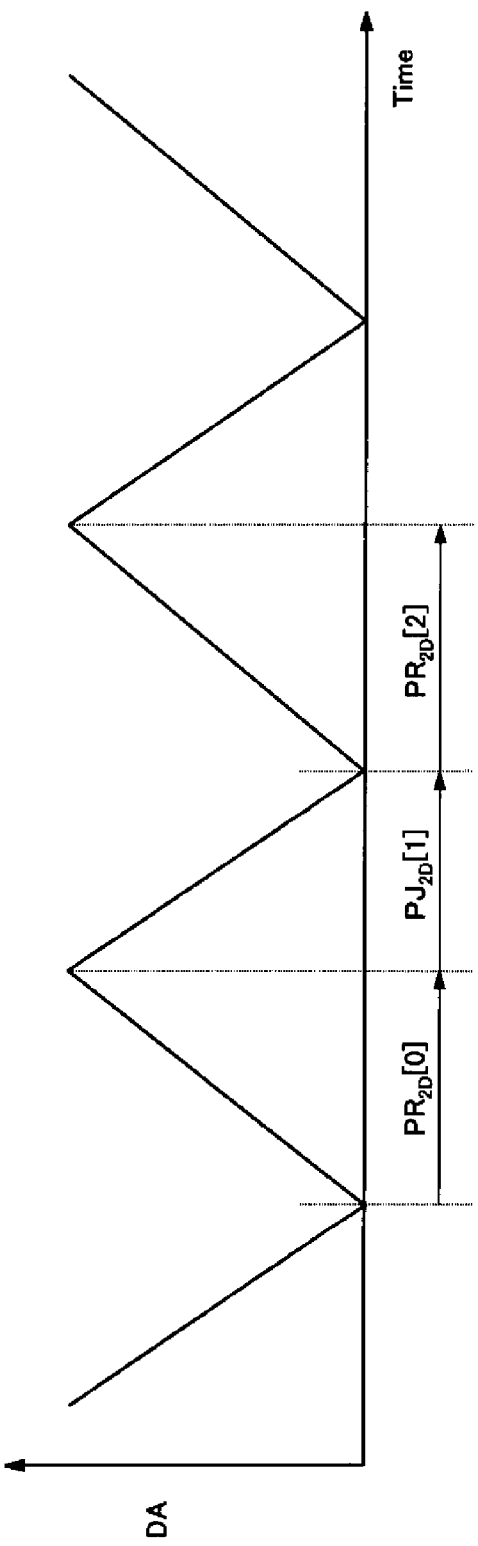
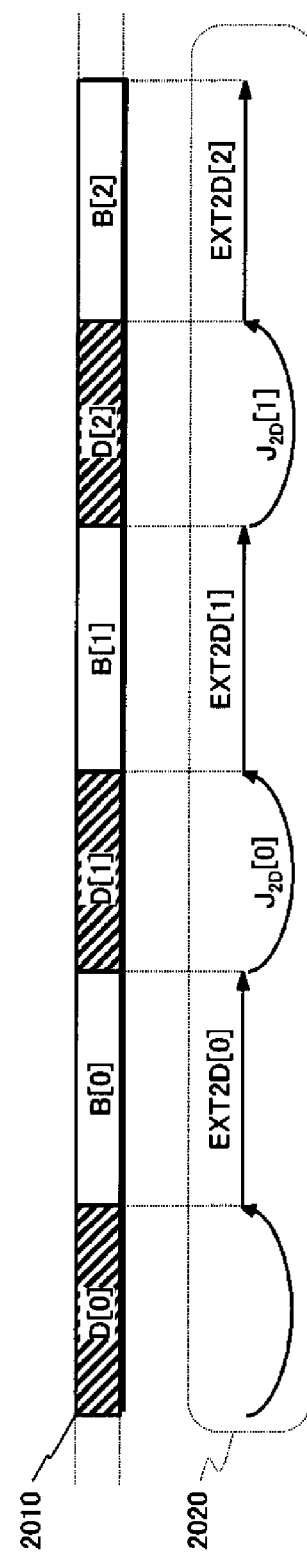
FIG.20A
FIG.20B

FIG.21

| $S_{JUMP}$ (sectors) | 0 | 1 – 10000 | 10001 – 20000 | 20001 – 40000 | 40000 – 1/10 of a stroke | 1/10 of a stroke or greater |
|---|---|---|---|---|---|---|
| $T_{JUMP\_MAX}$ (ms) | $0 = T_{JUMP0}$ | 250 | 300 | 350 | 700 | 1400 |

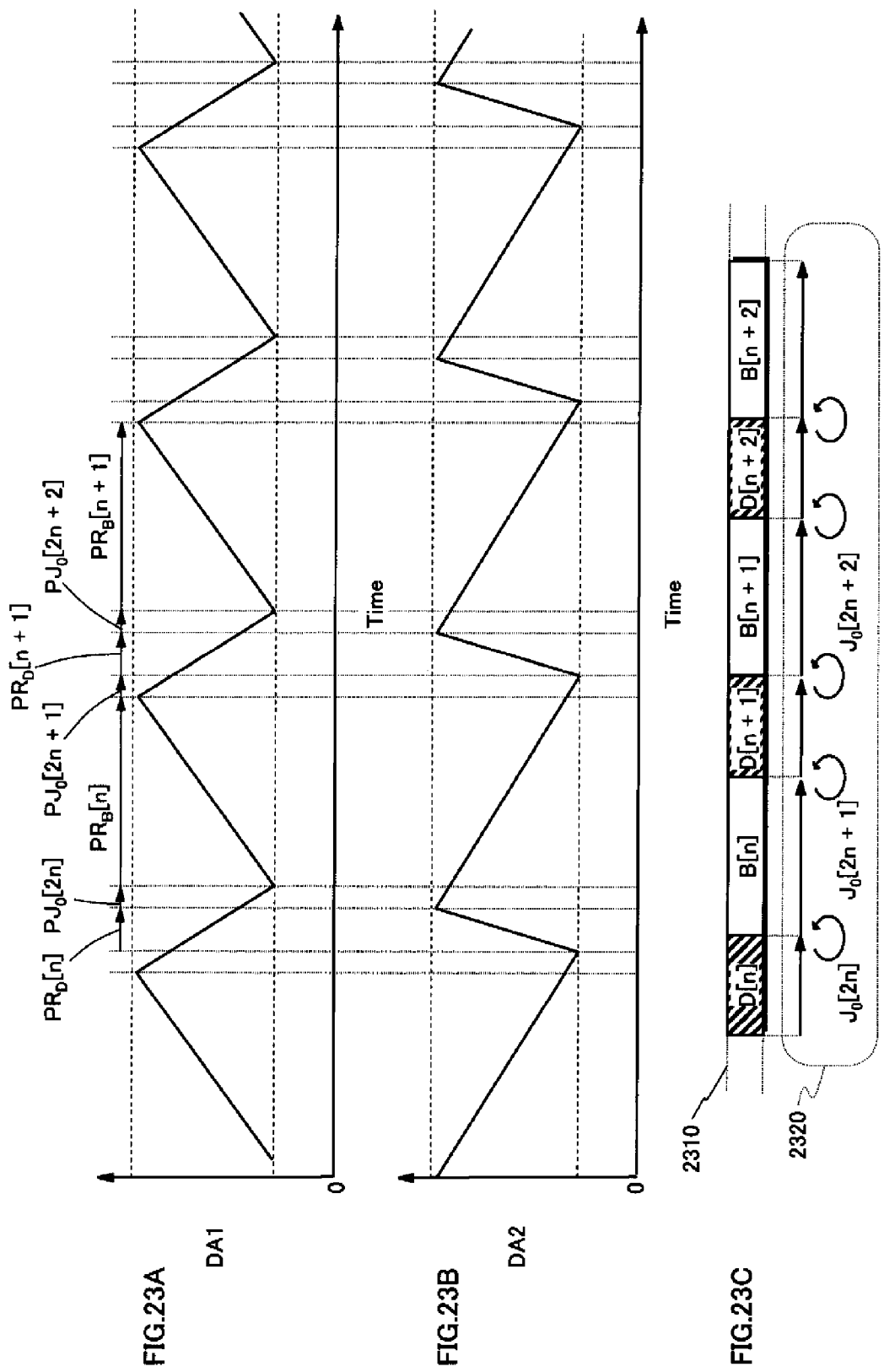

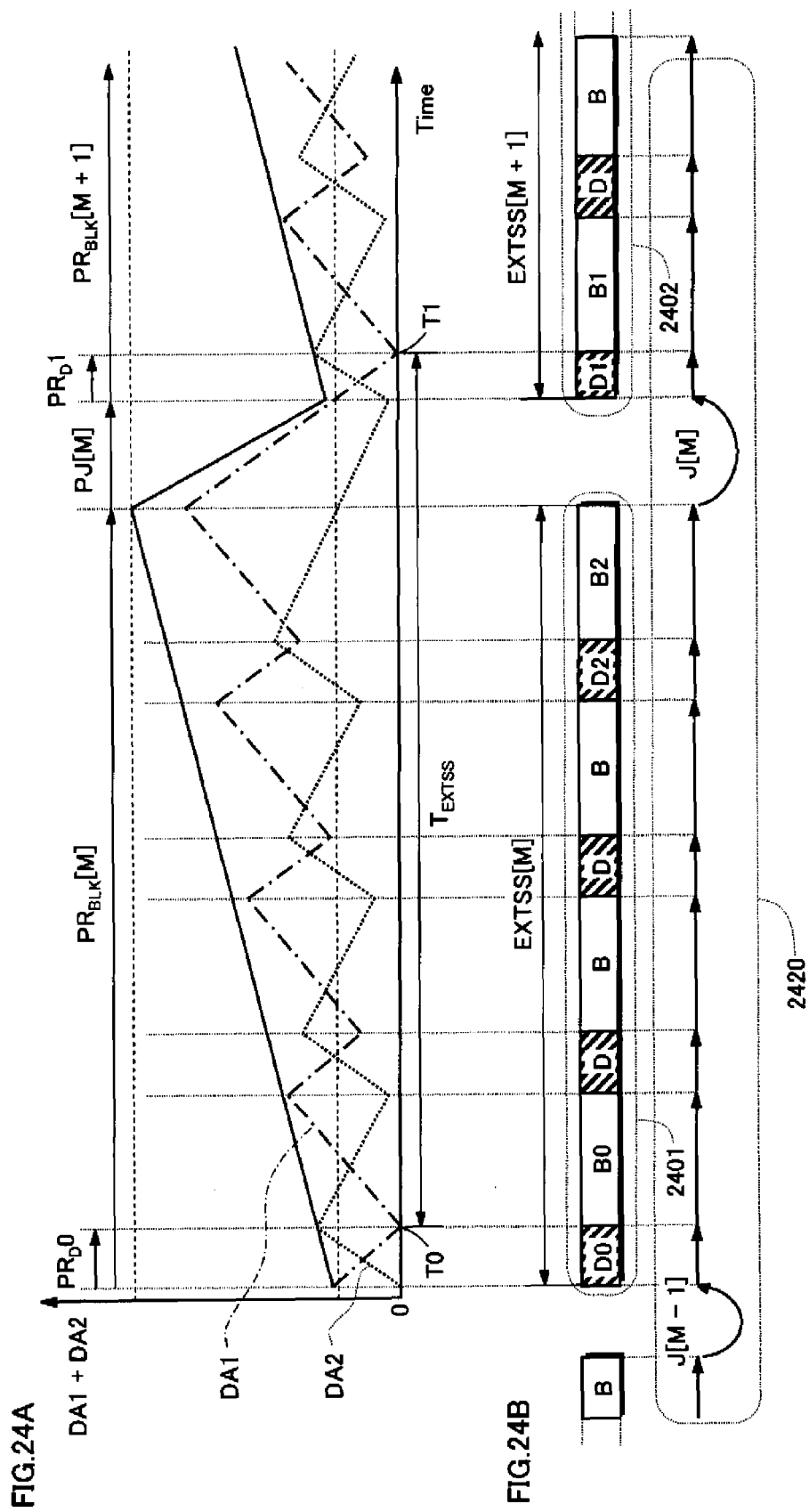

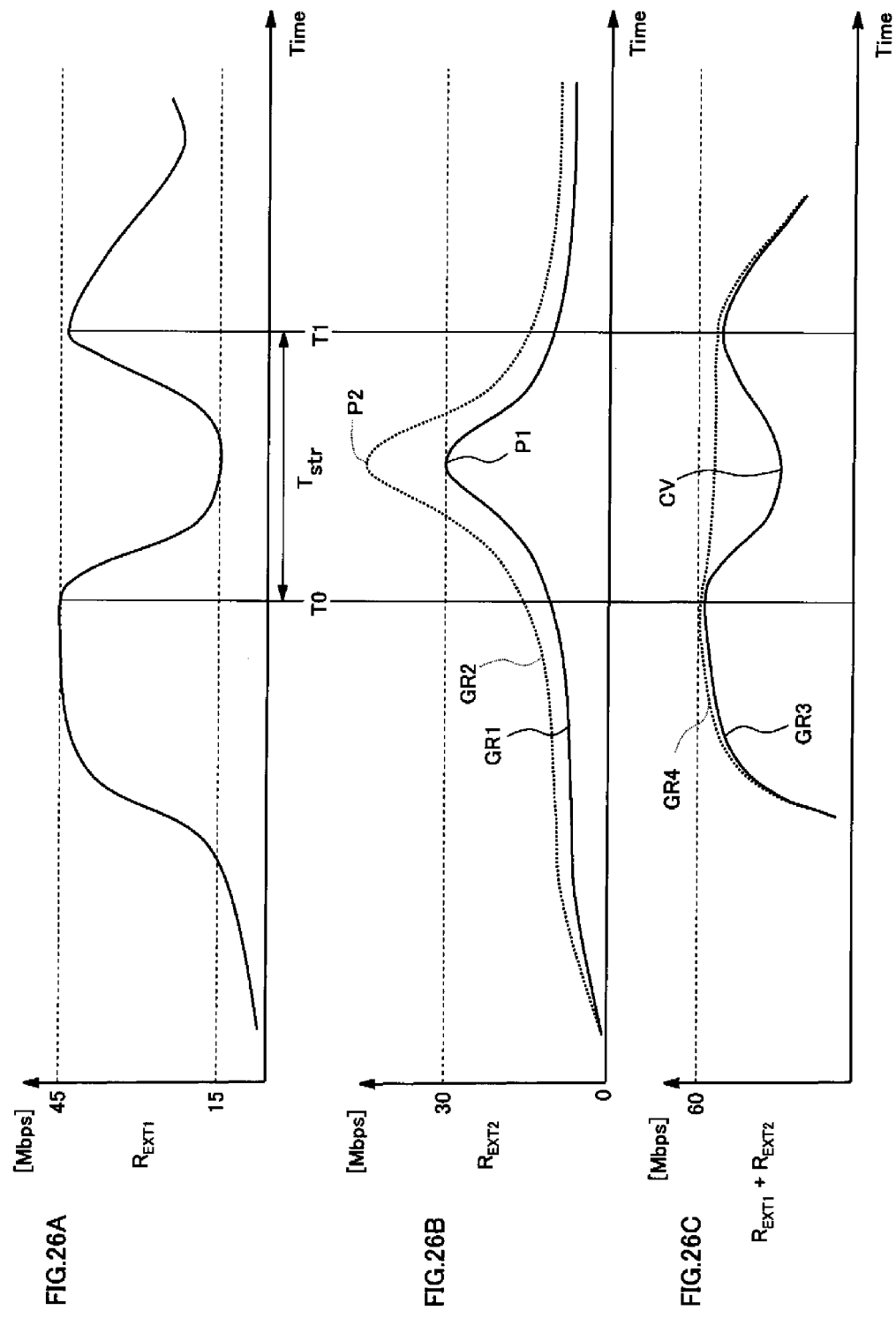

FIG.28A

| $R_{TS2}$ | Target data blocks | Maximum extent size | Type |
|---|---|---|---|
| $R_{TS2} \leq 32$ Mbps | All | $S_{EXT1}[i] \leq 19$ MB $S_{EXT2}[i] \leq 6$ MB | (A) |
| $R_{TS2} > 32$ Mbps | Data blocks other than the two types below | $S_{EXT1}[i] \leq 19$ MB $S_{EXT2}[i] \leq 8$ MB | |
| | Second and subsequent pairs of data blocks in an extent block read immediately before a long jump ($T_{JUMP} > 350$ ms) | $S_{EXT1}[i] \leq 7$ MB $S_{EXT2}[i] \leq 3$ MB | (B) |
| | Top pair of data blocks in an extent block read immediately after a long jump ($T_{JUMP} > 350$ ms) | $S_{EXT1}[i] \leq 19$ MB $S_{EXT2}[i] \leq 6$ MB | (C) |

FIG.28B

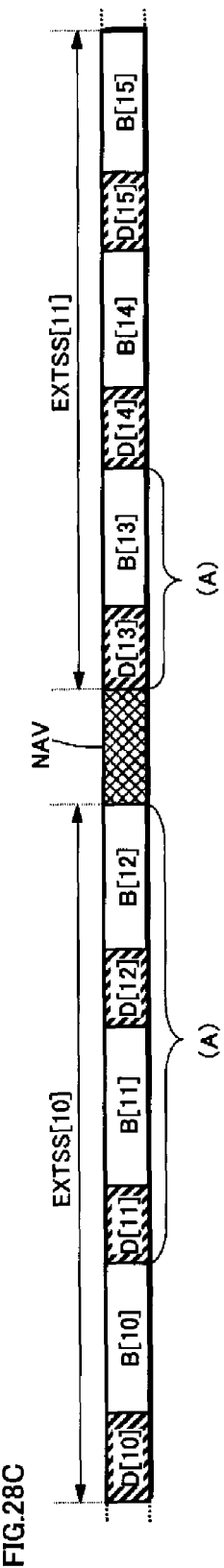

| $R_{EXT1}[i]$ | $R_{EXT2}[i]$ | $S_{EXT1}[i]$ | | $maxS_{EXT2}[i]$ |
|---|---|---|---|---|
| | | $T_{EXT}$ | $maxS_{EXT1}[i]$ | |
| 48 Mbps | 16 Mbps | 3.2 sec | 19 MB | 6 MB |
| 40 Mbps | 24 Mbps | 1.8 sec | 9 MB | 5 MB |
| 32 Mbps | 32 Mbps | 1.5 sec | 6 MB | 6 MB |
| 24 Mbps | 40 Mbps | 1.4 sec | 4 MB | 7 MB |
| 16 Mbps | 48 Mbps | 1.3 sec | 3 MB | 8 MB |

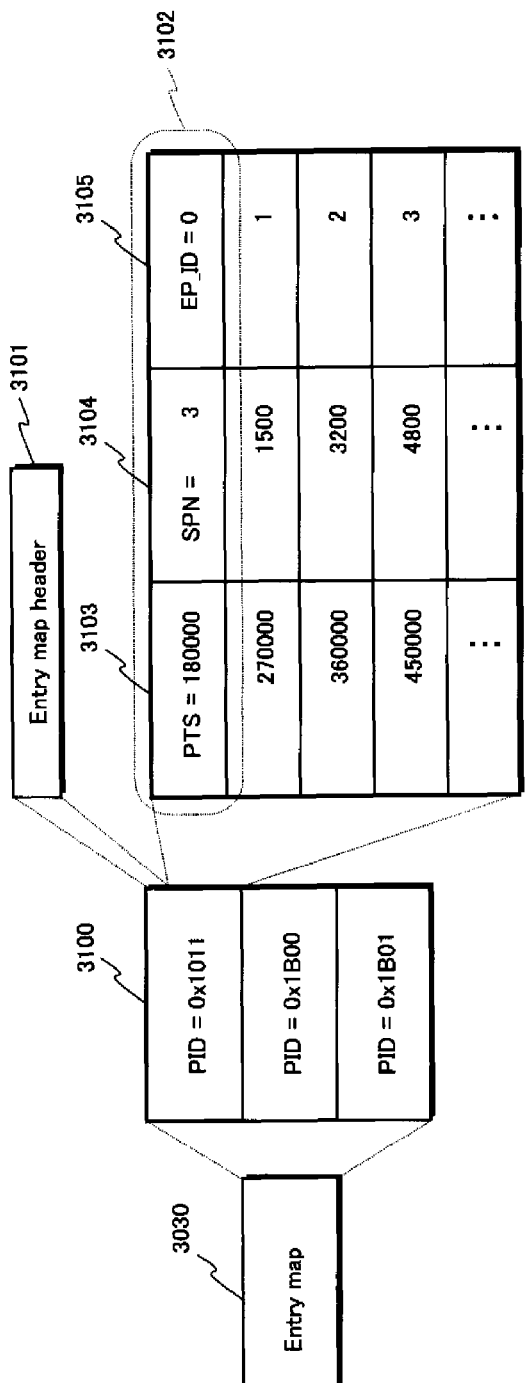
FIG.31A
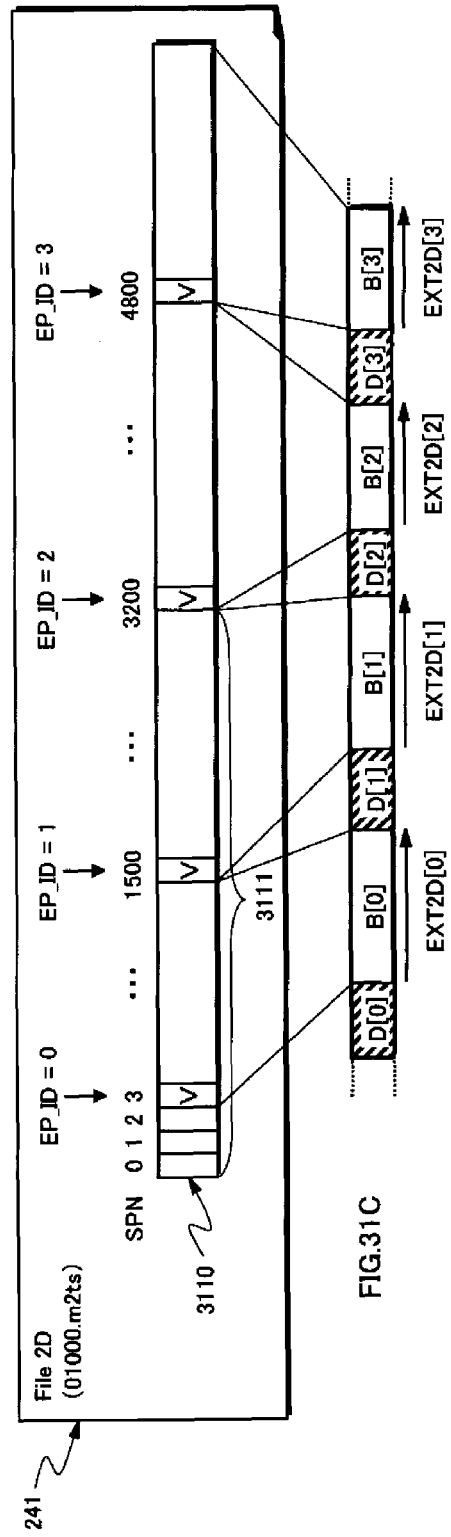
FIG.31B
FIG.31C

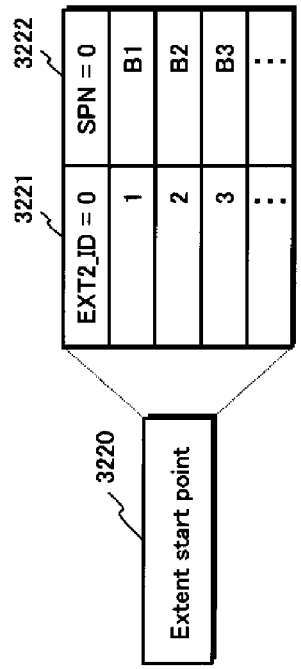
FIG.32A
FIG.32B
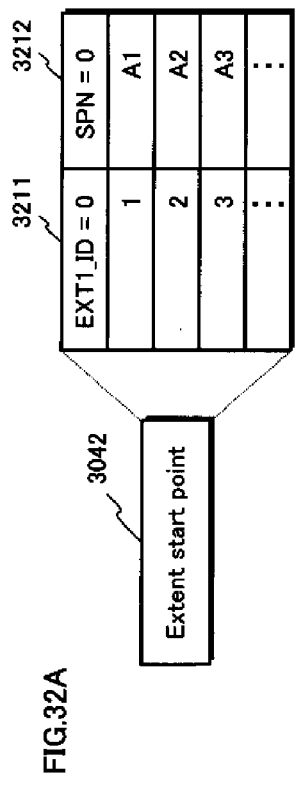
FIG.32C
FIG.32D
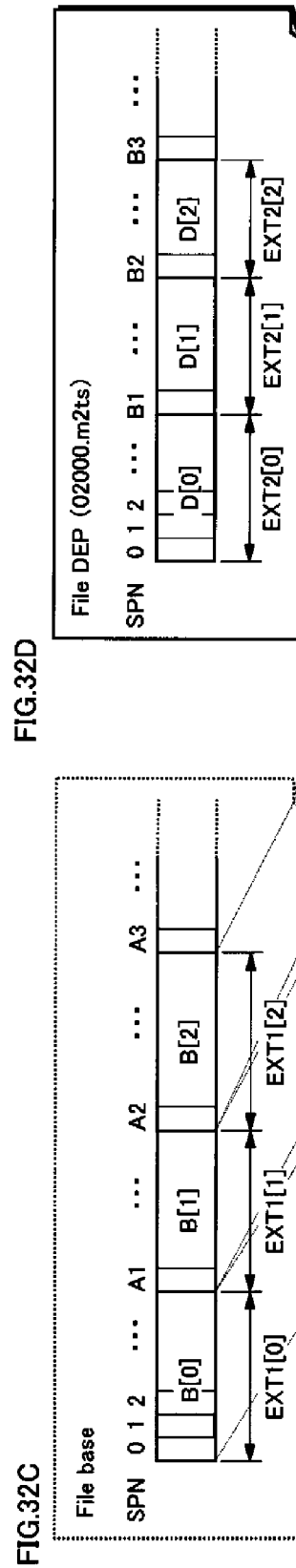
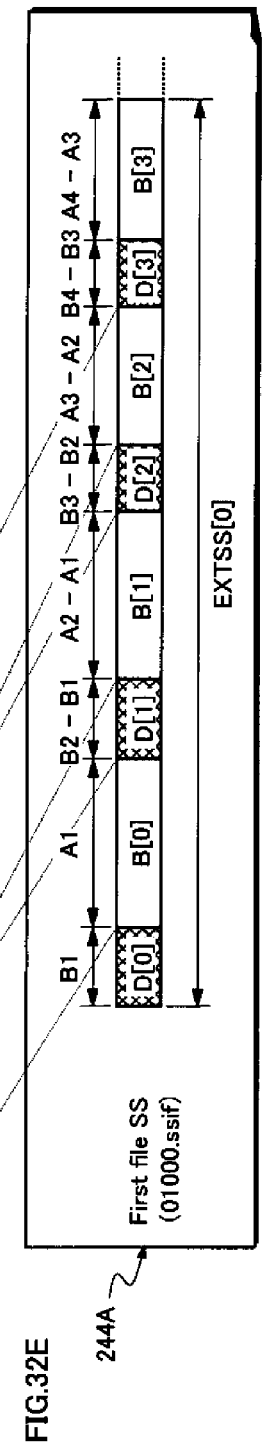
FIG.32E

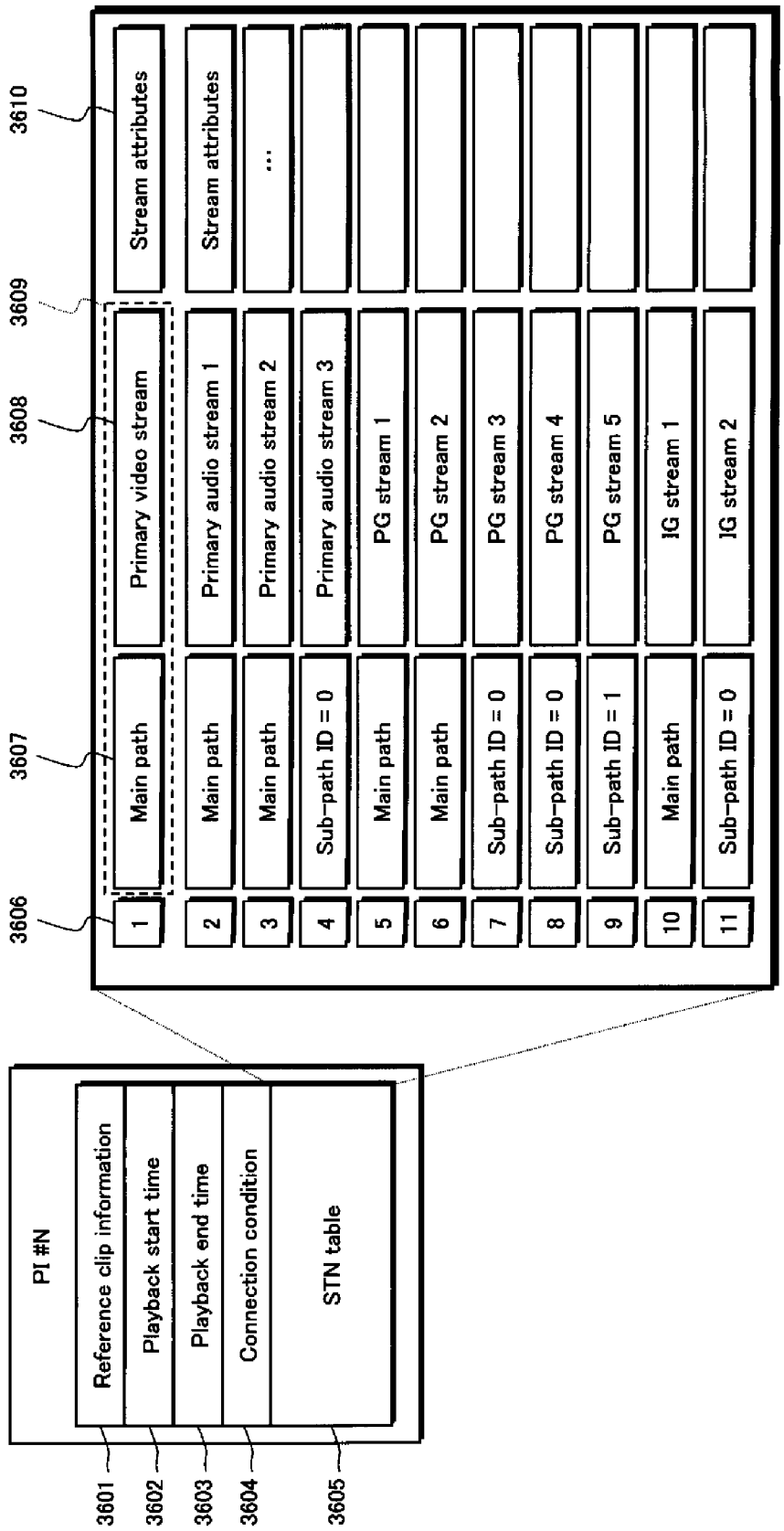

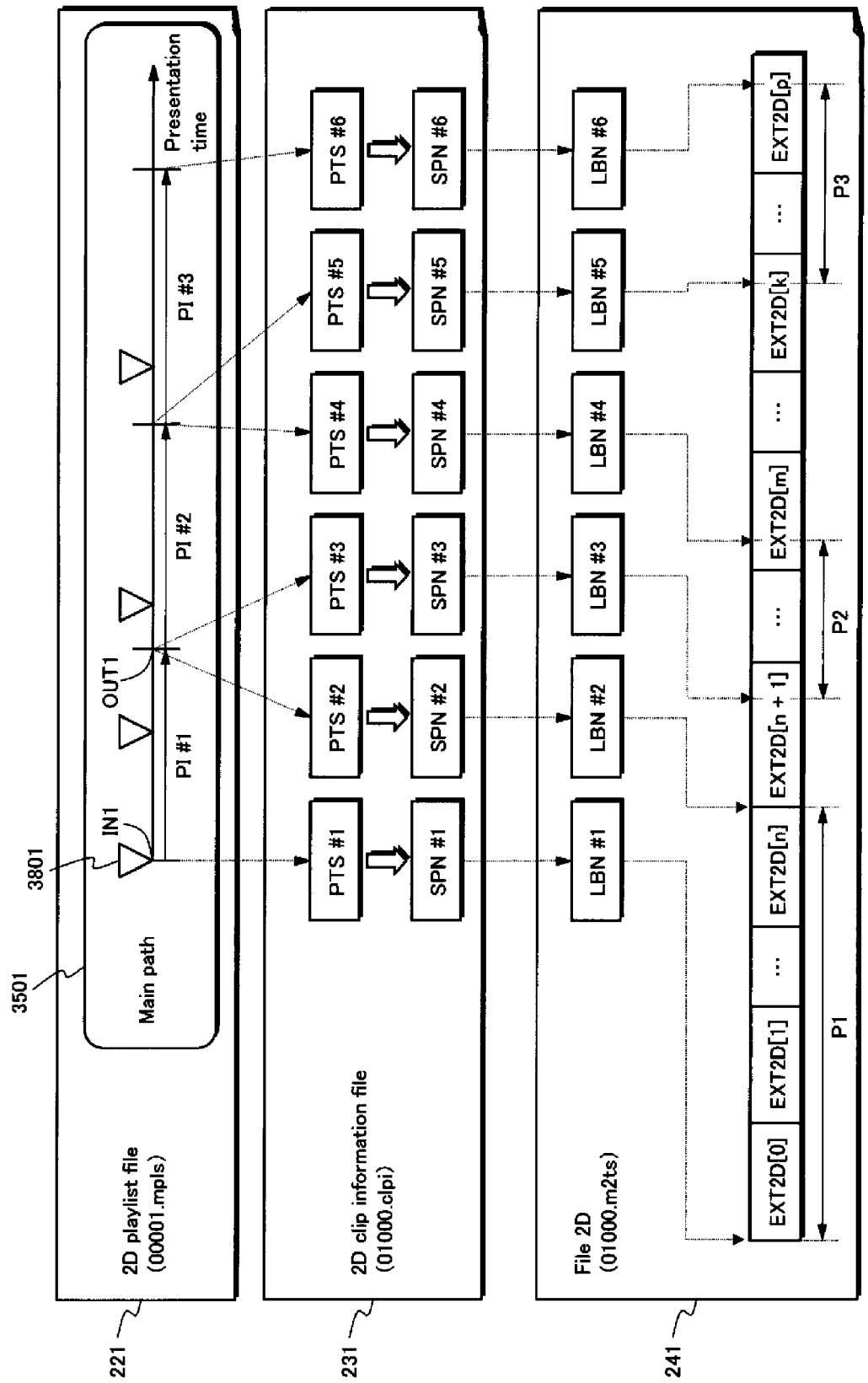

FIG.46

| 4601 | 4602 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 4601 | 4602 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 4601 | 4602 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 63 | reserved |

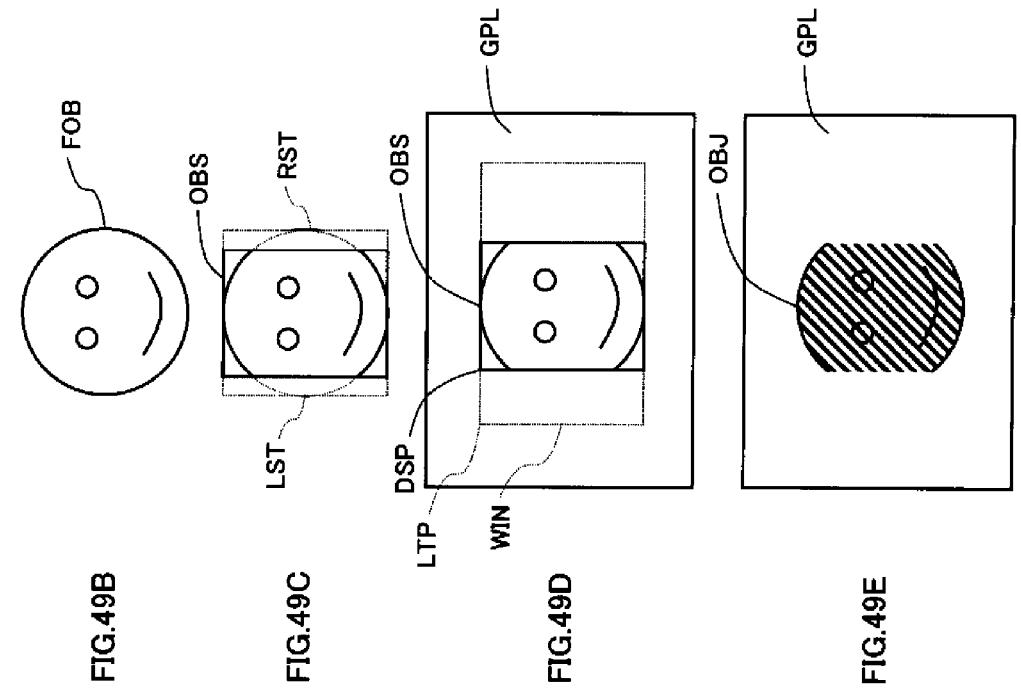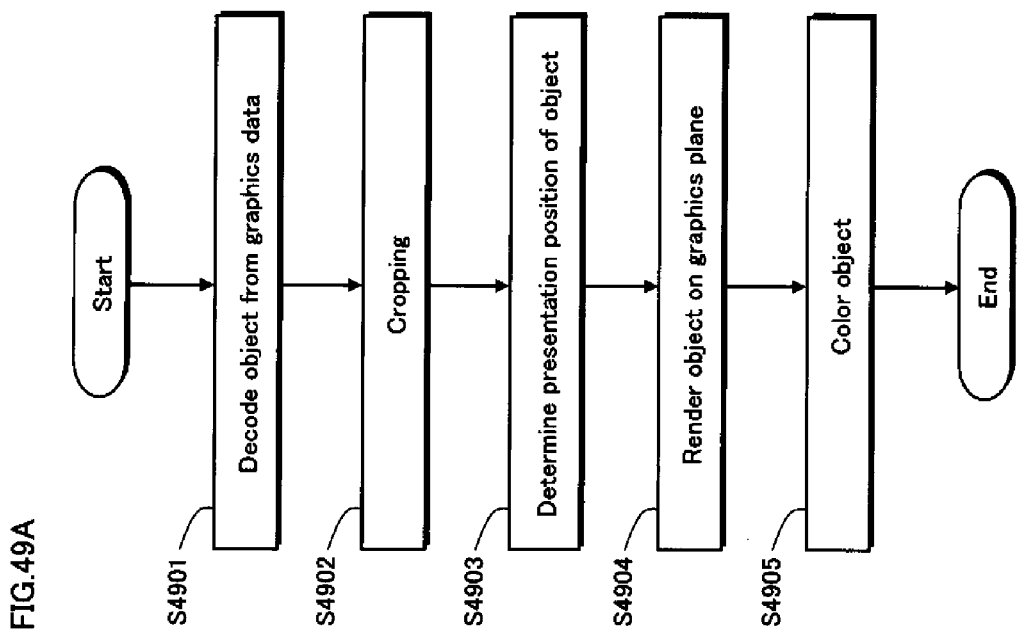

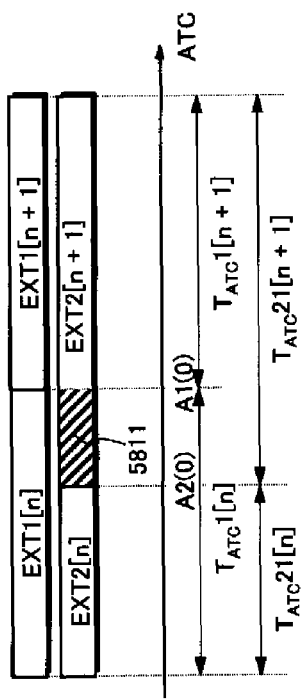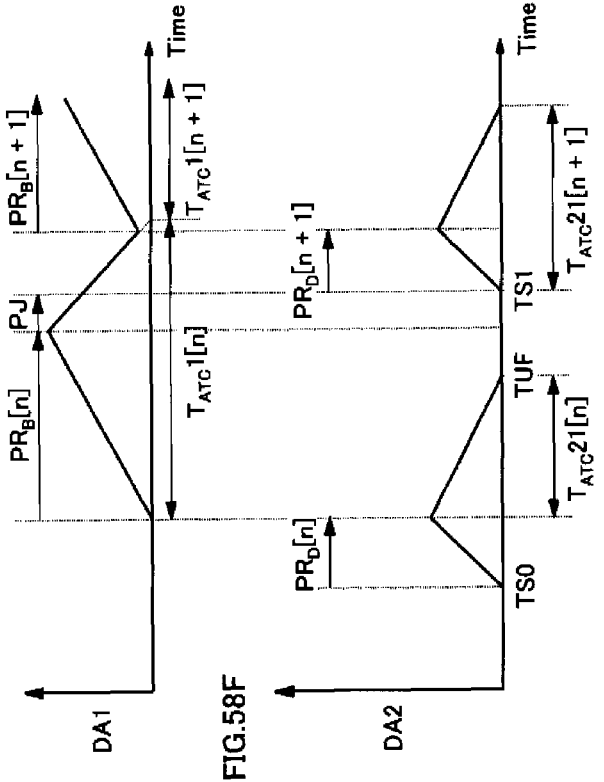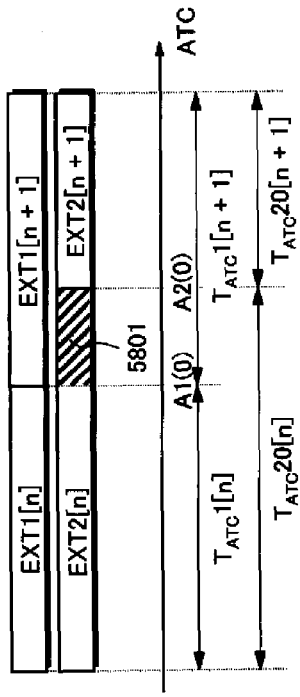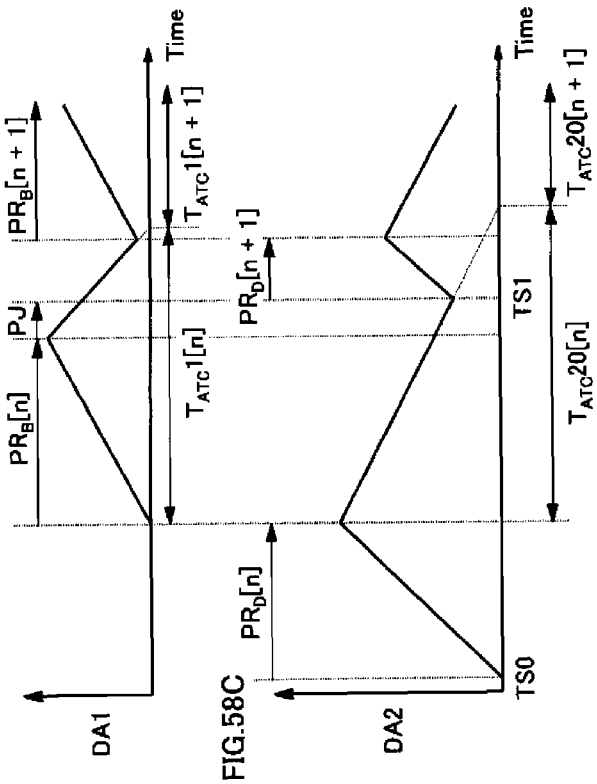

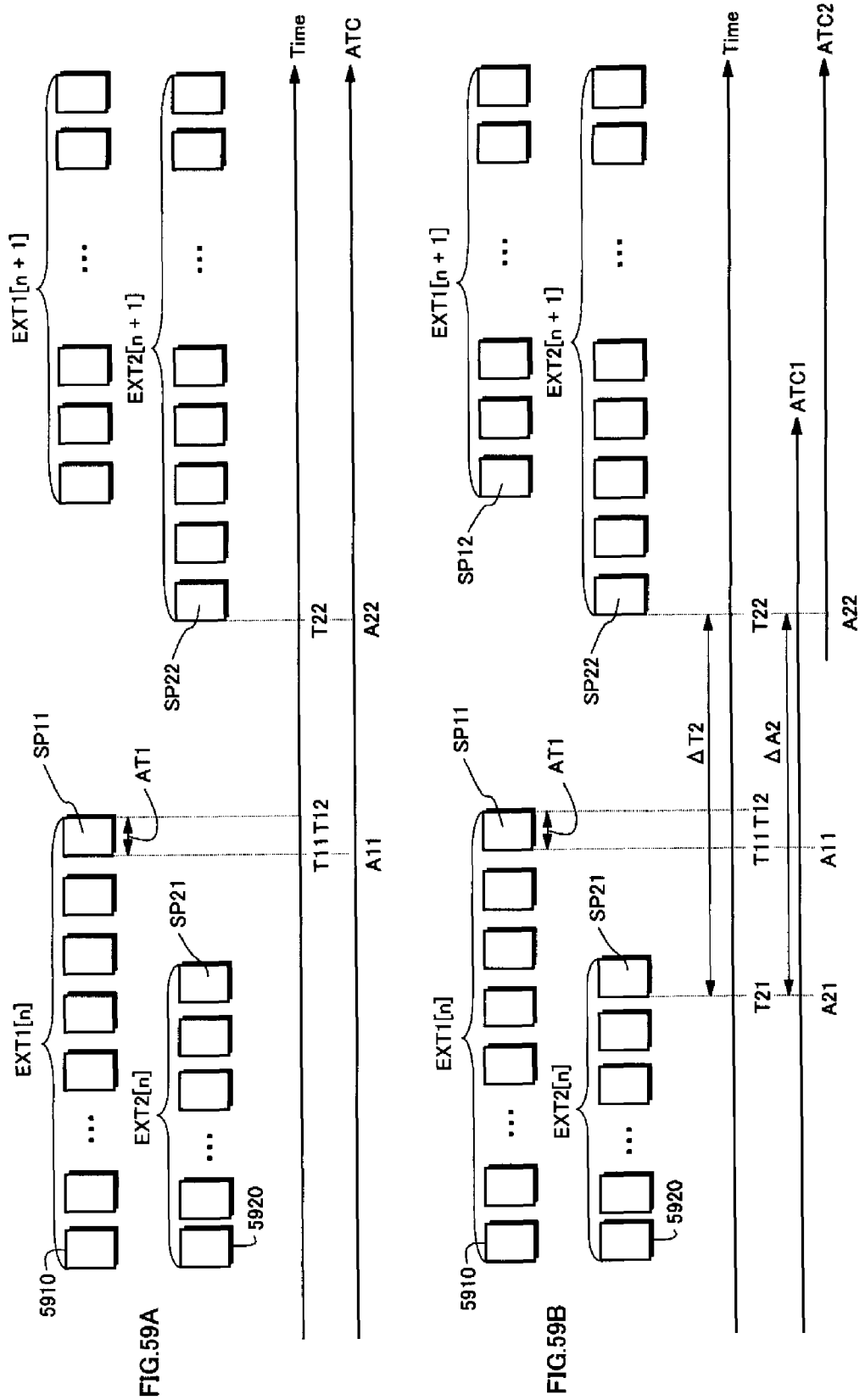

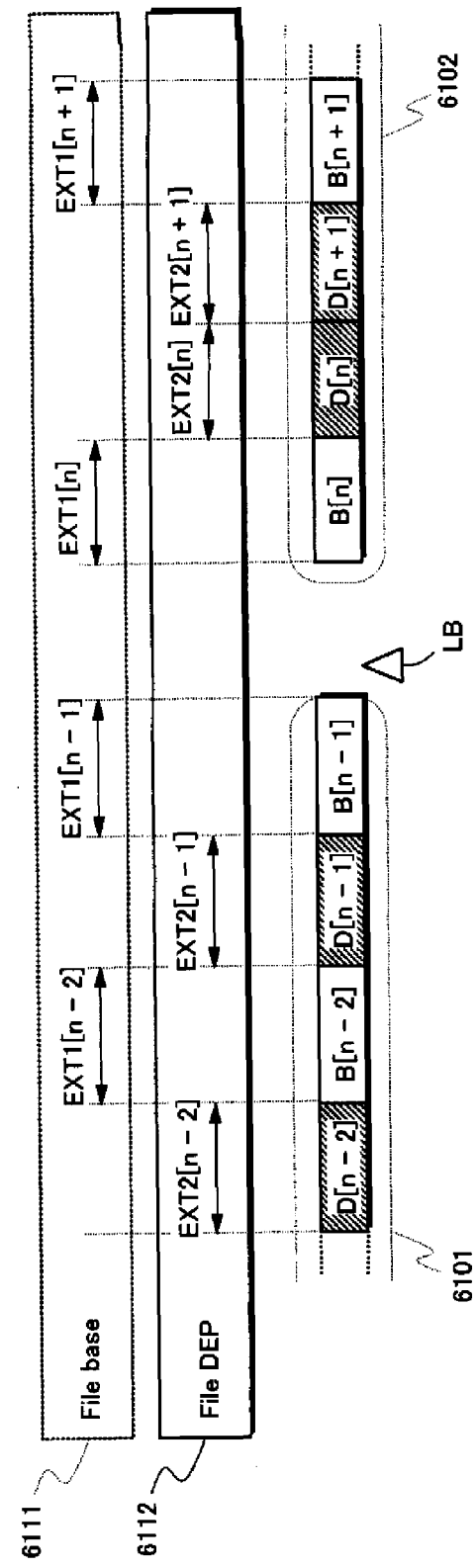

FIG.63A
| Syntax | No. of bits | Mnemonic |
|---|---|---|
| Extent_Start_Point() { | | |
|   length | 32 | uimsbf |
|   reserved_for_future_use | 16 | bslbf |
|   number_of_extent_start_points | 16 | bslbf |
|   for(extent_id=0; extent_id<number_of_extent_points; extent_id++) { | | |
|     is_located_first_in_extent_pair[extent_id] | 1 | bslbf |
|     SPN_extent_start[extent_id] | 31 | bslbf |
|   } | | |
| } | | |
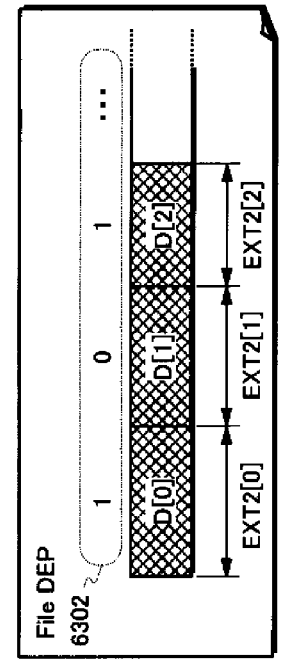
FIG.63B
File base 6301
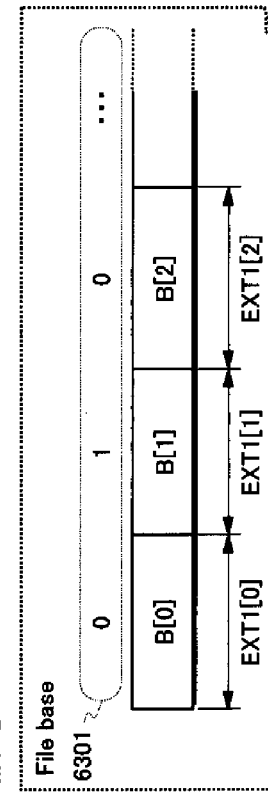
FIG.63C
File DEP 6302
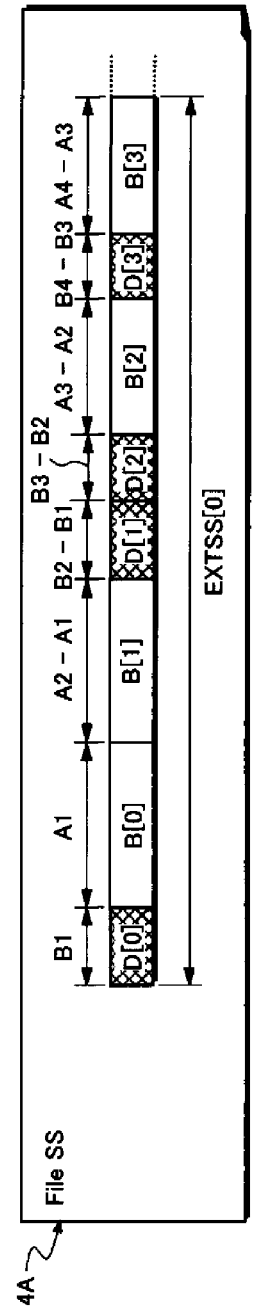
FIG.63D
File SS 244A

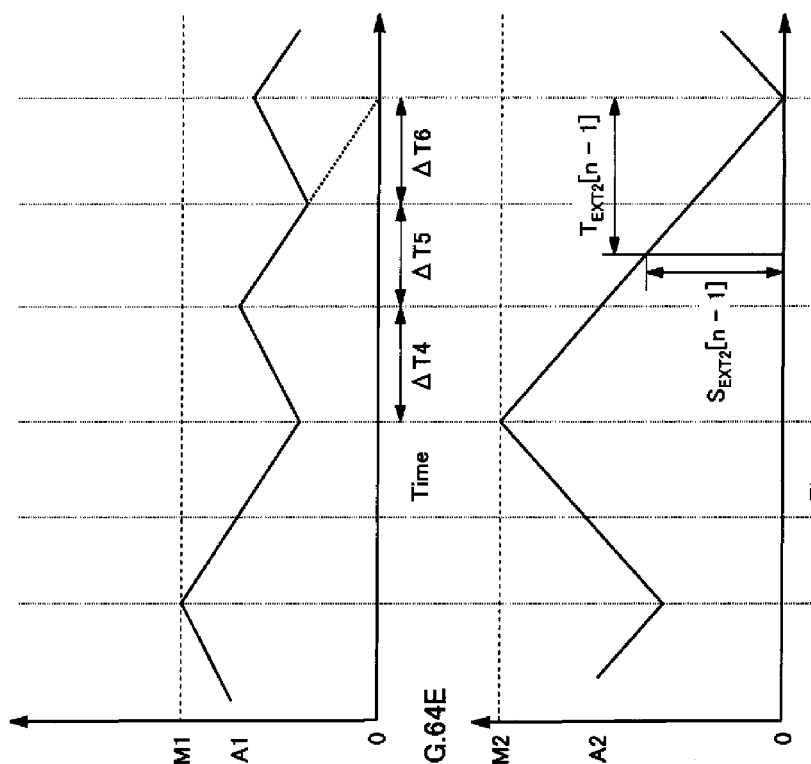
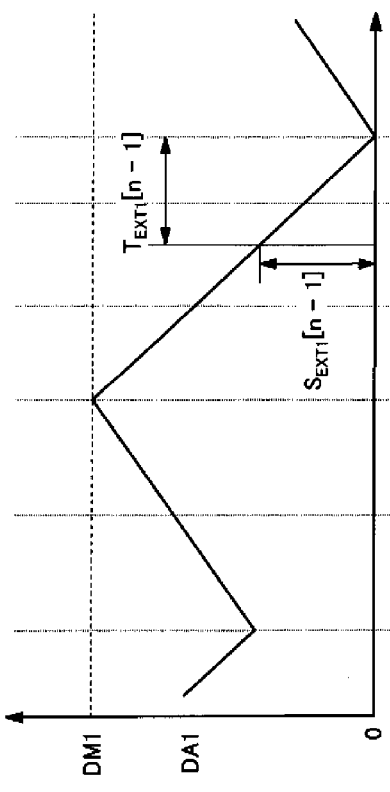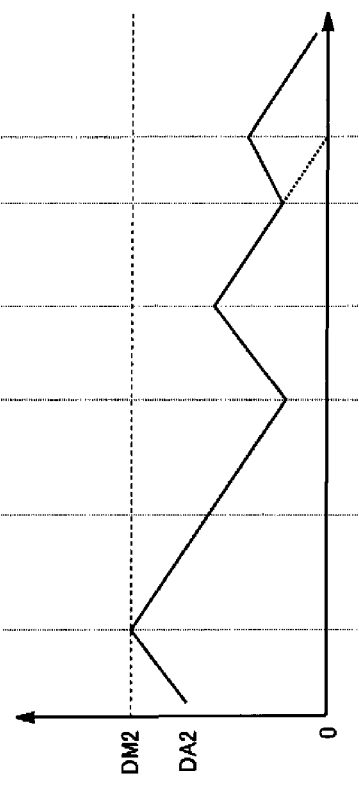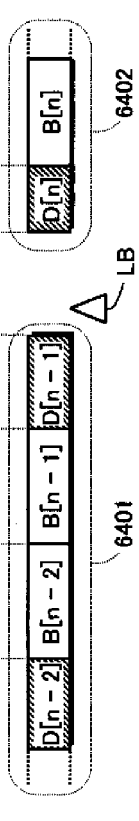

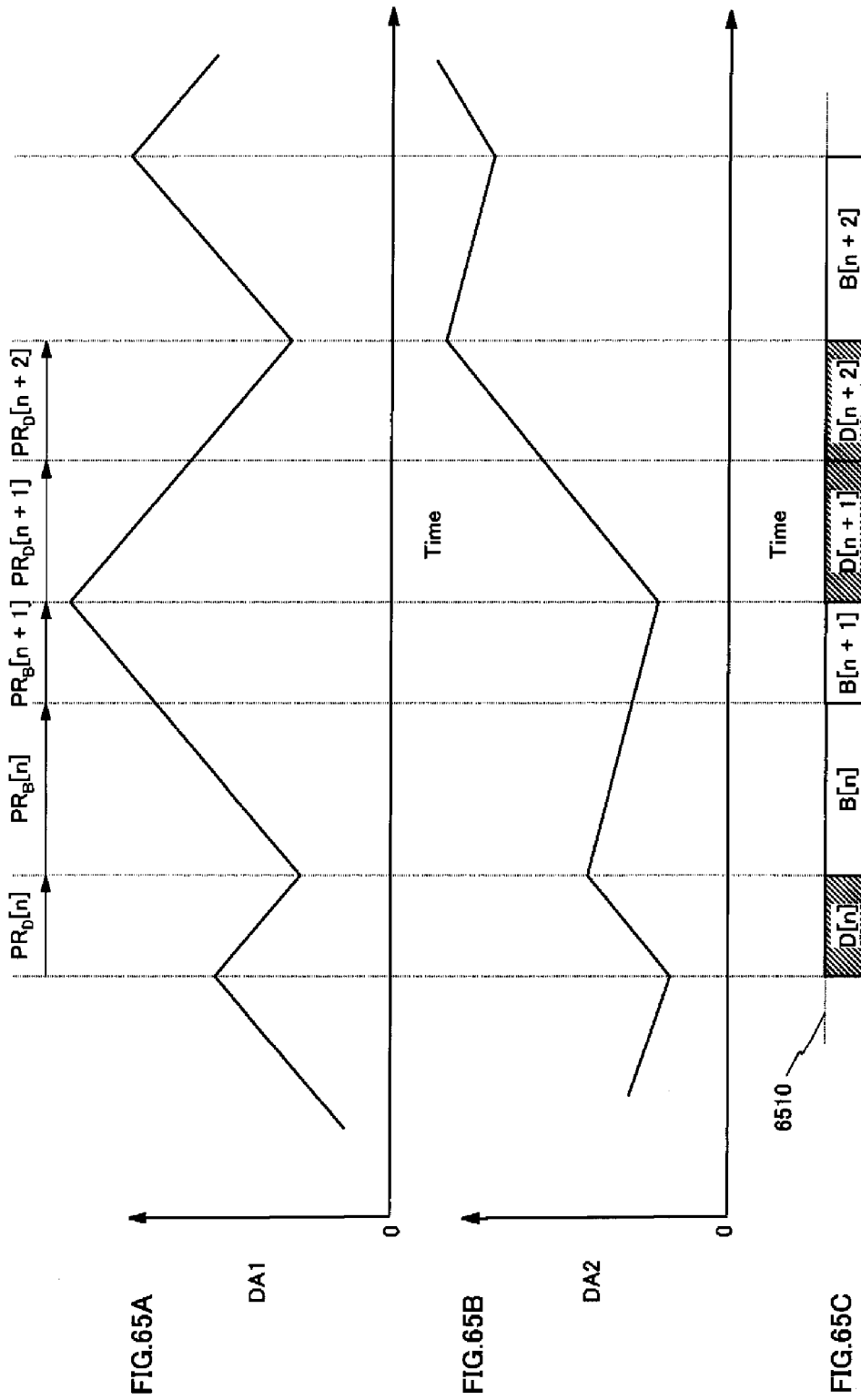

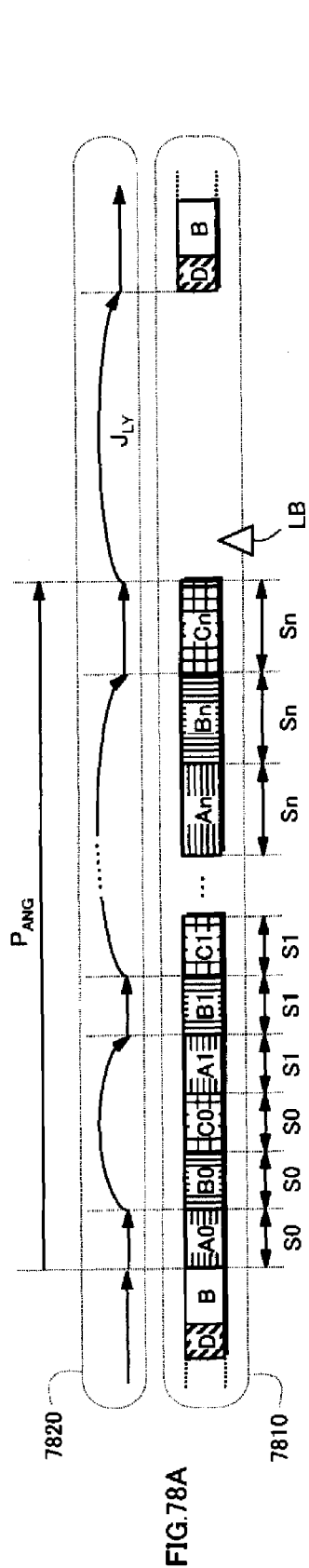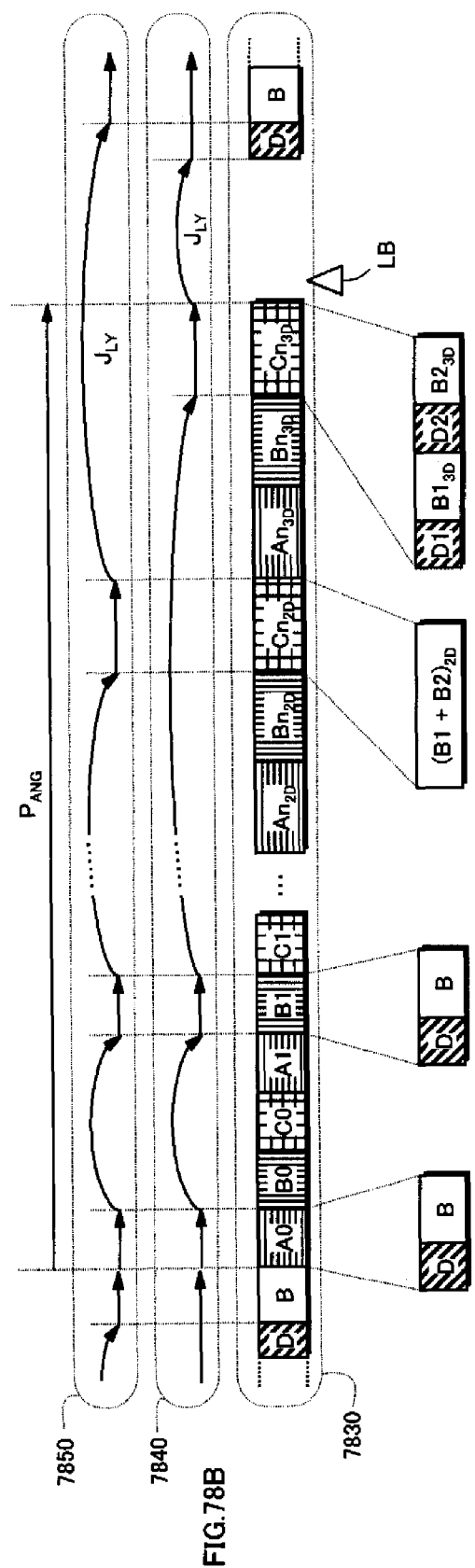
FIG.78A
FIG.78B

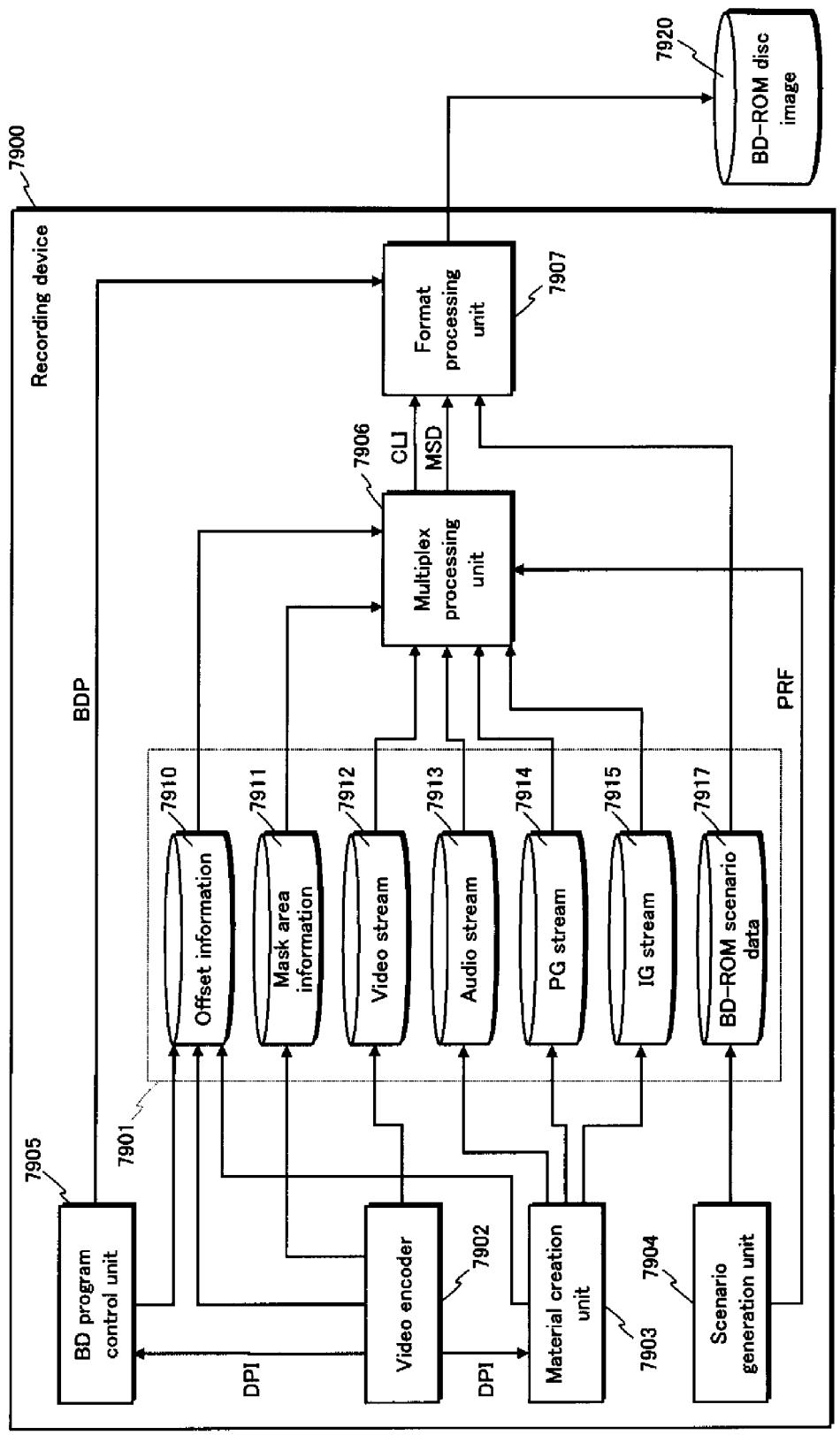

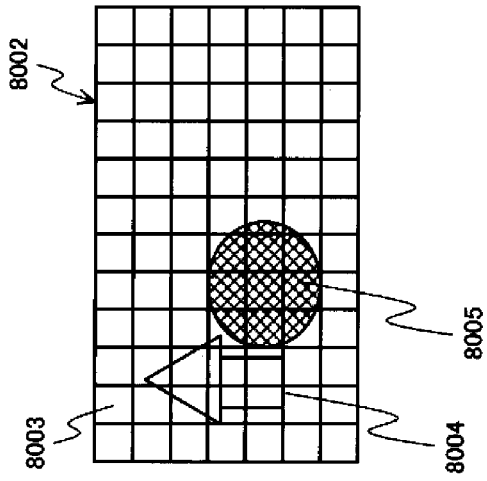
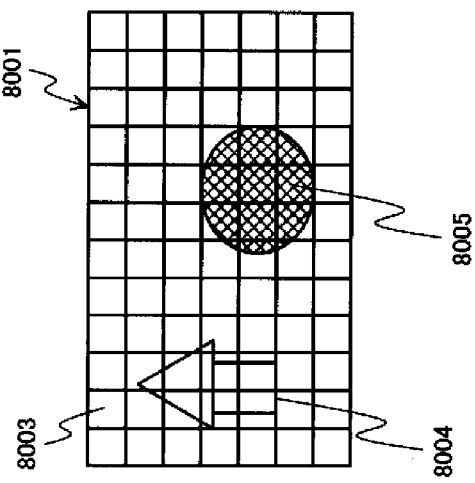
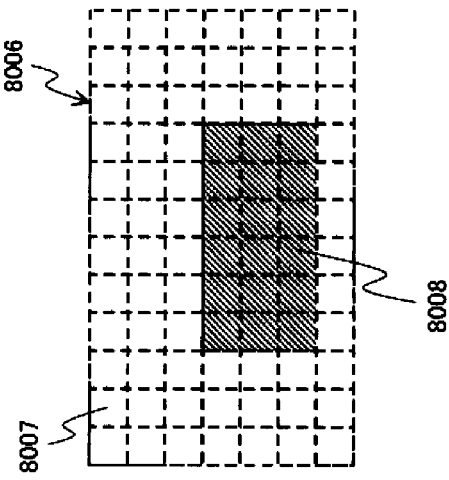

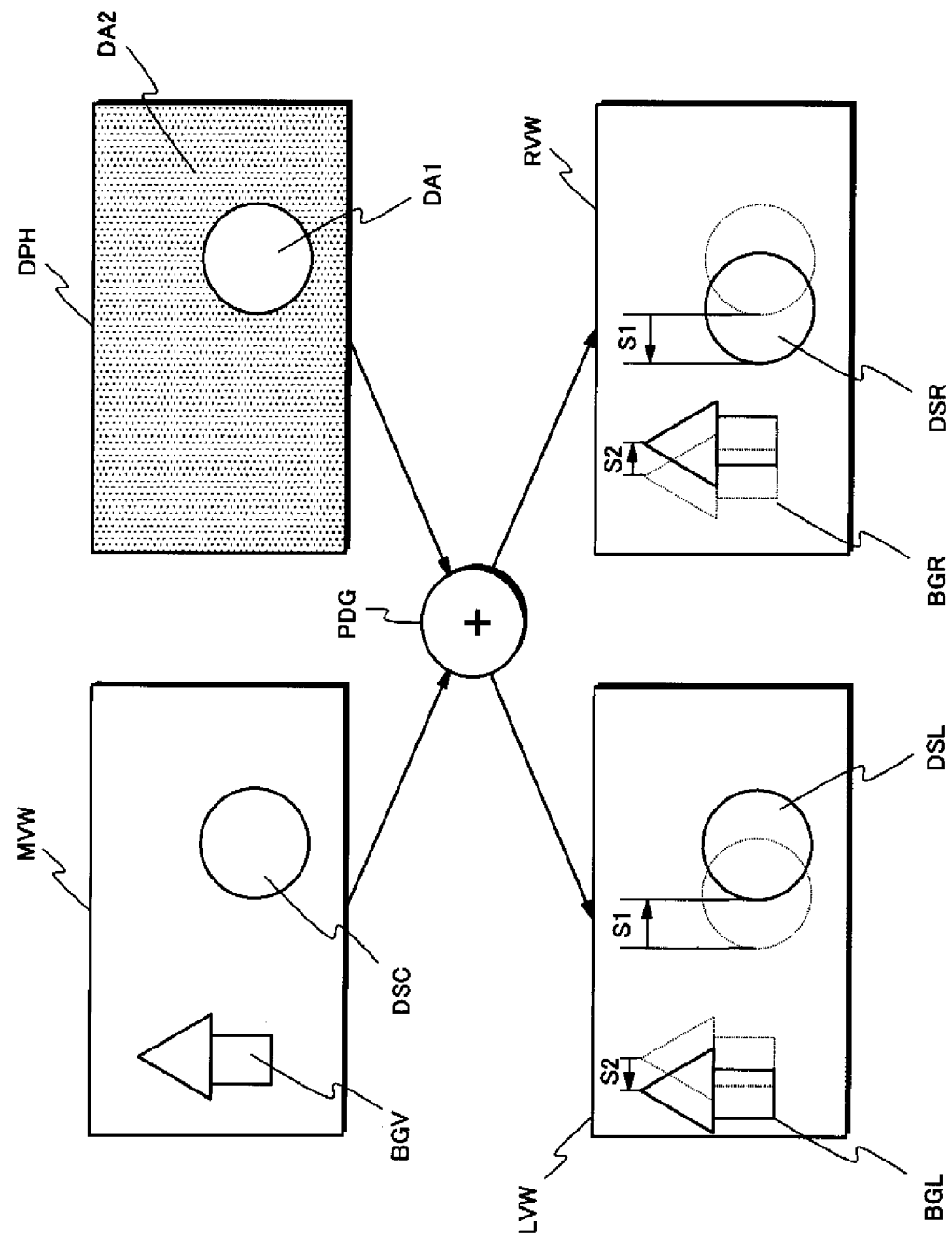

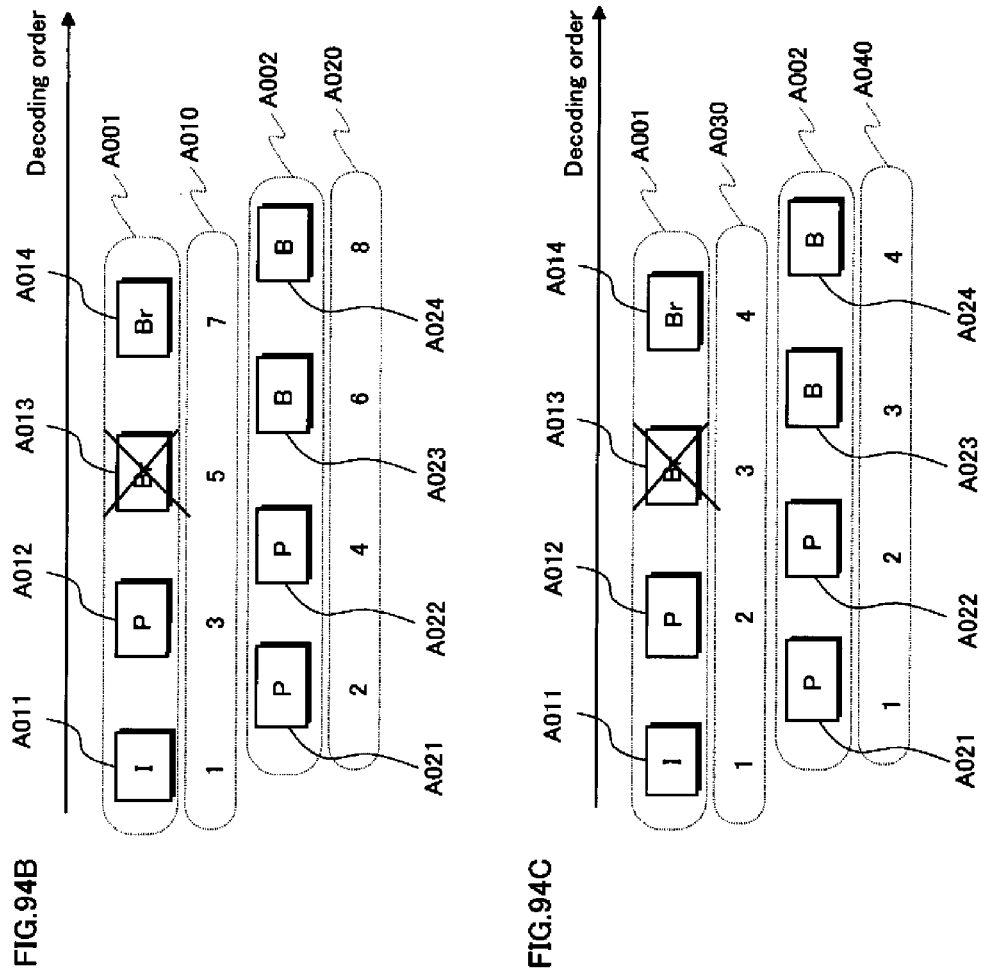
FIG.94B
FIG.94C
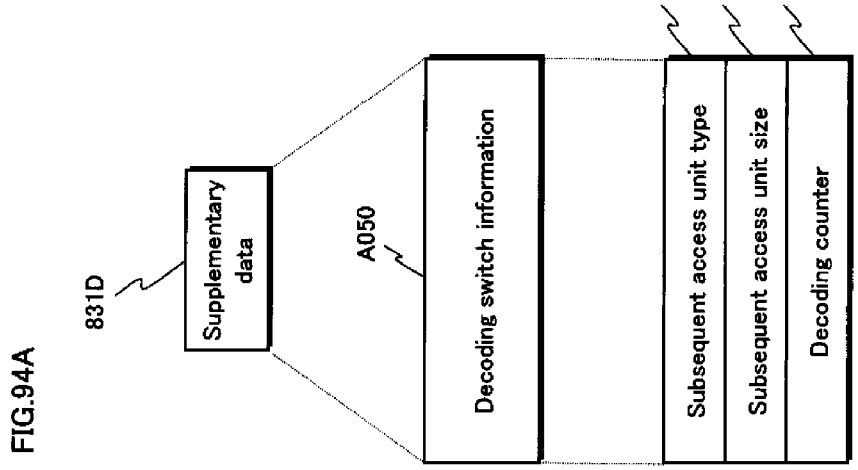
FIG.94A

RECORDING MEDIUM, PLAYBACK DEVICE, AND INTEGRATED CIRCUIT

This application claims benefit to the provisional U.S. Application No. 61/245,804, filed on Sep. 25, 2009.

BACKGROUND OF THE INVENTION (1) Field of the Invention

The present invention relates to a technology for stereoscopic, i.e. three-dimensional (3D), video playback, and especially to the structure of stream data on a recording medium.

(2) Description of the Related Art

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 100 is a schematic diagram illustrating the technology for ensuring the compatibility of an optical disc storing 3D video content with 2D playback devices (see Patent Literature 1). An optical disc PDS stores two types of video streams. One is a 2D/left-view video stream, and the other is a right-view video stream. A "2D/left-view video stream" represents a 2D video image to be shown to the left eye of a viewer during 3D playback, i.e. a "left view". During 2D playback, this stream constitutes the 2D video image. A "right-view video stream" represents a 2D video image to be shown to the right eye of the viewer during 3D playback, i.e. a "right view". The left and right-view video streams have the same frame rate but different presentation times shifted from each other by half a frame period. For example, when the frame rate of each video stream is 24 frames per second, the frames of the 2D/left-view video stream and the right-view video stream are alternately displayed every 1/48 seconds.

As shown in FIG. 100, the left-view and right-view video streams are divided into a plurality of extents EX1A-C and EX2A-C respectively on the optical disc PDS. Each extent contains at least one group of pictures (GOP), GOPs being read together by the optical disc drive. Hereinafter, the extents belonging to the 2D/left-view video stream are referred to as "2D/left-view extents", and the extents belonging to the right-view video stream are referred to as "right-view extents". The 2D/left-view extents EX1A-C and the right-view extents EX2A-C are alternately arranged on a track of the optical disc PDS. Each two contiguous extents EX1A+EX2A, EX1B+EX2B, and EX1C+EX2C have the same length of playback time. Such an arrangement of extents is referred to as an "interleaved arrangement". A group of extents recorded in an interleaved arrangement on a recording medium is used both in 3D video playback and 2D video image playback, as described below.

From among the extents recorded on the optical disc PDS, a 2D playback device PL2 causes an optical disc drive DD2 to read only the 2D/left-view extents EX1A-C sequentially from the start, skipping the reading of right-view extents EX2A-C. Furthermore, an image decoder VDC sequentially decodes the extents read by the optical disc drive DD2 into a video frame VFL. In this way, a display device DS2 only displays left views, and viewers can watch normal 2D video images.

A 3D playback device PL3 causes an optical disc drive DD3 to alternately read 2D/left-view extents and right-view extents from the optical disc PDS. When expressed as codes, the extents are read in the order EX1A, EX2A, EX1B, EX2B, EX1C, and EX2C. Furthermore, from among the read extents, those belonging to the 2D/left-view video stream are supplied to a left-video decoder VDL, whereas those belonging to the right-view video stream are supplied to a right-video decoder VDR. The video decoders VDL and VDR alternately decode each video stream into video frames VFL and VFR, respectively. As a result, left views and right views are alternately displayed on a display device DS3. In synchronization with the switching of the views by the display device DS3, shutter glasses SHG cause the left and right lenses to become opaque alternately. Therefore, a viewer wearing the shutter glasses SHG sees the views displayed by the display device DS3 as 3D video images.

When 3D video content is stored on any recording medium, not only on an optical disc, the above-described interleaved arrangement of extents is used. The recording medium can thus be used both for playback of 2D video images and 3D video images.

Citation List

Patent Literature

Patent Literature 1: Japanese Patent Publication No. 3935507

SUMMARY OF THE INVENTION

As shown in FIG. 100, when 2D video images are played back from an extent group in an interleaved arrangement, the optical disc drive DD2 performs a "jump" at the recording area of each of the right-view extents EX2A-C to skip the reading of data from these recording areas. During a jump period, data is not provided from the optical disc drive DD2 to the buffer in the 2D playback device PL2, and therefore the data stored in the buffer decreases because of processing by the image decoder VDC. Therefore, for 2D video images to be played back seamlessly, each of the 2D/left-view extents EX1A-C needs to have a data amount, i.e. size, equal to or greater than an amount that can prevent buffer underflow.

When 3D video images are played back from the same extent group, right-view extents EX2A-C are not read while 2D/left-view extents EX1A-C are being read. Therefore, during this time, the data of the right-view extents EX2A-C stored in the buffer in the 3D playback device PL3 decreases because of processing by the right-video decoder VDR. By contrast, while right-view extents EX2A-C are being read, the data of the 2D/left-view extents EX1A-C stored in the buffer decreases because of processing by the left-video decoder VDL. Therefore, for 3D video images to be played back seamlessly, the left extent EX1A-C and right extent EX2A-C paired with each other need to have sizes equal to or greater than their respective amounts that can prevent data of one of the paired extents in the buffer from being depleted while the other is being read.

Furthermore, in order to use the data areas on the recording medium efficiently, there are times when it is better to divide sequential stream data into portions recorded in separate recording areas and insert other data therebetween. Additionally, some optical discs have a plurality of recording layers, like dual-layer discs. Such discs may have sequential stream data recorded across two layers. In these cases, an optical disc drive performs a jump when playing back video images from sequential stream data in order to skip reading of the other data or to switch recording layers. In order to play back video images seamlessly regardless of the jump, the extents need to have sizes equal to or greater than their respective amounts that, during the jump period, can prevent buffer underflow or depletion of data of one of the extents. The above conditions determine the lower limit of the size of an extent.

As described above, left and right extents paired with each other are read from the recording medium by the 3D playback device and then stored into separate buffers in the 3D playback device. For 3D video images to be played back seamlessly, the buffers need to have storage capacities equal to or greater than their respective amounts that can prevent data of one of the paired extents from being depleted while the other is being read. Since the larger size of an extent requires a longer read period, the buffers need to have larger capacities in order to prevent one of the paired extents from being depleted while the other is being read. As a result, the buffer capacity that can be mounted on the playback device determines the upper limit of the size of an extent. Note that a playback device with a smaller buffer capacity generally requires a lower manufacturing cost. Therefore, it is preferable to reduce buffer capacity as much as possible, while satisfying the restrictions on extent size.

It is an object of the present invention to provide a recording medium that enables a buffer of a playback device to have a more reduced capacity without underflow while any monoscopic video images and stereoscopic video images are being played back.

On a recording medium according to a first aspect of the present invention, a main-view stream, a sub-view stream, and management information are recorded. The main-view stream has multiplexed therein a main-view video stream that constitutes main views of stereoscopic video images. The sub-view stream has multiplexed therein a sub-view video stream that constitutes sub-views of stereoscopic video images. The sub-view video stream is encoded with reference to the main-view video stream. The management information includes a system rate of each of the main-view stream and the sub-view stream. The recording medium includes a long jump region that is one of a region having at least a predetermined number of sectors and a region having a layer boundary. The main-view stream is divided and arranged into a plurality of main-view data blocks. The sub-view stream is divided and arranged into a plurality of sub-view data blocks. The recording medium includes a plurality of extent blocks, each of the extent blocks having main-view data blocks and sub-view data blocks in a continuous interleaved arrangement and being referred to as a single extent when stereoscopic video images are played back. Each extent block has a sub-view data block at the top of the extent block and includes at least one pair of a sub-view data block and a main-view data block. A first extent block is to be read immediately before a second extent block is read or immediately after a third extent block is read. A main-view data block and a sub-view data block constitute a single pair in the first extent block and each have a maximum size that is determined by the following factors: the system rate of the sub-view stream; whether the single pair is at the top of the first extent block; and whether the long jump region exists between recording areas of the first extent block and the second extent block, or between recording areas of the first extent block and the third extent block.

On a recording medium according to a second aspect of the present invention, a data stream and management information are recorded. The data stream includes a plurality of data blocks. The data stream also includes a main-view stream used for monoscopic playback and a sub-view stream used for playback of stereoscopic video images in combination with the main-view stream. The data blocks include a plurality of main-view data blocks constituting the main-view stream and a plurality of sub-view data blocks constituting the sub-view stream. Types of the data blocks are classified into common data blocks, monoscopic specific data blocks, and stereoscopic specific data blocks. Each common data block includes both a main-view data block and a sub-view data block and to be accessed during both monoscopic playback and stereoscopic playback. Each monoscopic specific data block exclusively includes a main-view data block and is to be accessed only during monoscopic playback. Each stereoscopic specific data block includes both a main-view data block and a sub-view data block and is to be accessed only during stereoscopic playback. One of the monoscopic specific data blocks includes a main-view data block having the same content as a main-view data block included in one of the stereoscopic specific data blocks. The management information includes a system rate of the main-view stream, a system rate of the sub-view stream, stereoscopic video playback path information, and monoscopic video playback path information. The stereoscopic video playback path information indicates a path for main-view data blocks and sub-view data blocks included in the common data blocks and the stereoscopic specific data blocks, the path representing the main-view data blocks and sub-view data blocks to be played back during stereoscopic playback. The monoscopic video playback path information indicates a path for main-view data blocks included in the common data blocks and the monoscopic specific data blocks, the path representing the main-view data blocks to be played back during monoscopic playback. The recording medium includes a long jump region that is one of a region having at least a predetermined number of sectors and a region having a layer boundary. The common data blocks include a first common data block and a second common data block to be read in this order, the long jump region existing between recording areas of the first common data block and the second common data block. The monoscopic specific data blocks and the stereoscopic specific data blocks respectively include a first monoscopic specific data block and a first stereoscopic specific data block that have identical content and are recorded between the recording area of the first common data block and the long jump region, or between the long jump region and the recording area of the second common data block. The first common data block, the second common data block, and the first monoscopic specific data block each include a main-view data block having a minimum size that is determined by at least the following factors: (1) a rate at which a playback device reads the main-view data block from the recording medium during monoscopic playback; (2) a bit rate of the main-view data block; and (3) a length of time necessary for the playback device to jump over the long jump region during monoscopic playback. The first common data block, the second common data block, the first monoscopic specific data block, and the first stereoscopic specific data block each include a main-view data block having a maximum size that is determined by at least the following factors: (4) the system rate of the sub-view stream; and (5) whether the long jump region exists between recording areas of two data blocks to be consecutively read.

On the recording medium according to the first aspect of the present invention, a main-view data block and a sub-view data block forming one pair have maximum sizes that are determined by the above three conditions, (i)-(iii). This enables a playback device to maintain the capacity of its read buffer at a lower level, regardless of a rise in the system rate of the sub-view stream. Accordingly, this recording medium enables the read buffer of the playback device to have a more reduced capacity without underflow while any of monoscopic video images is being played back.

On the recording medium according to the second aspect of the present invention, the playback path for stereoscopic video images is separated from the playback path for monoscopic video images before or after the long jump region. Accordingly, the minimum sizes of main-view data blocks included in the common data blocks and the monoscopic specific data blocks are determined by the above three parameters, (1)-(3), and in addition, the maximum sizes of main-view data blocks included in the common data blocks, monoscopic specific data blocks, and stereoscopic specific data blocks are determined by, at least, the above conditions (4) and (5). As a result, this recording medium enables the read buffer of a playback device to have more reduced capacity without underflow while any monoscopic video images and stereoscopic video images are being played back.

BRIEF DESCRIPTION OF THE DRAWINGS

FIGS. 3A, 3B, and 3C are lists of multiplexed elementary streams in the main TS, first sub-TS, and second sub-TS on the BD-ROM disc 101 shown in FIG. 1;

FIGS. 12A and 12B are schematic diagrams showing offset controls for a PG plane 1210 and IG plane 1220 respectively, and FIG. 12C is a schematic diagram showing 3D graphics images that a viewer 1230 is made to perceive from 2D graphics images represented by graphics planes shown in FIGS. 12A and 12B;

FIG. 16A is a schematic diagram showing the arrangement of the main TS 1601 and sub-TS 1602 recorded separately and consecutively on a BD-ROM disc, FIG. 16B is a schematic diagram showing an interleaved arrangement of dependent-view data blocks D[0], D[1], D[2], . . . and base-view data blocks B[0], B[1], B[2], . . . recorded on the BD-ROM disc 101 according to Embodiment 1 of the present invention, and FIGS. 16C and 16D are schematic diagrams showing an example of the extent ATC times for a dependent-view data block group D[n] and a base-view data block group B[n] recorded in an interleaved arrangement (n=0, 1, 2);

FIG. 20A is a graph showing changes in a data amount DA stored in a read buffer 1902, shown in FIG. 19, during operation in 2D playback mode, and FIG. 20B is a schematic diagram showing correspondence between an extent block 2010 for playback and a playback path 2020 in 2D playback mode;

FIG. 21 is an example of a correspondence table between jump distances $S_{JUMP}$ and maximum jump times $T_{JUMP\_MAX}$ for a BD-ROM disc;

FIGS. 23A and 23B are graphs showing changes in data amounts DA1 and DA2, stored in read buffers RB1 2211 and RB2 2212 shown in FIG. 22, when 3D video images are played back seamlessly from one extent block, and FIG. 23C is a schematic diagram showing correspondence between the extent block 2310 and a playback path 2320 in 3D playback mode;

FIG. 24A is a graph showing (i) changes in data amounts DA1 and DA2, stored in read buffers RB1 2211 and RB2 2212 shown in FIG. 22, when 3D video images are continually played back seamlessly from the $(M+1)^{th}$ extent block and $(M+2)^{th}$ extent blocks (the letter M representing an integer one or greater) and (ii) changes in the sum of DA1+DA2, and FIG. 24B is a schematic diagram showing correspondence between the extent blocks 2401, 2402 and a playback path 2420 in 3D playback mode;

FIGS. 26A, 26B, and 26C are graphs respectively showing changes over time in a base-view transfer rate $R_{EXT1}$, a dependent-view transfer rate $R_{EXT2}$, and a total of the two rates;

FIG. 28A is a table showing correspondence between a system rate $R_{TS2}$ for the file DEP and a maximum extent size for a data block, FIG. 28B is a schematic diagram showing a first extent SS EXTSS[0] and a second extent SS EXTSS[1] respectively located immediately before and after a layer boundary LB on the BD-ROM disc, and FIG. 28C is a schematic diagram showing a third extent SS EXTSS[10] and a fourth extent SS EXTSS[11] respectively located immediately before and after a recording area NAV for data other than multiplexed stream data on the BD-ROM disc;

FIG. 29 is a table showing, for different combinations of mean transfer rates $R_{EXT1}$ and $R_{EXT2}$, the maximum extent sizes $maxS_{EXT1}$ and $maxS_{EXT2}$ and the extent ATC time $T_{EXT}$ of each data block;

FIG. 31A is a schematic diagram showing a data structure of an entry map 3030 shown in FIG. 30, FIG. 31B is a schematic diagram showing source packets, in a source packet group 3110 belonging to the file 2D 241 shown in FIG. 2, that are associated with each EP_ID 3105 by the entry map 3030, and FIG. 31C is a schematic diagram showing a data block group D[n], B[n] (n=0, 1, 2, 3, . . . ) on a BD-ROM disc 101 corresponding to the source packet group 3110;

FIG. 32A is a schematic diagram showing a data structure of extent start points 3042 shown in FIG. 30, FIG. 32B is a schematic diagram showing a data structure of extent start points 3220 included in the second clip information file (02000.clpi) 232 shown in FIG. 2, FIG. 32C is a schematic diagram representing base-view data blocks B[0], B[1], B[2], . . . extracted from the first file SS 244A shown in FIG. 2 by the playback device 102 in 3D playback mode, FIG. 32D is a schematic diagram representing correspondence between dependent-view extents EXT2[0], EXT2[1], . . . belonging to the file DEP (02000.m2ts) 242 shown in FIG. 2 and SPNs 3222 shown by the extent start points 3220, and FIG. 32E is a schematic diagram showing correspondence between an extent SS EXTSS[0] belonging to the first file SS 244A and an extent block on the BD-ROM disc 101;

FIG. 36 is a schematic diagram showing a data structure of playitem information, PI #N, for playitem ID=#N (N=1, 2, 3, . . . );

FIG. 38 is a schematic diagram showing correspondence between PTSs indicated by the 2D playlist file (00001.mpls) 221 shown in FIG. 35 and sections played back from the file 2D (01000.m2ts) 241 shown in FIG. 35;

FIG. 46 is a list of system parameters (SPRM) recorded by the player variable storage unit 4536 shown in FIG. 45;

FIG. 49A is a flowchart of processing by which the PG decoder 4872 shown in FIG. 48 decodes a graphics object from one data entry in the PG stream, and FIGS. 49B through 49E are schematic diagrams showing how the graphics object changes in accordance with the processing;

FIGS. 58A and 58D are schematic diagrams indicating times at which data blocks are transferred from RB1 and RB2 to the system target decoder when PI #(N−1) and PI #N are connected seamlessly (the letter N representing an integer one or greater), the data blocks being located before and after the connection point; in FIG. 58A, the transfer period $T_{ATC}20[n]$ of EXT2[n] finishes later than the transfer period $T_{ATC}1[n]$ of EXT1[n], and in FIG. 58D, the transfer period $T_{ATC}21[n]$ of EXT2[n] finishes earlier than the transfer period $T_{ATC}1[n]$ of EXT1[n]; FIGS. 58B and 58C are graphs showing changes over time in the data amounts DA1 and DA2, respectively stored in RB1 and RB2, when the 3D playback device decodes EXT1[n], EXT1[n+1], EXT2[n], and EXT2[n+1] shown in FIG. 58A, and FIGS. 58E and 58F are graphs showing changes over time in the data amounts DA1 and DA2 stored in RB1 and RB2 when the 3D playback device decodes EXT1[n], EXT1[n+1], EXT2[n], and EXT2[n+1] shown in FIG. 58D;

FIGS. 59A and 59B are schematic diagrams showing, when seamless connection is set to CC=6, 5 between PI #(N−1) and PI #N, correspondence between the ATS set for each of the source packets respectively located before and after the connection point and the transfer period of the source packet;

FIG. 61A is a table showing maximum extent sizes max-$S_{EXT1}[n]$ and max$S_{EXT2}[n]$ for different combinations of the base-view transfer rate $R_{EXT1}[n]$ and dependent-view transfer rate $R_{EXT2}[n]$ for one extent pair (the letter n representing an integer zero or greater), and FIG. 61B is a schematic diagram showing the case when a data block with a smaller size is placed before a data block with a larger size in each extent pair for the $(M+1)^{th}$ extent block (EXTSS[M]) 6101 and the $(M+2)^{th}$ extent block (EXTSS[M+1]) 6102 respectively located before and after a layer boundary LB (the letter M representing an integer zero or greater);

FIG. 63A is a schematic diagram showing data structure (syntax) of extent start points for an arrangement in which the order of data blocks is reversed for an extent pair located within an extent block, FIG. 63B is a schematic diagram showing correspondence between base-view extents EXT1[k] (k=0, 1, 2, ... ) belonging to a file base and extent start flags indicated by extent start points, FIG. 63C is a schematic diagram showing correspondence between dependent-view extents EXT2[k] belonging to a file DEP and extent start flags indicated by extent start points, and FIG. 63D is a schematic diagram showing correspondence between an extent SS EXTSS[0] belonging to a file SS and extent blocks on the BD-ROM disc;

FIG. 64C is a schematic diagram showing the arrangement of data blocks requiring the largest capacity for RB1, FIGS. 64A and 64B are graphs showing changes in data amounts DA1 and DA2, respectively stored in RB1 and RB2, when 3D video images are continually played back seamlessly from EXTSS[M] 6401 and EXTSS[M+1] 6402 shown in FIG. 64C, FIG. 64F is a schematic diagram showing the arrangement of data blocks requiring the largest capacity for RB2, and FIGS. 64D and 64E are graphs showing changes in data amounts DA1 and DA2, respectively stored in RB1 and RB2, when 3D video images are continually played back seamlessly from EXTSS[N] 6403 and EXTSS[N+1] 6404 shown in FIG. 64F;

FIG. 65C is a schematic diagram showing an extent block 6510 that includes therein an extent pair in which the order of data blocks is reversed, and FIGS. 65A and 65B are graphs showing changes in data amounts DA1 and DA2, respectively stored in RB1 and RB2, when 3D video images are continually played back seamlessly from the extent block 6501 shown in FIG. 65C;

FIG. 78A is a schematic diagram showing correspondence between an extent block group 7810 constituting a 1TS multi-angle period $P_{ANG}$ and a playback path 7820 corresponding to the extent block group 7810, and FIG. 78B is a schematic diagram showing correspondence between an extent block group 7830 constituting a 2TS multi-angle period $P_{ANG}$ and a playback path 7840 in 2D playback mode and playback path 7850 in 3D playback mode that correspond to the extent block group 7830;

FIG. 79 is a functional block diagram of a recording device 7900 according to Embodiment 3 of the present invention;

FIGS. 80A and 80B are schematic diagrams respectively showing a left-view picture and a right-view picture used to display one scene of 3D video images, and FIG. 80C is a schematic diagram showing depth information calculated from these pictures by the video encoder 7902 shown in FIG. 79;

FIG. 93 is a schematic diagram showing an example of constructing a left-view LVW and a right-view RVW from the combination of a 2D video image MVW and a depth map DPH;

FIG. 94A is a schematic diagram showing a data structure of decoding switch information A050, FIG. 94B is a schematic diagram showing sequences of decoding counters A010 and A020 allocated to each picture in a base-view video stream A001 and a dependent-view video stream A002, and FIG. 94C is a schematic diagram showing other examples of decoding counters A030 and A040 allocated to each picture in the video streams A001 and A002;

DETAILED DESCRIPTION OF THE INVENTION

The following describes a recording medium and a playback device pertaining to preferred Embodiments of the present invention with reference to the drawings.

<<Embodiment 1>>

Figure 1:
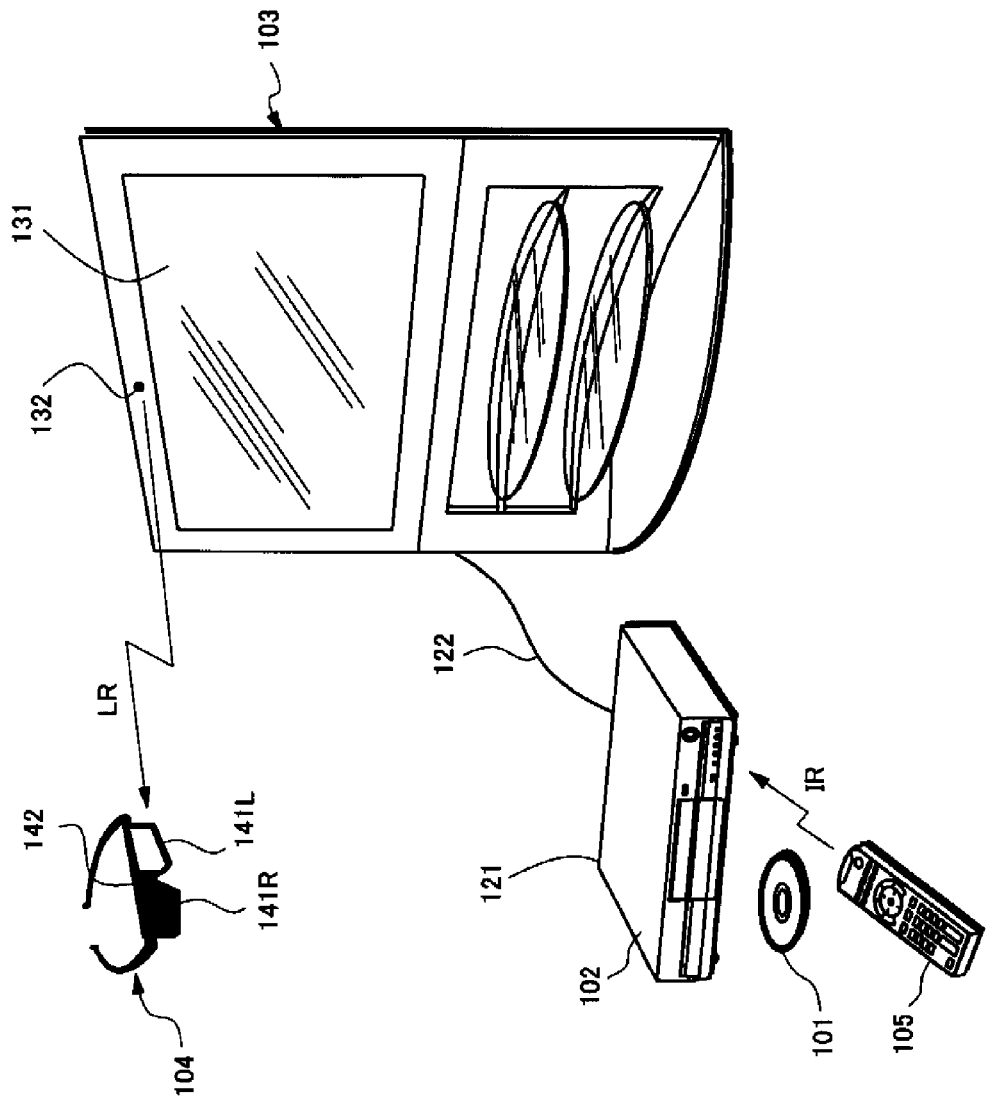
FIG. 1 is a schematic diagram showing a home theater system that uses a recording medium according to Embodiment 1 of the present invention.

FIG. 1 is a schematic diagram showing a home theater system that uses a recording medium according to Embodiment 1 of the present invention. This home theater system adopts a 3D video image (stereoscopic video image) playback method that uses parallax video images, and in particular adopts an alternate-frame sequencing method as a display method (see the <<Supplementary Explanation>> for details). As shown in FIG. 1, this home theater system plays back a recording medium 101 and includes a playback device 102, a display device 103, shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores movie content as 3D video images. This content includes video streams representing a left view and a right view for the 3D video images. The content may further include a video stream representing a depth map for the 3D video images. These video streams are arranged on the BD-ROM disc 101 in units of data blocks and are accessed using a file structure described below. The video streams representing the left view or the right view are used by both a 2D playback device and a 3D playback device to play the content back as 2D video images. Conversely, a pair of video streams representing a left view and a right view, or a pair of video streams representing either a left view or a right view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 is a 3D playback device and can play the content back as both 2D video images and as 3D video images. Hereinafter, the operation modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left view and right view. In "depth mode", a pair of left-view and right-view video frames is generated from a combination of video streams representing either a left view or a right view and a depth map. The playback device 102 is provided with an L/R mode. The playback device 102 may be further provided with a depth mode.

The playback device 102 is connected to the display device 103 via a High-Definition Multimedia Interface (HDMI) cable 122. The playback device 102 converts the video data/audio data into a video signal/audio signal in the HDMI format and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. The playback device 102 can thus ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in response to a video signal, and causes the speakers to produce audio in response to an audio signal. The display device 103 supports playback of 3D video images. During playback of 2D video images, either the left view or the right view is displayed on the screen 131. During playback of 3D video images, the left view and right view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame based on a control signal that accompanies a video signal. Furthermore, the display device 103 causes the left/right signal transmitting unit 132 to switch the left/right signal LR synchronously with the detected switching of frames.

The shutter glasses 104 include two liquid crystal display panels 141L and 141R and a left/right signal receiving unit 142. The liquid crystal display panels 141L and 141R respectively constitute the left and right lens parts. The left/right signal receiving unit 142 receives a left/right signal LR, and in accordance with changes therein, transmits the signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. The two liquid crystal display panels 141L and 141R thus alternately let light pass through in sync with the switching of frames. As a result, when the viewer looks at the screen 131 while wearing the shutter glasses 104, the left view is shown only to the viewer's left eye, and the right view is shown only to the right eye. The viewer is made to perceive the difference between the images seen by each eye as the binocular parallax for the same stereoscopic object, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

Figure 2:
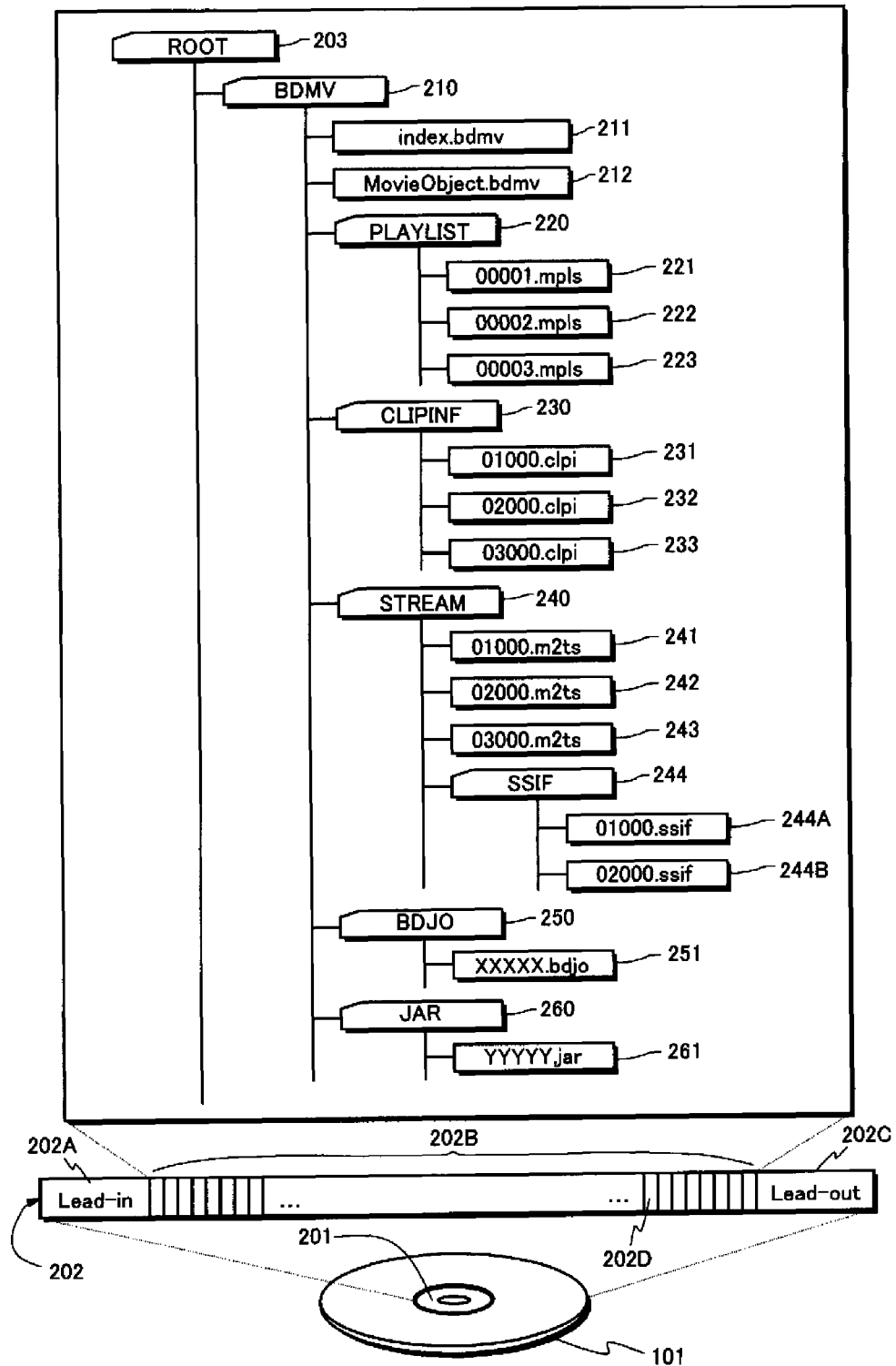
FIG. 2 is a schematic diagram showing a data structure of a BD-ROM disc 101 shown in FIG. 1.

FIG. 2 is a schematic diagram showing a data structure of a BD-ROM disc 101. As shown in FIG. 2, a Burst Cutting Area (BCA) 201 is provided at the innermost part of the data recording area on the BD-ROM disc 101. Only the BD-ROM drive 121 is permitted to access the BCA, and access by application programs is prohibited. The BCA 201 can thus be used as technology for copyright protection. In the data recording area outside of the BCA 201, tracks spiral from the inner to the outer circumference. In FIG. 2, a track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors". The sectors have a common size, for example 2048 bytes. Each sector 202D is consecutively assigned a serial number in order from the top of the volume area 202B. These serial numbers are called logical block numbers (LBN) and are used in logical addresses on the BD-ROM disc 101. During reading of data from the BD-ROM disc 101, data to be read is specified through designation of the LBN for the destination sector. The volume area 202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 202B is managed under a predetermined file system. Universal Disc Format (UDF) is adopted as this file system. Alternatively, the file system may be ISO9660. The data recorded on the volume area 202B is represented in a directory/file format in accordance with the file system (see the <<Supplementary Explanation>> for details). In other words, the data is accessible in units of directories or files.

<<Directory/File Structure on the BD-ROM Disc>>

FIG. 2 further shows the directory/file structure of the data stored in the volume area 202B on a BD-ROM disc 101. As shown in FIG. 2, in this directory/file structure, a BD movie (BDMV) directory 210 is located directly below a ROOT directory 203. Below the BDMV directory 210 are an index file (index.bdmv) 211 and a movie object file (MovieObject.bdmv) 212.

The index file 211 contains information for managing as a whole the content recorded on the BD-ROM disc 101. In particular, this information includes both information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 212 generally stores a plurality of movie objects. Each movie object includes a sequence of navigation commands. A navigation command is a control command causing the playback device 102 to execute playback processing similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. In a manner similar to general DVD players, the playback device 102 first displays a menu on the display device 103 to allow the user to select a command. The playback device 102 then executes playback start/stop of a title, switches to another title, etc. in response to the selected command, thereby dynamically changing the progress of video playback.

As shown in FIG. 2, the BDMV directory 210 further contains a playlist (PLAYLIST) directory 220, a clip information (CLIPINF) directory 230, a stream (STREAM) directory 240, a BD-J object (BDJO: BD Java Object) directory 250, and a Java archive (JAR: Java Archive) directory 260.

Three types of AV stream files, (01000.m2ts) 241, (02000.m2ts) 242, and (03000.m2ts) 243, as well as a Stereoscopic Interleaved File (SSIF) directory 244 are located directly under the STREAM directory 240. Two types of AV stream files, (01000.ssif) 244A and (02000.ssif) 244B are located directly under the SSIF directory 244.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc., i.e. elementary streams, have been multiplexed. Multiplexed stream data can be broadly divided into a main transport stream (TS) and a sub-TS depending on the type of internal primary video stream. A "main TS" is multiplexed stream data that includes a base-view video stream as a primary video stream. A "base-view video stream" is a video stream that can be played back independently and that represents 2D video images. Note that a base-view is also called a "main-view". A "sub-TS" is multiplexed stream data that includes a dependent-view video stream as a primary video stream. A "dependent-view video stream" is a video stream that requires a base-view video stream for playback and represents 3D video images by being combined with the base-view video stream. Note that a dependent-view is also called a "sub-view". The types of dependent-view video streams are a right-view video stream, left-view video stream, and depth map stream. When 2D video images represented by a base-view video stream are used by a playback device in L/R mode as the left view of 3D video images, the "right-view video stream" is used as the video stream representing the right view of the 3D video images. The reverse is true for a "left-view video stream". When 2D video images represented by a base-view video stream are used by a playback device in depth mode as a projection of 3D video images on a virtual 2D screen, the "depth map stream" is used as stream data representing the depth map of the 3D video images. In particular, a depth map stream in which the base-view video stream is used to represent the left view is referred to as a "left-view depth map stream", and a depth map stream in which the base-view video stream is used to represent the right view is referred to as a "right-view depth map stream".

Depending on the type of multiplexed stream data stored therein, AV stream files are divided into three types: file 2D, file dependent (hereinafter abbreviated as "file DEP"), and interleaved file (hereinafter abbreviated as "file SS"). A "file 2D" is an AV stream file for playback of 2D video images in 2D playback mode and includes a main TS. A "file DEP" is an AV stream file that includes a sub-TS. A "file SS" is an AV stream file that includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 2, the first AV stream file (01000.m2ts) 241 is a file 2D, the second AV stream file (02000.m2ts) 242 and third AV stream file (03000.m2ts) 243 are both a file DEP. In this way, files 2D and files DEP are located directly below the STREAM directory 240. The first AV stream file, i.e. the base-view video stream that includes the file 2D 241, represents a left view of 3D video images. The second AV stream file, i.e. the dependent-view video stream that includes the first file DEP 242, is a right-view video stream. The third AV stream file, i.e. the dependent-view video stream that includes the second file DEP 243, is a depth map stream.

In the example shown in FIG. 2, the fourth AV stream file (01000.ssif) 244A and the fifth AV stream file (02000.ssif) 244B are both a file SS. In this way, files SS are located directly below the SSIF directory 244. The fourth AV stream file, i.e. the first file SS 244A, shares a main TS, and in particular a base-view video stream, with the file 2D 241 and shares a sub-TS, in particular a right-view video stream, with the first file DEP 242. The fifth AV stream file, i.e. the second file SS 244B, shares a main TS, and in particular a base-view video stream, with the file 2D 241 and shares a sub-TS, in particular a depth map stream, with the second file DEP 243.

Three types of clip information files, (01000.clpi) 231, (02000.clpi) 232, and (03000.clpi) 233 are located in the CLIPINF directory 230. A "clip information file" is a file associated on a one-to-one basis with a file 2D and file DEP and in particular contains an entry map for each file. An "entry map" is a correspondence table between the presentation time for each scene represented by the file 2D or file DEP and the address within each file at which the scene is recorded. Among the clip information files, a clip information file associated with a file 2D is referred to as a "2D clip information file", and a clip information file associated with a file DEP is referred to as a "dependent-view clip information file". Furthermore, when the file DEP includes a right-view video stream, the corresponding dependent-view clip information file is referred to as a "right-view clip information file". When the file DEP includes a depth map stream, the corresponding dependent-view clip information file is referred to as a "depth map clip information file". In the example shown in FIG. 2, the first clip information file (01000.clpi) 231 is a 2D clip information file and is associated with the file 2D 241. The second clip information file (02000.clpi) 232 is a right-view clip information file and is associated with the first file DEP 242. The third clip information file (03000.clpi) 233 is a depth map clip information file and is associated with the second file DEP 243.

Three types of playlist files, (00001.mpls) 221, (00002.mpls) 222, and (00003.mpls) 223 are located in the PLAYLIST directory 220. A "playlist file" is a file that specifies the playback path of an AV stream file, i.e. the part of an AV stream file for playback, and the order of playback. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 2, the first playlist file (00001.mpls) 221 is a 2D playlist file and specifies the playback path of the file 2D 241. The second playlist file (00002.mpls) 222 is a 3D playlist file that specifies, for a playback device in 2D playback mode, the playback path of the file 2D 241, and for a playback device in L/R mode, the playback path of the first file SS 244A. The third playlist file (00003.mpls) 223 is a 3D playlist file that specifies, for a playback device in 2D playback mode, the playback path of the file 2D 241, and for a playback device in depth mode, the playback path of the second file SS 244B.

A BD-J object file (XXXXX.bdjo) 251 is located in the BDJO directory 250. The BD-J object file 251 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. lifecycle. The "identification information of the playlist file to which is referred" identifies a playlist file that corresponds to a title to be played back. The Java virtual machine calls a BD-J object in response to a user operation or an application program and executes the Java application program according to the application management table included in the BD-J object. Consequently, the playback device 102 dynamically changes the progress of the video for each title played back, or causes the display device 103 to display graphics images independently of the title video.

A JAR file (YYYYY.jar) 261 is located in the JAR directory 260. The JAR directory 261 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 261 is a Java archive file, and when it is read by the playback device 102, it is loaded in internal memory. In this way, a Java application program is stored in memory.

<<Structure of Multiplexed Stream Data>>

FIG. 3A is a list of elementary streams multiplexed in a main TS on a BD-ROM disc 101. The main TS is a digital stream in MPEG-2 Transport Stream (TS) format and includes the file 2D 241 shown in FIG. 2. As shown in FIG. 3A, the main TS includes a primary video stream 301 and primary audio streams 302A and 302B. The main TS may additionally include presentation graphics (PG) streams 303A and 303B, an interactive graphics (IG) stream 304, a secondary audio stream 305, and a secondary video stream 306.

The primary video stream 301 represents the primary video of a movie, and the secondary video stream 306 represents secondary video of the movie. The primary video is the main video pertaining to the content, such as the main feature of a movie, and is displayed on the entire screen, for example. On the other hand, the secondary video is displayed on the screen simultaneously with the primary video with the use, for example, of a picture-in-picture method, so that the secondary video images are displayed in a smaller window within the primary video images. The primary video stream 301 and the secondary video stream 306 are both a base-view video stream. Each of the video streams 301 and 306 is encoded by a video compression encoding method, such as MPEG-2, MPEG-4 AVC, or SMPTE VC-1.

The primary audio streams 302A and 302B represent the primary audio of the movie. In this case, the two primary audio streams 302A and 302B are in different languages. The secondary audio stream 305 represents secondary audio to be mixed with the primary audio, such as sound effects accompanying operation of an interactive screen. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM).

Each of the PG streams 303A and 303B represents graphics images, such as subtitles formed by graphics, to be displayed superimposed on the video images represented by the primary video stream 301. The two PG streams 303A and 303B represent, for example, subtitles in a different language. The IG stream 304 represents Graphical User Interface (GUI) graphics elements, and the arrangement thereof, for constructing an interactive screen on the screen 131 in the display device 103.

The elementary streams 301-306 are identified by packet identifiers (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is a list of elementary streams multiplexed in a first sub-TS on a BD-ROM disc 101. The first sub-TS is multiplexed stream data in MPEG-2 TS format and is included in the first file DEP 242 shown in FIG. 2. As shown in FIG. 3B, the first sub-TS includes a primary video stream 311. The first sub-TS may additionally include left-view PG streams 312A and 312B, right-view PG streams 313A and 313B, a left-view IG stream 314, a right-view IG stream 315, and a secondary video stream 316. When the primary video stream 301 in the main TS represents the left view of 3D video images, the primary video stream 311, which is a right-view video stream, represents the right view of the 3D video images. The pairs of left-view and right-view PG streams 312A+313A and 312B+313B represent the left view and right view of graphics images, such as subtitles, when these graphics images are displayed as 3D video images. The pair of left-view and right-view IG streams 314 and 315 represent the left view and right view of graphics images for an interactive screen when these graphics images are displayed as 3D video images. When the secondary video stream 306 in the main TS represents the left view of 3D video images, the secondary video stream 316, which is a right-view video stream, represents the right view of the 3D video images.

PIDs are assigned to the elementary streams 311-316 as follows, for example. A PID of 0x1012 is assigned to the primary video stream 311. When up to 32 other elementary streams can be multiplexed by type in one sub-TS, the left-view PG streams 312A and 312B are assigned any value from 0x1220 to 0x123F, and the right-view PG streams 313A and 313B are assigned any value from 0x1240 to 0x125F. The left-view IG stream 314 is assigned any value from 0x1420 to 0x143F, and the right-view IG stream 315 is assigned any value from 0x1440 to 0x145F. The secondary video stream 316 is assigned any value from 0x1B20 to 0x1B3F.

FIG. 3C is a list of elementary streams multiplexed in the second sub-TS on the BD-ROM disc 101. The second sub-TS is multiplexed stream data in MPEG-2 TS format and is included in the second file DEP 243 shown in FIG. 2. As shown in FIG. 3C, the second sub-TS includes a primary video stream 321. The second sub-TS may additionally include depth map PG streams 323A and 323B, a depth map IG stream 324, and a secondary video stream 326. The primary video stream 321 is a depth map stream and represents 3D video images in combination with the primary video stream 301 in the main TS. When the 2D video images represented by the PG streams 303A and 303B in the main TS are used to project 3D video images on a virtual 2D screen, the depth map PG streams 323A and 323B are used as the PG streams representing a depth map for the 3D video images. When the 2D video images represented by the IG stream 304 in the main TS are used to project 3D video images on a virtual 2D screen, the depth map IG stream 324 is used as the IG stream representing a depth map for the 3D video images. The secondary video stream 326 is a depth map stream and represents 3D video images in combination with the secondary video stream 306 in the main TS.

PIDs are assigned to the elementary streams 321-326 as follows, for example. A PID of 0x1013 is assigned to the primary video stream 321. When up to 32 other elementary streams can be multiplexed by type in one sub-TS, the depth map PG streams 323A and 323B are assigned any value from 0x1260 to 0x127F. The depth map IG stream 324 is assigned any value from 0x1460 to 0x147F. The secondary video stream 326 is assigned any value from 0xB40 to 0x1B5F.

Figure 4:
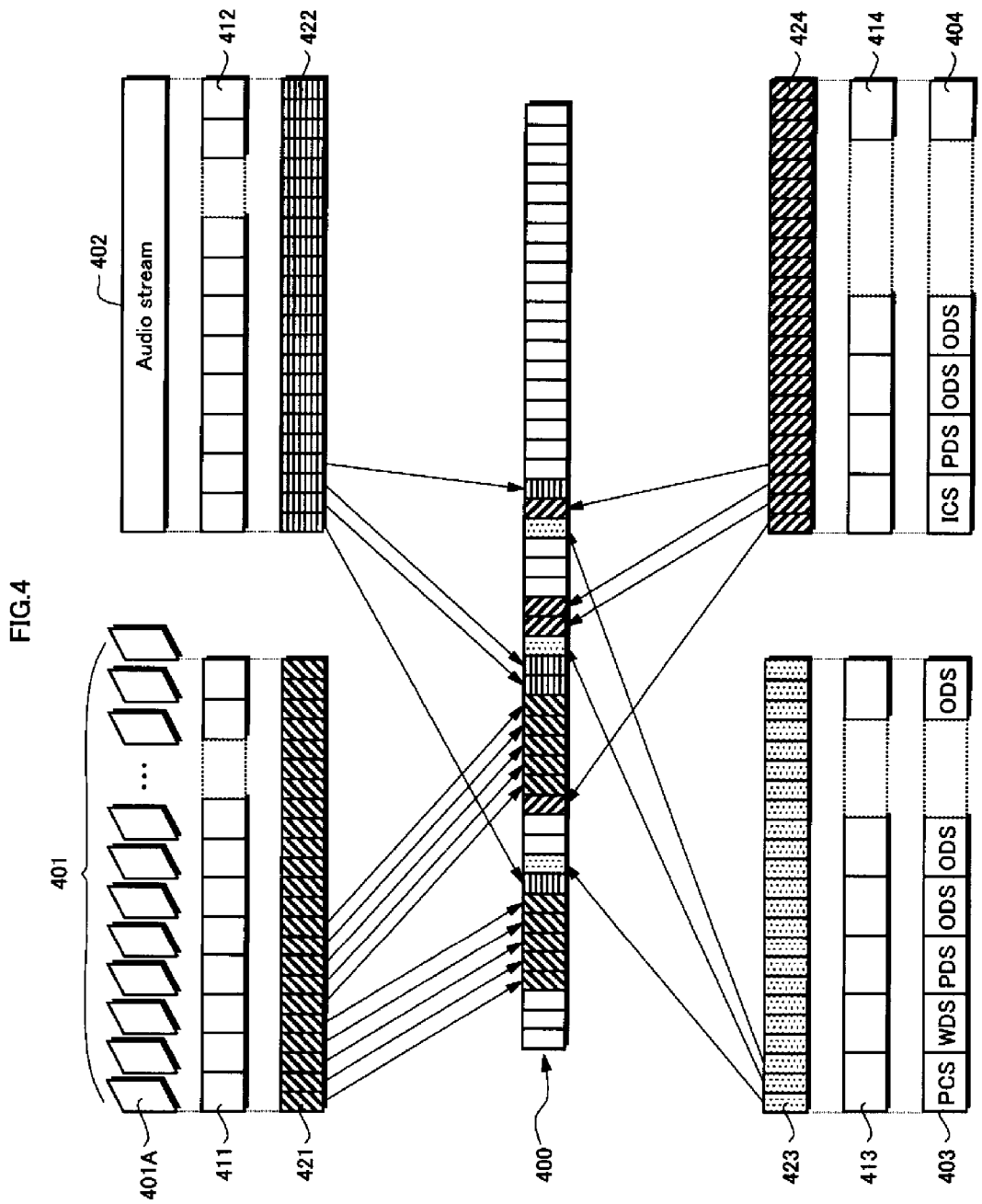
FIG. 4 is a schematic diagram showing an arrangement of TS packets in multiplexed stream data 400.

FIG. 4 is a schematic diagram showing the arrangement of TS packets in the multiplexed stream data 400. The main TS and sub TS share this packet structure. In the multiplexed stream data 400, the elementary streams 401, 402, 403, and 404 are respectively converted into sequences of TS packets 421, 422, 423, and 424. For example, in the video stream 401, each frame 401A or each field is first converted into one Packetized Elementary Stream (PES) packet 411. Next, each PES packet 411 is generally converted into a plurality of TS packets 421. Similarly, the audio stream 402, PG stream 403, and IG stream 404 are respectively first converted into a sequence of PES packets 412, 413, and 414, after which they are converted into a sequence of TS packets 422, 423, and 424. Finally, the TS packets 421, 422, 423, and 424 obtained from the elementary streams 401, 402, 403, and 404 are time-multiplexed into one piece of stream data, i.e. the main TS 400.

Figure 5:
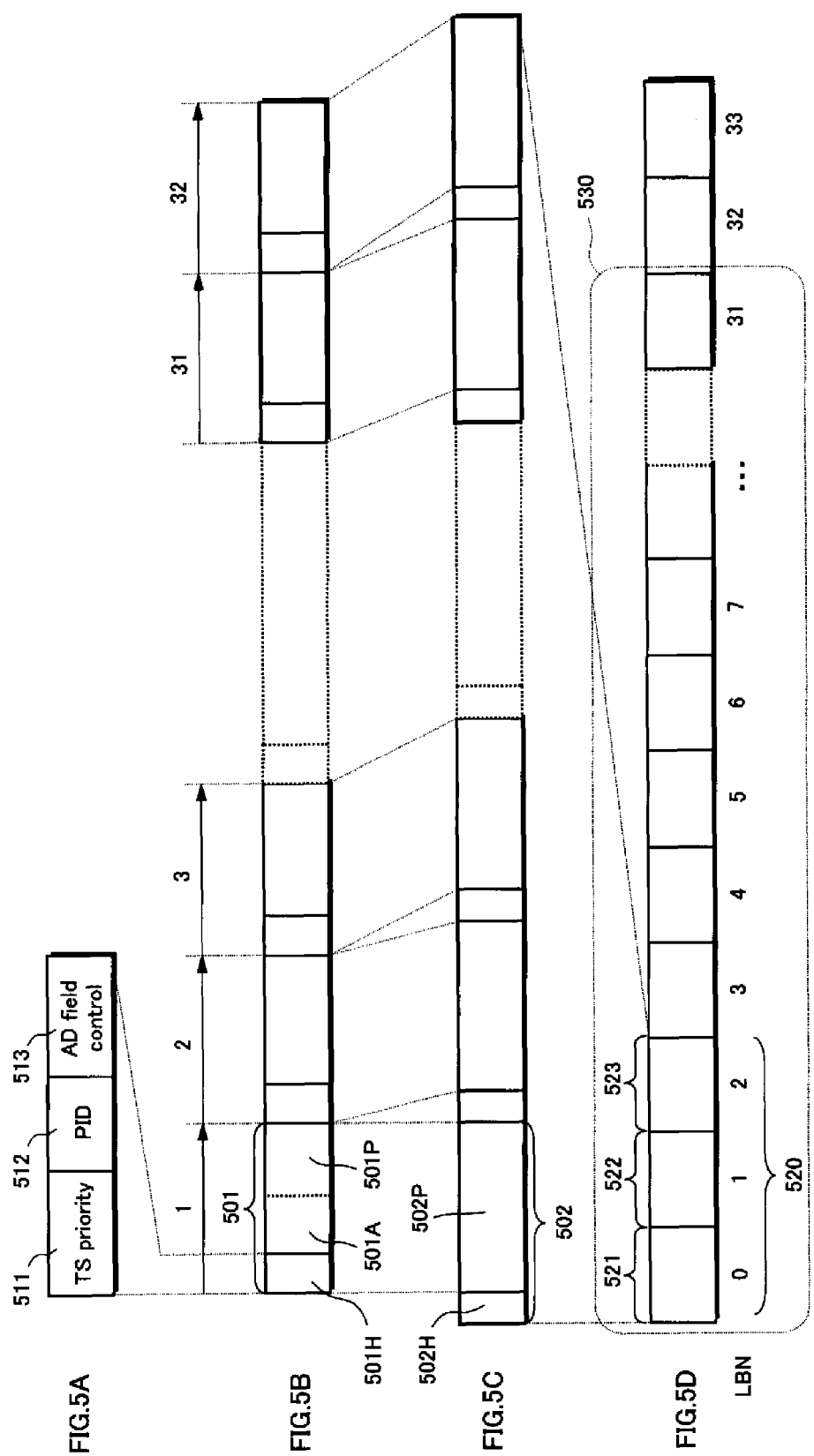
FIG. 5A is a schematic diagram showing the data structure of a TS header 501H included in each of a sequence of TS packets constituting multiplexed stream data.
FIG. 5B is a schematic diagram of the TS packet sequence.
FIG. 5C is a schematic diagram of a source packet sequence composed of the TS packet sequence.
FIG. 5D is a schematic diagram of a sector group, in which a sequence of source packets 502 are consecutively recorded, in a volume area 202B of the BD-ROM disc 101.

FIG. 5B is a schematic diagram showing a TS packet sequence constituting multiplexed stream data. Each TS packet 501 is 188 bytes long. As shown in FIG. 5B, each TS packet 501 includes a TS header 501H and either, or both, a TS payload 501P and an adaptation field (hereinafter abbreviated as "AD field") 501A. The TS payload 501P and AD field 501A together constitute a 184 byte-long data area. The TS payload 501P is used as a storage area for a PES packet. The PES packets 411-414 shown in FIG. 4 are typically divided into a plurality of parts, and each part is stored in a different TS payload 501P. The AD field 501A is an area for storing stuffing bytes (i.e. dummy data) when the amount of data in the TS payload 501P does not reach 184 bytes. Additionally, when the TS packet 501 is, for example, a PCR as described below, the AD field 501A is used to store such information. The TS header 501H is a four-byte long data area.

FIG. 5A is a schematic diagram showing the data structure of a TS header 501H. As shown in FIG. 5A, the TS header 501H includes TS priority (transport_priority) 511, PID 512, and AD field control (adaptation_field_control) 513. The PID 512 indicates the PID for the elementary stream whose data is stored in the TS payload 501P of the TS packet 501 containing the PID 512. The TS priority 511 indicates the degree of priority of the TS packet 501 among the TS packets that share the value indicated by the PID 512. The AD field control 513 indicates whether the TS packet 501 contains an AD field 501A and/or a TS payload 501P. For example, if the AD field control 513 indicates "1", then the TS packet 501 does not include an AD field 501A but includes a TS payload 501P. If the AD field control 513 indicates "2", then the reverse is true. If the AD field control 513 indicates "3", then the TS packet 501 includes both an AD field 501A and a TS payload 501P.

FIG. 5C is a schematic diagram showing the formation of a source packet sequence composed of the TS packet sequence for multiplexed stream data. As shown in FIG. 5C, each source packet 502 is 192 bytes long and includes one TS packet 501, shown in FIG. 5B, and a four-byte long header (TP_Extra_Header) 502H. When the TS packet 501 is recorded on the BD-ROM disc 101, a source packet 502 is constituted by attaching a header 502H to the TS packet 501. The header 502H includes an ATS (Arrival_Time_Stamp). The "ATS" is time information used as follows. When a source packet 502 is sent from the BD-ROM disc 101 to a system target decoder in the playback device 102, the TS packet 502P is extracted from the source packet 502 and transferred to a PID filter in the system target decoder. The ATS in the header 502H indicates the time at which this transfer is to begin. The "system target decoder" is a device that decodes multiplexed stream data one elementary stream at a time. Details regarding the system target decoder and its use of the ATS are provided below.

FIG. 5D is a schematic diagram of a sector group, in which a sequence of source packets 502 are consecutively recorded, in the volume area 202B of the BD-ROM disc 101. As shown in FIG. 5D, 32 source packets 502 are recorded at a time as a sequence in three consecutive sectors 521, 522, and 523. This is because the data amount for 32 source packets, i.e. 192 bytes×32=6144 bytes, is the same as the total size of three sectors, i.e. 2048 bytes×3=6144 bytes. 32 source packets 502 that are recorded in this way in three consecutive sectors 521, 522, and 523 are referred to as an "aligned unit" 520. The playback device 102 reads source packets 502 from the BD-ROM disc 101 by each aligned unit 520, i.e. 32 source packets at a time. Also, the sector group 521, 522, 523, . . . is divided into 32 pieces in order from the top, and each forms one error correction code block 530. The BD-ROM drive 121 performs error correction processing for each ECC block 530.

<<Data Structure of PG Stream>>

Figure 6:
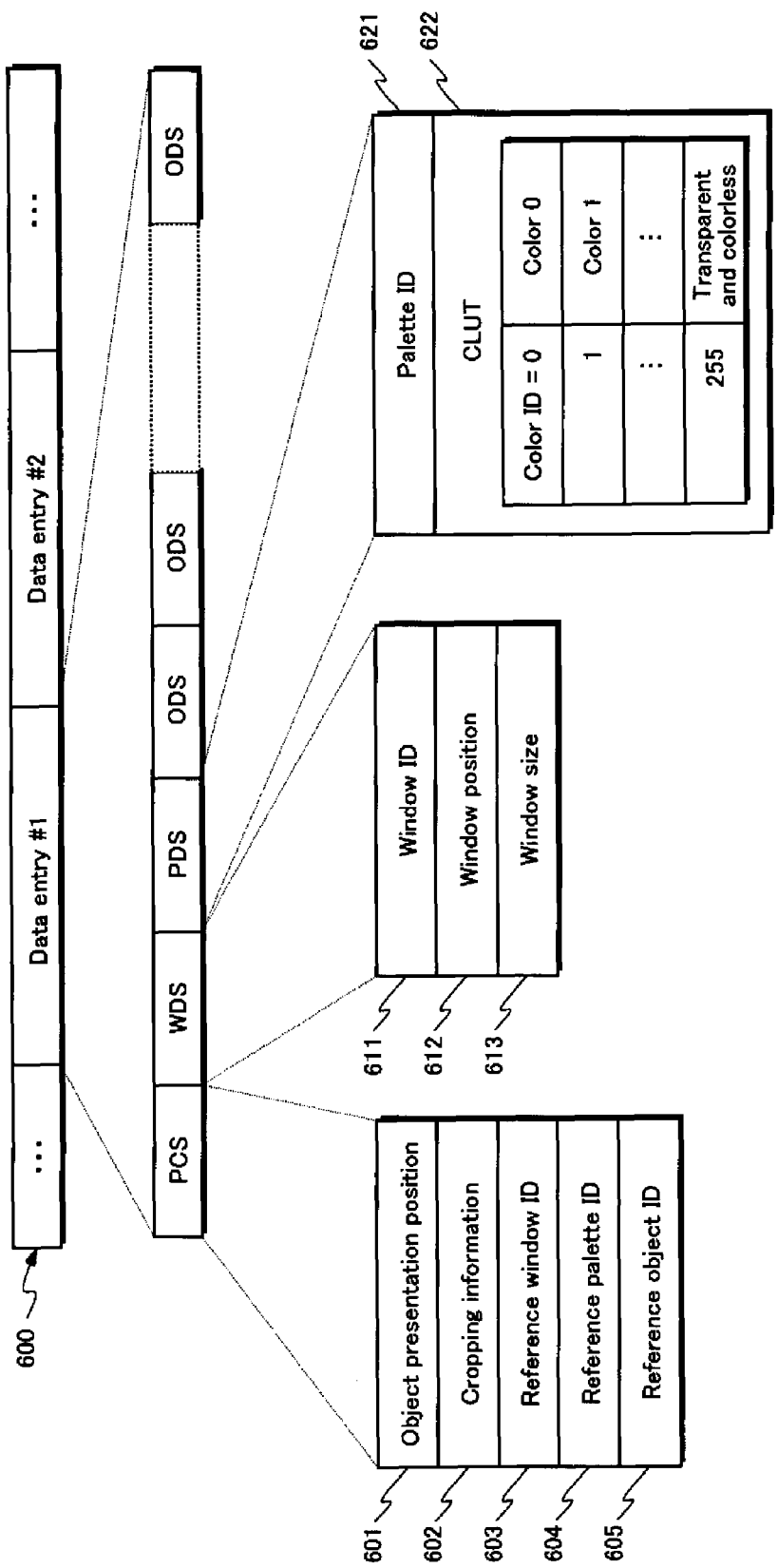
FIG. 6 is a schematic diagram showing a data structure of a PG stream 600.

FIG. 6 is a schematic diagram showing a data structure of a PG stream 600. As shown in FIG. 6, the PG stream 600 includes a plurality of data entries #1, #2, . . . . The data entries represent the PG stream 600 in display sets and are composed of data necessary for the playback device 102 to form one graphics plane. A "graphics plane" refers to plane data generated from graphics data representing a 2D graphics image. "Plane data" is a two-dimensional array of pixel data. The size of the array is the same as the resolution of the video frame. A set of pixel data is formed by a combination of a chromatic coordinate value and an α value (transparency). The chromatic coordinate value is expressed as an RGB value or a YCrCb value. Types of graphics planes include a PG plane, IG plane, image plane, and On-Screen Display (OSD) plane. A PG plane is generated from a PG stream in the main TS. An IG plane is generated from an IG stream in the main TS. An image plane is generated in accordance with a BD-J object. An OSD plane is generated in accordance with firmware in the playback device 102.

Referring again to FIG. 6, each data entry includes a plurality of functional segments. In order from the top, these functional segments include a Presentation Control Segment (PCS), Window Define Segment (WDS), Palette Define Segment (PDS), and Object Define Segment (ODS).

WDS defines a rectangular region inside the graphics plane, i.e. a window. Specifically, WDS includes a window ID 611, window position 612, and window size 613. The window ID 611 is identification information (ID) for the WDS. The window position 612 indicates the position of the window within the graphics plane, e.g. coordinates of the upper-left corner of the window. The window size 613 indicates the height and width of the window.

PDS defines the correspondence between a predetermined type of color ID and a chromatic coordinate value (for example, luminance Y, red-difference Cr, blue-difference Cb, and transparency α). Specifically, PDS includes a palette ID 621 and a Color Look-up Table (CLUT) 622. The palette ID 621 is the ID of the PDS. The CLUT 622 is a table of colors used in rendering a graphics object. 256 colors can be registered in the CLUT 622. Color IDs are assigned one by one from 0 to 255 to each color. Note that color ID=255 is always assigned to be "transparent and colorless".

There are usually a plurality of ODSs, which represent a graphics object. A "graphics object" is data that expresses graphics rendering via correspondence between pixel codes and color IDs. After being compressed via run-length encoding, a graphics object is divided up and distributed among ODSs. Each ODS also includes an object ID, i.e. the ID of a graphics object.

A PCS indicates details on display sets belonging to the same data entry and in particular defines a screen layout that uses graphics objects. Types of screen layout include Cut-In/Out, Fade-In/Out, Color Change, Scroll, and Wipe-In/Out. Specifically, PCS includes an object presentation position 601, cropping information 602, reference window ID 603, reference palette ID 604, and reference object ID 605. The object presentation position 601 represents the position within the graphics plane at which the graphics object is to be presented, e.g. the coordinates of the upper-left corner of the region in which the graphics object is to be presented, as coordinates within the window defined by WDS. The cropping information 602 indicates the range of a rectangular section that is to be cut out from within the graphics object via cropping. This range is, for example, defined by coordinates of the upper left corner, height, and width. This section can actually be rendered at the position indicated by the object presentation position 601. The reference window ID 603, reference palette ID 604, and reference object ID 605 respectively indicate the WDS, PDS, and graphics object ID to be referred to when rendering a graphics object. A contents provider refers to the parameters within the PCS to indicate screen layout to the playback device 102. Accordingly, it is possible to cause the playback device 102 to implement a visual effect whereby, for example, "a certain subtitle gradually disappears, and the next subtitle is displayed".

<<Data Structure of IG Stream>>

Referring yet again to FIG. 4, the IG stream 404 includes an Interactive Composition Segment (ICS), PDS, and ODS. PDS and ODS are the same functional segments as included in the PG stream 403. In particular, a graphics object that includes an ODS represents a GUI graphics element, such as a button, pop-up menu, etc., that forms an interactive screen. An ICS defines interactive operations that use these graphics objects. Specifically, an ICS defines the states that each graphics object, such as a button, pop-up menu, etc. can take when changed in response to user operation, states such as normal, selected, and active. An ICS also includes button information. Button information includes a command that the playback device is to perform when the user performs a certain operation on the button or the like.

<<Data Structure of Video Stream>>

Figure 7:
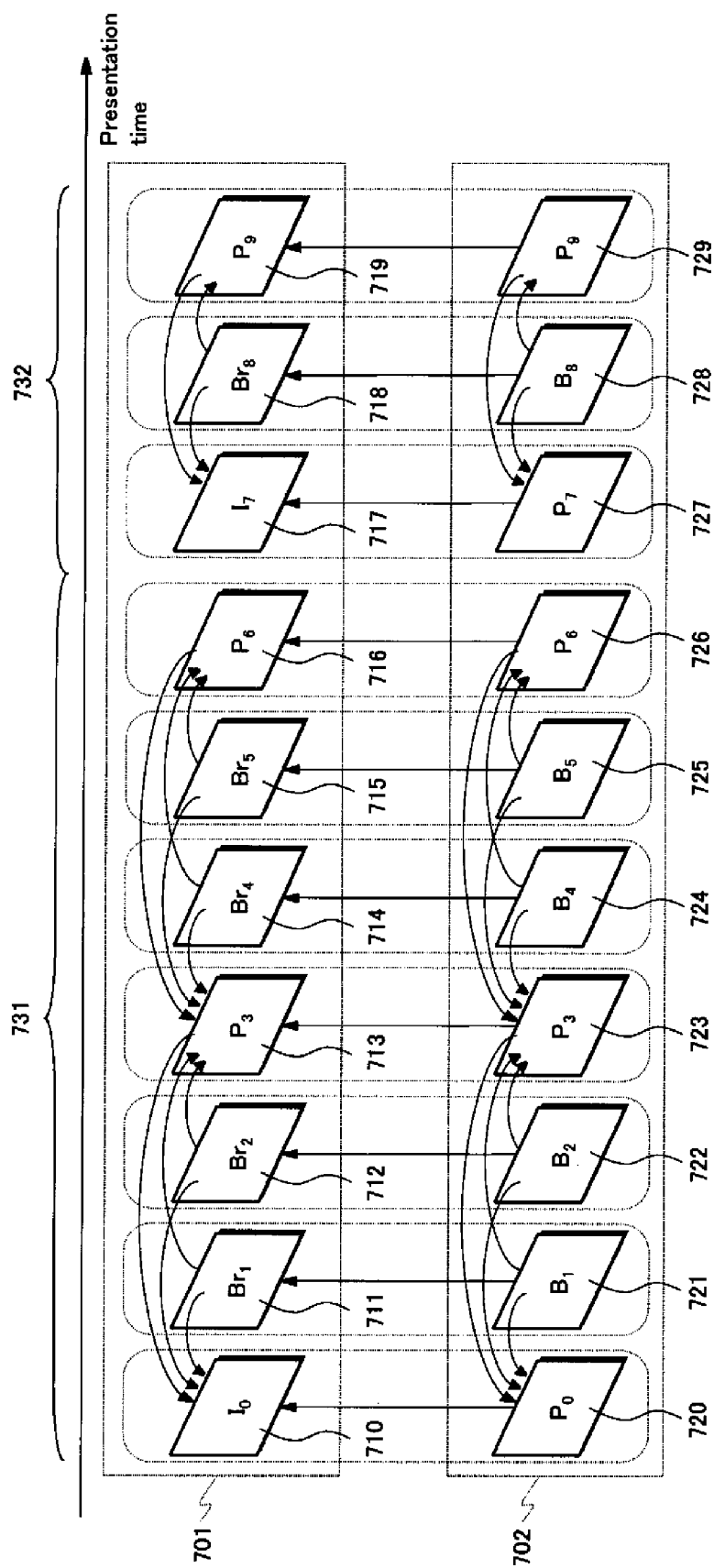
FIG. 7 is a schematic diagram showing pictures in a base-view video stream 701 and a right-view video stream 702 in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). Each of the pictures 710-719 and 720-729 represents one frame or one field and is compressed by a video compression encoding method, such as MPEG-2, MPEG-4 AVC, etc.

This compression of each picture via the above encoding uses the picture's spatial or temporal redundancy. Here, picture encoding that only uses the picture's spatial redundancy is referred to as "intra-picture encoding". On the other hand, picture encoding that uses temporal redundancy, i.e. the similarity between data for a plurality of pictures displayed sequentially, is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and spatial redundancy is removed using the difference value. In this way, the amount of data for each picture is compressed.

As shown in FIG. 7, the base-view pictures 710-719 are typically divided into a plurality of GOPs 731 and 732. A "GOP" refers to a sequence of pictures having an I (Intra) picture at the top of the sequence. An "I picture" refers to a picture compressed by intra-picture encoding. In addition to an I picture, a GOP typically includes P (Predictive) and B (Bidirectionally Predictive) pictures. A "P picture" refers to a picture compressed by inter-picture predictive encoding, having used as a reference picture one picture, either an I picture or another P picture, that has an earlier presentation time. A "B picture" refers to a picture compressed by inter-picture predictive encoding, having used as a reference picture two pictures, either I pictures or other P pictures, that have an earlier or later presentation time. B pictures that are used as a reference picture for other pictures in inter-picture predictive encoding are particularly referred to as "Br (reference B) pictures".

In the example shown in FIG. 7, the base-view pictures in the GOPs 731 and 732 are compressed in the following order. In the first GOP 731, the top base-view picture is compressed as $I_0$ picture 710. The subscripted number indicates the serial number allotted to each picture in order of presentation time. Next, the fourth base-view picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third base-view pictures are respectively compressed as $Br_1$ picture 711 and $Br_2$ picture 712, using both $I_0$ picture 710 and $P_3$ picture 713 as reference pictures. Furthermore, the seventh base-view picture is compressed as $P_6$ picture 716 using $P_3$ picture 713 as a reference picture. Next, the fourth and fifth base-view pictures are respectively compressed as $Br_4$ picture 714 and $Br_5$ picture 715, using both $P_3$ picture 713 and $P_6$ picture 716 as reference pictures. Similarly, in the second GOP 732, the top base-view picture is first compressed as $I_7$ picture 717. Next, the third base-view picture is compressed as $P_9$ picture 719 using $I_7$ picture 717 as a reference picture. Subsequently, the second base-view picture is compressed as $Br_8$ picture 718 using both $I_7$ picture 717 and $P_9$ picture 719 as reference pictures.

In the base-view video stream 701, each GOP 731 and 732 always contains an I picture at the top, and thus base-view pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded $I_0$ picture 710 and $P_3$ picture 713. The subsequent picture group 714, 715, . . . is similarly decoded. In this way, the base-view video stream 701 can be decoded independently and furthermore can be randomly accessed in units of GOPs.

As further shown in FIG. 7, the right-view pictures 720-729 are compressed by inter-picture predictive encoding. However, the encoding method differs from the encoding method for the base-view pictures 710-719, since in addition to redundancy in the temporal redundancy of video images, redundancy between the left and right-video images is also used. Specifically, as shown by the arrows in FIG. 7, the reference picture for each of the right-view pictures 720-729 is not selected from the right-view video stream 702, but rather from the base-view video stream 701. In particular, the presentation time is substantially the same for each of the right-view pictures 720-729 and the corresponding base-view picture selected as a reference picture. These pictures represent a right view and a left view for the same scene of a 3D video image, i.e. a parallax video image. The right-view pictures 720-729 and the base-view pictures 710-719 are thus in one-to-one correspondence. In particular, the GOP structure is the same between these pictures.

In the example shown in FIG. 7, the top right-view picture in the first GOP 731 is compressed as $P_0$ picture 720 using $I_0$ picture 710 in the base-view video stream 701 as a reference picture. These pictures 710 and 720 represent the left view and right view of the top frame in the 3D video images. Next, the fourth right-view picture is compressed as $P_3$ picture 723 using $P_3$ picture 713 in the base-view video stream 701 and $P_0$ picture 720 as reference pictures. Next, the second right-view picture is compressed as $B_1$ picture 721, using $Br_1$ picture 711 in the base-view video stream 701 in addition to $P_0$ picture 720 and P3 picture 723 as reference pictures. Similarly, the third right-view picture is compressed as $B_2$ picture 722, using $Br_2$ picture 712 in the base-view video stream 701 in addition to $P_0$ picture 720 and $P_3$ picture 730 as reference pictures. For each of the remaining right-view pictures 724-729, a base-view picture with a presentation time substantially the same as the right-view picture is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 720-729. Therefore, unlike the base-view video stream 701, the right-view video stream 702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

While not shown in FIG. 7, a depth map stream includes a plurality of depth maps. The depth maps are in one-to-one correspondence with base-view pictures and each represent the depth map corresponding to a 2D video image in one field or frame as indicted by a base-view picture. The depth maps are compressed by a video compression encoding method, such as MPEG-2, MPEG-4 AVC, etc., in the same way as the base-view pictures. In particular, inter-picture predictive encoding is used in this encoding method. In other words, each depth map is compressed using another depth map as a reference picture. Furthermore, the depth map stream is divided into units of GOPs in the same way as the base-view video stream, and each GOP always contains an I picture at the top. Accordingly, depth maps can be decoded GOP by GOP. However, since a depth map itself is only information representing the depth of each part of a 2D video image pixel by pixel, the depth map stream cannot be used independently for playback of video images. The encoding method used in compression of the depth map stream is the same as that used in compression of the right-view video stream. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 8:
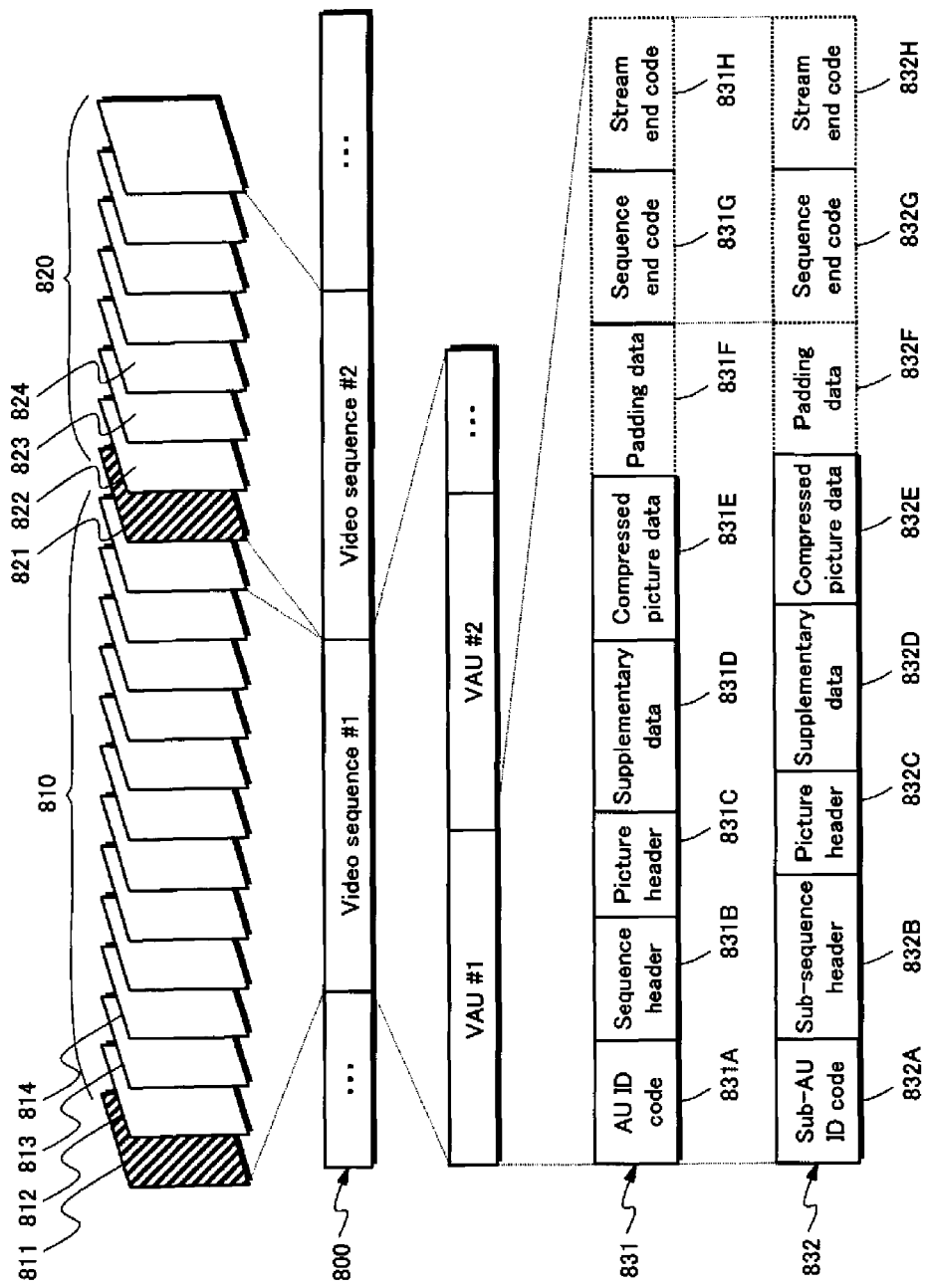
FIG. 8 is a schematic diagram showing details on a data structure of a video stream 800.

FIG. 8 is a schematic diagram showing details on a data structure of a video stream 800. This data structure is substantially the same for the base-view video stream and the dependent-view video stream. As shown in FIG. 8, the video stream 800 is generally composed of a plurality of video sequences #1, #2, . . . . A "video sequence" is a combination of pictures 811, 812, 813, 814, . . . that constitute a single GOP 810 and to which additional information, such as a header, has been individually attached. The combination of this additional information and a picture is referred to as a "video access unit (VAU)". That is, in the GOPs 810 and 820, a single VAU #1, #2, . . . is formed for each picture. Each picture can be read from the video stream 800 in units of VAUs.

FIG. 8 further shows the structure of VAU #1 831 located at the top of each video sequence in the base-view video stream. The VAU #1 831 includes an access unit (AU) identification code 831A, sequence header 831B, picture header 831C, supplementary data 831D, and compressed picture data 831E. Except for not including a sequence header 831B, VAUs from the second VAU #2 on have the same structure as VAU #1 831. The AU identification code 831A is a predetermined code indicating the top of the VAU #1 831. The sequence header 831B, also called a GOP header, includes an identification number for the video sequence #1 which includes the VAU #1 831. The sequence header 831B further includes information shared by the whole GOP 810, e.g. resolution, frame rate, aspect ratio, and bit rate. The picture header 831C indicates a unique identification number, the identification number for the video sequence #1, and information necessary for decoding the picture, such as the type of encoding method. The supplementary data 831D includes additional information regarding matters other than the decoding of the picture, for example closed caption text information, information on the GOP structure, and time code information. In particular, the supplementary data 831D includes decoding switch information (see the <<Supplementary Explanation>> for details). The compressed picture data 831E includes a base-view picture. Additionally, the VAU #1 831 may include any or all of padding data 831F, a sequence end code 831G, and a stream end code 831H as necessary. The padding data 831F is dummy data. By adjusting the size of the padding data 831F in conjunction with the size of the compressed picture data 831E, the bit rate of the VAU #1 831 can be maintained at a predetermined value. The sequence end code 831G indicates that the VAU #1 831 is located at the end of the video sequence #1. The stream end code 831H indicates the end of the base-view video stream 800.

FIG. 8 also shows the structure of a VAU #1 832 located at the top of each video sequence in the dependent-view video stream. The VAU #1 832 includes a sub-sequence header 832B, picture header 832C, supplementary data 832D, and compressed picture data 832E. Except for not including a sub-sequence header 832B, VAUs from the second VAU #2 on have the same structure as VAU #1 832. The sub-sequence header 832B includes an identification number for the video sequence #1 which includes the VAU #1 832. The sub-sequence header 832B further includes information shared by the whole GOP 810, e.g. resolution, frame rate, aspect ratio, and bit rate. These values are the same as the values set for the corresponding GOP in the base-view video stream, i.e. the values shown by the sequence header 831B in the VAU #1 831. The picture header 832C indicates a unique identification number, the identification number for the video sequence #1, and information necessary for decoding the picture, such as the type of encoding method. The supplementary data 832D only includes offset metadata (details provided below). In addition to the offset metadata in 832D, types of supplementary data include additional information regarding matters other than the decoding of the picture, for example closed caption text information, information on the GOP structure, time code information, and decoding switch information. Accordingly, the VAU #1 832 may include one or more of the above types of supplementary data in addition to the supplementary data 832D. The compressed picture data 832E includes a dependent-view picture. Additionally, the VAU #1 832 may include any or all of padding data 832F, a sequence end code 832G, and a stream end code 832H as necessary. The padding data 832F is dummy data. By adjusting the size of the padding data 832F in conjunction with the size of the compressed picture data 831E, the bit rate of the VAU #1 832 can be maintained at a predetermined value. The sequence end code 832G indicates that the VAU #1 832 is located at the end of the video sequence #1. The stream end code 832H indicates the end of the dependent-view video stream 800.

The specific content of each component in a VAU differs according to the encoding method of the video stream 800. For example, when the encoding method is MPEG-4 AVC, the components in the VAUs shown in FIG. 8 are composed of a single Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream. In particular, in the VAU #1 832, the supplementary data 832D including offset metadata is composed of one NAL unit that does not include data other than offset metadata.

Figure 9:
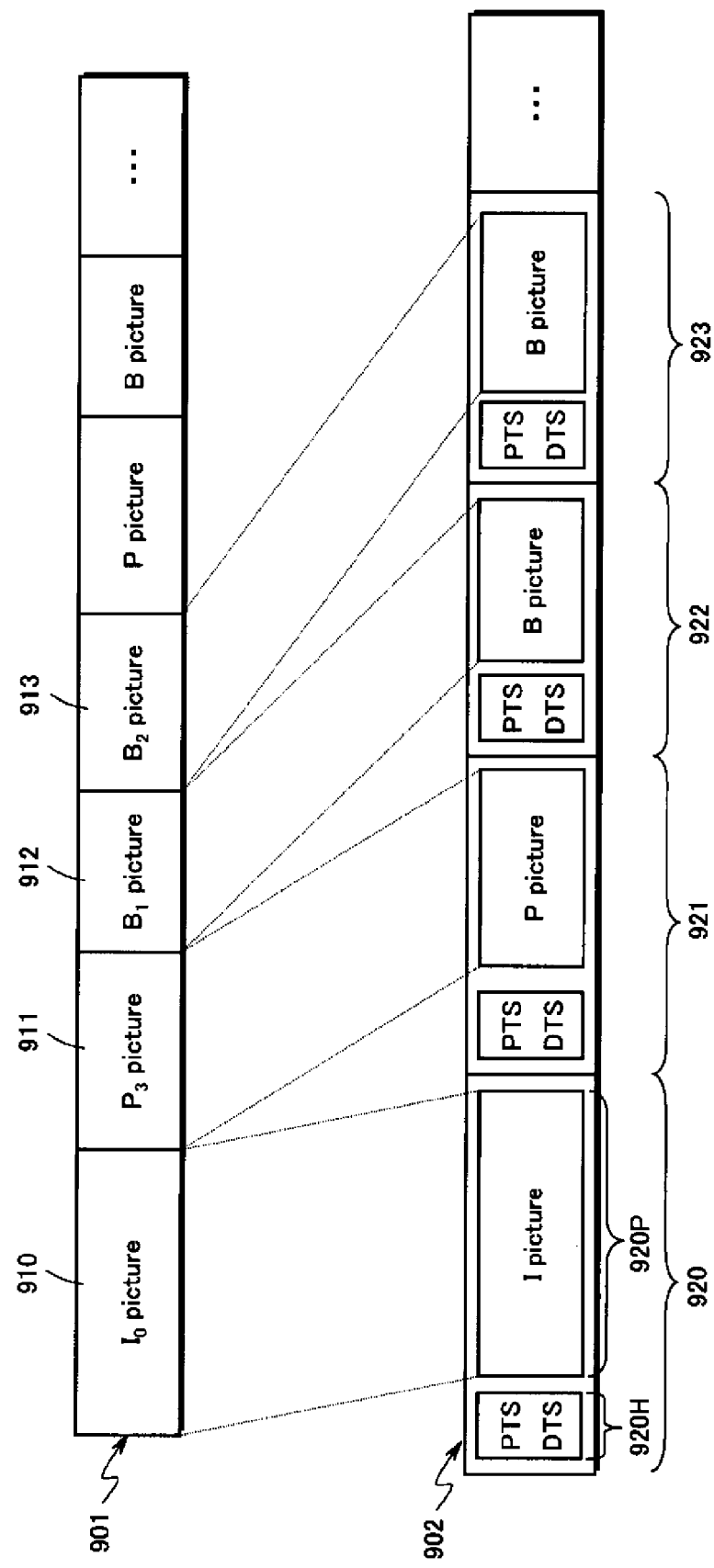
FIG. 9 is a schematic diagram showing details on a method for storing a video stream 901 into a PES packet sequence 902.

FIG. 9 is a schematic diagram showing details on a method for storing a video stream 901 into a PES packet sequence 902. This storage method is the same for the base-view video stream and the dependent-view video stream. As shown in FIG. 9, in the actual video stream 901, pictures are multiplexed in the order of encoding, not in the order of presentation time. For example, in the VAUs in the base-view video stream, as shown in FIG. 9, $I_0$ picture 910, $P_3$ picture 911, $B_1$ picture 912, $B_2$ picture 913, . . . are stored in order from the top. The subscripted number indicates the serial number allotted to each picture in order of presentation time. $I_0$ picture 910 is used as a reference picture for encoding $P_3$ picture 911, and both $I_0$ picture 910 and $P_3$ picture 911 are used as reference pictures for encoding $B_1$ picture 912 and $B_2$ picture 913. Each of these VAUs is stored as a different PES packet 920, 921, 922, 923, . . . . Each PES packet 920, . . . includes a PES payload 920P and a PES header 920H. Each VAU is stored in a PES payload 920P. Each PES header 920H includes a presentation time, (Presentation Time-Stamp, or PTS), and a decoding time (Decoding Time-Stamp, or DTS), for the picture stored in the PES payload 920P in the same PES packet 920.

As with the video stream 901 shown in FIG. 9, the other elementary streams shown in FIGS. 3 and 4 are stored in PES payloads in a sequence of PES packets. Furthermore, the PES header in each PES packet includes the PTS for the data stored in the PES payload for the PES packet.

Figure 10:
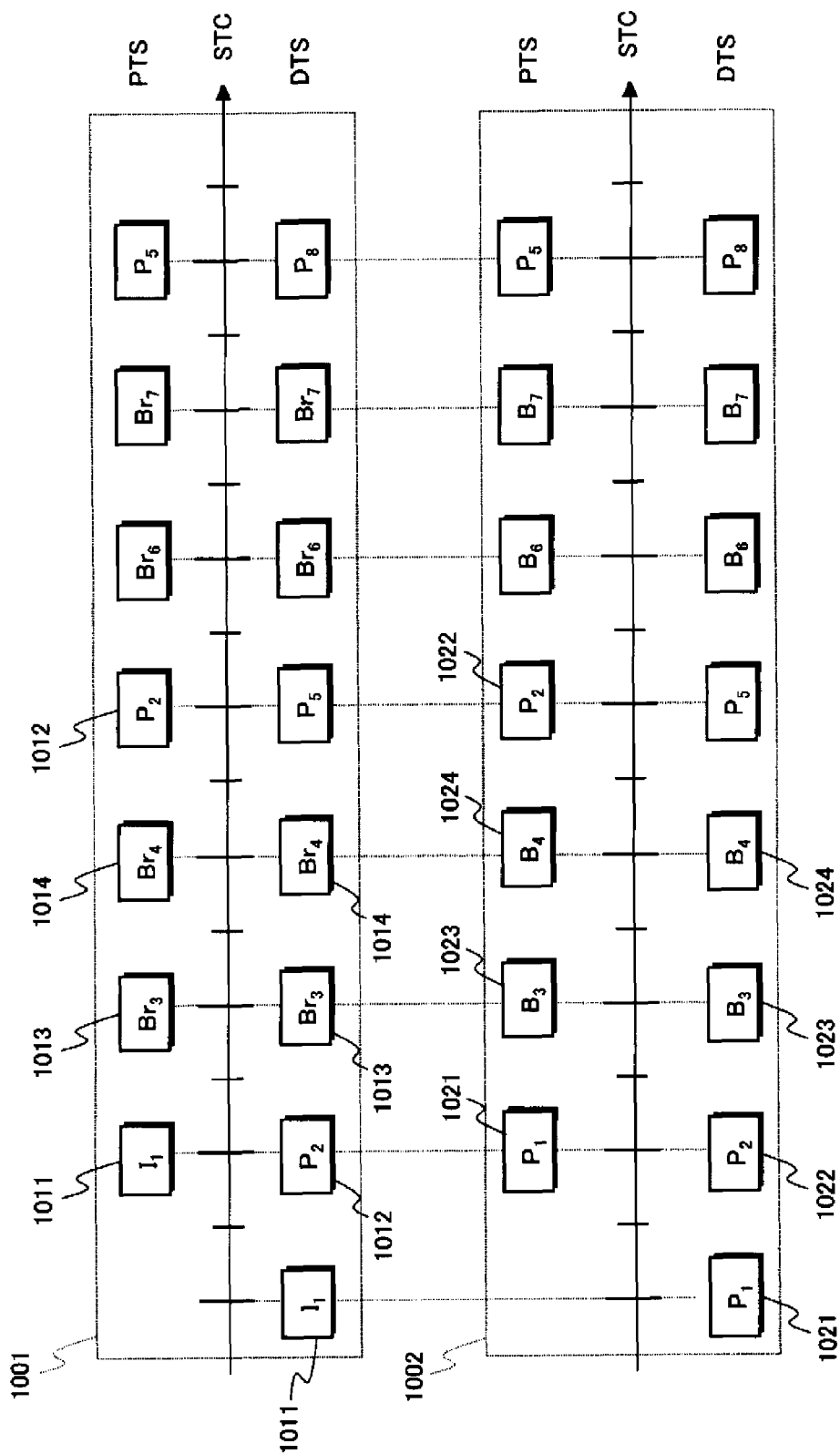
FIG. 10 is a schematic diagram showing correspondence between PTSs and DTSs assigned to each picture in a base-view video stream 1001 and a dependent-view video stream 1002.

FIG. 10 is a schematic diagram showing correspondence between PTSs and DTSs assigned to each picture in a base-view video stream 1001 and a dependent-view video stream 1002. As shown in FIG. 10, between the video streams 1001 and 1002, the same PTSs and DTSs are assigned to a pair of pictures representing the same frame or field in a 3D video image. For example, the top frame or field in the 3D video image is rendered from a combination of $I_1$ picture 1011 in the base-view video stream 1001 and $P_1$ picture 1021 in the dependent-view video stream 1002. Accordingly, the PTS and DTS for these two pictures 1011 and 1021 are the same. The subscripted numbers indicate the serial number allotted to each picture in the order of DTSs. Also, when the dependent-view video stream 1002 is a depth map stream, $P_1$ picture 1021 is replaced by an I picture representing a depth map for the $I_1$ picture 1011. Similarly, the PTS and DTS for the pair of second pictures in the video streams 1001 and 1002, i.e. $P_2$ pictures 1012 and 1022, are the same. The PTS and DTS are both the same for the pair of third pictures in the video streams 1001 and 1002, i.e. $Br_3$ picture 1013 and $B_3$ picture 1023. The same is also true for the pair $Br_4$ picture 1014 and $B_4$ picture 1024.

A pair of VAUs that include pictures for which the PTS and DTS are the same between the base-view video stream 1001 and the dependent-view video stream 1002 is called a "3D VAU". Using the allocation of PTSs and DTSs shown in FIG. 10, it is easy to cause the decoder in the playback device 102 in 3D playback mode to process the base-view video stream 1001 and the dependent-view video stream 1002 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1001 is decoded independently in 2D playback mode.

<<Offset Metadata>>

Figure 11:
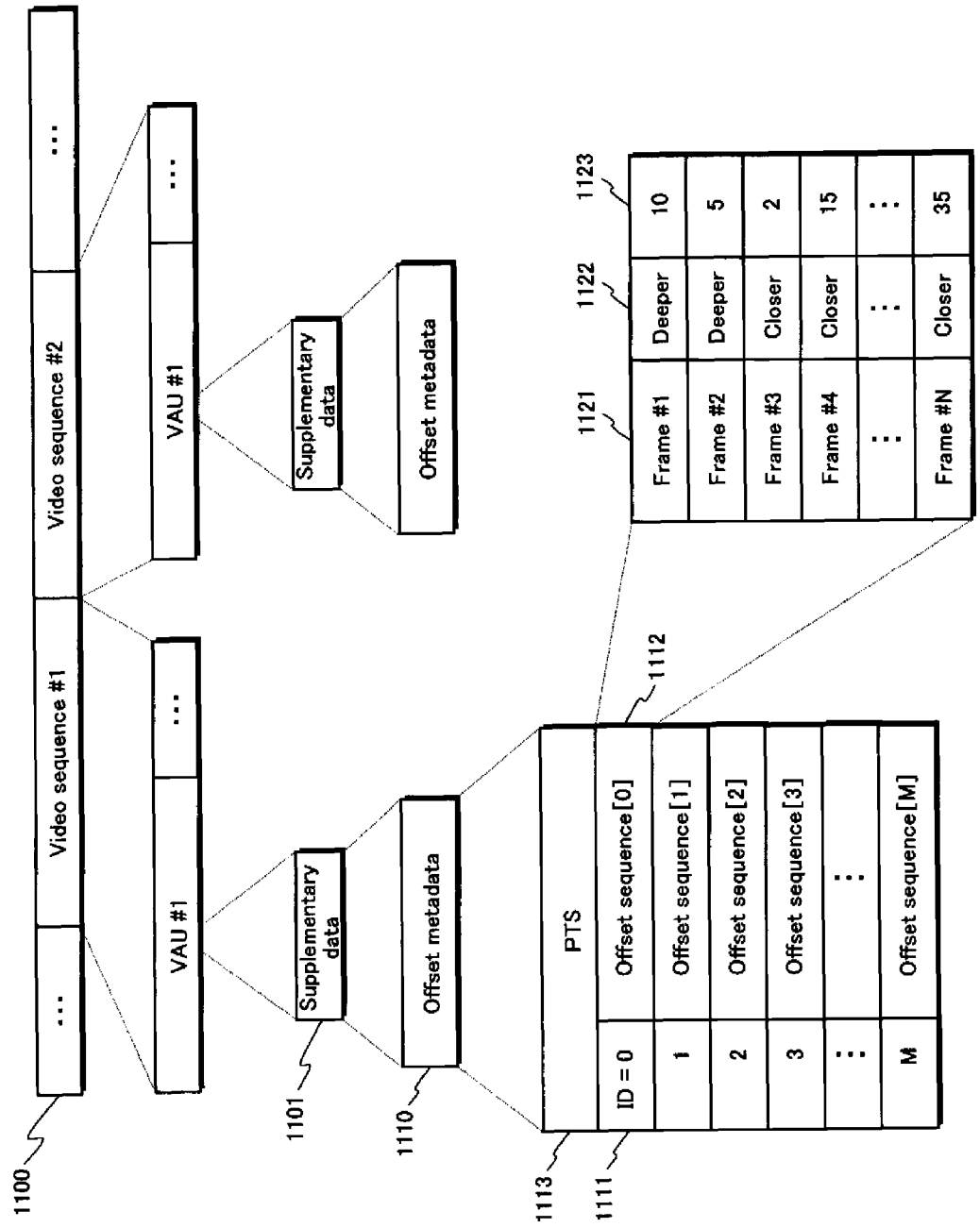
FIG. 11 is a schematic diagram showing a data structure of offset metadata 1110 included in a dependent-view video stream 1100.

FIG. 11 is a schematic diagram showing a data structure of offset metadata 1110 included in a dependent-view video stream 1100. As shown in FIG. 11, the offset metadata 1110 is stored in the supplementary data 1101 of VAU #1 located at the top of each video sequence (i.e. each GOP). As shown in FIG. 11, offset metadata 1110 includes a PTS 1111, offset sequence IDs 1112, and offset sequences 1113. The PTS 1111 is the same as the PTS of the frame representing compressed picture data in VAU #1, i.e. the first frame in each GOP.

The offset sequence IDs 1112 are serial numbers 0, 1, 2, ..., M allotted in order to the offset sequences 1113. The letter M represents an integer, one or greater, that equals the total number of offset sequences 1113. Offset sequence IDs 1112 are allocated to a graphics plane and secondary video plane that are to be combined in a video plane. Each piece of plane data is thus associated with an offset sequence 1113. A "video plane" refers to plane data generated from a picture included in a video sequence, i.e. a 2D array of pixel data. The size of this array equals the resolution of the video frame. A pair of pieces of pixel data is a combination of a chromatic coordinate value (RGB value or YCrCb value) and an α value.

Each offset sequence 1113 is a correspondence table between frame numbers 1121 and offset information 1122 and 1123. Frame numbers 1121 are serial numbers 1, 2, ..., N allocated in order of presentation to frames #1, #2, ..., N represented by a single video sequence (for example, video sequence #1). The letter N represents an integer one or greater and indicates the total number of frames included in the video sequence. The pieces of offset information 1122 and 1123 are control information defining offset control for a single piece of plane data.

"Offset control" refers to a process to provide left and right offsets to the horizontal coordinates in a graphics plane (or secondary video plane) and combine the resulting planes respectively with the base-view video plane and dependent-view video plane. "Providing horizontal offsets to a graphics plane" refers to horizontally shifting each piece of pixel data in the graphics plane. From a single graphics plane, this generates a pair of graphics planes representing a left view and a right view. The presentation position of each element in the 2D graphics images played back from this pair of planes is shifted to the left or right from the original presentation position. The viewer is made to perceive a pair of a left view and a right view as a single 3D graphics image due to the binocular parallax produced by these shifts. The same is also true for video images represented by secondary video planes.

An offset is determined by a direction and a size. Accordingly, as shown in FIG. 11, each piece of offset information includes an offset direction 1122 and an offset value 1123. The offset direction 1122 indicates whether a 3D graphics image is closer to the viewer than the screen or further back. Whether the presentation position in the left view and the right view is shifted to the left or to the right from the original presentation position of the 2D graphics image depends on the value of the offset direction 1122. The offset value 1123 indicates the number of horizontal pixels of the distance between the original presentation position of the 2D graphics image and the presentation position of each of the left view and the right view.

FIGS. 12A and 12B are schematic diagrams showing offset controls for a PG plane 1210 and IG plane 1220 respectively. Via these offset controls, two types of graphics planes, 1210 and 1220, are respectively combined with the left-view video plane 1201 and the right-view video plane 1202. A "left-view/right-view video plane" refers to a video plane that represents a left view/right view and is generated from a combination of the base-view video stream and the dependent-view video stream. In the following description, it is assumed that a subtitle 1211 indicated by the PG plane 1210 is displayed closer than the screen, and a button 1221 indicated by the IG plane 1220 is displayed further back than the screen.

As shown in FIG. 12A, a right offset is provided to the PG plane 1210. Specifically, the position of each piece of pixel data in the PG plane 1210 is first shifted to the right (virtually) from the corresponding position of the pixel data in the left-view video plane 1201 by a number of pixels SFP equal to the offset value. Next, a strip 1212 (virtually) protruding from the right edge of the range of the left-view video plane 1201 is "cut off" from the right edge of the PG plane 1210. In other words, the pixel data for this region 1212 is discarded. Conversely, a transparent strip 1213 is added to the left edge of the PG plane 1210. The width of this strip 1213 is the width of the strip 1212 at the right edge; i.e. the width is the same as the offset value SFP. A PG plane representing the left view is thus generated from the PG plane 1210 and combined with the left-view video plane 1201. In particular, in this left-view PG plane, the presentation position of the subtitle 1211 is shifted to the right from the original presentation position by the offset value SFP.

Conversely, a left offset is provided to the IG plane 1220. Specifically, the position of each piece of pixel data in the IG plane 1220 is first shifted to the left (virtually) from the corresponding position of the pixel data in the left-view video plane 1201 by a number of pixels SFI equal to the offset value.

Next, a strip 1222 (virtually) protruding from the left edge of the range of the left-view video plane 1210 is cut off from the left edge of the IG plane 1220. Conversely, a transparent strip 1223 is added to the right edge of the IG plane 1220. The width of this strip 1223 is the width of the strip 1222 at the left edge; i.e. the width is the same as the offset value SFI. An IG plane representing the left view is thus generated from the IG plane 1220 and combined with the left-view video plane 1201. In particular, in this left-view IG plane, the presentation position of the button 1221 is shifted to the left from the original presentation position by the offset value SFI.

As shown in FIG. 12B, a left offset is provided to the PG plane 1210, and a right offset is provided to the IG plane 1220. In other words, the above operations are performed in reverse for the PG plane 1210 and the IG plane 1220. As a result, plane data representing the right view is generated from the plane data 1210 and 1220 and combined with the right-view video plane 1220. In particular, in the right-view PG plane, the presentation position of the subtitle 1211 is shifted to the left from the original presentation position by the offset value SFP. On the other hand, in the right-view IG plane, the presentation position of the button 1221 is shifted to the right from the original presentation position by the offset value SFI.

FIG. 12C is a schematic diagram showing 3D graphics images that a viewer 1230 is made to perceive from 2D graphics images represented by graphics planes shown in FIGS. 12A and 12B. When the 2D graphics images represented by these graphics planes are alternately displayed on the screen 1240, the viewer 1230 perceives the subtitle 1231 to be closer than the screen 1240 and the button 1232 to be further back than the screen 1240, as shown in FIG. 12C. The distance between the 3D graphics images 1231 and 1232 and the screen 1240 can be adjusted via the offset values SFP and SFI.

Figure 13B:
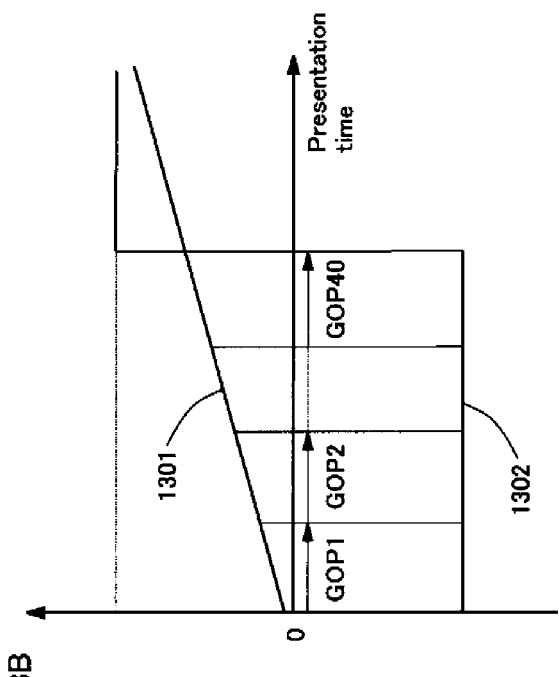
FIGS. 13A and 13B are graphs showing examples of offset sequences.
Figure 13A:
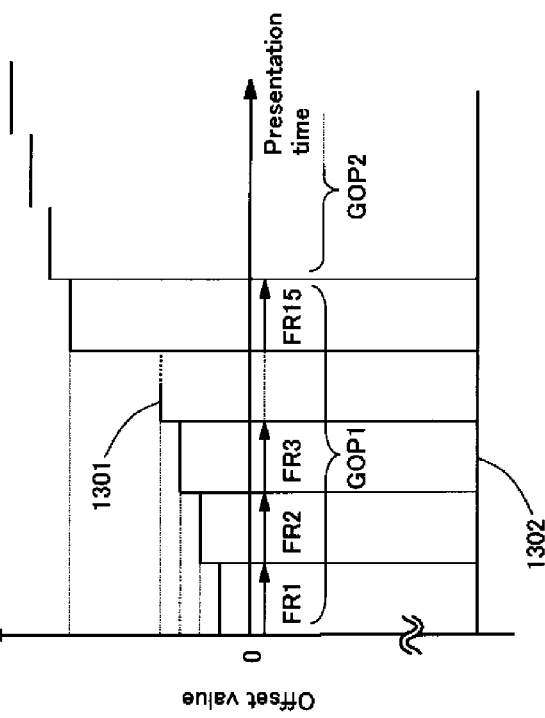

FIGS. 13A and 13B are graphs showing examples of offset sequences. In these graphs, the offset value is positive when the offset direction is toward the viewer from the screen. FIG. 13A is an enlargement of the graph for the presentation period of the first GOP in FIG. 13B, i.e. GOP1. As shown in FIG. 13A, the stepwise line 1301 shows offset values for the offset sequence with an offset sequence ID equaling 0, i.e. offset sequence [0]. On the other hand, the horizontal line 1302 shows offset values for the offset sequence with an offset sequence ID equaling 1, i.e. offset sequence [1]. The offset value 1301 of the offset sequence [0] increases stepwise during the presentation period GOP1 of the first GOP in the order of frames FR1, FR2, FR3, . . . , FR15, . . . . As shown in FIG. 13B, the stepwise increase in the offset value 1301 similarly continues in the presentation periods GOP2, GOP3, . . . , GOP40, . . . for the second and subsequent GOPs. The amount of increase per frame is sufficiently small for the offset value 1301 in FIG. 13B to appear to increase continually as a line. On the other hand, the offset value 1302 in offset sequence [1] is maintained constant during the presentation period GOP1 of the first GOP. As shown in FIG. 13B, the offset value 1302 increases to a positive value at the end of the presentation period GOP40 for the 40$^{th}$ GOP. Offset values may thus exhibit discontinuous change.

Figure 13C:
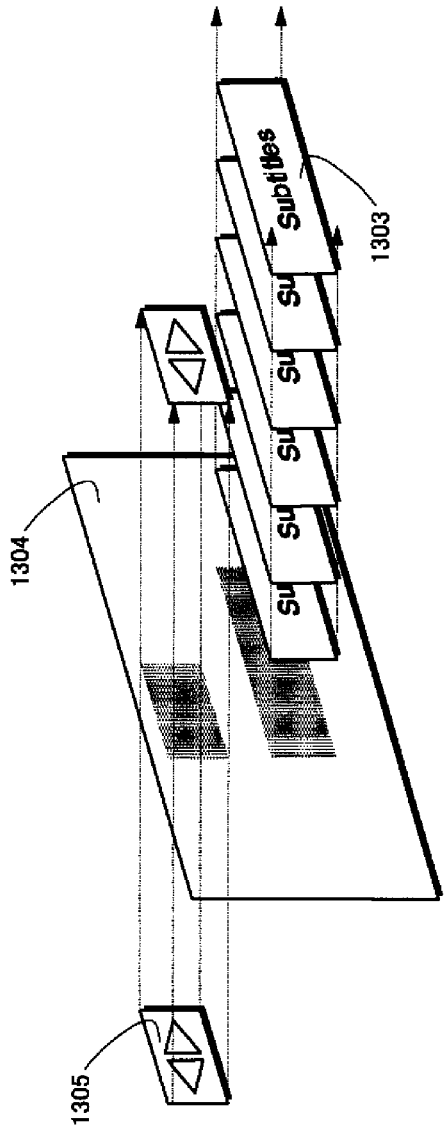
FIG. 13C is a schematic diagram showing 3D graphics images reproduced in accordance with the offset sequences shown in FIGS. 13A and 13B.

FIG. 13C is a schematic diagram showing 3D graphics images reproduced in accordance with the offset sequences shown in FIGS. 13A and 13B. When the subtitle 3D video image 1303 is displayed in accordance with the offset sequence [0], the 3D video image 1303 appears to start from right in front of the screen 1304 and gradually approach the viewer. On the other hand, when the button 3D video image 1305 is displayed in accordance with the offset sequence [1], the 3D video image 1305 appears to suddenly jump from a fixed position behind the screen 1304 to in front of the screen 1304. As described, the patterns by which offset values increase and decrease frame by frame are changed in a variety of ways from one offset sequence to another. Individual changes in the depth of a plurality of 3D graphics images can thereby be represented in a variety of ways.

<<Other TS Packets Included in AV Stream File>>

In addition to the TS packets converted from the elementary stream as shown in FIG. 3, the types of TS packets included in an AV stream file include a Program Association Table (PAT), Program Map Table (PMT), and Program Clock Reference (PCR). The PCR, PMT, and PAT are specified by the European Digital Broadcasting Standard and are intended to regulate the partial transport stream constituting a single program. By using PCR, PMT, and PAT, the AV stream file can also be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC.

Figure 14:
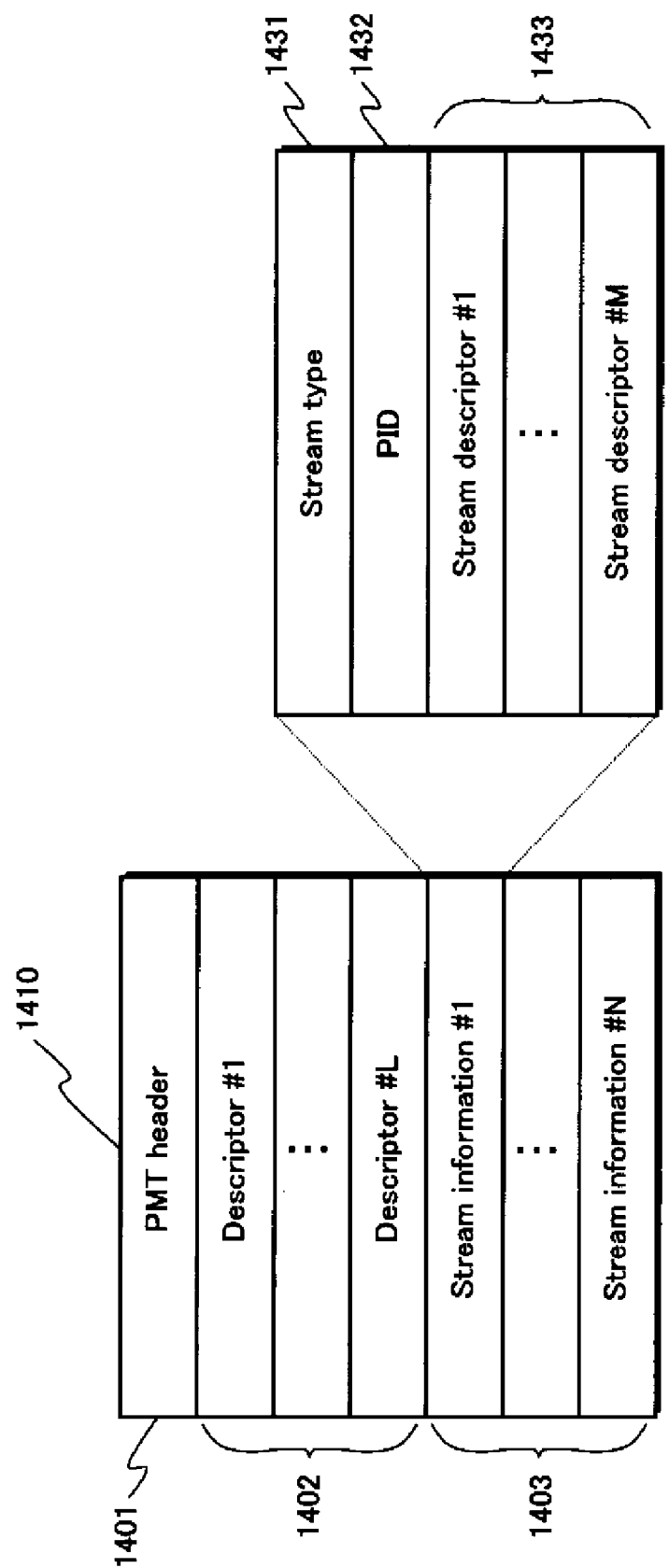
FIG. 14 is a schematic diagram showing a data structure of a PMT 1410.

FIG. 14 is a schematic diagram showing a data structure of a PMT 1410. The PMT 1410 includes a PMT header 1401, descriptors 1402, and pieces of stream information 1403. The PMT header 1401 indicates the length of data, etc. stored in the PMT 1410. Each descriptor 1402 relates to the entire AV stream file that includes the PMT 1410. The copy control information is included in one of the descriptors 1402. Each piece of stream information 1403 relates to one of the elementary streams included in the AV stream file and is assigned to a different elementary stream. Each piece of stream information 1403 includes a stream type 1431, a PID 1432, and stream descriptors 1433. The stream type 1431 includes identification information for the codec used for compressing the elementary stream. The PID 1432 indicates the PID of the elementary stream. The stream descriptors 1433 include attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 15:
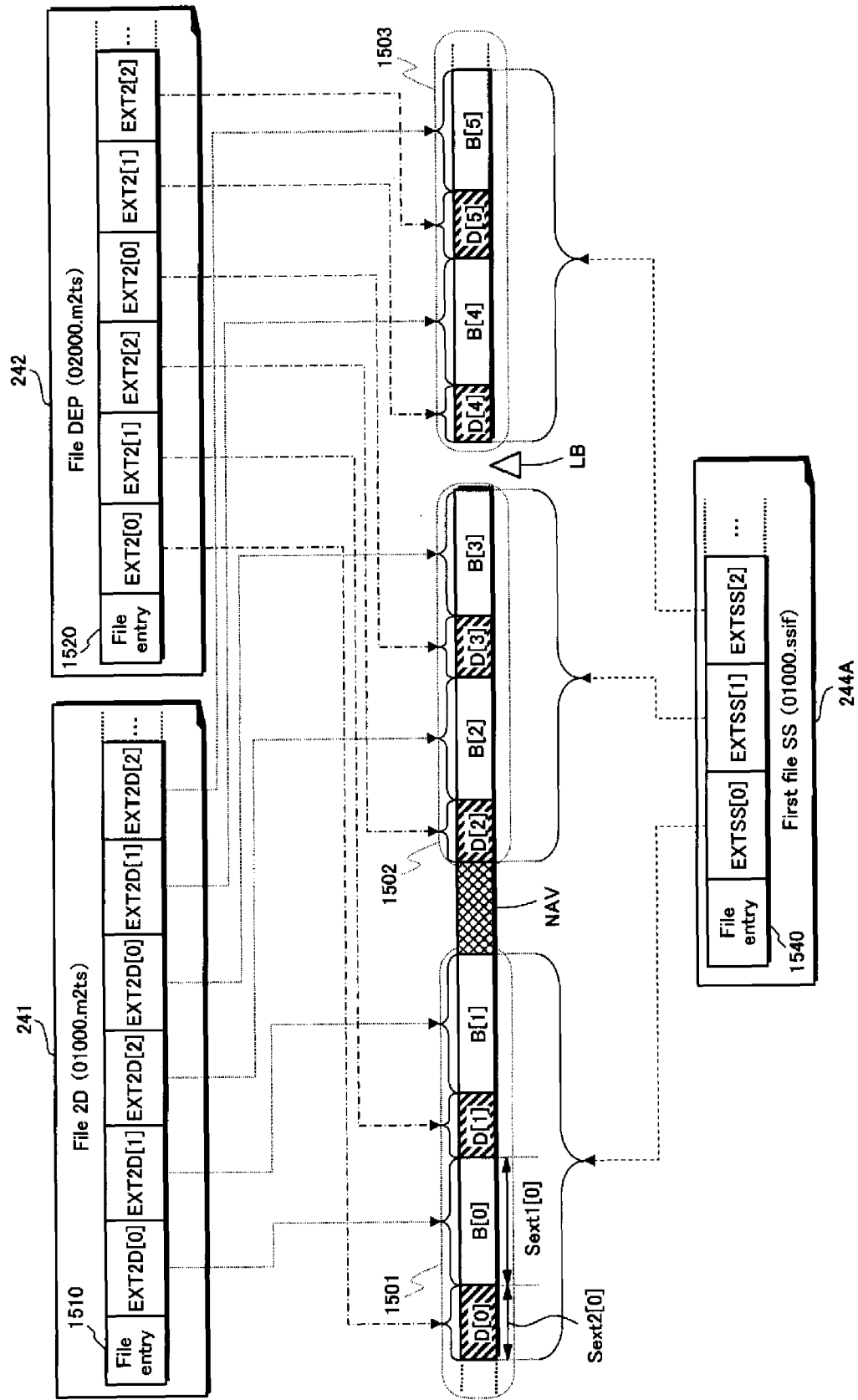
FIG. 15 is a schematic diagram showing a physical arrangement on the BD-ROM disc 101 of the main TS, first sub-TS, and second sub-TS shown in FIGS. 3A, 3B, and 3C.

FIG. 15 is a schematic diagram showing a physical arrangement on the BD-ROM disc 101 of the main TS, first sub-TS, and second sub-TS shown in FIG. 3. As shown in FIG. 15, each TS is divided into a plurality of data blocks D[n], B[n] (n=0, 1, 2, 3, . . . ) and arranged on the BD-ROM disc 101. A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks B[n] belonging to the main TS are referred to as "base-view data blocks", and data blocks D[n] belonging to the sub-TS are referred to as "dependent-view data blocks". In particular, the data blocks belonging to the first sub-TS are referred to as "right-view data blocks", and the data blocks belonging to the second sub-TS are referred to as "depth map data blocks".

In the file system on the BD-ROM disc 101, each data block B[n] and D[n] can be accessed as one extent in the file 2D or the file DEP. In other words, the logical address for each data block can be known from the file entry of the file 2D or the file DEP (see the <<Supplementary Explanation>> for details).

In the example shown in FIG. 15, the file entry 1510 in the file 2D (01000.m2ts) 241 indicates the sizes of the base-view data blocks B[n] and the LBNs of their tops. Accordingly, the base-view data blocks B[n] can be accessed as extents EXT2D[n] in the file 2D 241. Hereinafter, the extents EXT2D[n] belonging to the file 2D 241 are referred to as "2D extents". On the other hand, the file entry 1520 of the first file DEP (02000.m2ts) 242 indicates the sizes of the dependent-view data blocks D[n] and the LBNs of their tops. Accordingly, each dependent-view data block D[n] is a right-view data block and can be accessed as an extent EXT2[$n$] in the first file DEP 242. Hereinafter, the extents EXT2[$n$] belonging to the first file DEP 242 are referred to as "right-view extents". When the dependent-view data blocks D[n] are depth map data blocks, each depth map data block can similarly be accessed as an extent in the second file DEP (03000.m2ts) 243. Hereinafter, the extents belonging to the second file DEP 243 are referred to as "depth map extents". Furthermore, extents that belong to some file DEP, such as right-view extents and depth map extents, are collectively referred to as "dependent-view extents".

As shown in FIG. 15, a data block group is recorded continuously along a track on the BD-ROM disc 101. Furthermore, the base-view data blocks B[n] and the dependent-view data blocks D[n] are arranged alternately one by one. This type of arrangement of a data block group is referred to as an "interleaved arrangement". In particular, one series of data blocks recorded in an interleaved arrangement is referred to as an "extent block". Three extent blocks 1501, 1502, and 1503 are shown in FIG. 15. Extent blocks are separated by a recording area NAV for data other than multiplexed stream data, as in the case of the first extent block 1501 and the second extent block 1502. Also, when the BD-ROM disc 101 is a multi-layer disc, i.e. when the BD-ROM disc 101 includes a plurality of recording layers, the extent blocks may also separated by a boundary between recording layers (hereinafter referred to as a layer boundary) LB, as in the second and third extent blocks 1502 and 1503. In this way, one sequence of multiplexed stream data is generally arranged so as to be divided into a plurality of extent blocks. In this case, for the playback device 102 to seamlessly play back video images from the multiplexed stream data, it is necessary for video images to be played back from the extent blocks to be seamlessly connected. Hereinafter, processing required by the playback device 102 for that purpose is referred to as "seamless connection between extent blocks".

In the extent blocks 1501-1503 in Embodiment 1 of the present invention, the two types of data blocks D[n] and B[n] are equal in number. Furthermore, the extent ATC times are the same between the pair of $(n+1)^{th}$ consecutive data blocks D[n] and B[n]. Hereinafter, such a pair of data blocks is referred to as an "extent pair". In this context, an "Arrival Time Clock (ATC)" refers to a clock that acts as a standard for an ATS. "Extent ATC time" indicates the range of ATSs assigned to source packets in one data block, i.e. the difference from the ATS of the top source packet in a data block to the ATS of the top source packet in the next data block. This difference equals the time, expressed as an ATC value, required for the playback device 102 to transfer all of the source packets in the data block from the read buffer to the system target decoder. The "read buffer" is a buffer memory in the playback device 102 where data blocks read from the BD-ROM disc 101 are temporarily stored before being transmitted to the system target decoder. Details on the read buffer are provided later. In the example shown in FIG. 15, since three extent blocks 1501-1503 are connected together seamlessly, the extent ATC times are the same between the data block pairs D[n], B[n] (n=0, 1, 2, . . . ).

The VAUs located at the top of each extent pair D[n] and B[n] belong to the same 3D VAU, and in particular include the top picture of the GOP representing the same 3D video image. For example, in FIG. 15, the top of each right-view data block D[n] includes a P picture for the right-view video stream, and the top of each base-view data block B[n] includes an I picture for the base-view video stream. The P picture for the right-view video stream represents the right view when the 2D video image represented by the I picture in the base-view video stream is used as the left view. In particular, the P picture, as shown in FIG. 7, is compressed using the I picture as a reference picture. Accordingly, the playback device 102 in 3D playback mode can start playback of 3D video images from any extent pair D[n] and B[n]. That is to say, processing that requires random access of video streams, such as interrupt playback, is possible.

In the interleaved arrangement according to Embodiment 1 of the present invention, in each extent pair D[n], B[n], the dependent-view data block D[n] is located before the base-view data block B[n]. This is because the amount of data is typically smaller in the dependent-view data block D[n] than the base-view data block B[n], i.e. the bit rate is lower. For example, in FIG. 15, the picture included in the $(n+1)^{th}$ right-view data block D[n] is compressed using the picture included in the $(n+1)^{th}$ base-view data block B[n] as a reference picture, as shown in FIG. 7. Accordingly, the size of the right-view data block D[n], $S_{EXT2}[n]$, is typically equal to or less than the size of the base-view data block B[n], $S_{EXT1}[n]$: $S_{EXT2}[n] \leq S_{EXT1}[n]$. On the other hand, the amount of data per pixel in the depth map, i.e. the number of bits of the depth value, is typically smaller than the amount of data per pixel of the base-view picture, i.e. the sum of the number of bits of the chromatic coordinate value and the α (transparency) value. Furthermore, as shown in FIGS. 3A and 3C, unlike the second sub-TS, the main TS includes other elementary streams, such as a primary audio stream, in addition to the primary video stream. Therefore, the size of the depth map data block, $S_{EXT3}[n]$, is less than or equal to the size of the base-view data block B[n], $S_{EXT1}[n]$: $S_{EXT3}[n] \leq S_{EXT1}[n]$.

[Significance of Dividing Multiplexed Stream Data into Data Blocks]

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

FIG. 16A is a schematic diagram showing the arrangement of the main TS 1601 and sub-TS 1602 recorded separately and consecutively on a BD-ROM disc. When the playback device 102 processes the main TS 1601 and sub-TS 1602 in parallel, as shown by the arrows (1)-(4) on the solid lines in FIG. 16A, the BD-ROM drive 121 alternately reads sections of the main TS 1601 and the sub-TS 1602 that have the same extent ATC time. At this time, as shown by the arrows in the dashed curves in FIG. 16A, during read processing the BD-ROM drive 121 has to make a large change in the area to be read on the BD-ROM disc. For example, after the top section of the main TS 1601 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 1602 shown by arrow (2) is recorded to the position of the optical pickup. This operation to temporarily stop reading by the optical pickup and, while reading is stopped, position the optical pickup above the next area to be read is referred to as a "jump". The dashed curves with an arrow shown in FIG. 16A indicate the range of the jumps necessary during read processing. During each jump period, read processing by the optical pickup stops, and only decoding processing by the decoder progresses. Since the jump is excessive in the example shown in FIG. 16A, it is difficult to cause read processing to keep up with decoding processing. As a result, it is difficult to stably maintain seamless playback.

FIG. 16B is a schematic diagram showing an interleaved arrangement of dependent-view data blocks D[0], D[1], D[2], . . . and base-view data blocks B[0], B[1], B[2], . . . recorded on the BD-ROM disc 101 according to Embodiment 1 of the present invention. As shown in FIG. 16B, the main TS and sub-TS are divided into a plurality of data blocks and are arranged alternately. In this case, during playback of 3D video images, the playback device 102 reads data blocks D[0], B[0], D[1], B[1] . . . in order from the top, as shown by arrows (1)-(4) in FIG. 16B. By simply reading these data blocks in order, the playback device 102 can smoothly read the main TS and sub-TS alternately. In particular, since no jump occurs during read processing, seamless playback of 3D video images can be stably maintained.

[Significance of Providing Contiguous Data Blocks with the Same Extent ATC Time]

FIG. 16C is a schematic diagram showing an example of the extent ATC times for a dependent-view data block group D[n] and a base-view data block group B[n] recorded in an interleaved arrangement (n=0, 1, 2). As shown in FIG. 16C, the extent ATC time is the same in each pair between the dependent-view data block D[n] and the immediately subsequent base-view data block B[n]. For example, the extent ATC time is equal to one second for each of D[0] and B[0] in the top data block pair. Accordingly, when the data blocks D[0] and B[0] are read by the read buffer in the playback device 102, all of the TS packets therein are sent from the read buffer to the system target decoder in the same one-second interval. Similarly, since the extent ATC time is equal to 0.7 seconds for each of D[1] and B[1] in the second data block pair, all of the TS packets in each data block are transmitted from the read buffer to the system target decoder in the same 0.7-second interval.

FIG. 16D is a schematic diagram showing another example of the extent ATC times for a dependent-view data block group D[n] and a base-view data block group B[n] recorded in an interleaved arrangement. As shown in FIG. 16D, the extent ATC times in all of the data blocks D[n] and B[n] are equal to one second. Accordingly, in the same one-second interval in which any of the data blocks D[n] and B[n] are read by the read buffer in the playback device 102, all of the TS packets in each of those data blocks are transmitted from the read buffer to the system target decoder.

As described above, the compression rate of the video stream for dependent-view data blocks is typically higher than for base-view data blocks. Accordingly, decoding processing of the dependent-view data blocks is generally slower than decoding processing of the base-view data blocks. On the other hand, when the extent ATC times are equal, the dependent-view data blocks have a smaller amount of data than the base-view data blocks. Therefore, when the extent ATC times are the same between contiguous data blocks as in FIGS. 16C and 16D, the speed at which the data to be decoded is provided to the system target decoder can easily be maintained uniformly with the speed of processing by the decoder. In other words, the system target decoder facilitates synchronization between the decoding processing of the base-view data blocks and the decoding processing of the dependent-view data blocks, particularly in interrupt playback.

[Method to Align Extent ATC Times]

Figure 17:
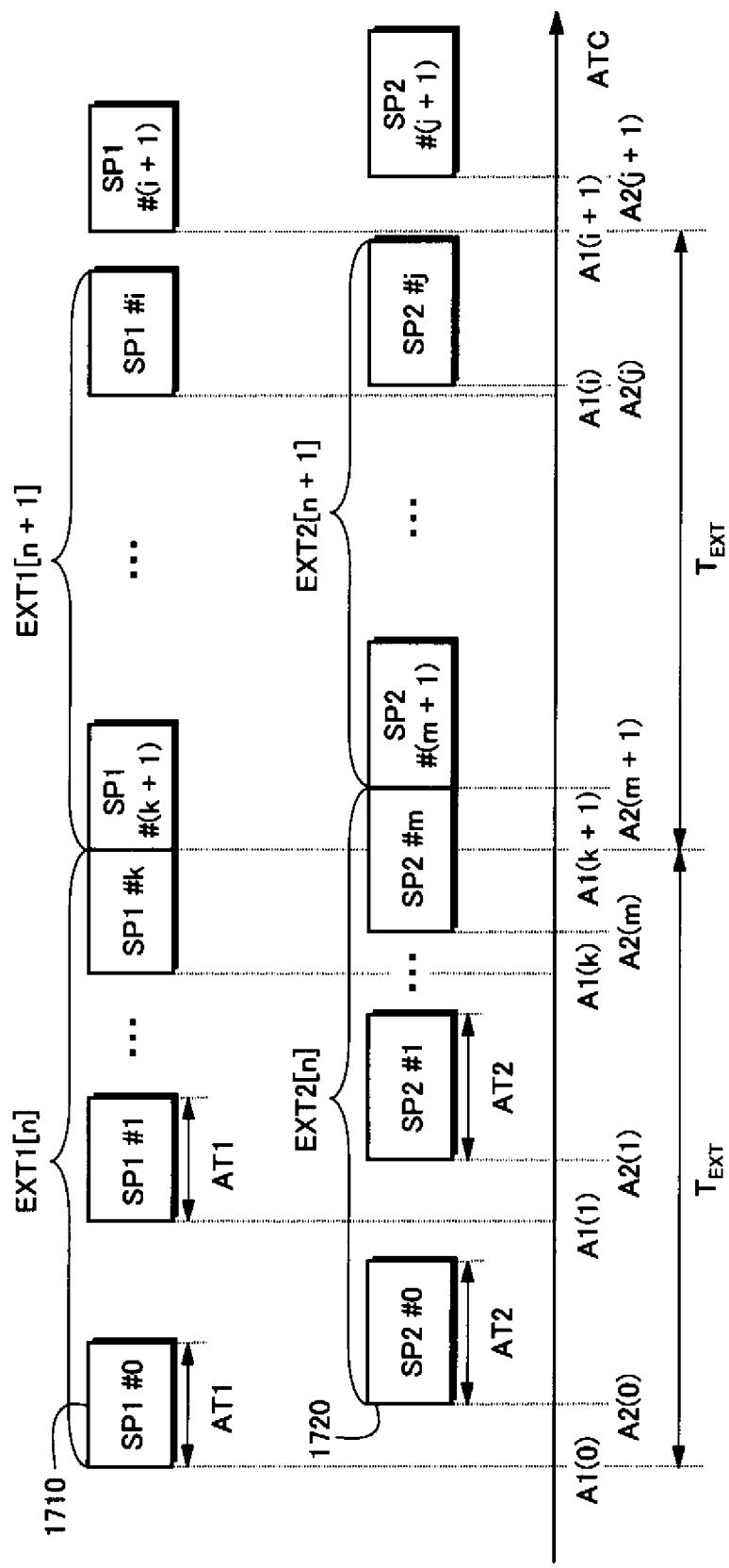
FIG. 17 is a schematic diagram showing a method to align extent ATC times between consecutive data blocks.

FIG. 17 is a schematic diagram showing a method to align extent ATC times between consecutive data blocks. First, ATSs along the same ATC time axis are assigned to source packets stored in a base-view data block (hereinafter, SP1) and source packets stored in a dependent-view data block (hereinafter, SP2). As shown in FIG. 17, the rectangles 1710 and 1720 respectively represent SP1 #p (p=0, 1, . . . , k, k+1, . . . , i+1) and SP2 #q (q=0, 1, . . . , m+1, j, j+1). These rectangles 1710 and 1720 are arranged in order along the time axis by the ATS of each source packet. The positions A1($p$) and A2($q$) respectively of the top of each rectangle 1710 and 1720 represent the value of the ATS of the source packet. The length AT1 and AT2 respectively of each rectangle 1710 and 1720 represent the amount of time needed for the 3D playback device to transfer one source packet from the read buffer to the system target decoder.

From the ATS A1(0) of SP1 #0 until an extent ATC time $T_{EXT}[n]$ has passed, SP1, i.e. SP1 #0, 1, 2, . . . , k, is transferred from the read buffer to the system target decoder and stored in the $(n+1)^{th}$ base-view data block EXT1[$n$]. Similarly, from the ATS A1($k$+1) of SP1 #(k+1) until an extent ATC time $T_{EXT}[n+1]$ has passed, SP1, i.e. SP1 #(k+1), i, is transferred from the read buffer to the system target decoder and stored in the $(n+2)^{th}$ base-view data block EXT1[$n$+1].

On the other hand, SP2, which is to be stored in the $(n+1)^{th}$ dependent-view data block EXT2[$n$], is selected as follows. First, the sum of the ATS A1(0) of SP1 #0 and the extent ATC time $T_{EXT}[n]$ is sought as ATS A1($k$+1) of SP1 #(k+1): ATS A1($k$+1)=A1(0)+$T_{EXT}[n]$. Next, SP2, i.e. SP2 #0, 1, . . . , m, is selected. Transfer of SP2 from the read buffer to the system target decoder begins during the period from ATS A1(0) of SP1 #0 until ATS A1($k$+1) of SP1 #(k+1). Accordingly, the top SP2, i.e. ATS A2(0) of SP2 #0, is always equal to or greater than the top SP1, i.e. ATS A1(0) of SP1 #0: A2(0)≧A1(0). Furthermore, the last SP2, i.e. ATS A2($m$) of SP2 #m, is equal to or less than ATS A1($k$+1) of SP1 #(k+1): A2($m$)≦A1($k$+1). In this context, completion of transfer of SP2 #m may be at or after ATS A1($k$+1) of SP1 #(k+1).

Similarly, SP2, which is to be stored in the $(n+2)^{th}$ dependent-view data block EXT2[$n$+1], is selected as follows. First, ATS A1($k$+1) of SP1 #(k+1), which is located at the top of the $(n+3)^{th}$ base-view data block EXT1[$n$+2], is sought: ATS A1($i$+1)=A1($k$+1)+$T_{EXT}$. Next, SP2, i.e. SP2 #(m+1)–

SP2 #j, is selected. Transfer of SP2 from the read buffer to the system target decoder begins during the period from ATS A1(k+1) of SP1 #(k+1) until ATS A1(i+1) of SP1 #(i+1). Accordingly, the top SP2, i.e. ATS A2(m+1) of SP2 #(m+1), is equal to or greater than the top SP1, i.e. ATS A1(k+1) of SP1 #(k+1): A2(m+1)≧A1(k+1). Furthermore, ATS A2(j) of the last SP2 #j is equal to or less than ATS A1(i+1) of the SP1 #(i+1) located at the top of the next base-view data block EXT1[n+2]: A2(j)≦A1(i+1).

[Significance of Placing Smaller-Data-Amount Data Blocks First]

When reading a data block located at the top or at the playback start position of each extent block, the playback device 102 in 3D playback mode first reads the entirety of the data block into the read buffer. The data block is not transferred to the system target decoder during that period. After finishing reading the data block, the playback device 102 transfers the data block to the system target decoder in parallel with the next data block. This processing is called "preloading".

The technical significance of preloading is as follows. First, in L/R mode, base-view data blocks are necessary for decoding the dependent-view data blocks. Therefore, to maintain the buffer at the minimum necessary capacity for storing the decoded data until output processing, it is preferable to simultaneously provide the data blocks to the system target decoder to be decoded. In depth mode, processing is necessary to generate a pair of video planes representing parallax images from a pair of a decoded base-view picture and a decoded depth map. Accordingly, to maintain the buffer at the minimum necessary capacity for storing the decoded data until this processing, it is preferable to provide the base-view data blocks simultaneously with the depth map data blocks to the system target decoder to be decoded. Therefore, preloading causes the entirety of the data block at the top of an extent block or at the playback start position to be read into the read buffer in advance. This enables the data block and the following data block to be transferred simultaneously from the read buffer to the system target decoder and decoded. Furthermore, the subsequent extent pairs can also be simultaneously decoded by the system target decoder.

When preloading, the entirety of the data block that is read first is stored in the read buffer. Accordingly, the read buffer requires at least a capacity equal to the size of the data block. To maintain the capacity of the read buffer at a minimum, the size of the data block to be preloaded should be as small as possible. Meanwhile, for interrupt playback, etc., any extent pair may be selected as the playback start position. For this reason, in each extent pair, the smaller data amount is placed first. This enables the minimum capacity to be maintained in the read buffer.

<<Cross-Linking of AV Stream Files to Data Blocks>>

For the data block group shown in FIG. 15, the AV stream files are cross-linked as follows. The file entry 1540 of the first file SS (01000.ssif) 244A considers each extent block 1501-1503 to each be one extent, indicating the size of each and the LBN of the top thereof. Accordingly, the extent blocks 1501-1503 can be accessed as the extents EXTSS[0], EXTSS[1], and EXTSS[2] of the first file SS 244A. Hereinafter, the extents EXTSS[0], EXTSS[1], and EXTSS[2] belonging to the first file SS 244A are referred to as the "extents SS". Each of the extents SS EXTSS[0], EXTSS[1], and EXTSS[2] share the base-view data blocks B[n] with the file 2D 241 and share the right-view data blocks D[n] with the first file DEP 242.

<<Playback Path for Extent Block Group>>

Figure 18:
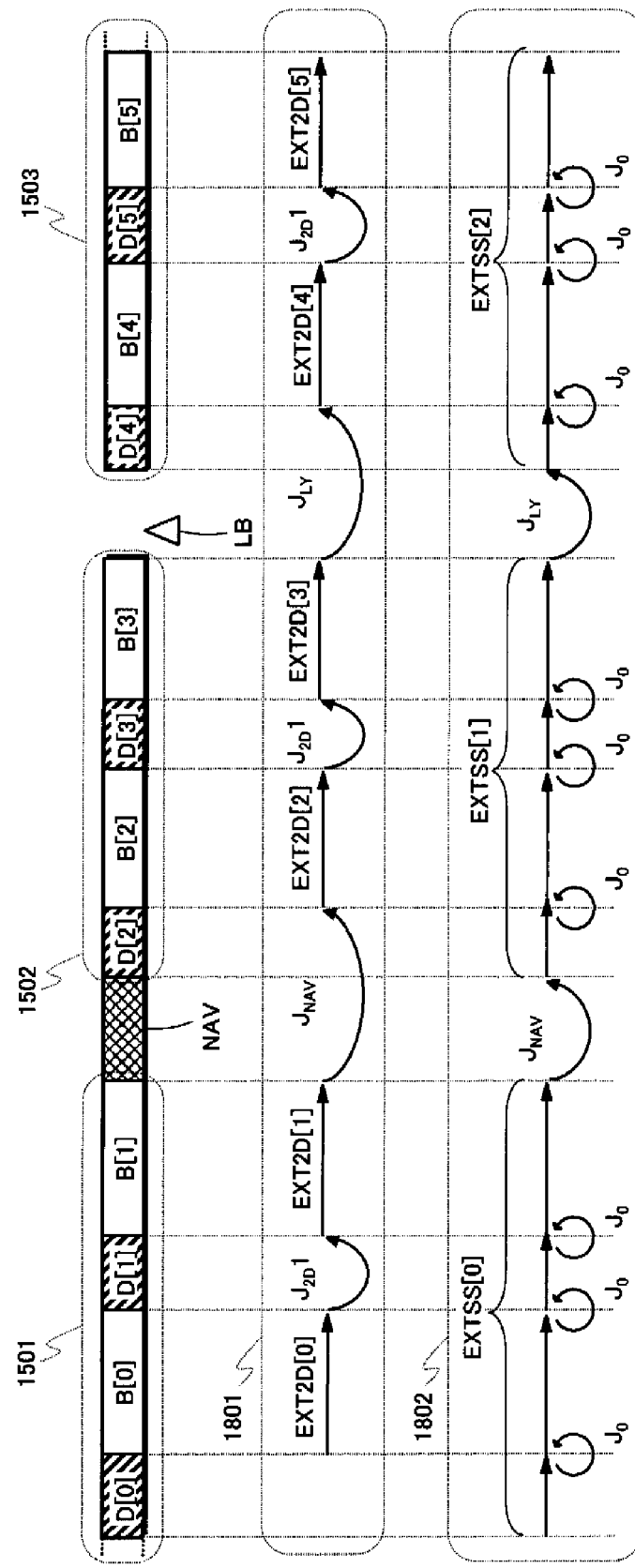
FIG. 18 is a schematic diagram showing a playback path 1801 in 2D playback mode for the extent block group 1501-1503 shown in FIG. 15.

FIG. 18 is a schematic diagram showing a playback path 1801 in 2D playback mode for an extent block group 1501-1503. The playback device 102 in 2D playback mode plays back the file 2D 241. Accordingly, as indicated by the playback path 1801 in 2D playback mode, the base-view data blocks B[n] (n=0, 1, 2, . . . ) are read in order from the extent blocks 1501-1503 as 2D extents EXT2D[n]. Specifically, the top base-view data block B[0] is first read from the top extent block 1501, then reading of the immediately subsequent right-view data block D[0] is skipped by a first jump $J_{2D}1$. Next, the second base-view data block B[1] is read, and then reading of the immediately subsequent data NAV and right-view data block D[1] is skipped by a second jump $J_{NAV}$. Subsequently, reading of the base-view data blocks and jumps are repeated similarly in the second and subsequent extent blocks 1502 and 1503.

A jump $J_{LY}$ occurring between the second extent block 1502 and the third extent block 1503 is a long jump across the layer boundary LB. A "long jump" is a collective term for jumps with a long seek time and specifically refers to (i) a jump performed to switch recording layers and (ii) a jump distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value in (ii) above is specified as 40000 sectors, for example, in the BD-ROM standard. This threshold value, however, depends on the type of BD-ROM disc and on the BD-ROM drive's read processing capability. Long jumps particularly include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

FIG. 18 is a schematic diagram showing a playback path 1802 in L/R mode for the extent block group 1501-1503. The playback device 102 in L/R mode plays back the first file SS 244A. Accordingly, as indicated by the playback path 1802 in L/R mode, the extent blocks 1501, 1502, and 1503 are read in order as the extents SS EXTSS [0], EXTSS[1], and EXTSS [2]. Specifically, the data blocks D[0], B[0], D[1] and B[1] are first sequentially read from the top extent block 1501, then reading of the immediately subsequent data NAV is skipped by a first jump $J_{NAV}$. Next, the data blocks D[2], . . . , B[3] are sequentially read from the second extent block 1502. Immediately thereafter, a long jump $J_{LY}$ for switching recording layers occurs. Next, the data blocks D[4], B[4], . . . are sequentially read from the third extent block 1503.

When reading the extent blocks 1501-1503 as extents of the first file SS 244A, the playback device 102 reads the top LBN of the extents SS EXTSS[0], EXTSS[1], . . . , and the size thereof, from the file entry 1540 in the first file SS 244A and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 242 and the file 2D 241 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. However, after the playback device 102 has read the extents SS EXTSS[0], EXTSS[1], . . . , it needs to separate each into a right-view data block and a base-view data block and output them to the decoder. The clip information file is used for this separation processing. Details are provided below.

As shown in FIG. 15, when actually reading the extent blocks 1501-1503, the BD-ROM drive 121 performs a zero sector transition $J_0$ in the time from the top of a data block to the top of the next data block. A "zero sector transition" is a movement of the optical pickup between two consecutive data blocks. During a period in which a zero sector transition is performed (hereinafter referred to as a "zero sector transition period"), the optical pickup temporarily suspends its read operation and waits. For this reason, a zero sector transition is considered "a jump whose jump distance equals zero sectors". The length of the zero sector transition period, that is, the zero sector transition time period, may include, in addition to the time for shifting the position of the optical pickup via revolution of the BD-ROM disc 101, overhead caused by error correction processing. "Overhead caused by error correction processing" refers to excess time caused by performing error correction processing twice using an ECC block when the boundary between ECC blocks does not match the boundary between two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is estimated at the total time for reading the excess data, i.e. 32 sectors×2048 bytes×8 bits/byte×2 instances/read rate. Note that data blocks may be structured in units of ECC blocks. In this case, the size of each data block equals an integer multiple of the size of an ECC block. The overhead caused by error correction processing can thus be removed from the zero sector transition period.

<<Size of Data Blocks/Extent Blocks>>

Data blocks are structured in aligned units. The size of each data block equals a multiple of the size of an aligned unit (=6144 bytes, or approximately 6 KB). Accordingly, the BD-ROM drive can reliably read any data block sequentially in its entirety, since the boundary between data blocks coincides with the boundary between sectors.

[1: Conditions for Seamless Playback]

As shown in FIG. 15, for seamless playback of both 2D video images and 3D video images from extent blocks 1501-1503 that have been separated from each other, the size of each data block and each extent block 1501-1503 should satisfy the conditions described in [1-1] and [1-2] below.

1-1: Conditions During 2D Playback Mode

Figure 19:
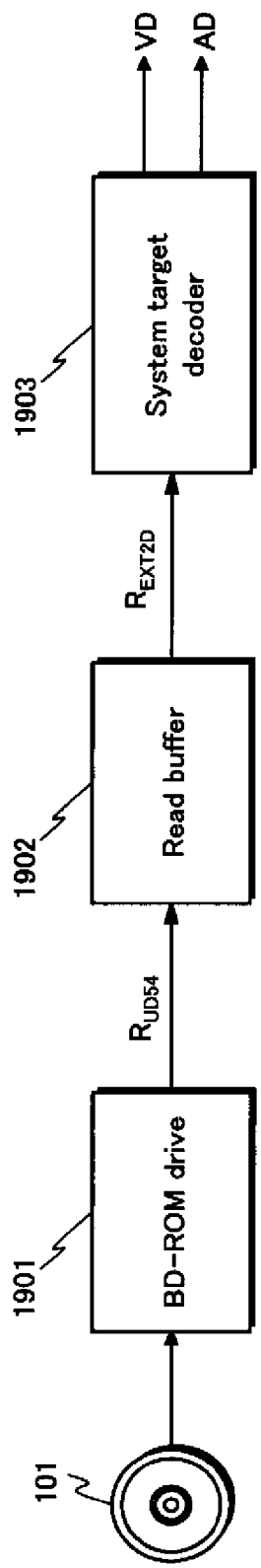
FIG. 19 is a block diagram showing playback processing in the playback device 102 in 2D playback mode.

FIG. 19 is a block diagram showing a playback processing system in the playback device 102 in 2D playback mode. As shown in FIG. 19, this playback processing system includes a BD-ROM drive 1901, read buffer 1902, and system target decoder 1903. The BD-ROM drive 1901 reads 2D extents from the BD-ROM disc 101 and transfers the 2D extents to the read buffer 1902 at a read rate $R_{UD54}$. The read buffer 1902 is a buffer memory, internal to the playback device 102, that receives 2D extents from the BD-ROM drive 1901 and stores the 2D extents. The system target decoder 1903 reads source packets from each 2D extent stored in the read buffer 1902 at a mean transfer rate $R_{EXT2D}$ and decodes the source packets into video data VD and audio data AD.

The mean transfer rate $R_{EXT2D}$ equals 192/188 times the mean rate of processing by the system target decoder 1903 to extract TS packets from each source packet in the read buffer 1902. In this case, the coefficient 192/188 is the ratio of bytes in a source packet to bytes in a TS packet. The mean transfer rate $R_{EXT2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes×8 bits/byte). The mean transfer rate $R_{EXT2D}$ typically varies by 2D extent. The maximum value $R_{MAX2D}$ of the mean transfer rate $R_{EXT2D}$ equals 192/188 times the system rate $R_{TS}$ for the file 2D. The "system rate" refers to the maximum speed at which the system target decoder 1903 processes TS packets. The system rate $R_{TS}$ is normally expressed as bits per second (bps) and equals eight times the main TS recording rate as expressed in bytes per second (Bps).

The mean transfer rate $R_{EXT2D}$ is estimated as follows. First, extent ATC time is calculated as follows. In the example shown in FIG. 17, the extent ATC time $T_{EXT}[n]$ of the $(n+1)^{th}$ base-view data block EXT1[$n$] is expressed in the following equation as the difference between ATS A1(0) of SP1 #0 and ATS A1(k+1) of SP1 #(k+1) located at the top of the $(n+2)^{th}$ base-view data block EXT1[$n$+1]:

$$T_{EXT}[n]=(A1(k+1)-A1(0)+WA)/T_{ATC}$$

In this equation, a wraparound value WA represents the sum of the count values discarded each time wraparound occurs while the ATC is being counted from the ATS A1(0) of SP1 #0 to the ATS A1(k+1) of SP1 #(k+1). In other words, the wraparound value WA equals the product of the number of times wraparound occurs during this period and the count value when wraparound occurs. For example, when the ATC is counted with a 30 bit counter, the wraparound value WA is $2^{30}$. The constant $T_{ATC}$ represents the period of the ATC and equals, for example, 27 MHz:

$$T_{ATC}=27\times 10^6.$$

Next, the 2D extent size is calculated as follows. In the example shown in FIG. 17, the size $S_{EXT1}[n]$ of the $(n+1)^{th}$ base-view data block EXT1[$n$] is 192×(k+1)×8 bits, the total data amount of the source packets SP1 #0, 1, . . . , k stored in the data block.

Finally, the mean transfer rate $R_{EXT2D}[n]$ is estimated at the size $S_{EXT1}[n]$ of the base-view data block EXT1[$n$] divided by the extent ATC time $T_{EXT}[n]$:

$$R_{EXT2D}[n]=S_{EXT1}[n]/T_{EXT}[n].$$

In the above estimate, the size of each 2D extent may be set to a constant multiple of the source packet length for the sake of accurate calculation of its extent ATC time. Furthermore, when a 2D extent includes more source packets than the multiple, the extent ATC time of the 2D extent may be calculated as follows. First, the multiple is subtracted from the total number of source packets, and the result is multiplied by the transfer time for one source packet (=188×8/system rate). Next, this product is added to an extent ATC time corresponding to the above multiple. The sum is designated as the extent ATC time of the 2D extent.

Alternatively, an extent ATC time may be calculated as follows. First, for one 2D extent, the duration from the ATS of the top source packet to the ATS of the last source packet is sought. Next, the transfer time per source packet is added to the duration. The sum is designated as the extent ATC time of the 2D extent. Specifically, in the example in FIG. 17, the extent ATC time $T_{EXT}[n]$ of the $(n+1)^{th}$ base-view data block EXT1[$n$] is expressed in the following equation based on the difference between the ATS A1(0) of SP1 #0 and the ATS A1(k) of SP1 #k located at the end of the data block EXT1[$n$].

$$T_{EXT}[n]=(A1(k)-A1(0)+WA)/T_{ATC}+188\times 8/R_{TS1}$$

In this equation, the wraparound value WA represents the sum of the count values discarded each time wraparound occurs while the ATC is being counted from the ATS A1(0) of SP1 #0 to the ATS A1(k) of SP1 #k. The second term in the right-hand side of the above equation is the data length of a TS packet, 188 (bytes)×8 (bits/byte), divided by the system rate $R_{TS2}$; the second term equals the time necessary to transfer one TS packet from the read buffer to the system target decoder.

Since the above calculation of extent ATC time does not need to refer to the next extent, the extent ATC time can be calculated even when the next extent does not exist. Even if the next extent does exist, calculation of the extent ATC time is simplified.

The read rate $R_{UD54}$ is normally expressed in bits/second and is set at a higher value, e.g. 54 Mbps, than the maximum value $R_{MAX2D}$ of the mean transfer rate $R_{EXT2D}$: $R_{UD54} > R_{MAX2D}$. This prevents underflow in the read buffer 1902 due to decoding processing by the system target decoder 1903 while the BD-ROM drive 1901 is reading a 2D extent from the BD-ROM disc 101.

FIG. 20A is a graph showing the change in the data amount DA stored in the read buffer 1902 during operation in 2D playback mode. FIG. 20B is a schematic diagram showing the correspondence between an extent block 2010 for playback and a playback path 2020 in 2D playback mode. As shown in FIG. 20B, in accordance with the playback path 2020, the base-view data blocks B[n] (n=0, 1, 2, ...) in the extent block 2010 are each read as one 2D extent EXT2D[n] from the BD-ROM disc 101 into the read buffer 1902. As shown in FIG. 20A, during the read period $PR_{2D}[n]$ for each 2D extent$_{EXT2D}[n]$, the stored data amount DA increases at a rate equal to $R_{UD54} - R_{EXT2}D[n]$, the difference between the read rate $R_{UD54}$ and the mean transfer rate $R_{EXT2D}[n]$. A jump $J_{2D}[n]$ occurs between two contiguous 2D extents EXT2D[n−1] and EXT2D[n]. Since the reading of two contiguous dependent-view data blocks D[n] is skipped during the corresponding jump period $PJ_{2D}[n]$, reading of data from the BD-ROM disc 101 is interrupted. Accordingly, the stored data amount DA decreases at a mean transfer rate $R_{EXT2D}[n]$ during each jump period $PJ_{2D}[n]$.

Reading and transfer operations by the BD-ROM drive 1901 are not actually performed in a continuous manner, as suggested by the graph in FIG. 20A, but rather in an intermittent manner. This prevents the stored data amount DA from exceeding the capacity of the read buffer 1902, i.e. overflow in the read buffer 1902, during the read period $PR_{2D}[n]$ for each 2D extent. Accordingly, the graph in FIG. 20A represents actual step-wise changes as approximated linear changes.

For seamless playback of 2D video images from the extent block 2010 shown in FIG. 20B, the following two conditions should be met. First, the size $S_{EXT2D}[n]$ of each 2D extent EXT2D[n] should be at least a predetermined lower limit. This lower limit is referred to as the "minimum extent size". The distance between 2D extents should also not exceed a predetermined upper limit.

1-1-1: Minimum Extent Size of 2D Extents

During each jump period $PJ_{2D}[n]$, data needs to be so continuously provided from the read buffer 1902 to the system target decoder 1903 that the system target decoder 1903 can ensure its continuous output. Accordingly, the size of each 2D extent should satisfy the following condition 1.

The size $S_{EXT2D}[n]$ of each 2D extent EXT2D[n] equals the data amount transferred from the read buffer 1902 to the system target decoder 1903 throughout the read period $PR_{2D}[n]$ and the next jump period $PJ_{2D}[n+1]$. In this case, as shown in FIG. 20A, the stored data amount DA at the end of the jump period $PJ_{2D}[n+1]$ does not fall below the value at the start of the read period $PR_{2D}[n]$. In other words, during each jump period $PJ_{2D}[n]$, data is continuously provided from the read buffer 1902 to the system target decoder 1903. In particular, underflow does not occur in the read buffer 1902. Note that the length of the read period $PR_{2D}[n]$ equals a value $S_{EXT2D}[n]/R_{UD54}$, the size $S_{EXT2D}[n]$ of a 2D extent EXT2D[n] divided by the read rate $R_{UD54}$. Accordingly, condition 1 indicates the following. The minimum extent size of each 2D extent EXT2D[n] is expressed in the right-hand side of expression (1):

$$S_{EXT2D}[n] \geq \left( \frac{S_{EXT2D}[n]}{R_{UD54}} + T_{JUMP-2D}[n] \right) \times R_{EXT2D}[n] \therefore \quad (1)$$

$$S_{EXT2D}[n] \geq \text{CEIL}\left( \frac{R_{EXT2D}[n]}{8} \times \frac{R_{UD54}}{R_{UD54} - R_{EXT2D}[n]} \times T_{JUMP-2D}[n] \right).$$

In expression (1), the jump time $T_{JUMP-2D}[n]$ represents the length of the jump period $PJ_{2D}[n]$ in seconds. The read rate $R_{UD54}$ and the mean transfer rate $R_{EXT2D}$ are both expressed in bits per second. Accordingly, in expression (1), the mean transfer rate $R_{EXT2D}$ is divided by 8 to convert the size $S_{EXT2D}[n]$ of the 2D extent from bits to bytes. That is, the size $S_{EXT2D}[n]$ of the 2D extent is expressed in bytes. The function CEIL( ) is an operation to round up fractional numbers after the decimal point of the value in parentheses.

1-1-2: Distance between 2D Extents

Since the capacity of the read buffer 1902 is limited, the maximum value of the jump time $T_{JUMP-2D}[n]$ is restricted. In other words, even if the stored data amount DA fills the capacity of the read buffer 1902 immediately before a jump period $PJ_{2D}[n]$, the jump time $T_{JUMP-2D}[n]$ being too long would cause the stored data amount DA to reach zero during the jump period $PJ_{2D}[n]$, and thus there would be a risk of underflow occurring in the read buffer 1902. Hereinafter, the time for the stored data amount DA to decrease from the capacity of the read buffer 1902 to zero while data supply from the BD-ROM disc 101 to the read buffer 1902 has stopped, that is, the maximum value of the jump time $T_{JUMP-2D}$ that guarantees seamless playback, is referred to as the "maximum jump time $T_{JUMP\_MAX}$".

Standards of optical discs determine correspondence between jump distances and maximum jump times from the access speed of an optical disc drive and other factors. FIG. 21 is an example of a correspondence table between jump distances $S_{JUMP}$ and maximum jump times $T_{JUMP\_MAX}$ for a BD-ROM disc. As shown in FIG. 21, jump distances $S_{JUMP}$ are represented in units of sectors, and maximum jump times $T_{JUMP\_MAX}$ are represented in milliseconds. One sector equals 2048 bytes. When a jump distance $S_{JUMP}$ is zero sectors or within a range of 1-10000 sectors, 10001-20000 sectors, 20001-40000 sectors, 40001 sectors-1/10 of a stroke, and 1/10 of a stroke or greater, the corresponding maximum jump time $T_{JUMP\_MAX}$ is 0 msec, 200 msec, 300 msec, 350 msec, 700 msec, and 1400 msec, respectively. When the jump distance $S_{JUMP}$ equals zero sectors, the maximum jump time $T_{JUMP\_MAX}$ equals a zero sector transition time $T_{JUMP0}$. In the example in FIG. 21, the zero sector transition time $T_{JUMP0}$ is considered to be zero msec.

Based on the above considerations, the jump time $T_{JUMP-2D}[n]$ to be substituted into expression (1) is the maximum jump time $T_{JUMP\_MAX}$ specified for each jump distance by BD-ROM disc standards. Specifically, in the table in FIG. 21, the maximum jump time $T_{JUMP\_MAX}$ corresponding to the jump distance $S_{JUMP}$ between two contiguous 2D extents EXT2D[n] and EXT2D[n+1] is substituted into expression (1) as the jump time $T_{JUMP-2D}[n]$. The jump distance $S_{JUMP}$ equals the number of sectors within the range from the end of the $(n+1)^{th}$ 2D extent EXT2D[n] to the end of the $(n+2)^{th}$ 2D extent EXT2D[n+1].

Since the jump time $T_{JUMP-2D}[n]$ for the jump between two 2D extents EXT2D[n] and EXT2D[n+1] is restricted to the maximum jump time $T_{JUMP\_MAX}$, the jump distance $S_{JUMP}$, i.e. the distance between the two adjacent 2D extents EXT2D[n] and EXT2D[n+1], is also restricted. For example, if the jump time $T_{JUMP-2D}[n]$ is restricted to be equal to or less than the maximum jump time $T_{JUMP\_MAX}$=700 msec, the jump distance $S_{JUMP}$ between two 2D extents EXT2D[n] and EXT2D[n+1] is allowed to be a maximum of ¹⁄₁₀ of a stroke (=approximately 1.2 GB). Like this maximum of the jump distance $S_{JUMP}$, a jump distance $S_{JUMP}$ corresponding to a jump time $T_{JUMP}$ equal to its maximum jump time $T_{JUMP\_MAX}$ is referred to as a "maximum jump distance $S_{JUMP\_MAX}$". For seamless playback of 2D video images, the distance between adjacent 2D extents needs to be equal to or less than a maximum jump distance $S_{JUMP\_MAX}$.

Within each extent block, the distance between adjacent 2D extents equals the size of a dependent-view data block. Accordingly, the size of the dependent-view data block is restricted to be equal to or less than a maximum jump distance $S_{JUMP\_MAX}$. Specifically, when the maximum jump time $T_{JUMP\_MAX}$ between the adjacent 2D extents is restricted to the minimum value of 200 msec specified in FIG. 21, the size of the dependent-view data block is restricted to be equal to or less than the maximum jump distance $S_{JUMP\_MAX}$=10000 sectors (=approximately 19.5 MB).

When two extent blocks arranged on different recording layers are seamlessly recorded, a long jump occurs between the end of the extent block read earlier and the start of the extent block read later. This long jump includes an operation to switch the recording layer, such as a focus jump. Accordingly, the time required for this long jump includes a "layer switching time", which is the time necessary for an operation to switch the recording layer, in addition to the maximum jump time $T_{JUMP\_MAX}$ specified in the table in FIG. 21. This "layer switching time" is, for example, 350 msec. In this context, the $(n+1)^{th}$ 2D extent EXT2D[n] is located at the end of the extent block that is read earlier, and the $(n+2)^{th}$ 2D extent EXT2D[n+1] is located at the top of the extent block that is read later. Expression (1), that the size of the $(n+1)^{th}$ 2D extent EXT2D[n] should satisfy, has the jump time $T_{JUMP-2D}[n]$ determined by the sum of two parameters TJ[n] and TL[n]: $T_{JUMP-2D}[n]$=TJ[n]+TL[n]. The first parameter TJ[n] represents the maximum jump time $T_{JUMP\_MAX}$ specified for the jump distance $S_{JUMP}$ of the long jump according to BD-ROM disc standards. This maximum jump time $T_{JUMP\_MAX}$ equals the value that the table in FIG. 21 assigns to the number of sectors from the end of the $(n+1)^{th}$ 2D extent EXT2D[n] to the top of the $(n+2)^{th}$ 2D extent EXT2D[n+1]. The second parameter TL[n] represents the layer switching time, for example 350 msec. Accordingly, the distance between the two 2D extents EXT2D[n] and EXT2D[n+1] is restricted to a maximum jump distance $S_{JUMP\_MAX}$ or less; the table in FIG. 21 assigns the maximum jump distance to a value equal to the maximum jump time $T_{JUMP\_MAX}$ of the long jump minus the layer switching time. For example, when the jump time $T_{JUMP-2D}[n]$ is restricted to a range with a maximum jump time $T_{JUMP\_MAX}$=700 msec, or 600 msec as its upper limit, the maximum jump distance $S_{JUMP\_MAX}$ between the two 2D extents EXT2D[n] and EXT2D[n+1] is 40000 sectors (=approximately 78.1 MB) or 10000 sectors (=approximately 19.5 GB).

1-2: Conditions During 3D Playback Mode

Figure 22:
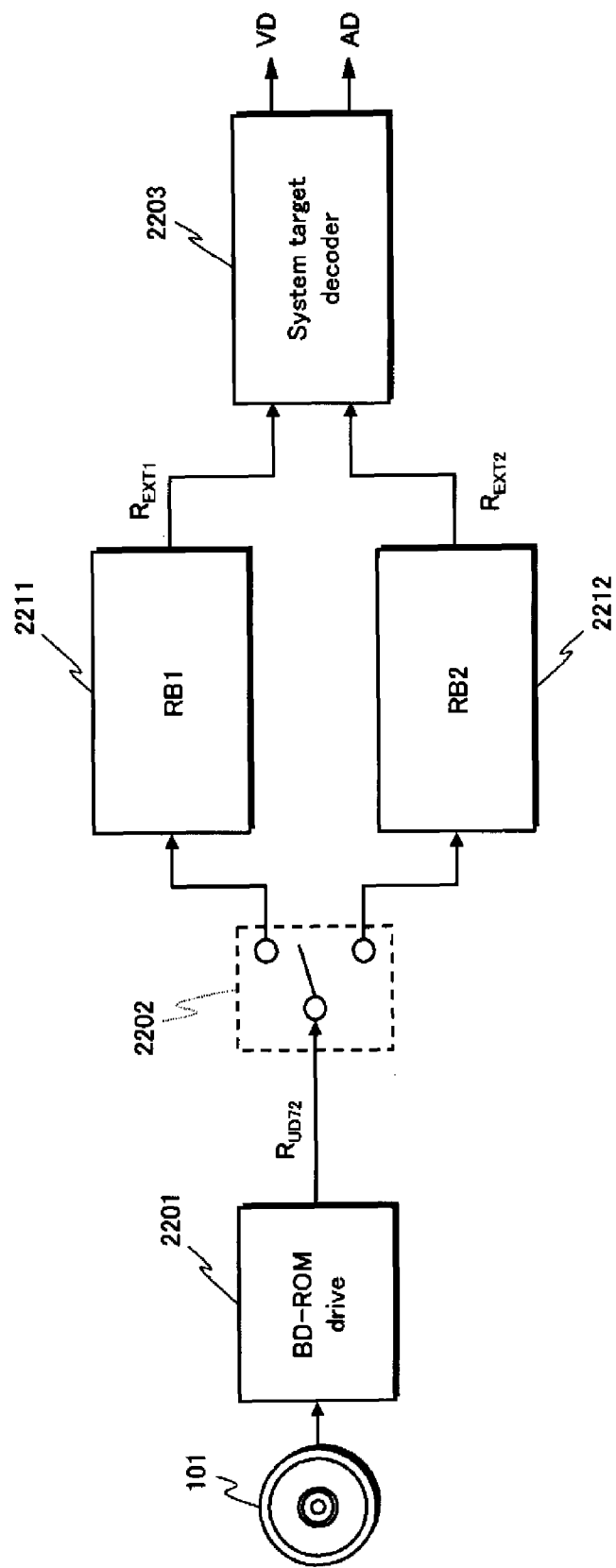
FIG. 22 is a block diagram showing a playback processing system in the playback device 102 in 3D playback mode.

FIG. 22 is a block diagram showing a playback processing system in the playback device 102 in 3D playback mode. As shown in FIG. 22, this playback processing system includes a BD-ROM drive 2201, switch 2202, pair of read buffers 2211 and 2212, and system target decoder 2203. The BD-ROM drive 2201 reads extents SS from the BD-ROM disc 101 and transfers the extents SS to the switch 2202 at a read rate $R_{UD72}$. The switch 2202 separates extents SS into base-view data blocks and dependent-view data blocks. Details on separation processing are provided below. The first read buffer 2211 and second read buffer 2212 (hereinafter abbreviated as RB1 and RB2) are buffer memories internal to the playback device 102 and store data blocks separated by the switch 2202. The RB1 2211 stores base-view data blocks, and the RB2 2212 stores dependent-view data blocks. The system target decoder 2203 reads source packets from the base-view data blocks stored in the RB1 2211 at a base-view transfer rate $R_{EXT1}$ and reads source packets from the dependent-view data blocks stored in the RB2 2212 at a dependent-view transfer rate $R_{EXT2}$. The system target decoder 2203 also decodes pairs of read base-view data blocks and dependent-view data blocks into video data VD and audio data AD.

The base-view transfer rate $R_{EXT1}$ equals 192/188 times the mean rate of processing by the system target decoder 2203 to extract TS packets from each source packet in the RB1 2211. The maximum value $R_{MAX1}$ of the base-view transfer rate $R_{EXT1}$ equals 192/188 times the system rate $R_{TS1}$ for the file 2D: $R_{MAX1}=R_{TS1}\times192/188$. This system rate $R_{TS1}$ is normally expressed in bits per second (bps) and equals eight times the main TS recording rate expressed in bytes per second (Bps). The dependent-view transfer rate $R_{EXT2}$ equals 192/188 times the mean rate of processing by the system target decoder 2203 to extract TS packets from each source packet in the RB2 2212. The maximum value $R_{MAX2}$ of the dependent-view transfer rate $R_{EXT2}$ equals 192/188 times the system rate $R_{TS2}$ for the file DEP: $R_{MAX2}=R_{TS2}\times192/188$. This system rate $R_{TS2}$ is normally expressed in bits per second (bps) and equals eight times the main TS recording rate expressed in bytes per second (Bps). The transfer rates $R_{EXT1}$ and $R_{EXT2}$ are typically represented in bits/second and specifically equal to the size of each data block divided by the extent ATC time thereof; the size is expressed in bits. The extent ATC time equals the time required to transfer all of the source packets in the data block from the RB1 2211 and RB2 2212 to the system target decoder 2203.

The base-view transfer rate $R_{EXT1}$ is estimated in exactly the same way at the mean transfer rate $R_{EXT2D}$ of a 2D extent: $R_{EXT1}[\bullet]=S_{EXT1}[\bullet]/T_{EXT1}[\bullet]$. On the other hand, the dependent-view transfer rate $R_{EXT2}$ is estimated at the ratio between a data amount $SP_{EXT2}[\bullet]$ and an extent ATC time: $R_{EXT2}[\bullet]=SP_{EXT2}[\bullet]/T_{EXT1}[\bullet]$, instead of the ratio between the size and extent ATC time of a dependent-view data block. This data amount $SP_{EXT2}[\bullet]$ equals the data amount of a portion of a dependent-view data block; the portion is actually transferred while the corresponding base-view data block is transferred. For the $(n+1)^{th}$ dependent-view data block EXT2[n] shown in FIG. 17, the data amount $SP_{EXT2}[n]$ equals the data amount of a portion of the source packets SP2 #0, 1, . . . , m stored in the dependent-view data block EXT2[n]; the portion is transferred from the RB2 2212 to the system target decoder 2203 during the period of the extent ATC time $T_{EXT1}[n]$ from the ATS A1(0) of SP1 #0, i.e. the top source packet in the $(n+1)^{th}$ base-view data block EXT1[n]. In other words, the data amount $SP_{EXT2}[n]$ is smaller than the size $S_{EXT2}[n]$ of the dependent-view data block EXT2[n] by the data amount of a portion of SP2 #m transferred after the ATS A1($k$+1) of SP1 #($k$+1). For the next dependent-view data block EXT2[$n$+1], the data amount SP$_{EXT2}$[$n$+1] equals the data amount that is transferred from the RB2 2212 to the system target decoder 2203 during the period of the extent ATC time T$_{EXT}$[$n$+1] from the ATS A1($k$+1) of SP1 #(k+1), i.e. the top source packet in the (n+2)$^{th}$ base-view data block EXT1[$n$+1]; the data amount includes the source packets SP2 #(m+1), . . . , j stored in the dependent-view data block EXT2[$n$+1]. In other words, the data amount SP$_{EXT2}$[$n$+1] is larger than the size S$_{EXT2}$[$n$+1] of the dependent-view data block EXT2[$n$+1] by the data amount of a portion of SP2 #m transferred after the ATS A1($k$+1) of SP1 #(k+1). As described above, the base-view transfer rate R$_{EXT1}$ and the dependent-view transfer rate R$_{EXT2}$ are estimated in different manners. Since the difference is slight, however, either transfer rate can be considered in the following description as being equal to the ratio between the size and extent ATC time of a data block.

The read rate R$_{UD72}$ is typically expressed in bits/second and is set at a higher value, e.g. 72 Mbps, than either of the maximum values R$_{MAX1}$, R$_{MAX2}$ of the transfer rates R$_{EXT1}$, R$_{EXT2}$: R$_{UD72}$>R$_{MAX1}$, R$_{UD72}$>R$_{MAX2}$. This prevents underflow in the RB1 2211 and RB2 2212 due to decoding processing by the system target decoder 2203 while the BD-ROM drive 2201 is reading an extent SS from the BD-ROM disc 101.

1-2-1: Seamless Connection Within an Extent Block

FIGS. 23A and 23B are graphs showing changes in data amounts DA1 and DA2, respectively stored in the RB 1 2211 and RB2 2212, when 3D video images are played back seamlessly from a single extent block. FIG. 23C is a schematic diagram showing correspondence between the extent block 2310 and a playback path 2320 in 3D playback mode. As shown in FIG. 23C, in accordance with the playback path 2320, the entirety of the extent block 2310 is collectively read as a single extent SS. Subsequently, the switch 2202 separates the extent SS into dependent-view data blocks D[k] and base-view data blocks B[k] (k= . . . , n, n+1, n+2, . . . ).

Reading and transfer operations by the BD-ROM drive 2201 are not actually performed in a continuous manner, as suggested by the graphs in FIGS. 23A and 23B, but rather in an intermittent manner. During the read periods PR$_D$[k] and PR$_B$[k] of the data blocks D[k] and B[k], this prevents overflow in the RB1 2211 and RB2 2212. Accordingly, the graphs in FIGS. 23A and 23B represent actual step-wise changes as approximated linear changes.

As shown in FIGS. 23A and 23B, during the read period PR$_D$[n] of the (n+1)$^{th}$ dependent-view data block D[n], the data amount DA2 stored in the RB2 2212 increases at a rate equal to R$_{UD72}$−R$_{EXT2}$[n], the difference between the read rate R$_{UD72}$ and a dependent-view transfer rate R$_{EXT2}$[n], whereas the data amount DA1 stored in the RB1 2211 decreases at a base-view transfer rate R$_{EXT1}$[n−1]. As shown in FIG. 23C, a zero sector transition J$_0$[2n] occurs from the (n+1)$^{th}$ dependent-view data block D[n] to the (n+1)$^{th}$ base-view data block B[n]. As shown in FIGS. 23A and 23B, during the zero sector transition period PJ$_0$[n], the data amount DA1 stored in the RB 1 2211 continues to decrease at the base-view transfer rate R$_{EXT1}$[n−1], whereas the data amount DA2 stored in the RB2 2212 decreases at the dependent-view transfer rate R$_{EXT2}$[n].

As further shown in FIGS. 23A and 23B, during the read period PR$_B$[n] of the (n+1)$^{th}$ base-view data block B[n], the data amount DA1 stored in the RB1 2211 increases at a rate equal to R$_{UD72}$−R$_{EXT1}$[n], the difference between the read rate R$_{UD72}$ and a base-view transfer rate R$_{EXT1}$[n]. On the other hand, the data amount DA2 stored in the RB2 2212 continues to decrease at the dependent-view transfer rate R$_{EXT2}$[n]. As further shown in FIG. 23C, a zero sector transition J$_0$[2n+1] occurs from the base-view data block B[n] to the next dependent-view data block D[n+1]. As shown in FIGS. 23A and 23B, during the zero sector transition period PJ$_0$[2n+1], the data amount DA1 stored in the RB 1 2211 decreases at the base-view transfer rate R$_{EXT1}$[n], and the data amount DA2 stored in the RB2 2212 continues to decrease at the dependent-view transfer rate R$_{EXT2}$[n].

In order to play back 3D video images seamlessly from the single extent block 2310, the sizes of the data blocks B[n] and D[n] belonging to the extent block should each satisfy conditions [2] and [3] explained below.

The size S$_{EXT1}$[n] of the (n+1)$^{th}$ base-view data block B[n] is at least equal to the data amount transferred from the RB 1 2211 to the system target decoder 2203 during the period from the start of the corresponding read period PR$_B$[n] immediately before the read period PR$_B$[n+1] of the next base-view data block B[n+1]. In this case, as shown in FIG. 23A, the data amount DA1 stored in the RB1 2211 immediately before the read period PR$_B$[n+1] of the next base-view data block B[n+1] does not fall below the amount immediately before the read period PR$_B$[n] of the (n+1)$^{th}$ base-view data block B[n]. The length of the read period PR$_B$[n] of the (n+1)$^{th}$ base-view data block B[n] equals a value S$_{EXT1}$[n]/R$_{UD72}$, the size S$_{EXT1}$[n] of this base-view data block B[n] divided by the read rate R$_{UD72}$. On the other hand, the length of the read period PR$_D$[n+1] of the (n+2)$^{th}$ dependent-view data block D[n+1] equals a value S$_{EXT2}$[n+1]/R$_{UD72}$, the size S$_{EXT2}$[n+1] of this dependent-view data block D[n+1] divided by the read rate R$_{UD72}$. Accordingly, condition 2 indicates that the minimum extent size of the base-view data block B[n] is expressed in the right-hand side of expression (2):

$$S_{EXT1}[n] \geq \left( \frac{S_{EXT1}[n]}{R_{UD72}} + T_{JUMP0}[2n+1] + \frac{S_{EXT2}[n+1]}{R_{UD72}} + T_{JUMP0}[2n+2] \right) \times R_{EXT1}[n] \therefore \quad (2)$$

$$S_{EXT1}[n] \geq \text{CEIL}\left\{ \frac{R_{EXT1}[n]}{8} \times \frac{R_{UD72}}{R_{UD72} - R_{EXT1}[n]} \times \left( T_{JUMP0}[2n+1] + 8 \times \frac{S_{EXT2}[n+1]}{R_{UD72}} + T_{JUMP0}[2n+2] \right) \right\}$$

$$S_{EXT1}[n] \geq \text{CEIL}\left( R_{EXT1}[n] \times \frac{S_{EXT2}[n+1]}{R_{UD72} - R_{EXT1}[n]} \right)$$

(where $T_{JUMP0}[k] = 0$ is assumed).

The size S$_{EXT2}$[n] of the (n+1)$^{th}$ dependent-view data block D[n] is at least equal to the data amount transferred from the RB2 2212 to the system target decoder 2203 during the period from the start of the corresponding read period PR$_D$[n] immediately before the read period PR$_D$[n+1] of the next dependent-view data block D[n+1]. In this case, as shown in FIG. 23B, the data amount DA2 stored in the RB2 2212 immediately before the read period PR$_D$[n+1] of the next dependent-view data block D[n+1] does not fall below the amount immediately before the read period PR$_D$[n] of the (n+1)$^{th}$ dependent-view data block D[n]. The length of the read period PR$_D$[n] of the (n+1)$^{th}$ dependent-view data block D[n] equals a value S$_{EXT2}$[n]/R$_{UD72}$, the size S$_{EXT2}$[n] of this dependent-view data block D[n] divided by the read rate R$_{UD72}$. Accordingly, condition 3 indicates that the minimum extent size of the dependent-view data block D[n] is expressed in the right-hand side of expression (3):

$$S_{EXT2}[n] \geq \left( \frac{S_{EXT2}[n]}{R_{UD72}} + T_{JUMP0}[2n] + \frac{S_{EXT1}[n]}{R_{UD72}} + T_{JUMP0}[2n+1] \right) \times \quad (3)$$
$$R_{EXT2}[n] \therefore$$

$$S_{EXT2}[n] \geq \text{CEIL}\left\{ \frac{R_{EXT2}[n]}{8} \times \frac{R_{UD72}}{R_{UD72} - R_{EXT2}[n]} \times \right.$$
$$\left. \left( T_{JUMP0}[2n] + 8 \times \frac{S_{EXT1}[n]}{R_{UD72}} + T_{JUMP0}[2n+1] \right) \right\}$$

$$S_{EXT2}[n] \geq \text{CEIL}\left( R_{EXT2}[n] \times \frac{S_{EXT1}[n]}{R_{UD72} - R_{EXT2}[n]} \right)$$

(where $T_{JUMP0}[k] = 0$ is assumed).

1-2-2: Seamless Connection Between Extent Blocks

FIG. 24B is a schematic diagram showing the $(M+1)^{th}$ extent block 2401, the $(M+2)^{th}$ extent block 2402, (the letter M representing an integer one or greater) and correspondence between the extent blocks 2401, 2402 and a playback path 2420 in 3D playback mode. As shown in FIG. 24B, the two extent blocks 2401 and 2402 are separated by a layer boundary LB or a recording area for other data. In accordance with the playback path 2420, the entirety of the $(M+1)^{th}$ extent block 2401 is first read collectively as the $(M+1)^{th}$ extent SS, i.e. EXTSS[M]. A jump J[M] occurs immediately thereafter. Subsequently, the $(M+2)^{th}$ extent block 2402 is read collectively as the $(M+2)^{th}$ extent SS, i.e. EXTSS[M+1].

FIG. 24A is a graph showing changes in data amounts DA1 and DA2, stored in RB1 2211 and RB2 2212, respectively, and changes in their sum DA1+DA2, when 3D video images are played back seamlessly and continuously from two extent blocks 2401 and 2402. In FIG. 24A, alternating long and short dashed lines indicate changes in the data amount DA1 stored in the RB1 2211, the dashed lines indicate changes in the data amount DA2 stored in the RB2 2212, and the solid lines indicates changes in their sum DA1+DA2. In this graph, the solid lines linearly approximate averaged small changes that occur each time one data block is read. Furthermore, the zero sector transition time $T_{JUMP0}$ is assumed to be "zero milliseconds".

As shown in FIG. 24A, during the period $PR_{BLK}[M]$ the entirety of EXTSS[M] 2401 is read from the BD-ROM disc 101 into the RB1 2211 and RB2 2212, and accordingly both the data amounts DA1 and DA2 stored in the RB1 2211 and RB2 2212 increase. Specifically, during the read period $PR_{BLK}[M]$ of the entirety of EXTSS[M] 2401, the sum DA1+DA2 of the stored data amounts increases at a rate equal to the difference $R_{UD72}-R_{EXTSS}[M]$ between the read rate $R_{UD72}$ and a mean transfer rate $R_{EXTSS}[M]$. The mean transfer rate $R_{EXTSS}[M]$ is estimated at the size $S_{EXTSS}[M]$ of the entirety of EXTSS[M] 2401 divided by the extent ATC time $T_{EXTSS}$.

The mean transfer rate $R_{EXTSS}[M]$ is specifically estimated in the following manner. First, the extent ATC time is calculated as follows. The extent ATC time $T_{EXTSS}[M]$ of EXTSS [M] 2401 is expressed in the following equation as the difference between the ATS A10 of the top base-view data block B0 in EXTSS[M] 2401 and the ATS A11 of the top base-view data block B1 in EXTSS[M+1] 2402:

$T_{EXTSS}[M]=(A11-A10+WA)/T_{ATC}$.

In this equation, the wraparound value WA represents the sum of count values discarded each time wraparound occurs while the ATC is being counted from the ATS A10 of the top base-view data block B0 in EXTSS[M] 2401 to the ATS A11 of the top base-view data block B1 in EXTSS[M+1] 2402. The constant $T_{ATC}$ represents the period of the ATC: $T_{ATC}=27\times10^6$[Hz].

Alternatively, an extent ATC time may be calculated as follows. In the example in FIGS. 24A and 24B, the extent ATC time $T_{EXT}[M]$ of EXTSS[M] 2401 is expressed in the following equation as the difference between the ATS A10 of the top base-view data block B0 and the ATS A12 of the last base-view data block B2.

$T_{EXTSS}[M]=(A12-A10+WA)/T_{ATC}+188\times8/\min(R_{TS1}, R_{TS2})$

In this equation, the wraparound value WA represents the sum of count values discarded each time wraparound occurs while the ATC is being counted from the ATS A10 of the top base-view data block B0 to the ATS A12 of the last base-view data block B2 in EXTSS[M] 2401. The second term in the right-hand side of the above equation is the data length of a TS packet, 188×8 bits divided by the system rate $R_{TS1}$ or $R_{TS2}$ for a file 2D or file DEP, whichever is lower. This value equals the time necessary to transfer one TS packet from RB1 or RB2 to the system target decoder, whichever is longer. Since the above calculation of extent ATC time does not need to refer to the next extent block, the extent ATC time can be calculated even when the next extent block does not exist. Even if the next extent block does exist, calculation of the extent ATC time is simplified.

Next, the mean transfer rate $R_{EXTSS}[M]$ is estimated at the ratio between a data amount $SP_{EXTSS}[M]$ described below and the extent ATC time $T_{EXTSS}[M]$: $R_{EXTSS}[M]=SP_{EXTSS}[M]/T_{EXTSS}[M]$. This data amount $SP_{EXTSS}[M]$ equals the total data amount of a portion of EXTSS[M] 2401; the portion is actually transferred from RB 1 and RB2 to the system target decoder during the period of the extent ATC time $T_{EXTSS}[M]$ starting from the ATS A10 of the top base-view data block B0. As in the $(n+1)^{th}$ dependent-view data block EXT2[n] shown in FIG. 17, the data amount $SP_{EXTSS}[M]$ is smaller than the size $S_{EXTSS}[M]$ of EXTSS[M] 2401 when there is a portion of data to be transferred from RB2 to the system target decoder after the extent ATC time $T_{EXTSS}[M]$ has elapsed since the ATS A1(0) of the corresponding base-view data block EXT1 [n]. Thus, the data amount $SP_{EXTSS}[M]$ used to estimate the mean transfer rate $R_{EXTSS}$ differs from the size $S_{EXTSS}[M]$ of the extent block. Since this difference is slight, however, the mean transfer rate is considered in the following description as being equal to the ratio between the size and extent ATC time of an extent block.

At the time when the last base-view data block B2 in EXTSS[M] 2401 is read into RB1 2211, the sum DA1+DA2 of the stored data amount reaches its maximum value. During the immediately subsequent jump period PJ[M], the sum DA1+DA2 of the stored data amount decreases at the mean transfer rate $R_{EXTSS}[M]$. Accordingly, by adjusting the maximum value of the sum DA1+DA2 of the stored data amount to be sufficiently large can prevent underflow in both RB 1 2211 and RB2 2212 during the jump J[M]. As a result, the two extent blocks 2401 and 2402 can be seamlessly connected.

The maximum value of the sum DA1+DA2 of the stored data amounts depends on the size of EXTSS[M] 2401. Accordingly, seamless connection between EXTSS[M] 2401 and EXTSS[M+1] 2402 requires the size of EXTSS[M] 2401 to satisfy the following condition 4.

Preloading is performed during the read period $PR_D0$ of the dependent-view data block D0 located at the top of EXTSS [M] 2401. During this preload period $PR_D0$, the base-view data block B0 corresponding to the dependent-view data block D0 has not been stored in RB1 2211, and thus the dependent-view data block D0 cannot be transferred from RB2 2212 to the system target decoder 2203. Accordingly, during the preload period $PR_D0$, data in the $M^{th}$ extent block continues to be transferred from RB2 2212 to the system target decoder 2203 similarly during the period of the immediately prior jump J[M−1]. Data supply to the system target decoder 2203 is thus maintained. Preloading is similarly performed during the read period $PR_D1$ of the dependent-view data block D1 located at the top of EXTSS[M+1] 2402. Accordingly, during the preload period $PR_D1$, data in EXTSS [M]2401 continues to be transferred from the RB2 2212 to the system target decoder 2203 similarly during the immediately prior jump period PJ[M]. Data supply to the system target decoder 2203 is thus maintained. Therefore, preventing underflow in RB 1 2211 and RB2 2212 during the jump J[M] requires the extent ATC time $T_{EXTSS}$ of EXTSS[M] 2401 to at least equal the time length from the end time T0 of the preload period $PR_D0$ in EXTSS[M] 2401 until the end time T1 of the preload period $PR_D1$ in EXTSS[M+1] 2402. In other words, the size $S_{EXTSS}[M]$ of EXTSS[M] 2401 should at least equal the sum of the data amounts transferred from RB1 2211 and RB2 2212 to the system target decoder 2203 during the period T0-T1.

As is clear from FIG. 24A, the length of the period T0-T1 equals the sum in length of the read period $PR_{BLK}[M]$ of EXTSS[M] 2401, the jump time $T_{JUMP}[M]$ of the jump J[M], and the difference $T_{DIFF}[M]$ in length between the preload periods $PR_D0$ and $PR_D1$ of the two extent blocks 2401 and 2402. Furthermore, the length of the read period $PR_{BLK}[M]$ of EXTSS[M] 2401 equals a value $S_{EXTSS}[M]/R_{UD72}$, the size $S_{EXTSS}[M]$ of EXTSS[M] 2401 divided by the read rate $R_{UD72}$. Accordingly, condition 4 indicates that the minimum extent size of EXTSS[M] 2401 is expressed in the right-hand side of expression (4):

$$S_{EXTSS}[M] \geq \left( \frac{S_{EXTSS}[M]}{R_{UD72}} + T_{JUMP}[M] + T_{DIFF}[M] \right) \times R_{EXTSS}[M] \therefore \quad (4)$$

$$S_{EXTSS}[M] \geq \frac{R_{UD72} \times R_{EXTSS}[M]}{R_{UD72} - R_{EXTSS}[M]} \times (T_{JUMP}[M] + T_{DIFF}[M]).$$

The lengths of the preload periods $PR_D0$ and $PR_D1$ respectively equal the values $S_{EXT2}0/R_{UD72}$ and $S_{EXT2}1/R_{UD72}$, the sizes $S_{EXT2}0$ and $S_{EXT2}1$ of the dependent-view data blocks D0 and D1 divided by the read rate $R_{UD72}$; the dependent-view data blocks D0 and D1, respectively. Accordingly, the difference $T_{DIFF}$ in lengths between the preload periods $PR_D0$ and $PR_D1$ equals the difference in these values: $T_{DIFF}=S_{EXT2}1/R_{UD72}-S_{EXT2}0/R_{UD72}$. Like the right-hand side of expressions (1)-(3), the right-hand side of expression (4) may be expressed as an integer value in units of bytes.

When decoding of multiplexed stream data is modified in the following manner, the difference $T_{DIFF}$ in expression (4) may be considered to be zero. First, the maximum value of the difference $T_{DIFF}$ throughout the multiplexed stream data, i.e. the worst value of the difference $T_{DIFF}$, is sought. Next, when the multiplexed stream data is played back, the start of decoding is delayed after the start of reading by a time equal to the worst value of $T_{DIFF}$.

[2: Conditions for Reducing Capacity of Read Buffers]

The minimum extent sizes of data blocks and extent blocks are restricted by the above conditions 1-4 for seamless playback. As described below, however, larger sizes of data blocks typically require larger capacities of read buffers. Accordingly, in order to reduce the capacities of read buffers as much as possible, it is preferable to restrict the upper limits on the sizes of data blocks and extent blocks as much as possible. The upper limits are referred to as "maximum extent sizes".

2-1: Lower Limits of Read Buffer Capacities

Figures 25A, 25B:
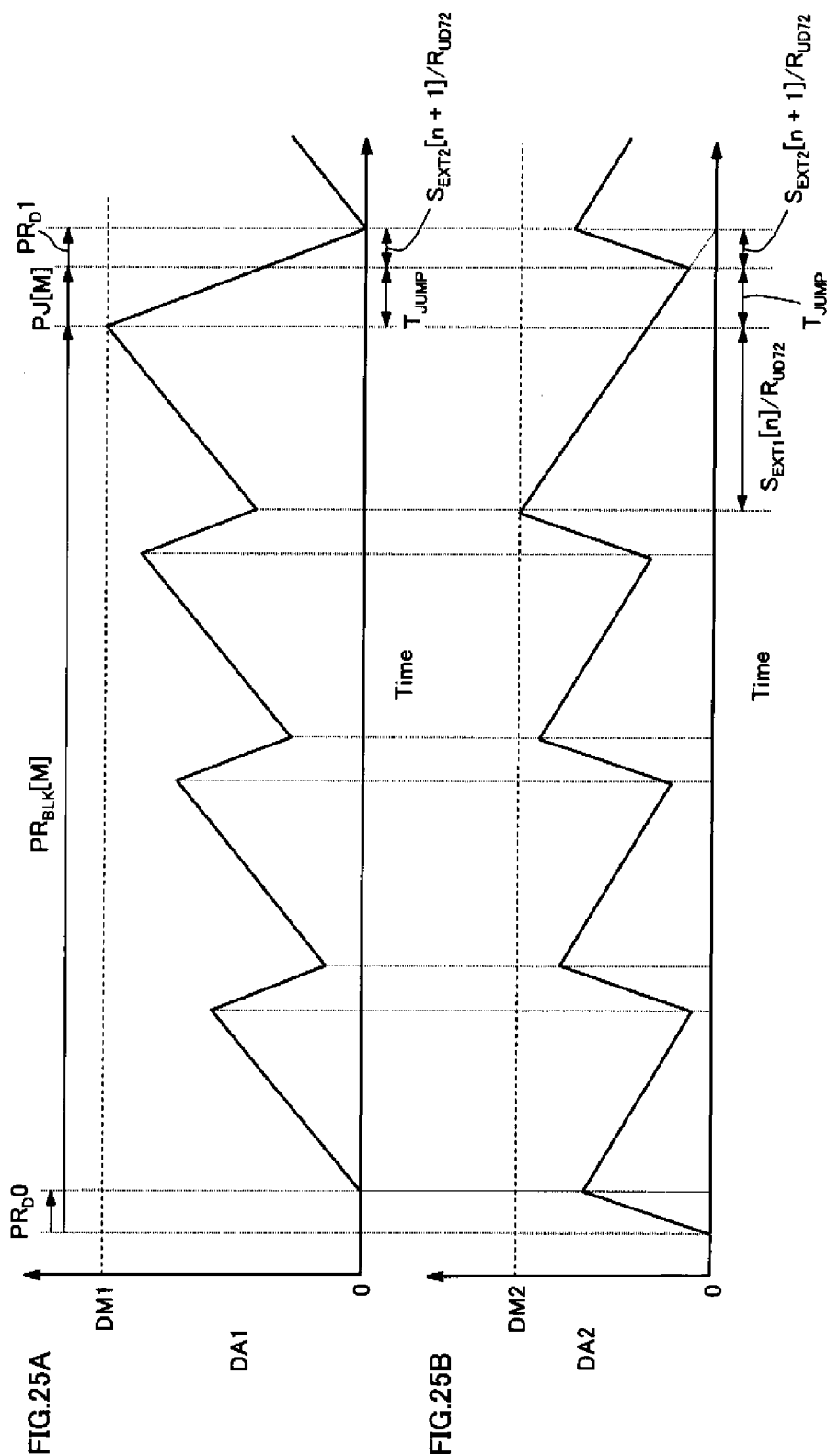
FIGS. 25A and 25B are graphs showing changes in data amounts DA1 and DA2, stored in read buffers RB1 2211 and RB2 2212 shown in FIG. 22, when 3D video images are continually played back seamlessly from two extent blocks 2401, 2402 shown in FIG. 24B.

FIG. 25A is a graph showing changes in the data amount DA1 stored in RB1 2211 when 3D video images are played back seamlessly and continuously from the two extent blocks 2401 and 2402 shown in FIG. 24B. As shown in FIG. 25A, the stored data amount DA1 equals a value DM1 immediately before the last base-view data block B2 in EXTSS[M] 2401 is read into RB1 2211 and then decreases at the base-view transfer rate $R_{EXT1}[n]$ during the jump period PJ[M] and preload period $PR_D1$ of EXTSS[M+1] 2402. The letter n represents an integer zero or greater; the last extent pair in EXTSS[M] 2401 consists of the $(n+1)^{th}$ extents D2 and B2 counted from the tops of a file DEP and file base, respectively. Accordingly, in order to maintain the stored data amount DA1 greater than zero until the end of the preload period $PR_D1$, the above value DM1 should be equal to or greater than a data amount that is transferred from RB1 2211 to the system target decoder 2203 during the jump period PJ[M] and the preload period $PR_D1$ and equal to the sum in length of these periods, $T_{JUMP}$ and $S_{EXT2}[n+1]/R_{UD72}$, multiplied by the base-view transfer rate $R_{EXT1}[n]$: $DM1 \geq (T_{JUMP}+S_{EXT2}[n+1]/R_{UD72}) \times R_{EXT1}[n]$. The base-view transfer rate $R_{EXT1}[n]$ can reach the maximum value $R_{MAX1}=R_{TS1}\times 192/188$, and thus the lower limit of the capacity RB1 of RB1 2211 is expressed in the right-hand side of expression (5):

$$RB1 \geq \left(T_{JUMP} + \frac{S_{EXT2}[n+1]}{R_{UD72}}\right) \times R_{MAX1} = \quad (5)$$

$$\left(T_{JUMP} + \frac{S_{EXT2}[n+1]}{R_{UD72}}\right) \times R_{TS1} \times \frac{192}{188}.$$

FIG. 25B is a graph showing changes in the data amount DA2 stored in RB2 2212 when 3D video images are played back seamlessly and continuously from the two extent blocks 2401 and 2402. As shown in FIG. 25B, the stored data amount DA2 equals a value DM2 at the start of reading of the last base-view data block B2 in EXTSS[M] 2401 and then decreases at the dependent-view transfer rate $R_{EXT2}[n]$ during the read period of the base-view data block B2 and the preload period $PR_D1$ of EXTSS[M+1] 2402. Accordingly, in order to maintain data supply to the system target decoder 2203 until the end of the preload period $PR_D1$, the above value DM2 should be equal to or greater than a data amount that is transferred from RB2 2212 to the system target decoder 2203 during the read period of the base-view data block B2, the jump period PJ[M], and the preload period $PR_D1$ and equal to the sum in length of these periods, $S_{EXT1}[n]/R_{UD72}$, $T_{JUMP}$, and $S_{EXT2}[n+1]/R_{UD72}$, multiplied by the dependent-view transfer rate $R_{EXT2}[n]$: $DM2 \geq (S_{EXT1}[n]/R_{UD72}+T_{JUMP}+S_{EXT2}[n+1]/R_{UD72})\times R_{EXT2}[n]$. The dependent-view transfer rate $R_{EXT2}[n]$ can reach the maximum value $R_{MAX2}=R_{TS2}\times 192/188$. Furthermore, any dependent-view data block may be the first of data blocks read at interrupt playback. Accordingly, the capacity RB2 of RB2 2212 should not fall below the size $S_{EXT2}[\bullet]$ of any of the dependent-view data blocks. In other words, the capacity RB2 should be equal to or greater than the maximum extent size $maxS_{EXT2}$ of the dependent-view extent EXT2[•]. As a result, the lower limit on the capacity RB2 of RB2 2212 is expressed by the right-hand side of expression (6):

$$RB2 \geq \quad (6)$$

$$\max\left\{\left(\frac{S_{EXT1}[n]}{R_{UD72}} + T_{JUMP} + \frac{S_{EXT2}[n+1]}{R_{UD72}}\right) \times R_{TS2} \times \frac{192}{188}, \max S_{EXT2}\right\}.$$

2-2: Maximum Extent Size of 2D Extents

As shown in expression (5), the smaller size $S_{EXT2}[n+1]$ of the dependent-view data block D1 read immediately after the jump J[M] between extent blocks enables the lower limit of the capacity of RB1 2211 to be more reduced. On the other hand, as shown in expression (6), not only the smaller size $S_{EXT2}[n+1]$ of the dependent-view data block D1 read immediately after the jump J[M], but also the smaller size $S_{EXT1}[n]$ of the base-view data block B2 read immediately before the jump J[M] and the smaller value of the maximum extent size $maxS_{EXT2}$ of the dependent-view data block enable the lower limit of the capacity of the RB2 2212 to be more reduced. Furthermore, the $(k+1)^{th}$ base-view extent EXT1[k] has the same extent ATC time as the $(k+1)^{th}$ dependent-view extent EXT2[k]. (The letter k represents an integer zero or greater). Accordingly, if the extent ATC time is shortened by a restriction on the maximum extent size of the $(k+1)^{th}$ base-view extent EXT1[k], the maximum extent size of the $(k+1)^{th}$ dependent-view extent EXT2[k] is also restricted. Therefore, in order to maintain the lower limits of the capacities of RB1 2211 and RB2 2212 within permissible ranges, the size of each base-view data block EXT1[•] should satisfy condition 5.

As shown in FIG. 15, the base-view data blocks B[k] (k=0, 1, 2, . . . ) in the extent blocks 1501-1503 are shared by the file 2D 241 and the file SS 244A. Accordingly, the sizes $S_{EXT1}[k]$ of the base-view data block B[k] should satisfy expression (1). In order to reduce the sizes $S_{EXT1}[k]$ of the base-view data block B[k] as much as possible while satisfying expression (1), the following conditions should be satisfied: the maximum extent size of each base-view data block B[k] should be as close to upper limit of the right-hand side of expression (1), i.e. the upper limit of the minimum extent size of the base-view data block B[k] as possible. In Embodiment 1 of the present invention, condition 5 indicates that the maximum extent size of the base-view data block B[k] is expressed in the right-hand side of expression (7):

$$S_{EXT1}[k] \leq \mathrm{CEIL}\left(\frac{R_{EXT1}[k]}{8} \times \frac{R_{UD54}}{R_{UD54} - R_{MAX2D}} \times T_{JUMP\_2D\_MIN}\right). \quad (7)$$

The right-hand side of expression (7) differs from the right-hand side of expression (1) in the following ways. First, the mean transfer rate $R_{EXT2D}$ included in the denominator is replaced by the maximum value thereof, $R_{MAX2D}$. Accordingly, the second fraction in the right-hand side of expression (7) equals the maximum value of the same fraction in expression (1). Next, the jump time $T_{JUMP\_2D\_MIN}$ in expression (7) is set to 200 msec, the largest value next to 0 msec among the maximum jump times $T_{JUMP\_MAX}$ specified in the table in FIG. 21. This means that the distance between 2D extents EXT2D[k] and EXT2D[k+1] in the extent blocks 1501-1503 is restricted to 10000 sectors or less. Note that 10000 sectors equals the maximum jump distance $S_{JUMP\_MAX}$ corresponding to the maximum jump time $T_{JUMP\_MAX}$=200 msec in the table in FIG. 21. Also, the distance between 2D extents EXT2D[k] and EXT2D[k+1] in the extent blocks 1501-1503 equals the size $S_{EXT2}[k]$ of the dependent-view data block D[k]. Accordingly, expressing the maximum extent size of a base-view data block as the right-hand side of expression (7) does mean restricting that the maximum extent size of a dependent-view data block to 10000 sectors or less.

2-3: Addition of a Margin to 2D Extents

As is clear from the playback path 2101 in 2D playback mode shown in FIG. 21, jumps occur frequently in 2D playback mode. Accordingly, to further ensure seamless playback, it is preferable to add a margin to the minimum extent size of the 2D extents expressed in the right-hand side of expression (1). However, addition of this margin should not change expression (7), since this change may lead to an increase in the capacities of read buffers. There are the following three types of methods for adding a margin without changing expression (7).

The first method is to replace the mean transfer rate $R_{EXT2D}$ included in the denominator of the right-hand side of expression (1) with the maximum value thereof, $R_{MAX2D}$. In other words, the size $S_{EXT2D}$ of a 2D extent satisfies expression (8) instead of expression (1):

$$S_{EXT2D}[n] \geq \mathrm{CEIL}\left(\frac{R_{EXT2D}[n]}{8} \times \frac{R_{UD54}}{R_{UD54} - R_{MAX2D}} \times T_{JUMP\_2D}[n]\right). \quad (8)$$

As described above, the replacement of the mean transfer rate $R_{EXT2D}$ with the maximum value thereof, $R_{MAX2D}$, is similar to that when deriving expression (7) from expression (1). Accordingly, while expression (1) is changed to expression (8), expression (7) does not change.

The second method is to extend the extent ATC time of a 2D extent by ΔT seconds. In other words, the size $S_{EXT2D}$ of the 2D extent satisfies expression (9A) or (9B) instead of expression (1):

$$S_{EXT2D}[n] \geq \qquad (9A)$$
$$\mathrm{CEIL}\left\{\frac{R_{EXT2D}[n]}{8} \times \left(\frac{R_{UD54}}{R_{UD54} - R_{EXT2D}[n]} \times T_{JUMP\_2D}[n] + \Delta T\right)\right\},$$

$$S_{EXT2D}[n] \geq \qquad (9B)$$
$$\mathrm{CEIL}\left\{\frac{R_{EXT2D}[n]}{8} \times \left(\frac{R_{UD54}}{R_{UD54} - R_{MAX2D}} \times T_{JUMP\_2D}[n] + \Delta T\right)\right\}.$$

The extension time ΔT may be determined by the length of a GOP, or by the upper limit of the number of extents that can be played back during a predetermined time. For example, if the length of a GOP is one second, the extension time ΔT is set to one second. On the other hand, if the number of extents that can be played back during a predetermined time [sec] has the upper limit of k, then the extension time ΔT is set to the predetermined time/k [sec].

The second method changes the right-hand side of expression (7) to explicitly include the extension time ΔT. In other words, when expression (9A) or (9B) is adopted, the size of a base-view data block satisfies expression (10A) or (10B) instead of expression (7):

$$S_{EXT1}[n] \leq \qquad (10A)$$
$$\mathrm{CEIL}\left\{\frac{R_{EXT2D}[n]}{8} \times \left(\frac{R_{UD54}}{R_{UD54} - R_{EXT2D}[n]} \times T_{JUMP\_2D\_MIN} + \Delta T\right)\right\},$$

$$S_{EXT1}[n] \leq \qquad (10B)$$
$$\mathrm{CEIL}\left\{\frac{R_{EXT2D}[n]}{8} \times \left(\frac{R_{UD54}}{R_{UD54} - R_{MAX2D}} \times T_{JUMP\_2D\_MIN} + \Delta T\right)\right\}.$$

The maximum extent size expressed in the right-hand side of expression (10A) is larger than the minimum extent size expressed in the right-hand side of expression (1) by a data amount that is read from the read buffer to the system target decoder 2203 during the extension time ΔT. The maximum extent size expressed in the right-hand side of expression (10B) is larger than the maximum extent size expressed in the right-hand side of expression (7) by the same data amount. In other words, in both cases, this data amount is guaranteed as a margin.

The third method is to replace all of the mean transfer rates $R_{EXT2D}$ included in the right-hand side of expression (1) with the maximum value thereof, $R_{MAX2D}$. In other words, the size $S_{EXT2D}$ of a 2D extent satisfies expression (11) instead of expression (1):

$$S_{EXT2D}[n] \geq \mathrm{CEIL}\left(\frac{R_{MAX2D}}{8} \times \frac{R_{UD54}}{R_{UD54} - R_{MAX2D}} \times T_{JUMP-2D}[n]\right). \quad (11)$$

The third method can add a larger margin to the minimum extent size than the first method. On the other hand, however, even when the bit rate of a 2D extent is low, sufficiently large capacity has to be guaranteed in the read buffer since the size of the 2D extent is large. Accordingly, it is necessary to weigh the size of the margin against the use efficiency of the read buffer.

2-4: Restricting Transfer Bandwidth of Data Blocks

As shown in FIG. 7, dependent-view pictures are compressed with reference to base-view pictures. Accordingly, the mean bit rate for a dependent-view video stream is typically lower than for a base-view video stream. As a result, the system rate $R_{TS2}$ for a file DEP is typically set lower than the system rate $R_{TS1}$ for a file 2D. For example, if the system rate $R_{TS1}$ for the file 2D is set to 45 Mbps or less, the system rate $R_{TS2}$ for the file DEP is set to 30 Mbps or less: $R_{TS1} \leq 45$ Mbps, $R_{TS2} \leq 30$ Mbps.

In this description, it is assumed that the sum of the system rates $R_{TS1}$ and $R_{TS2}$ is restricted to a constant threshold value or less. This threshold value is set to be equal to or less than a transfer bandwidth allocated to the system target decoder 2203 and equals, for example, 60 Mbps: $R_{TS1} + R_{TS2} \leq 60$ Mbps. In this case, if the system rate $R_{TS1}$ for the file 2D is set to 45 Mbps, the system rate $R_{TS2}$ for the file DEP is set to 15 Mbps or less: $R_{TS1} = 45$ Mbps, $R_{TS2} \leq 15$ Mbps. As long as the bit rate of each video stream is maintained at a normal value, this sort of restriction on the sum of the system rates $R_{TS1}$ and $R_{TS2}$ is useful for efficient use of the transfer bandwidth. In practice, however, the bit rate of a dependent-view video stream may transiently rise and exceed the bit rate of the base-view video stream. Such a reversal of bit rates may occur, for example, during playback of 3D video images representing a natural landscape, if the base view (for example, the left view) suddenly goes out of focus due to camera movement and only the dependent view (for example, the right view) is in focus. In this case, even though the base-view transfer rate $R_{EXT1}$ is much lower than the system rate $R_{TS1} = 45$ Mbps, the dependent-view transfer rate $R_{EXT2}$ cannot exceed the system rate $R_{TS2} \leq 15$ Mbps (to be precise, 15 Mbps multiplied by 192/188 approximately equal to 1.02. Hereinafter, this coefficient is considered to be one unless necessary). When the sum of the system rates $R_{TS1}$ and $R_{TS2}$ is thus restricted, the dependent-view transfer rate $R_{EXT2}$ cannot adapt to a temporary rise in bit rate of the dependent-view video stream.

In order to enable such adaptation, instead of restricting the sum of the system rates $R_{TS1}$ and $R_{TS2}$, the sum of the transfer rates $R_{EXT1}[n]$ and $R_{EXT2}[n]$ should be restricted for each of the $(n+1)^{th}$ extent pairs D[n] and B[n] (n=0, 1, 2, . . . ): $R_{EXT1}[n] + R_{EXT2}[n] \leq 60$ Mbps. FIGS. 26A and 26B are graphs respectively showing changes over time in the base-view transfer rate $R_{EXT1}$ and the dependent-view transfer rate $R_{EXT2}$. As shown in FIG. 26A, the base-view transfer rate $R_{EXT1}$ suddenly falls from a maximum value $R_{MAX1}$ approximately equal to 45 Mbps at a first time T0, and during a period $T_{str}$ from the first time T0 until a second time T1 remains at a low level of 15 Mbps. As shown by the solid curve GR1 in the graph in FIG. 26B, the dependent-view transfer rate $R_{EXT2}$ can change to compensate for the change in the base-view transfer rate $R_{EXT1}$. In particular, during the period $T_{str}$, the peak P1 reaches a maximum value $R_{MAX2}$ of approximately 30 Mbps. When the sum of a base-view transfer rate $R_{EXT1}[n]$ and a dependent-view transfer rate $R_{EXT2}[n]$ is thus restricted for each extent, the dependent-view transfer rate $R_{EXT2}$ can also adapt to a temporary rise in the bit rate of the dependent-view video stream.

To further effectively use the transfer bandwidth allocated to the system target decoder 2203 for transfer of stream data, the system rate $R_{TS2}$ for a file DEP can be set even higher. FIG. 26C is a graph showing change over time in the total of the base-view transfer rate $R_{EXT1}$ and the dependent-view transfer rate $R_{EXT2}$ shown in FIG. 26A and FIG. 26B, respectively. As indicated by the depression CV in the solid curve GR3 in FIG. 26C, the sum of the base-view transfer rate $R_{EXT1}$ and the dependent-view transfer rate $R_{EXT2}$ falls below the threshold value of 60 Mbps during the period $T_{str}$ from the first time T0 to the second time T1. As shown by the sold curve GR1 in the graph in FIG. 26B, this is because the dependent-view transfer rate $R_{EXT2}$ is restricted to the system rate $R_{TS2}$ for the file DEP, 30 Mbps, or less. As shown in FIG. 26A, the base-view transfer rate $R_{EXT1}$ falls to 15 Mbps during the period $T_{str}$, and thus there remains a margin of at least 45 Mbps in the transfer bandwidth; the value 45 Mbps is the difference between the threshold value of 60 Mbps and the above value of 15 Mbps. Accordingly, the system rate $R_{TS2}$ for the file DEP is set within a higher range than 30 Mbps, or preferably, the same range as the system rate $R_{TS1}$ for the file 2D, such as 45 Mbps or less: $R_{TS1} \leq 45$ Mbps, $R_{TS2} \leq 45$ Mbps. In FIGS. 26B and 26C, the dependent-view transfer rate $R_{EXT2}$, as well as the sum of the base-view transfer rate $R_{EXT1}$ and the dependent-view transfer rate $R_{EXT2}$, are respectively indicated by dashed curves GR2 and GR4. As the dashed curve GR2 indicates, the peak P2 of the dependent-view transfer rate $R_{EXT2}$ can exceed 30 Mbps. As a result, as the dashed curve GR4 in FIG. 26C indicates, the sum of the base-view transfer rate $R_{EXT1}$ and the dependent-view transfer rate $R_{EXT2}$ is maintained near the threshold value of 60 Mbps during the period $T_{str}$. Efficient use of the transfer bandwidth can thus be further improved.

Note that when the system rate $R_{TS2}$ for a file DEP is set to an equally high value as the system rate $R_{TS1}$ for a file 2D, their total $R_{TS1}$ $R_{TS2}$ is typically higher than the transfer bandwidth of the system target decoder 2203. On the other hand, since both the base-view transfer rate $R_{EXT1}[n]$ and the dependent-view transfer rate $R_{EXT2}[n]$ are mean values, the sum of the instantaneous values of the transfer rates is not restricted from exceeding a threshold value that is established for the sum of the transfer rates. As a specific example, suppose that: the system rates $R_{TS1}$ and $R_{TS2}$ are each set to 45 Mbps; the extent ATC time for each extent is three seconds; and during the first 1.5 seconds of the extent ATC time, the sum of the transfer rates is maintained at 30 Mbps. Under this assumption, even if the transfer rates reach their respective system rates of 45 Mbps during the second 1.5 seconds of the extent ATC time, the sum of the transfer rates averaged over the entirety of an extent is still restricted to 60 Mbps. Accordingly, even if the sum of the base-view transfer rate $R_{EXT1}[n]$ and the dependent-view transfer rate $R_{EXT2}[n]$ is restricted to 60 Mbps or less, the sum of the instantaneous values of the transfer rates is not prevented from rising to 45 Mbps×2=90 Mbps. Therefore, simply restricting the sum of the base-view transfer rate $R_{EXT1}[n]$ and the dependent-view transfer rate $R_{EXT2}[n]$ does not eliminate the risk saturating the transfer bandwidth in the system target decoder 2203.

Figure 27:
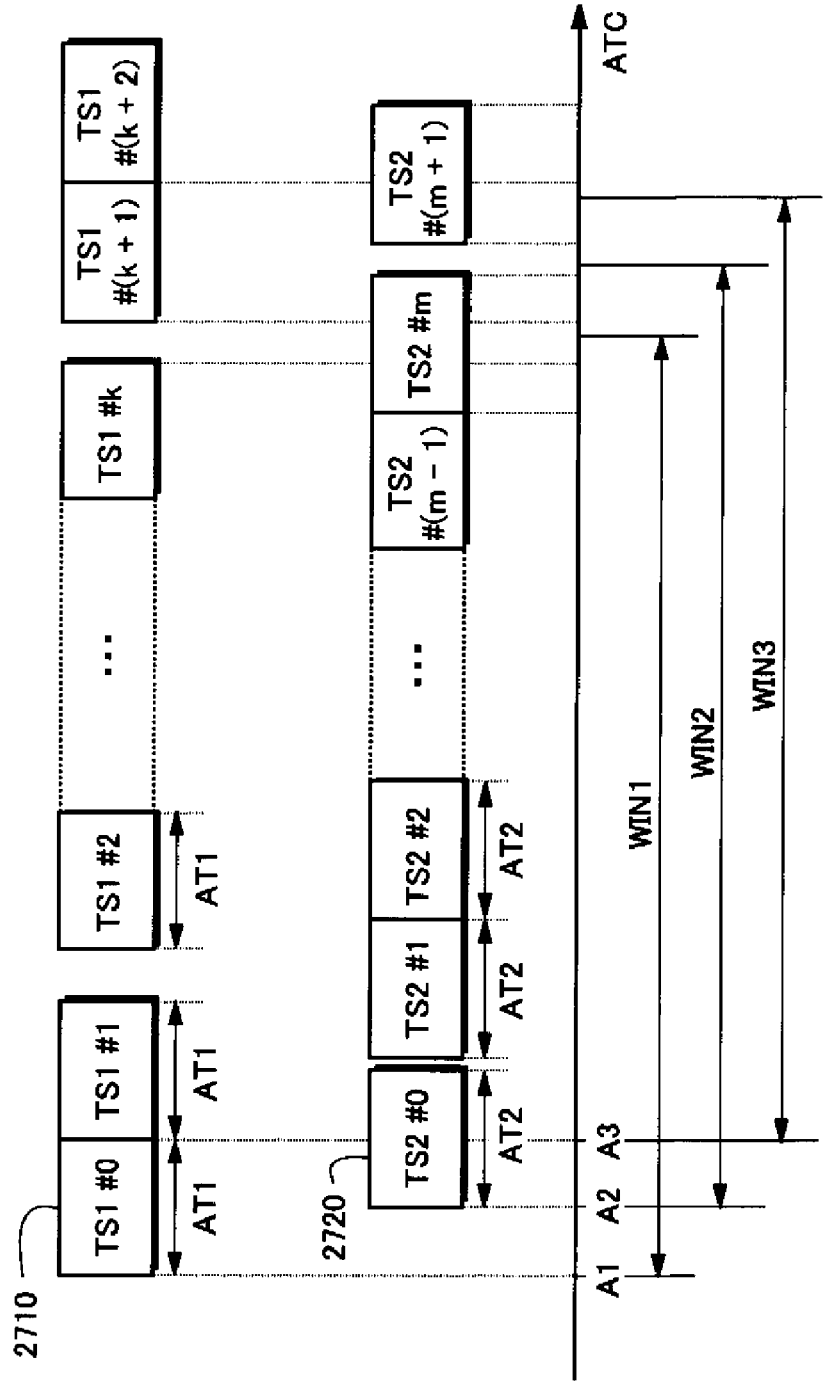
FIG. 27 is a schematic diagram showing correspondence between TS packets transferred from the RB1 2211 and RB2 2212 to the system target decoder 2203 and ATC times.

To further reduce the risk of saturating the transfer bandwidth in the system target decoder 2203, the restriction on the sum of the mean transfer rates is further changed as follows. FIG. 27 is a schematic diagram showing a relationship between ATC time and TS packets transferred from RB1 2211 and RB2 2212 to the system target decoder 2203. As shown in FIG. 27, each rectangle 2710 in the upper level represents the transfer period of a TS packet TS1 #p (p=0, 1, 2, 3, ..., k, k+1, k+2) included in a base-view data block, and each rectangle 2720 in the lower level represents the transfer period of a TS packet TS2 #q (q=0, 1, 2, 3, ..., m−1, m, m+1) included in a dependent-view data block. These rectangles 2710 and 2720 are arranged along the ATC time axis in the order in which the corresponding TS packets are transferred. The positions of the tops of the rectangles 2710 and 2720 represent the transfer start times of their respective TS packets. The lengths AT1 and AT2 of the rectangles 2710 and 2720 represent the amount of time needed for transfer of one TS packet respectively from RB1 2211 and RB2 2212 to the system target decoder 2203. Each time the playback device 102 in 3D playback mode begins transfer of a TS packet, the device sets a window WIN1, WIN2, or WIN3 of a predetermined time length, e.g. one second, starting at the transfer start time of the TS packet. The playback device 102 further averages the transfer rates TS1 and TS2 separately over each window WIN1, WIN2, and WIN3 and then restricts the sum of the mean values to a predetermined threshold value or less. In the example shown in FIG. 27, the first window WIN1 is set to start at the transfer start time A1 of TS1 #0, and then the sum of the mean transfer rates is restricted to the threshold value or less for TS1 #0-$k$ and TS2 #0-$m$ to be transferred within the first window. Similarly, the sum of the mean transfer rates is restricted to the threshold value or less for TS1 #0−(k+1) and TS2 #0-$m$, to be transferred within the second window WIN2 that starts at the transfer start time A2 of TS2 #0, and for TS1 #1−(k+1) and TS2 #0−(m+1), to be transferred within the third window WIN3 that starts at the transfer start time A3 of TS1 #1. In this manner, each time a window of a constant length is set from the transfer start time of a TS packet, the sum of mean transfer rates over the window is restricted to a predetermined threshold value or less. Thus, a window having a shorter length reduce the risk of saturating the transfer bandwidth in the system target decoder 2203.

2-5: Relationship between System Rate and Maximum Extent Size

As shown in expressions (5) and (6), the lower limits of the capacities of RB1 2211 and RB2 2212 also depend on the maximum jump time $T_{JUMP\_MAX}$ of the jump J[M] between the extent blocks and on the system rates $R_{TS1}$ and $R_{TS2}$. In particular, when the jump J[M] is a long jump and the system rate $R_{TS2}$ for the file DEP rises above the system rate $R_{TS1}$ for the file 2D, there is a risk that the lower limit of the capacity of the RB2 2212 will exceed an acceptable range. Accordingly, in order to maintain the capacity of RB2 2212 within the acceptable range regardless of the rise in the system rate $R_{TS2}$, the maximum extent sizes $maxS_{EXT1}$ and $maxS_{EXT2}$ of the data blocks EXT1[•] and EXT2[•], respectively, should be changed depending on the maximum jump time $T_{JUMP\_MAX}$ of the jump J[M] and the system rate $R_{TS2}$. In particular, for the extent block to be read immediately before the long jump, the maximum extent sizes of data blocks EXT1[•] and EXT2[•] should be more reduced as the system rate $R_{TS2}$ for the file DEP is higher.

FIG. 28A is a table showing an example of a relationship between the system rate $R_{TS2}$ for a file DEP and the maximum extent size for a data block. In this table, assume that the sum of the mean transfer rates $R_{EXT1}[i]$ and $R_{EXT2}[i]$ for the $(i+1)^{th}$ extent pair EXT1[$i$] and EXT2[$i$] (the letter i represents an integer zero or greater) is equal to or less than a threshold value of 64 Mbps: $R_{EXT1}[i]+R_{EXT2}[i] \leq 64$ Mbps. First, extent pairs B[i] and D[i] are classified into three types (A), (B), and (C), as shown in FIG. 28A, depending on the system rate $R_{TS2}$ for the file DEP and the arrangement of the extent pairs on the BD-ROM disc. When the system rate $R_{TS2}$ is higher than a threshold value of 32 Mbps, the second and subsequent extent pairs in the extent block to be read immediately before the long jump are classified as type (B), whereas the top extent pair in the extent block to be read immediately after the long jump is classified as type (C). When the system rate $R_{TS2}$ is equal to or less than the threshold value of 32 Mbps, all extent pairs are classified as type (A); when the system rate $R_{TS2}$ is higher than the threshold value of 32 Mbps, extent pairs other than type (B) and (C) are also classified as type (A). Next, the maximum extent size of a data block belonging to a different one of types (A), (B), and (C) is set to a different value. The maximum extent sizes of base-view data blocks B[i] of type (A) are uniformly set to 19 MB: $S_{EXT1}[i] \leq 19$ MB. The maximum extent sizes of dependent-view data block D[i] of type (A) are uniformly set to 6 MB when the system rate $R_{TS2}$ is equal to or less than the threshold value of 32 Mbps and set to 8 MB when the system rate $R_{TS2}$ exceeds the threshold value of 32 Mbps: $S_{EXT2}[i] \leq 6$ MB, 8 MB. The maximum extent sizes of base-view data blocks B[i] and dependent-view data blocks D[i] of type (B) are reduced to 7 MB and 3 MB, respectively: $S_{EXT1}[i] \leq 7$ MB, $S_{EXT2}[i] \leq 3$ MB. The maximum extent sizes of base-view data blocks B[i] of type (C) is set to 19 MB, equal to those of type (A), and the maximum extent sizes of dependent-view data blocks D[i] of type (C) are reduced to 6 MB, smaller than those of type (A): $S_{EXT1}[i] \leq 19$ MB, $S_{EXT2}[i] \leq 6$ MB.

Note that the specific values of the maximum extent sizes shown in FIG. 28A are nothing but examples optimized on the basis of the specific values of assumed parameters, such as the threshold value of 64 Mbps for the sum of the mean transfer rates. As is clear from the following explanation of the method for determining those values, the values depend on a variety of parameters, such as the BD-ROM drive's read rate and performance with regard to jumps, the mean transfer rate from each read buffer to the decoder, the threshold value for the sum of the mean transfer rates, the system rate for each AV stream file and the upper limit thereof, and the threshold value of the system rate for a file DEP. Furthermore, a tolerance to be set for a maximum extent size depends on the variation ranges and accuracies of various parameters. Based on these dependence relationships, a person of ordinary skill in the art would be able to optimize maximum extent sizes and their tolerances to the actually available capacity of a read buffer. Furthermore, in FIG. 28A, when the system rate for a file DEP equals the threshold value, all extent pairs are classified as type (A). Alternatively, in this case as well, the second and subsequent extent pairs in the extent block to be read immediately before the long jump may be classified as type (B), whereas the top extent pair in the extent block to be read immediately after the long jump may be classified as type (C).

FIG. 28B is a schematic diagram showing a first extent SS EXTSS[0] and a second extent SS EXTSS[1] respectively located immediately before and after a layer boundary LB on the BD-ROM disc. Since the two extents SS EXTSS[0] and EXTSS[1] are divided by the layer boundary LB, a long jump occurs between these extents. In this case, if the system rate $R_{TS2}$ for the file DEP is higher than the threshold value of 32 Mbps, the second and subsequent extent pairs B[1], D[1], B[2], and D[2] in the first extent SS EXTSS[0] are classified as type (B), whereas the top extent pair B[3], D[3] in the second extent SS EXTSS[1] is classified as type (C).

FIG. 28C is a schematic diagram showing a third extent SS EXTSS[10] and a fourth extent SS EXTSS[11] respectively located immediately before and after a recording area NAV on the BD-ROM disc for data other than multiplexed stream data. In FIG. 28C, the number of sectors of the recording area NAV that separates the two extents SS EXTSS[10] and EXTSS[11] is equal to or less than 40000. In this case, the jump that occurs between the two extents SS EXTSS[10] and EXTSS[11] is not a long jump. Accordingly, regardless of the system rate $R_{TS2}$ for the file DEP, the second and subsequent extent pairs B[11], D[11], B[12], and D[12] in the third extent SS EXTSS[10], as well as the top extent pair B[13], D[13] in the fourth extent SS EXTSS[11], are classified as type (A). On the other hand, if the number of sectors in the recording area NAV is 40001 or greater, the jump that occurs between the two extents SS EXTSS[10] and EXTSS[11] is a long jump. Accordingly, if the system rate $R_{TS2}$ for the file DEP is higher than the threshold value of 32 Mbps, then unlike FIG. 28C, the second and subsequent extent pairs B[11], D[11], B[12], and D[12] in the third extent SS EXTSS[10] are classified as type (B), whereas the top extent pair B[13], D[13] in the fourth extent SS EXTSS[11] is classified as type (C).

The maximum extent sizes of the data blocks of type (A) shown in FIG. 28A are determined as follows. First, assume that the sum of the mean transfer rates $R_{EXT1}[i]$ and $R_{EXT2}[i]$ for the $(i+1)^{th}$ extent pair EXT1[$i$], EXT2[$i$] is the threshold value of 64 Mbps: $R_{EXT1}[i]+R_{EXT2}[i]=64$ Mbps. In this case, the entirety of the extent pair EXT1[$i$], EXT2[$i$] has its maximum data amount. Next, for various combinations of the mean transfer rates $R_{EXT1}$ and $R_{EXT2}$, maximum extent sizes max$S_{EXT1}$ and max$S_{EXT2}$ and an extent ATC time $T_{EXT}$ of each data block are sought. The maximum extent sizes max$S_{EXT1}$ and max$S_{EXT2}$ are so determined that the following three requirements are established. (I) Expression (10A) is satisfied as condition 5. In this context, the extension time ΔT is set to one second. (II) The extent ATC time $T_{EXT}$ is the same for both the data blocks. (III) Both conditions 2 and 3 are satisfied. Among the maximum extent sizes max$S_{EXT1}$ and max$S_{EXT2}$ thus sought, the largest one for the dependent-view transfer rate $R_{EXT2}$ equal to or less than the system rate $R_{TS2}$ is chosen as the actual maximum extent size. Note that condition 5 may be represented by expression (7) or (10B). Condition 5 may alternatively be represented by an inequality wherein the size of a data block is equal to or less than the upper limit of the right-hand side of expression (8) or (11).

FIG. 29 is a table showing maximum extent sizes max$S_{EXT1}$, max$S_{EXT2}$ and an extent ATC time $T_{EXT}$ of each data block for various combinations of mean transfer rates $R_{EXT1}$ and $R_{EXT2}$. In this table, assume that the system rate $R_{TS1}$ for a file 2D and the system rate $R_{TS2}$ for a file DEP are both set to 48 Mbps or less: $R_{TS1} \leq 48$ Mbps, $R_{TS2} \leq 48$ Mbps. For example, when the base-view transfer rate $R_{EXT1}[i]$ is 48 Mbps, then it is found from expression (10A) that the maximum extent size max$S_{EXT1}$ of the base-view data block is approximately 19 MB and the extent ATC time $T_{EXT}$ is approximately 3.2 seconds. Furthermore, since the dependent-view transfer rate $R_{EXT2}[i]$ is 64−48=16 Mbps, it is found from the product of this rate and the extent ATC time $T_{EXT}$ of approximately 3.2 seconds that the maximum extent size max$S_{EXT2}$ of the dependent-view data block is approximately 6 MB. For other combinations of mean transfer rates $R_{EXT1}$ and $R_{EXT2}$, maximum extent sizes max$S_{EXT1}$ and max$S_{EXT2}$ are sought in a similar manner.

When the system rate $R_{TS2}$ for the file DEP is equal to or less than the threshold value of 32 Mbps, the dependent-view transfer rate $R_{EXT2}$ is also equal to or less than 32 Mbps. From FIG. 29, the maximum values, approximately 19 MB and 6 MB, within the range for the dependent-view transfer rate $R_{EXT2}$ less than or equal to 32 Mbps are chosen as the maximum extent sizes max$S_{EXT1}$ and max$S_{EXT2}$ of the data blocks. On the other hand, when the system rate $R_{TS2}$ exceeds the threshold value of 32 Mbps, the dependent-view transfer rate $R_{EXT2}$ may rise up to 48 Mbps. From FIG. 29, the maximum values, approximately 19 MB and 8 MB, within the range for the dependent-view transfer rate $R_{EXT2}$ less than or equal to 48 Mbps are chosen as the maximum extent sizes max$S_{EXT1}$ and max$S_{EXT2}$ of the data blocks.

The maximum extent size of the data blocks of type (B) shown in FIG. 28A is determined as follows. First, the following is clear from expression (6): when the system rate $R_{TS2}$ for the file DEP reaches the upper limit of 48 Mbps, the lower limit of the capacity of RB2 2212 is at a maximum. In order to reduce the lower limit as much as possible, the size of the last base-view data block in the extent block to be read immediately before a long jump should be reduced as much as possible. In order to do so, as can be easily understood from expressions (2)-(4), the sizes $S_{EXT1}[i]$ and $S_{EXT2}[i]$ of the second and subsequent data blocks in the same extent block, i.e. the sizes of data blocks of type (B), should all be reduced as much as possible.

The maximum extent size of the dependent-view data blocks of type (B) is reduced as follows. As shown in the table in FIG. 29, when the mean transfer rate $R_{EXT2}[i]$ for one dependent-view data block EXT2[$i$] reaches the upper limit of 48 Mbps, the maximum extent size max$S_{EXT1}[i]$ of the base-view data block EXT1[$i$] belonging to the same extent pair is approximately 3 MB. In order to reduce this value, the maximum extent size max$S_{EXT2}[i]$ of the dependent-view data blocks of type (B) is reduced below the value shown in FIG. 29, approximately 8 MB. For example, in the table shown in FIG. 28A, the maximum extent size max$S_{EXT2}[i]$ is restricted to approximately 3 MB. In this context, data blocks belonging to the same extent pair are required to have the same extent ATC time. Accordingly, when the mean transfer rate $R_{EXT2}[i]$ for the dependent-view data block EXT2[$i$] having the maximum extent size of approximately 3 MB reaches the upper limit of 48 Mbps, the maximum extent size max$S_{EXT1}[i]$ of the base-view data block EXT1[$i$] belonging to the same extent pair is restricted to approximately 1 MB. As is clear from expression (5), when the size of the base-view data block to be read immediately before a long jump is reduced from 3 MB to 1 MB as described above, the lower limit of the capacity of RB1 2211 can thus be reduced by approximately 1.4 MB: (3 MB/72 Mbps)×48 Mbps×(192/188)−(1 MB/72 Mbps)×48 Mbps×(192/188)=2.1 MB−0.7 MB=1.4 MB.

The maximum extent size of the base-view data blocks of type (B) is reduced as follows. When the size $S_{EXT2}[i+1]$ of the $(i+2)^{th}$ dependent-view data block EXT2[$i+1$] is approximately 3 MB, and the mean transfer rate $R_{EXT1}[i]$ of the $(i+1)^{th}$ base-view data block EXT1[$i$] reaches the upper limit of 48 Mbps, the minimum extent size min$S_{EXT1}[i]$ expressed in the right-hand side of expression (2) is approximately 7 MB: 48 Mbps×(192/188)×3 MB/(72 Mbps−48 Mbps×(192/188))=6.4 MB, or approximately 7 MB. Accordingly, in order for condition 2 to be satisfied, the maximum extent size of the base-view data blocks of type (B) is determined to be approximately 7 MB.

The maximum extent size of the data blocks of type (C) shown in FIG. 28A is determined as follows. As can be easily understood from expressions (5) and (6), the sizes $S_{EXT1}[\bullet]$ of the base-view data blocks of type (C) do not affect the lower limits of the capacities of the read buffers. Accordingly, the maximum extent size of the base-view data blocks of type (C) is the same as that of type (A). On the other hand, the sizes $S_{EXT2}[\bullet]$ of the dependent-view data blocks of type (C) do affect both the lower limits of the capacities of RB1 2211 and RB2 2212. In other words, when both the system rates $R_{TS1}$ and $R_{TS2}$ reach the upper limit of 48 Mbps, both the lower limits of the capacities of RB1 2211 and the RB2 2212 are at a maximum. In order to reduce the lower limits as much as possible, the size of the dependent-view data blocks of type (C) should be reduced as much as possible. Specifically, the maximum extent sizes $maxS_{EXT2}[\bullet]$ of the dependent-view data blocks are reduced below the value shown in FIG. 29 of approximately 8 MB. For example, in the table shown in FIG. 28A, the maximum extent sizes $maxS_{EXT2}[\bullet]$ are restricted to approximately 6 MB. As shown in FIG. 29, this value equals the maximum extent size of each of data blocks belonging to the same extent pair when the mean transfer rates $R_{EXT1}[\bullet]$ and $R_{EXT2}[\bullet]$ of the data blocks are the same value, 32 Mbps. As can be easily understood from expression (5) and FIG. 29, when the maximum extent size of a dependent-view data block of type (C) falls below this value of approximately 6 MB, the mean transfer rate for a base-view data block can rise and exceed 32 Mbps. Accordingly, when the maximum extent size of the dependent-view data blocks of type (C) is reduced below approximately 6 MB, the lower limit of the capacity of RB1 2211 actually cannot be reduced. For this reason, the maximum extent size $maxS_{EXT2}[\bullet]$ of dependent-view data blocks is set to approximately 6 MB. As is clear from expressions (5) and (6), when the sizes of the dependent-view data blocks of type (C) are reduced from approximately 8 MB to approximately 6 MB, both the lower limits of the capacities of RB1 2211 and RB2 2212 can thus be reduced by approximately 1.5 MB: (8 MB/72 Mbps)×48 Mbps×(192/188)−(6 MB/72 Mbps)×48 Mbps×(192/188)=5.5 MB−4 MB=1.5 MB.

As shown in FIG. 28A, when the system rate $R_{TS2}$ for the file DEP rises above a predetermined threshold value (for example, 32 Mbps), the maximum extent sizes of the data blocks of type (B) are reduced and set to values (for example, 6 MB and 3 MB) smaller than those (for example, 19 MB and 6 MB respectively) for the system rate $R_{TS2}$ equal to or less than the threshold value. Furthermore, the maximum extent size of the dependent-view data blocks of type (C) is set to a value (for example, 6 MB) smaller than that of type (A) (for example, 8 MB). As a result, the BD-ROM disc 101 enables the playback device 102 to maintain both the lower limits of the capacities of RB1 2211 and RB2 2212 within acceptable ranges while satisfying expressions (2)-(4). In other words, the BD-ROM disc 101 enables the read buffers in the playback device 102 in either of 2D playback mode and 3D playback mode to have more reduced capacity, without causing underflow in the read buffers.

<<Clip Information File>>

Figure 30:
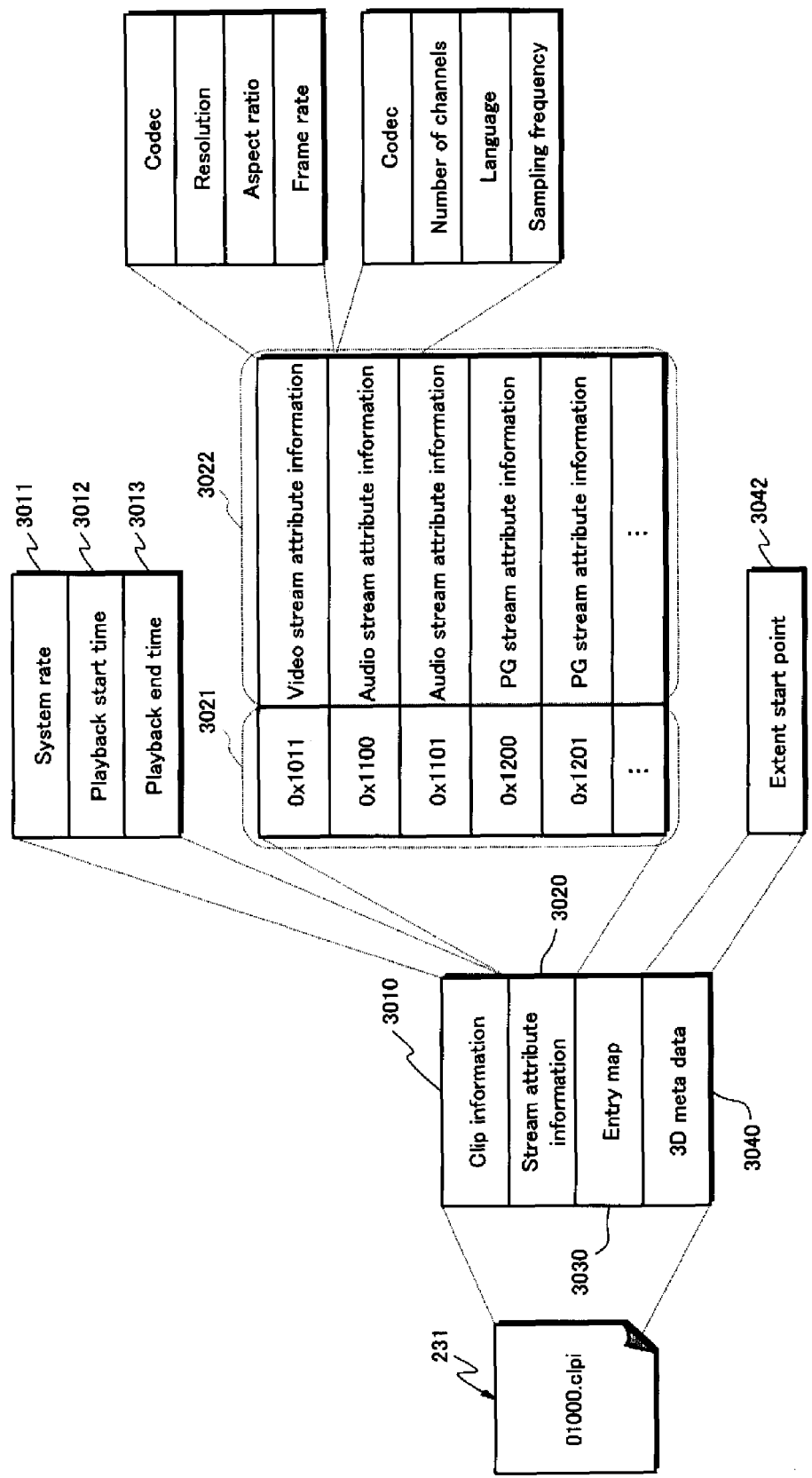
FIG. 30 is a schematic diagram showing a data structure of a first clip information file (01000.clpi) 231 shown in FIG. 2.

FIG. 30 is a schematic diagram showing a data structure of a first clip information file (01000.clpi), i.e. the 2D clip information file 231. The dependent-view clip information files (02000.clip, 03000.clip) 232 and 233 have the same data structure. Below, the data structure common to all clip information files is first described, using the data structure of the 2D clip information file 231 as an example. Afterwards, the differences in data structure between a 2D clip information file and a dependent-view clip information file are described.

As shown in FIG. 30, the 2D clip information file 231 includes clip information 3010, stream attribute information 3020, an entry map 3030, and 3D meta data 3040. The 3D meta data 3040 includes extent start points 3042.

As shown in FIG. 30, the clip information 3010 includes a system rate 3011, a playback start time 3012, and a playback end time 3013. The system rate 3011 specifies a system rate $R_{TS}$ for the file 2D (01000.m2ts) 241. In this context, as shown in FIG. 19, the playback device 102 in 2D playback mode transfers "TS packets" belonging to the file 2D 241 from the read buffer 1902 to the system target decoder 1903. Accordingly, the interval between the ATSs of the source packets in the file 2D 241 is set so that the transfer rate of the TS packets is limited to the system rate $R_{TS}$ or lower. The playback start time 3012 indicates the PTS allocated to the VAU located at the top of the file 2D 241, e.g. the PTS of the top video frame. The playback end time 3012 indicates the value of the STC delayed a predetermined time from the PTS allocated to the VAU located at the end of the file 2D 241, e.g. the sum of the PTS of the last video frame and the playback time of one frame.

As shown in FIG. 30, the stream attribute information 3020 is a correspondence table between the PID 3021 for each elementary stream included in the file 2D 241 and pieces of attribute information 3022. Each piece of attribute information 3022 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, a number of channels included in the audio stream, language, and sampling frequency. The playback device 102 uses this attribute information 3022 to initialize the decoder.

[Entry Map]

FIG. 31A is a schematic diagram showing a data structure of an entry map 3030. As shown in FIG. 31A, the entry map 3030 includes tables 3100. There is the same number of tables 3100 as there are video streams multiplexed in the main TS, and tables are assigned one-by-one to each video stream. In FIG. 31A, each table 3100 is distinguished by the PID of the video stream to which it is assigned. Each table 3100 includes an entry map header 3101 and an entry point 3102. The entry map header 3101 includes the PID corresponding to the table 3100 and the total number of entry points 3102 included in the table 3100. An entry point 3102 associates each pair of a PTS 3103 and source packet number (SPN) 3104 with one of individually differing entry point IDs (EP ID) 3105. The PTS 3103 is equivalent to the PTS for one of the I pictures included in the video stream for the PID indicated by the entry map header 3101. The SPN 3104 is equivalent to the SPN for the top of the source packet group stored in the corresponding I picture. An "SPN" refers to the serial number assigned consecutively from the top to a source packet group belonging to one AV stream file. The SPN is used as the address for each source packet in the AV stream file. In the entry map 3030 in the 2D clip information file 231, the SPN refers to the number assigned to the source packet group belonging to the file 2D 241, i.e. the source packet group storing the main TS. Accordingly, the entry point 3102 expresses the correspondence between the PTS and the address, i.e. the SPN, of each I picture included in the file 2D 241.

An entry point 3102 does not need to be set for all of the I pictures in the file 2D 241. However, when an I picture is located at the top of a GOP, and the TS packet that includes the top of that I picture is located at the top of a 2D extent, an entry point 3102 has to be set for that I picture.

FIG. 31B is a schematic diagram showing source packets in a source packet group 3110 belonging to a file 2D 241 that are associated with each EP_ID 3105 by the entry map 3030. FIG. 31C is a schematic diagram showing a data block group D[n], B[n] (n=0, 1, 2, 3, . . . ) on a BD-ROM disc 101 corresponding to the source packet group 3110. When the playback device 102 plays back 2D video images from the file 2D 241, it refers to the entry map 3030 to specify the SPN for the source packet that includes a frame representing an arbitrary scene from the PTS for that frame. Specifically, when for example a PTS=360000 is indicated as the PTS for a specific entry point for the playback start position, the playback device 102 first retrieves the SPN=3200 allocated to this PTS in the entry map 3030. Next, the playback device 102 seeks the quotient SPN×192/2048, i.e. the value of the SPN multiplied by 192 bytes, the data amount per source packet, and divided by 2048 bytes, the data amount per sector. As can be understood from FIGS. 5B and 5C, this quotient is the same as the total number of sectors recorded in the main TS prior to the source packet to which the SPN is assigned. In the example shown in FIG. 31B, this quotient is 3200×192/2048=300, and is equal to the total number of sectors on which are recorded source packet groups 3111 to which SPNs 0 through 3199 are allocated. Next, the playback device 102 refers to the file entry in the file 2D 241 and specifies the LBN of the (total number+1)$^{th}$ sector, counting from the top of the sector groups in which 2D extent groups are recorded. In the example shown in FIG. 31C, within the sector groups in which the base-view data blocks B[0], B[1], B[2], . . . which can be accessed as 2D extents EXT2D[0], EXT2D[1], EXT2D[2], . . . are recorded, the LBN of the 301$^{st}$ sector counting from the top is specified. The playback device 102 indicates this LBN to the BD-ROM drive. In this way, base-view data block groups are read as aligned units in order from the sector for this LBN. Furthermore, from the first aligned unit that is read in, the playback device 102 selects the source packet indicated by the entry point for the playback start position and then extracts and decodes an I picture. From then on, subsequent pictures are decoded in order referring to already decoded pictures. In this way, the playback device 102 can play back 2D video images from the file 2D 241 from a specified PTS onwards.

Furthermore, the entry map 3030 is useful for efficient processing during trickplay such as fast forward, reverse, etc. For example, the playback device 102 in 2D playback mode first refers to the entry map 3030 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 241 to specify the LBN of the sectors corresponding to each SPN. The playback device 102 then indicates each LBN to the BD-ROM drive. Aligned units are thus read from the sector for each LBN. Furthermore, from each aligned unit, the playback device 102 selects the source packet indicated by each entry point and then extracts and decodes an I picture. The playback device 102 can thus selectively play back an I picture from the file 2D 241 without analyzing the 2D extent group EXT2D[n] itself.

[Extent Start Point]

FIG. 32A is a schematic diagram showing a data structure of extent start points 3042. As shown in FIG. 32A, an "extent start point" 3042 includes base-view extent IDs (EXT1_ID) 3211 and SPNs 3212. The EXT1_IDs 3211 are serial numbers assigned consecutively from the top to the base-view data blocks belonging to the first file SS (01000.ssif) 244A. One SPN 3212 is assigned to each EXT1_ID 3211 and is the same as the SPN for the source packet located at the top of the base-view data block identified by the EXT1_ID 3211. This SPN is a serial number assigned in order from the top to the source packets included in the base-view data block group belonging to the first file SS 244A.

In the extent blocks 1501-1503 shown in FIG. 15, the file 2D 241 and the first file SS 244A share the base-view data blocks B[0], B[1], B[2], . . . in common. However, data block groups placed at locations requiring a long jump, such as at boundaries between recording layers, generally include base-view data blocks belonging to only one of the file 2D 241 and the first file SS 244A (see the description of Embodiment 2 for details). Accordingly, the SPN 3212 that indicates the extent start point 3042 generally differs from the SPN for the source packet located at the top of the 2D extent belonging to the file 2D 241.

FIG. 32B is a schematic diagram showing a data structure of extent start points 3220 included in a second clip information file (02000.clpi), i.e. the dependent-view clip information file 232. As shown in FIG. 32B, the extent start point 3220 includes dependent-view extent IDs (EXT2_ID) 3221 and SPNs 3222. The EXT2_IDs 3221 are serial numbers assigned in order from the top to the dependent-view data blocks belonging to the first file SS 244A. One SPN 3222 is assigned to each EXT2_ID 3221 and is the same as the SPN for the source packet located at the top of the dependent-view data block identified by the EXT2_ID 3221. This SPN is a serial number assigned in order from the top to the source packets included in the dependent-view data block group belonging to the first file SS 244A.

FIG. 32D is a schematic diagram representing correspondence between dependent-view extents EXT2[0], EXT2[1], . . . belonging to the first file DEP (02000.m2ts) 242 and the SPNs 3222 shown by the extent start points 3220. As shown in FIG. 15, the first file DEP 242 and the first file SS 244A share dependent-view data blocks in common. Accordingly, as shown in FIG. 32D, each SPN 3222 shown by the extent start points 3220 is the same as the SPN for the source packet located at the top of each right-view extent EXT2[0], EXT2[1], . . . .

As described below, the extent start points 3042 in the 2D clip information file 231 and the extent start points 3220 in the dependent-view clip information file 232 are used to detect the boundary of data blocks included in each extent SS during playback of 3D video images from the first file SS 244A.

FIG. 32E is a schematic diagram showing an example of correspondence between an extent SS EXTSS[0] belonging to the first file SS 244A and an extent block on the BD-ROM disc 101. As shown in FIG. 32E, the extent block includes data block groups D[n] and B[n] (n=0, 1, 2, . . . ) in an interleaved arrangement. Note that the following description is also true for other arrangements. The extent block can be accessed as a single extent SS EXTSS[0]. Furthermore, in the extent SS EXTSS[0], the number of source packets included in the (n+1)$^{th}$ base-view data block B[n] is, at the extent start point 3042, the same as the difference A(n+1)—An between SPNs respectively corresponding to EXT1_ID=n+1 and n. In this case, A0=0. On the other hand, the number of source packets included in the dependent-view data block D[n+1] is, in the extent start point 3220, the same as the difference B(n+1)−Bn between SPNs respectively corresponding to EXT2_ID=n+1 and n. In this case, B0=0.

When the playback device 102 in 3D playback mode plays back 3D video images from the first file SS 244A, the playback device 102 refers to the entry maps and the extent start points 3042 and 3220 respectively found in the clip information files 231 and 232. By doing this, the playback device 102 specifies, from the PTS for a frame representing the right view of an arbitrary scene, the LBN for the sector on which a dependent-view data block that is required for composing the frame is recorded. Specifically, the playback device 102 for example first retrieves the SPN associated with the PTS from the entry map in the dependent-view clip information file 232. It is assumed that the source packet indicated by the SPN is included in the third dependent-view extent EXT2[2] in the first file DEP 242, i.e. in the dependent-view data block D[2]. Next, the playback device 102 retrieves "B2", the largest SPN before the target SPN, from among the SPNs 3222 shown by the extent start points 3220 in the dependent-view clip information file 232. The playback device 102 also retrieves the corresponding EXT2_ID "2". Then the playback device 102 retrieves the value "A2" for the SPN 3012 corresponding to the EXT1_ID, which is the same as the EXT2_ID "2", from the extent start points 3042 in the 2D clip information file 231. The playback device 102 further seeks the sum B2+A2 of the retrieved SPNs. As can be seen from FIG. 32E, this sum B2+A2 is the same as the total number of source packets included in the data blocks located before the third dependent-view data block D[2] among the data blocks included in the extent SS EXTSS[0]. Accordingly, this sum B2+A2 multiplied by 192 bytes, the data amount per source packet, and divided by 2048 bytes, the data amount per sector, i.e. (B2+A2)×192/2048, is the same as the number of sectors from the top of the extent SS EXTSS[0] until immediately before the third dependent-view data block D[2]. Using this quotient, the LBN for the sector on which the top of the dependent-view data block D[2] is recorded can be specified by referencing the file entry for the first file SS 244A.

After specifying the LBN via the above-described procedure, the playback device 102 indicates the LBN to the BD-ROM drive 121. In this way, the portion of the extent SS EXTSS[0] recorded starting with the sector for this LBN, i.e. the data block group D[2], B[2], D[3], B[3], . . . starting from the third right-view data block D[2], is read as aligned units.

The playback device 102 further refers to the extent start points 3042 and 3220 to extract dependent-view data blocks and base-view data blocks alternately from the read extents SS. For example, assume that the data block group D[n], B[n] (n=0, 1, 2, . . . ) is read in order from the extent SS EXTSS[0] shown in FIG. 32E. The playback device 102 first extracts B1 source packets from the top of the extent SS EXTSS[0] as the dependent-view data block D[0]. Next, the playback device 102 extracts the B1$^{th}$ source packet and the subsequent (A1−1) source packets, a total of A1 source packets, as the first base-view data block B[0]. The playback device 102 then extracts the (B1+A1)$^{th}$ source packet and the subsequent (B2−B1−1) source packets, a total of (B2−B1) source packets, as the second dependent-view data block D[1]. The playback device 102 further extracts the (A1+B2)$^{th}$ source packet and the subsequent (A2−A1−1) source packets, a total of (A2−A1) source packets, as the second base-view data block B[1]. Thereafter, the playback device 102 thus continues to detect the boundary between data blocks in the extent SS based on the number of read source packets, thereby alternately extracting dependent-view and base-view data blocks.

The extracted base-view and dependent-view data blocks are transmitted to the system target decoder to be decoded in parallel.

In this way, the playback device 102 in 3D playback mode can play back 3D video images from the first file SS 244A starting at a specific PTS. As a result, the playback device 102 can in fact benefit from the above-described advantages (A) and (B) regarding control of the BD-ROM drive 121.

<<File Base>>

FIG. 32C is a schematic diagram representing the base-view data blocks B[0], B[1], B[2], . . . extracted from the first file SS 244A by the playback device 102 in 3D playback mode. As shown in FIG. 32C, when allocating SPNs in order from the top to a source packet group included in base-view data blocks B[n] (n=0, 1, 2, . . . ), the SPN of the source packet located at the top of the base-view data blocks B[n] is equal to the SPN 3212 indicated by the extent start point 3042. The base-view data block group extracted from a single file SS by referring to extent start points, like the base-view data block group B[n], is referred to as a "file base". Furthermore, the base-view data blocks included in a file base are referred to as "base-view extents". As shown in FIG. 32E, each base-view extent EXT1[0], EXT1[1] . . . is referred to by an extent start point 3042 or 3220 in a clip information file.

A base-view extent EXT1[$n$] shares the same base-view data block B[n] with a 2D extent EXT2D[n]. Accordingly, the file base includes the same main TS as the file 2D. Unlike the 2D extent EXT2D[n], however, the base-view extent EXT1[$n$] is not referred to by any file entry. As described above, the base-view extent EXT1[$n$] is extracted from the extent SS EXTSS [•] in the file SS with use of the extent start point in the clip information file. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 2.

Figure 33:
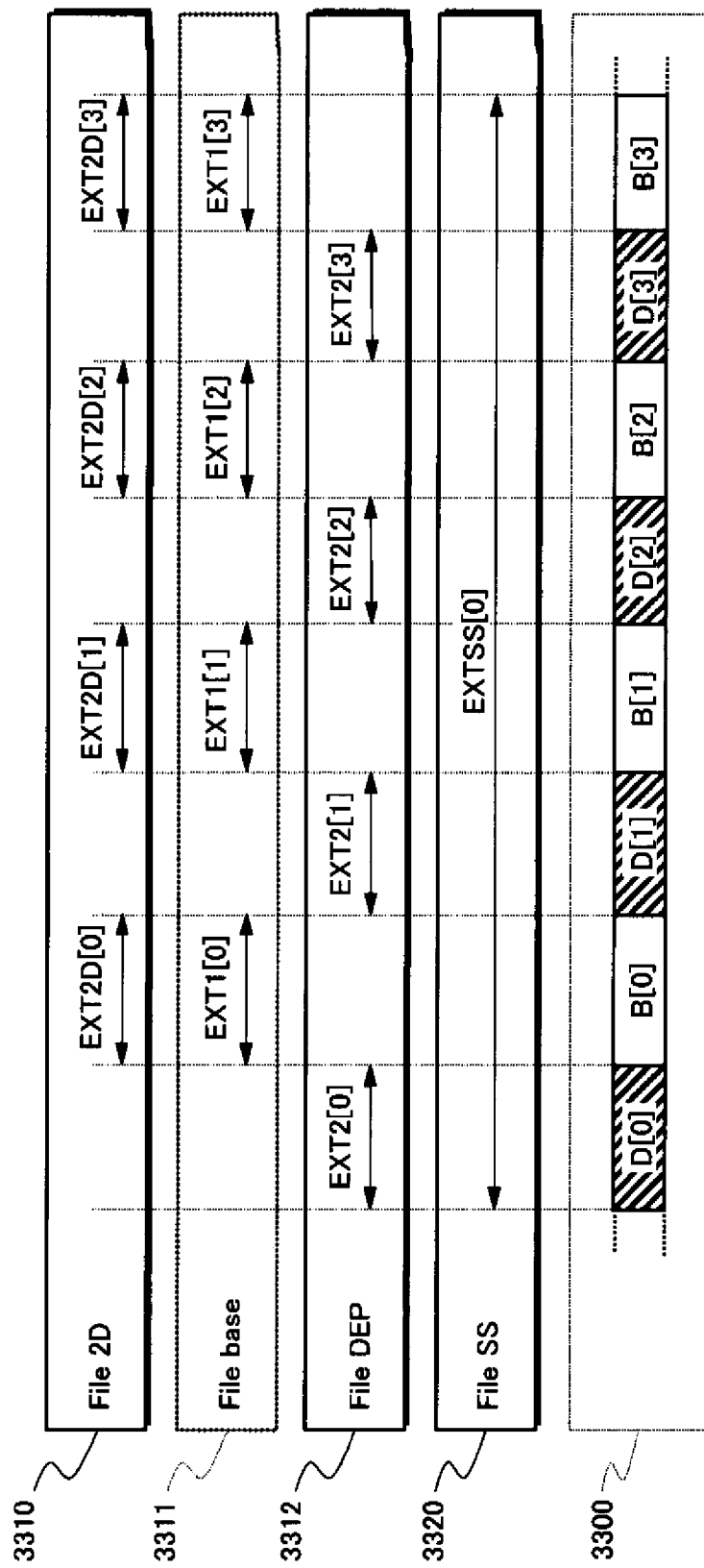
FIG. 33 is a schematic diagram showing correspondence between an extent block 3300 and each extent group in a file 2D 3310, file base 3311, file DEP 3312, and file SS 3320 recorded on the BD-ROM disc 101.

FIG. 33 is a schematic diagram showing correspondence between a single extent block 3300 recorded on the BD-ROM disc 101 and each of the extent block groups in a file 2D 3310, file base 3311, file DEP 3312, and file SS 3320. As shown in FIG. 33, the extent block 3300 includes the dependent-view data blocks D[n] and the base-view data blocks B[n] (n=. . . , 0, 1, 2, 3, . . . ). The base-view data blocks B[n] belong to the file 2D 3310 as the 2D extents EXT2D[n]. The dependent-view data blocks D[n] belong to the file DEP 3312 as the dependent-view extents EXT2[$n$]. The entirety of the extent block 3300 belongs to the file SS 3320 as one extent SS EXTSS[0]. Accordingly, the extent SS EXTSS[0] shares the base-view data blocks B[n] in common with the 2D extents EXT2D[n] and shares the dependent-view data blocks D[n] with the dependent-view extents EXT2[$n$]. After being read into the playback device 102, the extent SS EXTSS[0] is separated into the dependent-view data blocks D[n] and the base-view data blocks B[n]. These base-view data blocks B[n] belong to the file base 3311 as the base-view extents EXT1[$n$]. The boundary in the extent SS EXTSS [0] between the base-view extents EXT1[$n$] and the dependent-view extents EXT2[$n$] is specified with use of the extent start point in the clip information file corresponding to each of the file 2D 3310 and the file DEP 3312.

<<Dependent-View Clip Information File>>

The dependent-view clip information file has the same data structure as the 2D clip information file shown in FIGS. 31 and 32. Accordingly, the following description covers the differences between the dependent-view clip information file and the 2D clip information file. Details on the similarities can be found in the above description.

A dependent-view clip information file differs from a 2D clip information file mainly in the following three points: (i) conditions are placed on the stream attribute information, (ii) conditions are placed on the entry points, and (iii) the 3D metadata does not include an offset table.

(i) When the base-view video stream and the dependent-view video stream are to be used for playback of 3D video images by the playback device 102 in L/R mode, then as shown in FIG. 7, the dependent-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 3020 in the 2D clip information file. On the other hand, the video stream attribute information for the dependent-view video stream is associated with PID=0x1012 or 0x1013 in the stream attribute information in the dependent-view clip information file. Accordingly, the items shown in FIG. 30, i.e. the codec, resolution, aspect ratio, and frame rate, have to match between these two pieces of video stream attribute information. If the codec type matches, then a reference relationship between base-view pictures and dependent-view pictures is established during coding, and thus each picture can be decoded. If the resolution, aspect ratio, and frame rate all match, then on-screen display of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 3100 shown in FIG. 31A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the picture located at the top of one the GOPs included in the dependent-view video stream. The SPN for each entry point is the same as the SPN allocated to the top of the source packet group in which the picture indicated by the PTS belonging to the same entry point is stored. This SPN refers to a serial number assigned consecutively from the top to the source packet group belonging to the file DEP, i.e. the source packet group composing the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 34:
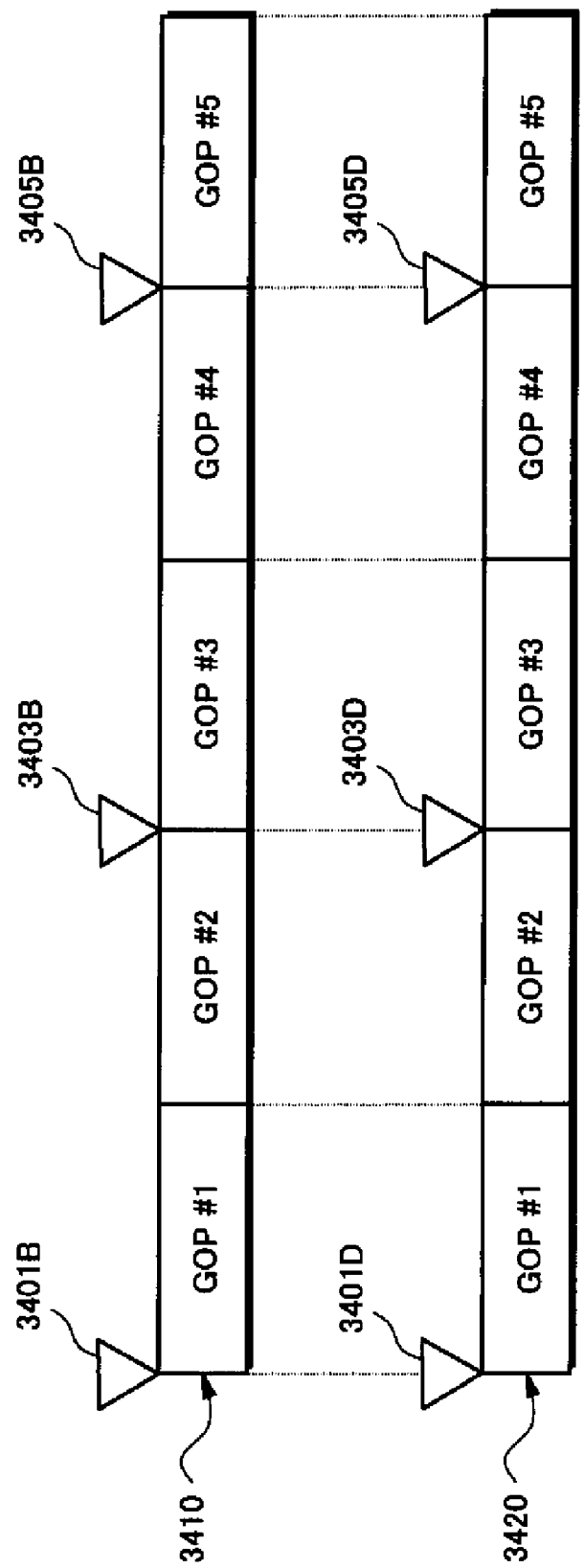
FIG. 34 is a schematic diagram showing an example of entry points set in a base-view video stream 3410 and a dependent-view video stream 3420.

FIG. 34 is a schematic diagram showing an example of entry points set in a base-view video stream 3410 and a dependent-view video stream 3420. In the two video streams 3410 and 3420, GOPs that are the same number from the top represent video for the same playback period. As shown in FIG. 34, in the base-view video stream 3410, entry points 3401B, 3403B, and 3405B are set to the top of the odd-numbered GOPs as counted from the top GOP, i.e. GOP #1, GOP #3, and GOP #5. Accordingly, in the dependent-view video stream 3420 as well, entry points 3401D, 3403D, and 3405D are set to the top of the odd-numbered GOPs as counted from the top GOP, i.e. GOP #1, GOP #3, and GOP #5. In this case, when the playback device 102 begins playback of 3D video images from GOP #3, for example, it can immediately calculate the SPN of the playback start position in the file SS from the SPN of the corresponding entry points 3403B and 3403D. In particular, when both entry points 3403B and 3403D are set to the top of a data block, then as can be understood from FIG. 32E, the sum of the SPNs of the entry points 3403B and 3403D equals the SPN of the playback start position within the file SS. As described with reference to FIG. 32E, from this number of source packets, it is possible to calculate the LBN of the sector on which the portion of the file SS for the playback start position is recorded. In this way, even during playback of 3D video images, it is possible to improve response speed for processing that requires random access to the video stream, such as interrupt playback or the like.

<<2D Playlist File>>

Figure 35:
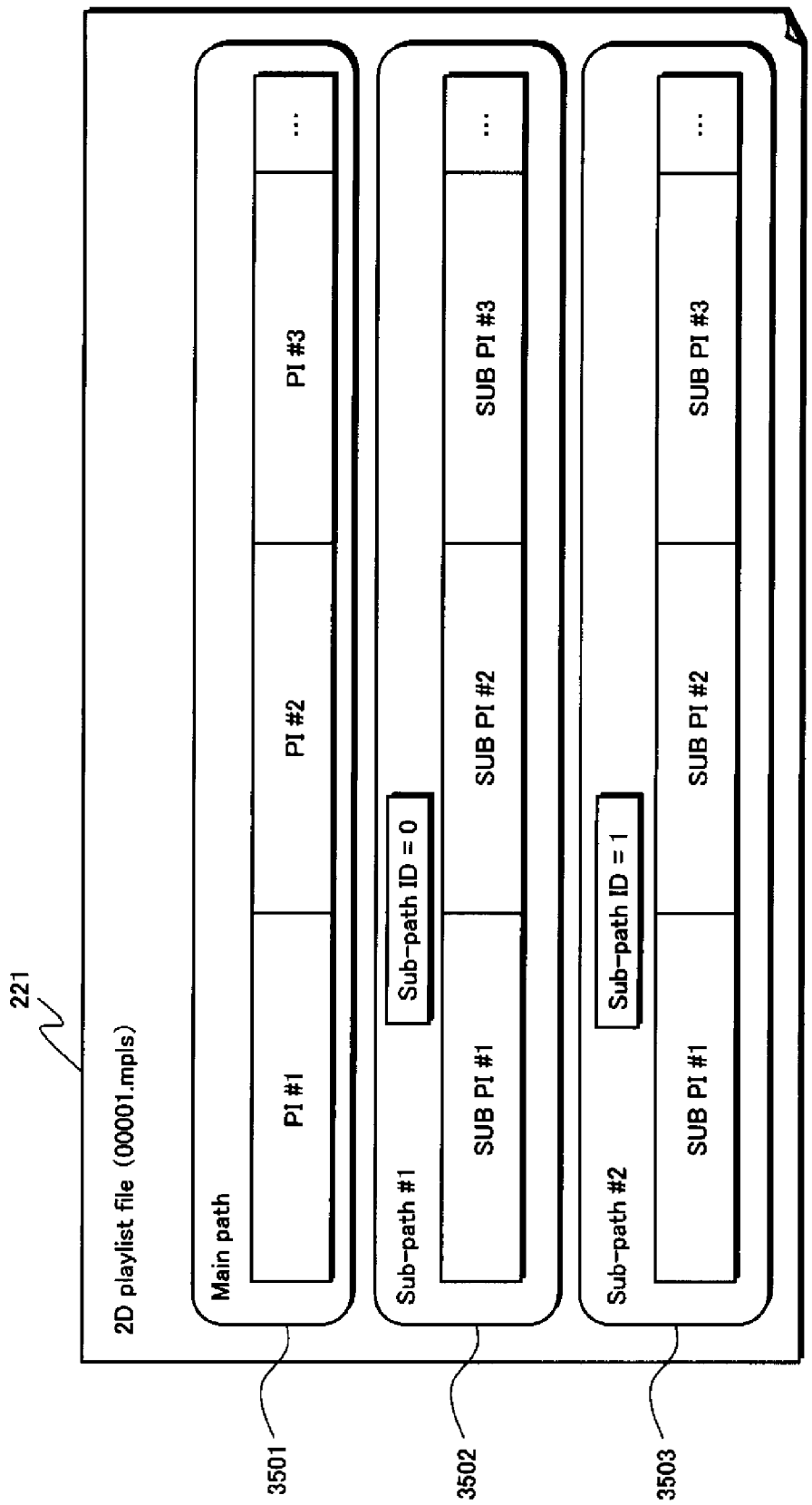
FIG. 35 is a schematic diagram showing a data structure of the 2D playlist file (00001.mpls) shown in FIG. 2.

FIG. 35 is a schematic diagram showing a data structure of a 2D playlist file. The first playlist file (00001.mpls) 221 shown in FIG. 2 has this data structure. As shown in FIG. 35, the 2D playlist file 221 includes a main path 3501 and two sub-paths 3502 and 3503.

The main path 3501 is a sequence of playitem information pieces (hereinafter abbreviated as PI) that defines the main playback path for the file 2D 241, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 3501 represents the order of corresponding playback sections in the playback path.

Each of the sub-paths 3502 and 3503 is a sequence of sub-playitem information pieces (hereinafter abbreviated as SUB_PI) that defines a playback path that can be associated in parallel with the main playback path for the file 2D 241. Such a playback path is a different section of the file 2D 241 than is represented by the main path 3501, or is a section of stream data multiplexed in another file 2D, along with the corresponding playback order. The stream data indicated by the playback path represents other 2D video images to be played back simultaneously with 2D video images played back from the file 2D 241 in accordance with the main path 3501. These other 2D video images include, for example, sub-video in a picture-in-picture format, a browser window, a pop-up menu, or subtitles. Serial numbers "0" and "1" are assigned to the sub-paths 3502 and 3503 in the order of registration in the 2D playlist file 221. These serial numbers are used as sub-path IDs to identify the sub-paths 3502 and 3503. In the sub-paths 3502 and 3503, each SUB_PI is identified by a unique sub-playitem ID=#M (M=1, 2, 3, . . . ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 3502 and 3503 represents the order of corresponding playback sections in the playback path.

FIG. 36 is a schematic diagram showing a data structure of PI #N. As shown in FIG. 36, a PI #N includes a piece of reference clip information 3601, playback start time (In_Time) 3602, playback end time (Out_Time) 3603, connection condition 3604, and stream selection table (hereinafter referred to as "STN table" (stream number table)) 3605. The reference clip information 3601 is information for identifying the 2D clip information file 231. The playback start time 3602 and playback end time 3603 respectively indicate PTSs for the beginning and the end of the section for playback of the file 2D 241. The connection condition 3604 specifies a condition for connecting video in the playback section specified by a playback start time 3602 and a playback end time 3603 to video in the playback section specified by the previous PI #(N−1). The STN table 3605 is a list of elementary streams that can be selected from the file 2D 241 by the decoder in the playback device 102 from the playback start time 3602 until the playback end time 3603.

The data structure of a SUB_PI is the same as the data structure of the PI shown in FIG. 36 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition (hereinafter abbreviated as "CC") 3604 can for example be assigned three types of values: "1", "5", and "6". When the CC 3604 is "1", the video to be played back from the section of the file 2D 241 specified by the PI #N does not need to be seamlessly connected to the video played back from the section of the file 2D 241 specified by the immediately preceding PI #(N−1). On the other hand, when the CC 3604 indicates "5" or "6", both video images need to be seamlessly connected.

Figure 37A:
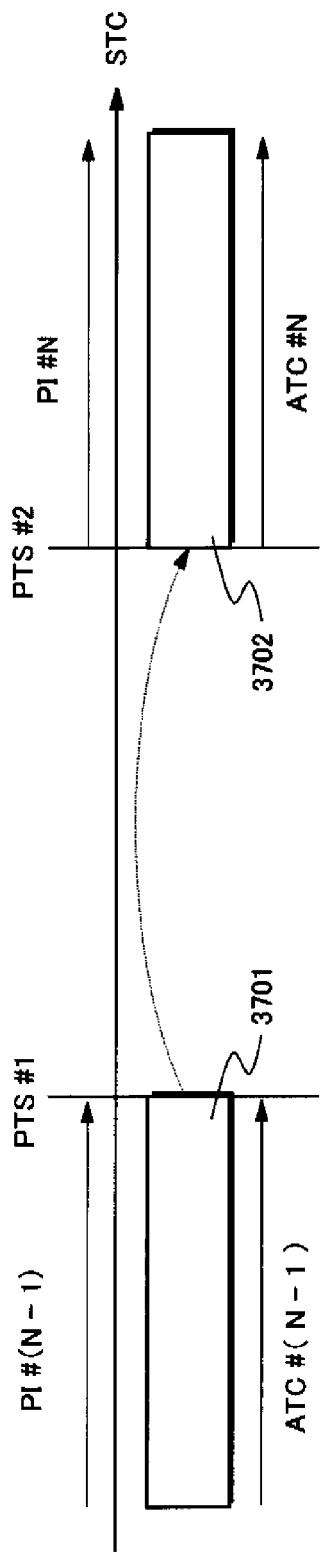
FIGS. 37A and 37B are schematic diagrams showing correspondence between two playback sections PI #(N−1) and PI #N that are to be connected when a connection condition is respectively "5" and "6"
Figure 37B:
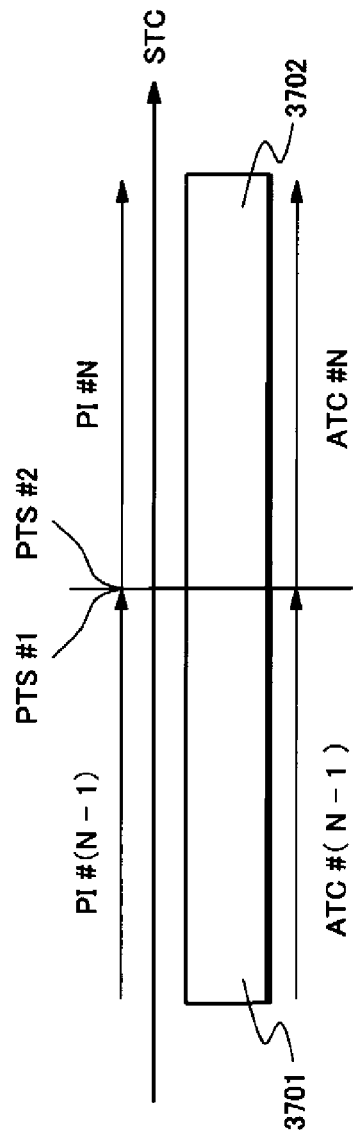

FIGS. 37A and 37B are schematic diagrams showing correspondence between two playback sections PI #(N−1) and PI #N that are to be connected when the CC is "5" or "6". In this case, the PI #(N−1) specifies a first section 3701 in the file 2D 241, and the PI #N specifies a second section 3702 in the file 2D 241. As shown in FIG. 37A, when the CC indicates "5", the STCs of the two PIs, PI #(N−1) and PI #N, may be nonconsecutive. That is, the PTS #1 at the end of the first section 3701 and the PTS #2 at the top of the second section 3702 may be nonconsecutive. Several constraint conditions, however, need to be satisfied. For example, the first section 3701 and second section 3702 need to be created so that the decoder can smoothly continue to decode data even when the second section 2902 is supplied to the decoder consecutively after the first section 2901. Furthermore, the last frame of the audio stream contained in the first section 3701 needs to overlap the top frame of the audio stream contained in the second section 3702. On the other hand, as shown in FIG. 37B, when the CC indicates "6", the first section 3701 and the second section 3702 need to be able to be handled as successive sections for the decoder to duly decode. That is, STCs and ATCs need to be contiguous between the first section 3701 and the second section 3702. Similarly, when the SP connection condition is "5" or "6", STCs and ATCs both need to be contiguous between sections of the file 2D specified by two contiguous SUB_PIs.

[STN Table]

Referring again to FIG. 36, the STN table 3605 is an array of stream registration information. "Stream registration information" is information individually listing the elementary streams that can be selected for playback from the main TS between the playback start time 3602 and playback end time 3603. The stream number (STN) 3606 is a serial number allocated individually to stream registration information and is used by the playback device 102 to identify each elementary stream. The STN 3606 further indicates priority for selection among elementary streams of the same type. The stream registration information includes a stream entry 3609 and stream attribute information 3610. The stream entry 3609 includes stream path information 3607 and stream identification information 3608. The stream path information 3607 is information indicating the file 2D to which the selected elementary stream belongs. For example, if the stream path information 3607 indicates "main path", the file 2D corresponds to the 2D clip information file indicated by reference clip information 3601. On the other hand, if the stream path information 3607 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3602 until the playback end time 3603 specified by the PI included in the STN table 3605. The stream identification information 3608 indicates the PID for the elementary stream multiplexed in the file 2D specified by the stream path information 3607. The elementary stream indicated by this PID can be selected from the playback start time 3602 until the playback end time 3603. The stream attribute information 3610 indicates attribute information for each elementary stream. For example, the attribute information for each of an audio stream, PG stream, and IG stream indicates a language type of the stream.

[Playback of 2D Video Images in Accordance With a 2D Playlist File]

FIG. 38 is a schematic diagram showing correspondence between the PTSs indicated by the 2D playlist file (00001.mpls) 221 and the sections played back from the file 2D (01000.m2ts) 241. As shown in FIG. 38, in the main path 3501 in the 2D playlist file 221, the PI #1 specifies a PTS #1, which indicates a playback start time IN1, and a PTS #2, which indicates a playback end time OUT1. The reference clip information for the PI #1 indicates the 2D clip information file (01000.clpi) 231. When playing back 2D video images in accordance with the 2D playlist file 221, the playback device 102 first reads the PTS #1 and PTS #2 from the PI #1. Next, the playback device 102 refers to the entry map in the 2D clip information file 231 to retrieve from the file 2D 241 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry for the file 2D 241 to specify the LBN #1 and LBN #2 at the beginning and end, respectively, of the sector group P1 on which the 2D extent group EXT2D[0], . . . , EXT2D[n] to be played back is recorded. Calculation of the numbers of sectors and specification of the LBNs are as per the description of FIGS. 31A, 31B, and 31C. Finally, the playback device 102 indicates the range from LBN #1 to LBN #2 to the BD-ROM drive 121. The source packet group belonging to the 2D extent group EXT2D[0], . . . , EXT2D[n] is thus read from the sector group P1 in this range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 241, the pair of SPN #3 and SPN #4 are converted into a pair of LBN #3 and LBN #4. Furthermore, a source packet group belonging to the 2D extent group is read from the sector group P2 in a range from the LBN #3 to the LBN #4. Conversion of a pair of PTS #5 and PTS #6 indicated by the PI #3 to a pair of SPN #5 and SPN #6, conversion of the pair of SPN #5 and SPN #6 to a pair of LBN #5 and LBN #6, and reading of a source packet group from the sector group P3 in a range from the LBN #5 to the LBN #6 are similarly performed. The playback device 102 thus plays back 2D video images from the file 2D 241 in accordance with the main path 3501 in the 2D playlist file 221.

The 2D playlist file 221 may include an entry mark 3801. The entry mark 3801 indicates a time point in the main path 3501 at which playback is actually to start. For example, as shown in FIG. 38, a plurality of entry marks 3801 can be set for the PI #1. The entry mark 3801 is particularly used for searching for a playback start position during random access. For example, when the 2D playlist file 221 specifies a playback path for a movie title, the entry marks 3801 are assigned to the top of each chapter. Consequently, the playback device 102 can play back the movie title by chapters.

<<3D Playlist File>>

Figure 39:
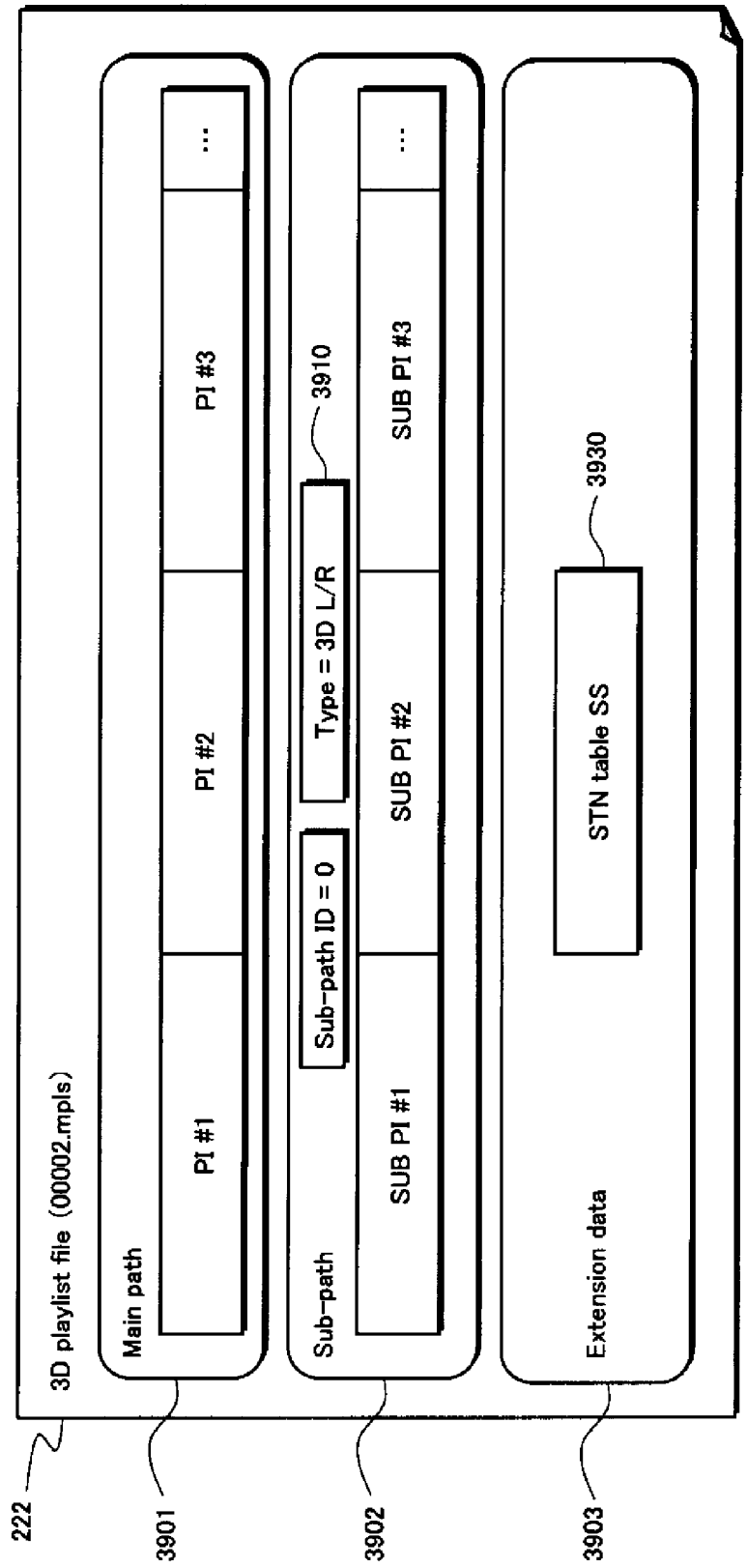
FIG. 39 is a schematic diagram showing a data structure of the 3D playlist file (00002.mpls) 222 shown in FIG. 2.

FIG. 39 is a schematic diagram showing a data structure of a 3D playlist file. The second playlist file (00002.mpls) 222 shown in FIG. 2 has this data structure. The same is also true for the third playlist file (00003.mpls) 223. As shown in FIG. 39, the 3D playlist file 222 includes a main path 3901, sub-path 3902, and extension data 3903.

The main path 3901 specifies the playback path of the main TS shown in FIG. 3A. Accordingly, the main path 3901 is substantially the same as the main path 3501 for the 2D playlist file 221 shown in FIG. 34. In other words, the playback device 102 in 2D playback mode can play back 2D video images from the file 2D 241 in accordance with the main path 3901 in the 3D playlist file 222. The main path 3901 differs from the main path 3501 shown in FIG. 35 in that, when an STN is associated with a PID in one of the graphics streams, the STN table for each PI furthermore allocates an offset sequence ID to the STN.

The sub-path 3902 specifies the playback paths for the sub-TSs shown in FIGS. 3B and 3C, i.e. the playback paths for the first file DEP 242 and the second file DEP 243. The data structure of the sub-path 3902 is the same as the data structure of the sub-paths 3502 and 3503 in the 2D playlist file 241 shown in FIG. 35. Accordingly, details on this similar data structure can be found in the description of FIG. 35, in particular details on the data structure of the SUB_PI.

The SUB_PI #N (N=1, 2, 3, . . . ) in the sub-path 3902 are in one-to-one correspondence with the PI #N in the main path 3901. Furthermore, the playback start time and playback end time specified by each SUB_PI #N is the same as the playback start time and playback end time specified by the corresponding PI #N. The sub-path 3902 additionally includes a sub-path type 3910. The "sub-path type" generally indicates whether playback processing should be synchronized between the main path and the sub-path. In the 3D playlist file 222, the sub-path type 3910 in particular indicates the type of the 3D playback mode, i.e. the type of the dependent-view video stream to be played back in accordance with the sub-path 3902. In FIG. 39, the value of the sub-path type 3910 is "3D L/R", thus indicating that the 3D playback mode is L/R mode, i.e. that the right-view video stream is to be played back. On the other hand, a value of "3D depth" for the sub-path type 3910 indicates that the 3D playback mode is depth mode, i.e. that the depth map stream is to be played back. When the playback device 102 in 3D playback mode detects that the value of the sub-path type 3910 is "3D L/R" or "3D depth", the playback device 102 synchronizes playback processing that conforms to the main path 3901 with playback processing that conforms to the sub-path 3902.

Extension data 3903 is interpreted only by the playback device 102 in 3D playback mode, and is ignored by the playback device 102 in 2D playback mode. In particular, the extension data 3903 includes an extension stream selection table 3930. The "extension stream selection table (STN_table_SS)" (hereinafter abbreviated as "STN table SS") is an array of stream registration information to be added to the STN tables indicated by each PI in the main path 3501 during 3D playback mode. This stream registration information indicates elementary streams that can be selected for playback from the sub TS.

[STN Table]

Figure 40:
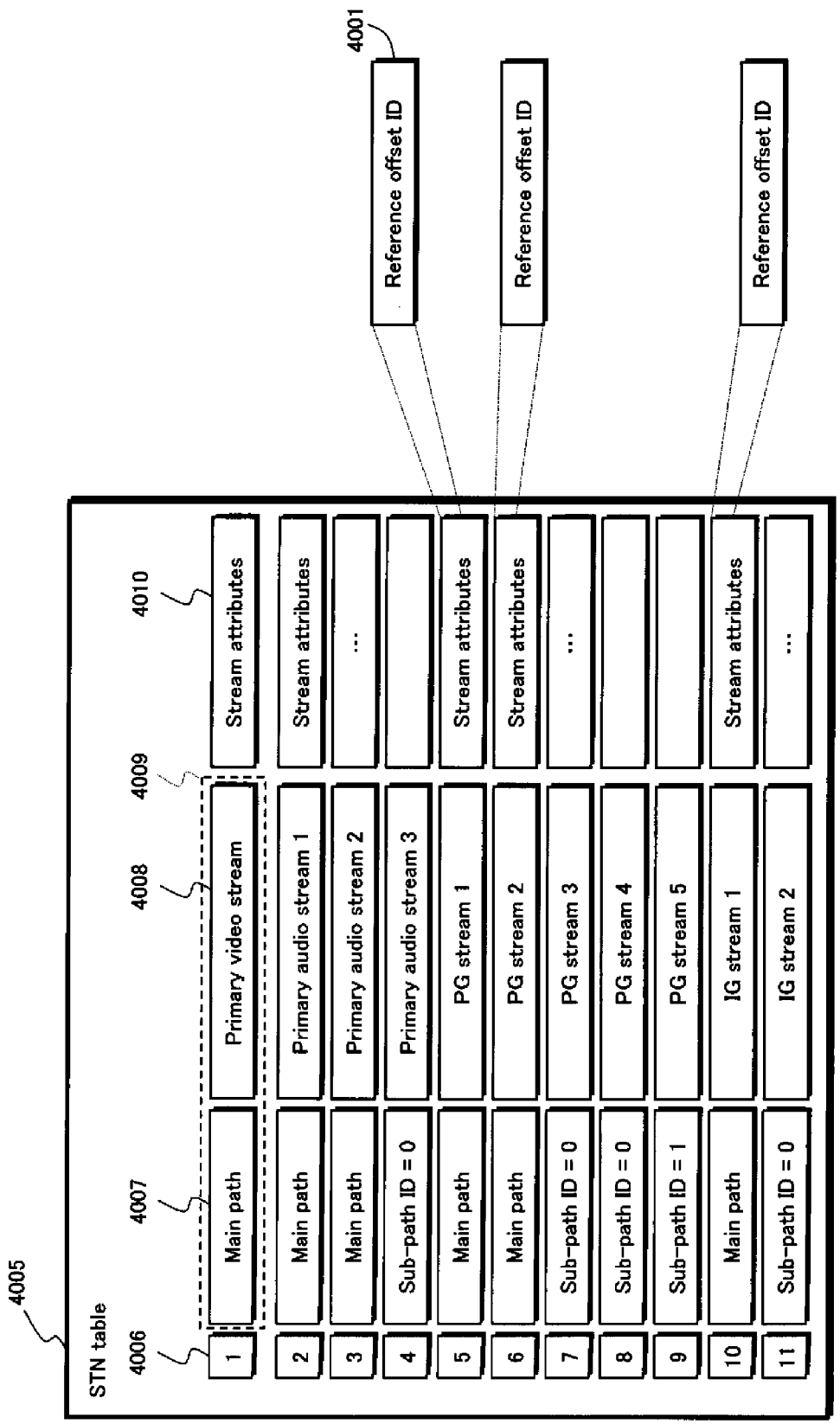
FIG. 40 is a schematic diagram showing an STN table 4005 included in a main path 3901 of the 3D playlist file 222 shown in FIG. 39.

FIG. 40 is a schematic diagram showing an STN table 4005 included in a main path 3901 of the 3D playlist file 222. As shown in FIG. 40, the pieces of stream identification information 4008 to which STNs 4006 of "5" through "11" are allocated indicate the PID of a PG stream or an IG stream. In this case, the stream attribute information 4010 to which the same STN is allocated includes a reference offset ID (stream_ref_offset_id) 4001. In the file DEP 242, as shown in FIG. 11, offset metadata 1110 is placed in VAU #1 of each video sequence. The reference offset ID 4001 is the same as one of the offset sequence IDs 1112 included in the offset metadata 1110. In other words, the reference offset ID 4001 defines the offset sequence that should be associated with each of the STNs from "5" through "11" among the plurality of offset sequences included in the offset metadata 1110.

[STN Table SS]

Figure 41:
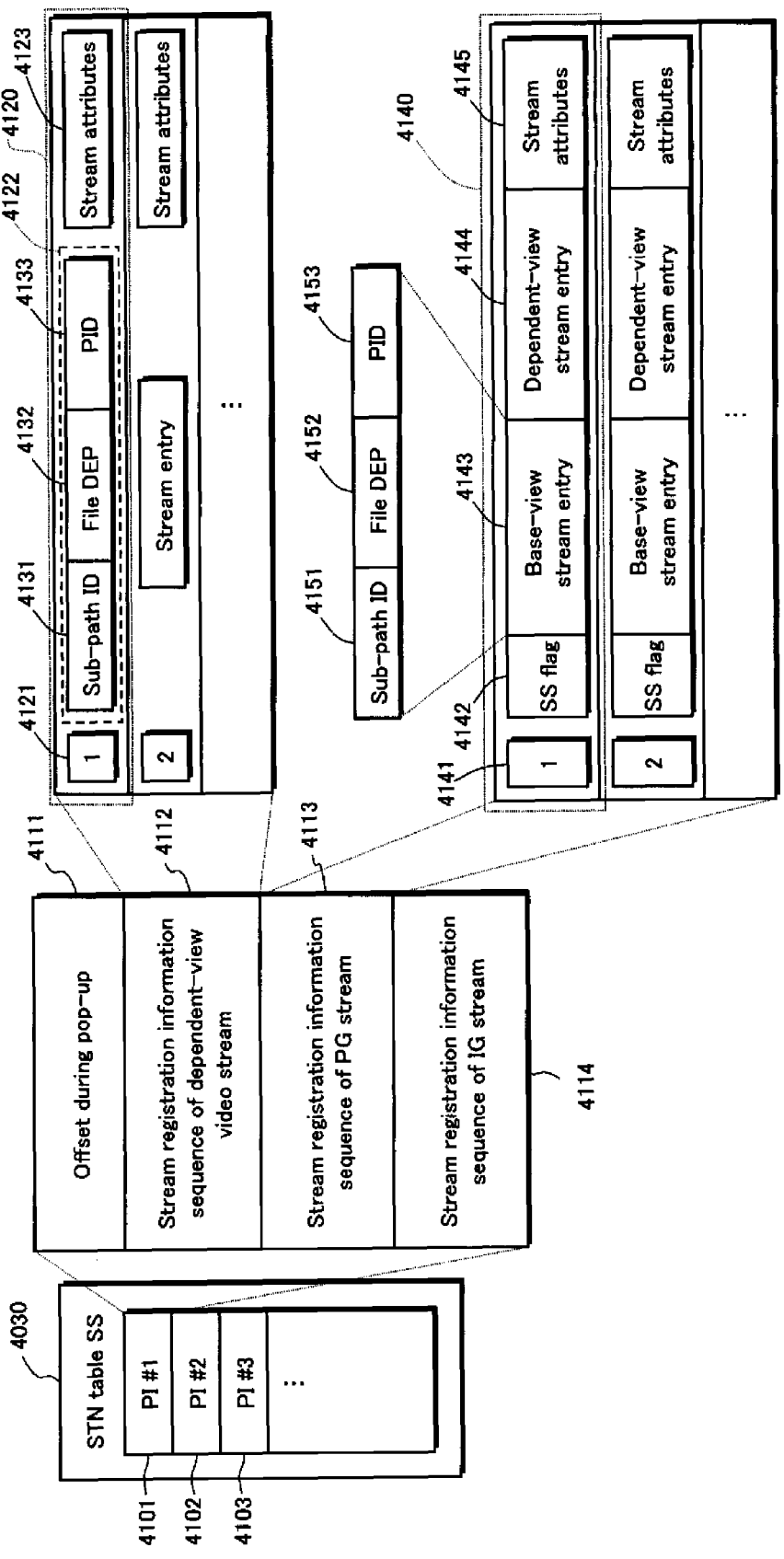
FIG. 41 is a schematic diagram showing a data structure of the STN table SS 4030 shown in FIG. 40.

FIG. 41 is a schematic diagram showing a data structure of the STN table SS 4030. As shown in FIG. 41, an STN table SS 4030 includes stream registration information sequences 4101, 4102, 4103, . . . . The stream registration information sequences 4101, 4102, 4103, . . . individually correspond to the PI #1, PI #2, PI #3, . . . in the main path 4001. The playback device 102 in 3D playback mode uses these stream registration information sequences 4101, 4102, and 4103 in combination with the stream registration information sequences included in the STN tables in the corresponding PIs. The stream registration information sequence 4101 corresponding to each PI includes an offset during pop-up (Fixed_offset_during_Popup) 4111, stream registration information sequence 4112 for the dependent-view video streams, stream registration information sequence 4113 for the PG streams, and stream registration information sequence 4114 for the IG streams.

The offset during pop-up 4111 indicates whether a pop-up menu is played back from the IG stream. The playback device 102 in 3D playback mode changes the presentation mode of the video plane and the PG plane in accordance with the value of the offset 4111. There are two types of presentation modes for the video plane: base-view (B)—dependent-view (D) presentation mode and B-B presentation mode. There are three types for each presentation mode for the PG plane and the IG plane: two plane mode, one plane+offset mode, and one plane+zero offset mode. For example, when the value of the offset during pop-up 4111 is "0", a pop-up menu is not played back from the IG stream. At this point, B-D presentation mode is selected as the video plane presentation mode, and two plane mode or one plane+offset mode is selected as the presentation mode for the PG plane. On the other hand, when the value of the offset during pop-up 4111 is "1", a pop-up menu is played back from the IG stream. At this point, B-B presentation mode is selected as the video plane presentation mode, and one plane+zero offset mode is selected as the presentation mode for the PG plane.

In "B-D presentation mode", the playback device 102 alternately outputs plane data decoded from the left-view and right-view video streams. Accordingly, since left-view and right-view frames representing video planes are alternately displayed on the screen of the display device 103, the viewer perceives these frames as 3D video images. In "B-B presentation mode", the playback device 102 outputs only plane data decoded from the base-view video stream twice for a frame while maintaining the operation mode in 3D playback mode (in particular, maintaining the frame rate at the value for 3D playback, e.g. 48 frames/second). Accordingly, since only left-view or right-view frames representing video planes are displayed on the screen of the display device 103, the viewer perceives these frames as mere 2D video images.

In "two plane mode", when a sub-TS includes both a base-view and dependent-view graphics stream, for example as shown in FIGS. 3B and 3C, the playback device 102 decodes and alternately outputs left-view and right-view graphics plane data from the graphics streams. In "one plane+offset mode", the playback device 102 generates, via offset control, a pair of left-view and right-view graphics planes from the graphics stream in the main TS and alternately outputs these graphics planes. Since left-view and right-view graphics planes are alternately displayed on the screen of the display device 103 in either mode, the viewer perceives these frames as 3D graphics images. In "one plane+zero offset mode", the playback device 102 temporarily stops offset control and outputs a graphics plane decoded from the graphics stream in the main TS twice for a frame while maintaining the operation mode in 3D playback mode. Accordingly, only either the left-view or right-view graphics planes are displayed on the screen of the display device 103, and thus the viewer perceives these planes as mere 2D graphics images.

The playback device 102 in 3D playback mode refers to the offset during pop-up 4111 for each PI and selects B-B presentation mode and one plane+zero offset mode when a pop-up menu is played back from an IG stream. While a pop-up menu is displayed, other 3D video images are thus temporarily changed to 2D video images. This improves the visibility and usability of the pop-up menu.

The stream registration information sequence 4112 for the dependent-view video streams, stream registration information sequence 4113 for the PG streams, and stream registration information sequence 4114 for the IG streams respectively include stream registration information indicating the dependent-view video streams, PG streams, and IG streams that can be selected for playback from the sub-TS. These stream registration information sequences 4112, 4113, and 4114 are used in combination with the stream registration information sequences, included in the STN table of the corresponding PI, that indicate base-view video streams, PG streams, and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

The stream registration information sequence 4112 for the dependent-view video streams generally includes a plurality of pieces of stream registration information (SS_dependent_view_block) 4120. These are the same in number as the pieces of stream registration information in the corresponding PI that indicate the base-view video stream. Each piece of stream registration information 4120 includes an STN 4121, stream entry 4122, and stream attribute information 4123. The STN 4121 is a serial number assigned individually to pieces of stream registration information 4120 and is the same as the STN of the piece of stream registration information, located in the corresponding PI, with which the piece of stream registration information 4120 is combined. The stream entry 4122 includes sub-path ID reference information (ref_to_Subpath_id) 4131, stream file reference information (ref_to_subClip_entry_id) 4132, and a PID (ref_to_stream_PID_subclip) 4133. The sub-path ID reference information 4131 indicates the sub-path ID of the sub-path that specifies the playback path of the dependent-view video stream. The stream file reference information 4132 is information to identify the file DEP storing this dependent-view video stream. The PID 4133 is the PID for this dependent-view video stream. The stream attribute information 4123 includes attributes the dependent-view video stream, such as frame rate, resolution, and video format. In particular, these attributes are the same as those for the base-view video stream shown by the piece of stream registration information, located in the corresponding PI, with which each piece of stream registration information is combined.

The stream registration information sequence 4113 of the PG stream generally includes a plurality of pieces of stream registration information 4140. These are the same in number as the pieces of stream registration information in the corresponding PI that indicate the PG stream. Each piece of stream registration information 4140 includes an STN 4141, stereoscopic flag (is_SS_PG) 4142, base-view stream entry (stream_entry_for_base_view) 4143, dependent-view stream entry (stream_entry_for_dependent_view) 4144, and stream attribute information 4145. The STN 4141 is a serial number assigned individually to pieces of stream registration information 4140 and is the same as the STN of the piece of stream registration information, located in the corresponding PI, with which the piece of stream registration information 4140 is combined. The stereoscopic flag 4142 indicates whether both base-view and dependent-view (for example, left-view and right-view) PG streams are recorded on a BD-ROM disc 101. If the stereoscopic flag 4142 is on, both PG streams are included in the sub-TS. Accordingly, the playback device 102 reads all of the fields in the base-view stream entry 4143, the dependent-view stream entry 4144, and the stream attribute information 4145. If the stereoscopic flag 4142 is off, the playback device 102 ignores all of these fields 4143-4145. Both the base-view stream entry 4143 and the dependent-view stream entry 4144 include sub-path ID reference information 4151, stream file reference information 4152, and PIDs 4053. The sub-path ID reference information 4151 indicates the sub-path IDs of the sub-paths that specify the playback paths of the base-view and dependent-view PG streams. The stream file reference information 4152 is information to identify the file DEP storing the PG streams. The PIDs 4153 are the PIDs for the PG streams. The stream attribute information 4145 includes attributes for the PG streams, such as language type. The stream registration information sequence 4114 of the IG stream has the same data structure.

[Playback of 3D Video Images in Accordance With a 3D Playlist File]

Figure 42:
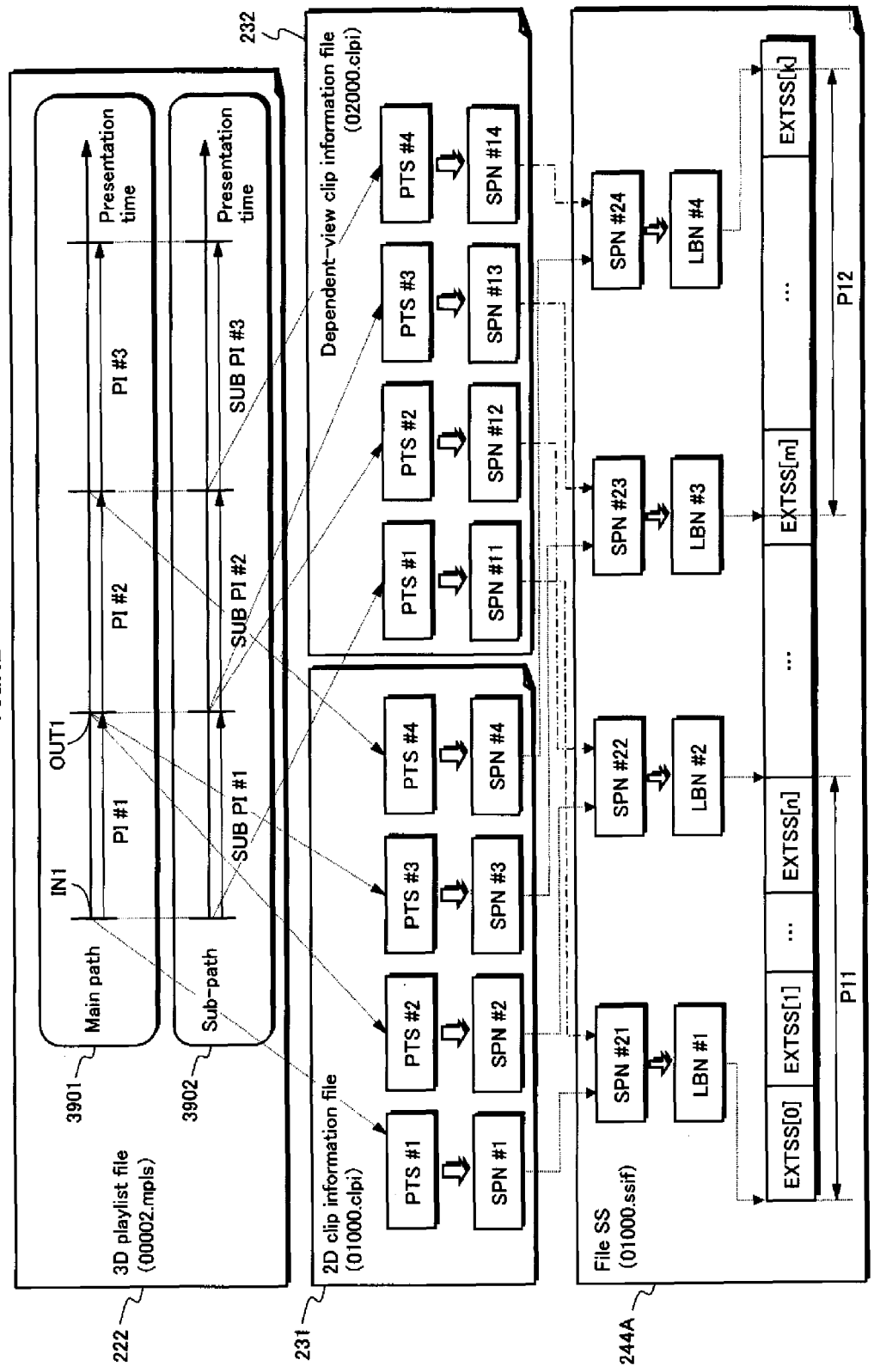
FIG. 42 is a schematic diagram showing correspondence between PTSs indicated by the 3D playlist file (00002.mpls) 222 shown in FIG. 39 and sections played back from the first file SS (01000.ssif) 244A shown in FIG. 39.

FIG. 42 is a schematic diagram showing correspondence between PTSs indicated by the 3D playlist file (00002.mpls) 222 and sections played back from the first file SS (01000.ssif) 244A. As shown in FIG. 42, in the main path 3901 in the 3D playlist file 222, the PI #1 specifies a PTS #1, which indicates a playback start time IN1, and a PTS #2, which indicates a playback end time OUT1. The reference clip information for the PI #1 indicates the 2D clip information file (01000.clpi) 231. In the sub-path 3902, the SUB_PI #1 specifies the same PTS #1 and PTS #2 as the PI #1. The reference clip information for the SUB_PI #1 indicates the dependent-view clip information file (02000.clpi) 232.

When playing back 3D video images in accordance with the 3D playlist file 222, the playback device 102 first reads PTS #1 and PTS #2 from the PI #1 and SUB_PI #1. Next, the playback device 102 refers to the entry map in the 2D clip information file 231 to retrieve from the file 2D 241 the SPN #1 and SPN #2 that correspond to the PTS #1 and PTS #2. In parallel, the playback device 102 refers to the entry map in the dependent-view clip information file 232 to retrieve from the first file DEP 242 the SPN #11 and SPN #12 that correspond to the PTS #1 and PTS #2. As described with reference to FIG. 32E, the playback device 102 then uses the extent start points 3042 and 3220 in the clip information files 231 and 232 to calculate, from SPN #1 and SPN #11, the number of source packets SPN #21 from the top of the first file SS 244A to the playback start position. Similarly, the playback device 102 calculates, from SPN #2 and SPN #12, the number of source packets SPN #22 from the top of the first file SS 244A to the playback end position. The playback device 102 further calculates the numbers of sectors corresponding to the SPN #21 and SPN #22. Next, the playback device 102 refers to these numbers of sectors and the file entry of the first file SS 244A to specify the LBN #1 and LBN #2 at the beginning and end, respectively, of the sector group P11 on which the extent SS group EXTSS[0], . . . , EXTSS[n] to be played back is recorded. Calculation of the numbers of sectors and specification of the LBNs are as per the description of FIG. 32E. Finally, the playback device 102 indicates the range from LBN #1 to LBN #2 to the BD-ROM drive 121. The source packet group belonging to the extent SS group EXTSS[0], . . . , EXTSS[n] is thus read from the sector group P11 in this range. Similarly, the pair PTS #3 and PTS #4 indicated by the PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 from the top of the first file SS 244A to the playback start position is calculated from SPN #3 and SPN #13, and the number of source packets SPN #24 from the top of the first file SS 244A to the playback end position is calculated from SPN #4 and SPN #14. Next, referring to the file entry for the first file SS 244A, the pair of SPN #23 and SPN #24 are converted into a pair of LBN #3 and LBN #4. Furthermore, a source packet group belonging to the extent SS group is read from the sector group P12 in a range from the LBN #3 to the LBN #4.

In parallel with the above-described read processing, as described with reference to FIG. 32E, the playback device 102 refers to the extent start points 3042 and 3220 in the clip information files 231 and 232 to extract base-view extents and dependent-view extents from each extent SS and decode the extents in parallel. The playback device 102 can thus play back 3D video images from the first file SS 244A in accordance with the 3D playlist file 222.

<<Index File>>

Figure 43:
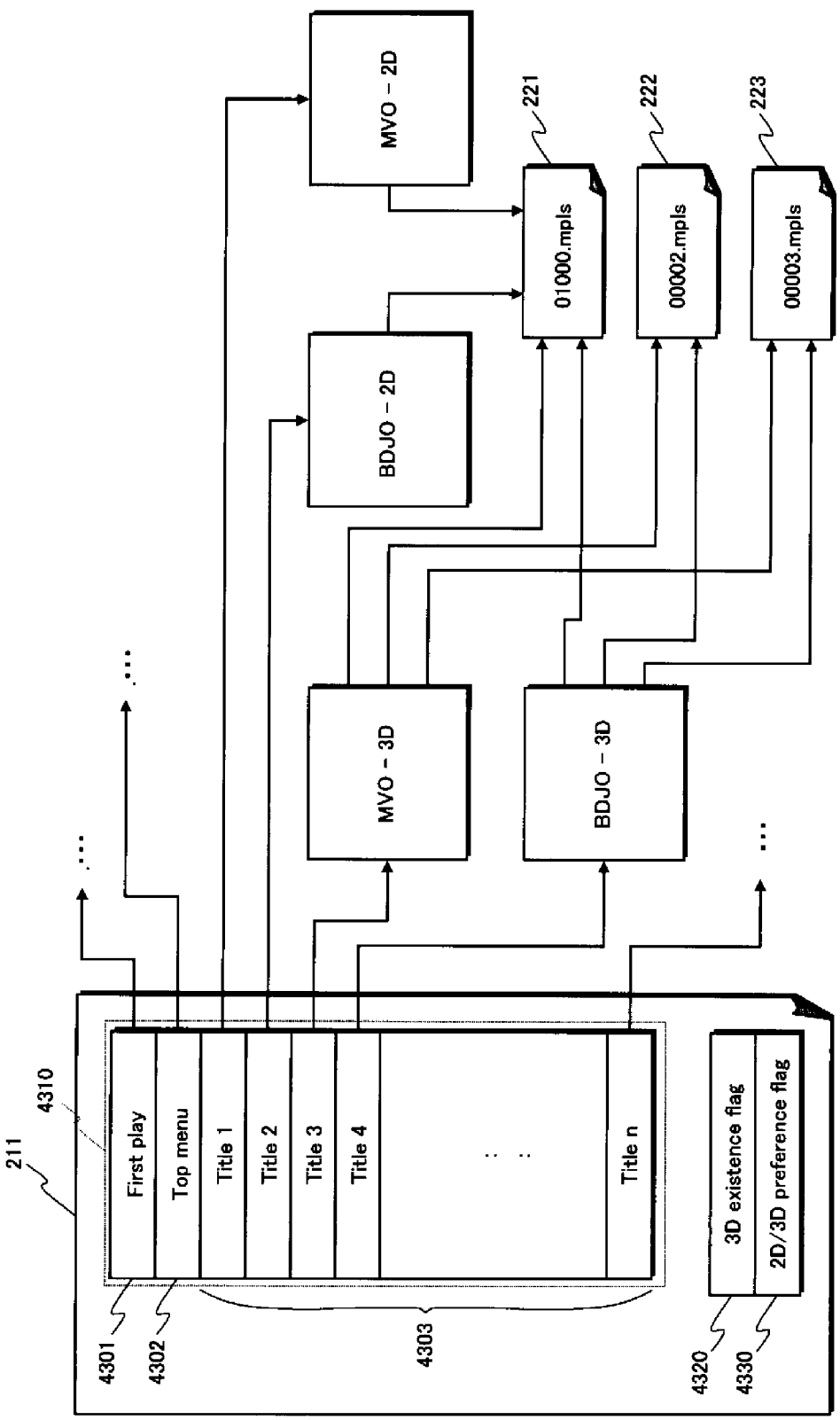
FIG. 43 is a schematic diagram showing a data structure of the index file (index.bdmv) 211 shown in FIG. 2.

FIG. 43 is a schematic diagram showing a data structure of an index file (index.bdmv) 211 shown in FIG. 2. As shown in FIG. 43, the index file 211 includes an index table 4310, 3D existence flag 4320, and 2D/3D preference flag 4330.

The index table 4310 stores the items "first play" 4301, "top menu" 4302, and "title k" 4303 (k=1, 2, . . . , n, the letter n representing an integer greater than or equal to 1). Each item is associated with either a movie object MVO-2D, MVO-3D, . . . , or a BD-J object BDJO-2D, BDJO-3D, . . . . Each time a title or a menu is called in response to a user operation or an application program, a control unit in the playback device 102 refers to a corresponding item in the index table 4310. Furthermore, the control unit calls an object associated with the item from the BD-ROM disc 101 and accordingly executes a variety of processes. Specifically, the item "first play" 4301 specifies an object to be called when the BD-ROM disc 101 is loaded into the BD-ROM drive 121. The item "top menu" 4302 specifies an object for displaying a menu on the display device 103 when, for example, a command "go back to menu" is input by user operation. In the items "title k" 4303, the titles that constitute the content on the BD-ROM disc 101 are individually allocated. For example, when a title for playback is specified by user operation, in the item "title k" in which the title is allocated, the object for playing back video images from the AV stream file corresponding to the title is specified.

In the example shown in FIG. 43, the items "title 1" and "title 2" are allocated to titles of 2D video images. The movie object associated with the item "title 1", MVO-2D, includes a group of commands related to playback processes for 2D video images using the 2D playlist file (00001.mpls) 221. When the playback device 102 refers to the item "title 1", then in accordance with the movie object MVO-2D, the 2D playlist file 221 is read from the BD-ROM disc 101, and playback processes for 2D video images are executed in accordance with the playback path specified therein. The BD-J object associated with the item "title 2", BDJO-2D, includes an application management table related to playback processes for 2D video images using the 2D playlist file 221. When the playback device 102 refers to the item "title 2", then in accordance with the application management table in the BD-J object BDJO-2D, a Java application program is called from the JAR file 261 and executed. In this way, the 2D playlist file 221 is read from the BD-ROM disc 101, and playback processes for 2D video images are executed in accordance with the playback path specified therein.

Furthermore, in the example shown in FIG. 43, the items "title 3" and "title 4" are allocated to titles of 3D video images. The movie object associated with the item "title 3", MVO-3D, includes, in addition to a group of commands related to playback processes for 2D video images using the 2D playlist file 221, a group of commands related to playback processes for 3D video images using either 3D playlist file (00002.mpls) 222 or (00003.mpls) 223. In the BD-J object associated with the item "title 4", BDJO-3D, the application management table specifies, in addition to a Java application program related to playback processes for 2D video images using the 2D playlist file 221, a Java application program related to playback processes for 3D video images using either 3D playlist file 222 or 223.

The 3D existence flag 4320 shows whether or not 3D video image content is recorded on the BD-ROM disc 101. When the BD-ROM disc 101 is inserted into the BD-ROM drive 121, the playback device 102 first checks the 3D existence flag 4320. When the 3D existence flag 4320 is off, the playback device 102 does not need to select 3D playback mode. Accordingly, the playback device 102 can rapidly proceed in 2D playback mode without performing HDMI authentication on the display device 103. "HDMI authentication" refers to the following processing: the playback device 102 exchanges CEC messages with the display device 103 via the HDMI cable 122 to check with the display device 103 as to whether it supports playback of 3D video images. By skipping HDMI authentication, the time between insertion of the BD-ROM disc 101 and the start of playback of 2D video images is shortened.

The 2D/3D preference flag 4330 indicates whether playback of 3D video images should be prioritized when both the playback device and the display device support playback of both 2D video images and 3D video images. The 2D/3D preference flag 4330 is set by the content provider. When the 3D existence flag 4320 in the BD-ROM disc 101 is on, the playback device 102 then additionally checks the 2D/3D preference flag 4330. When the 2D/3D preference flag 4330 is on, the playback device 102 does not make the user select the playback mode, but rather performs HDMI authentication. Based on the results thereof, the playback device 102 operates in either 2D playback mode or 3D playback mode. That is, the playback device 102 does not display a playback mode selection screen. Accordingly, if the results of HDMI authentication indicate that the display device 103 supports playback of 3D video images, the playback device 102 operates in 3D playback mode. This makes it possible to avoid delays in starting up caused by processing to switch from 2D playback mode to 3D playback mode, such as switching frame rates, etc.

[Selection of Playlist File When Selecting a 3D Video Title]

In the example shown in FIG. 43, when the playback device 102 refers to item "title 3" in the index table 4310, the following determination processes are performed in accordance with the movie object MVO-3D: (1) Is the 3D existence flag 4320 on or off? (2) Does the playback device 102 itself support playback of 3D video images? (3) Is the 2D/3D preference flag 4330 on or off? (4) Has the user selected 3D playback mode? (5) Does the display device 103 support playback of 3D video images? and (6) Is the 3D playback mode of the playback device 102 in L/R mode or depth mode? Next, in accordance with the results of these determinations, the playback device 102 selects one of the playlist files 221-223 for playback. On the other hand, when the playback device 102 refers to item "title 4", a Java application program is called from the JAR file 261, in accordance with the application management table in the BD-J object BDJO-3D, and executed. The above-described determination processes (1)-(6) are thus performed, and a playlist file is then selected in accordance with the results of determination.

Figure 44:
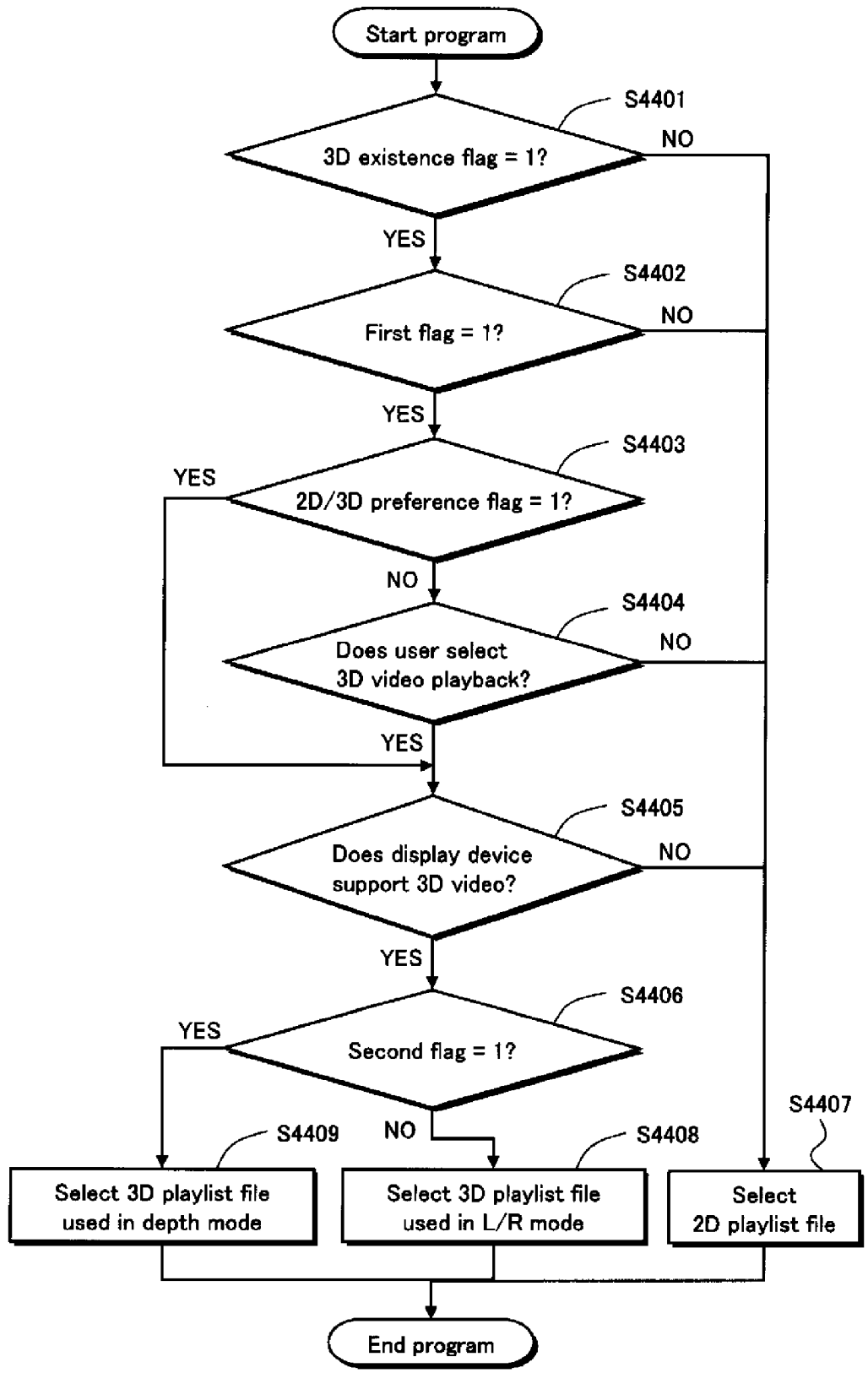
FIG. 44 is a flowchart of processing by the playback device 102 to select, by referring to "title 3" in the index table 4310 shown in FIG. 43, a playlist file for playback based on six determination processes, (1)-(6)

FIG. 44 is a flowchart of selection processing for a playlist file to be played back using the above determination processes (1)-(6). For this selection processing, it is assumed that the playback device 102 includes a first flag and a second flag. The first flag indicates whether the playback device 102 supports playback of 3D video images. For example, a value of "0" for the first flag indicates that the playback device 102 only supports playback of 2D video images, whereas "1" indicates support of 3D video images as well. The second flag indicates whether the 3D playback mode is L/R mode or depth mode. For example, a value of "0" for the second flag indicates that the 3D playback mode is L/R mode, whereas "1" indicates depth mode. Furthermore, the respective values of the 3D existence flag 4320 and 2D/3D preference flag 4330 are set to "1" when these flags are on, and to "0" when these flags are off.

In step S4401, the playback device 102 checks the value of the 3D existence flag 4320. If the value is "1", processing proceeds to step S4402. If the value is "0", processing proceeds to step S4407.

In step S4402, the playback device 102 checks the value of the first flag. If the value is "1", processing proceeds to step S4403. If the value is "0", processing proceeds to step S4407.

In step S4403, the playback device 102 checks the value of the 2D/3D preference flag 4330. If the value is "0", processing proceeds to step S4404. If the value is "1", processing proceeds to step S4405.

In step S4404, the playback device 102 displays a menu on the display device 103 for the user to select either 2D playback mode or 3D playback mode. If the user selects 3D playback mode via operation of a remote control 105 or the like, processing proceeds to step S4405, whereas if the user selects 2D playback mode, processing proceeds to step S4407.

In step S4405, the playback device 102 perform HDMI authentication to check whether the display device 103 supports playback of 3D video images. Specifically, the playback device 102 exchanges CEC messages with the display device 103 via the HDMI cable 122 to check with the display device 103 as to whether it supports playback of 3D video images. If the display device 103 does support playback of 3D video images, processing proceeds to step S4406. If the display device 103 does not support playback of 3D video images, processing proceeds to step S4407.

In step S4406, the playback device 102 checks the value of the second flag. If the value is "0", processing proceeds to step S4408. If the value is "1", processing proceeds to step S4409.

In step S4407, the playback device 102 selects for playback the 2D playlist file 221. Note that, at this time, the playback device 102 may cause the display device 103 to display the reason why playback of 3D video images was not selected. Processing then terminates.

In step S4408, the playback device 102 selects for playback the 3D playlist file 222 used in L/R mode. Processing then terminates.

In step S4409, the playback device 102 selects for playback the 3D playlist file 222 used in depth mode. Processing then terminates.

<Structure of 2D Playback Device>

Figure 45:
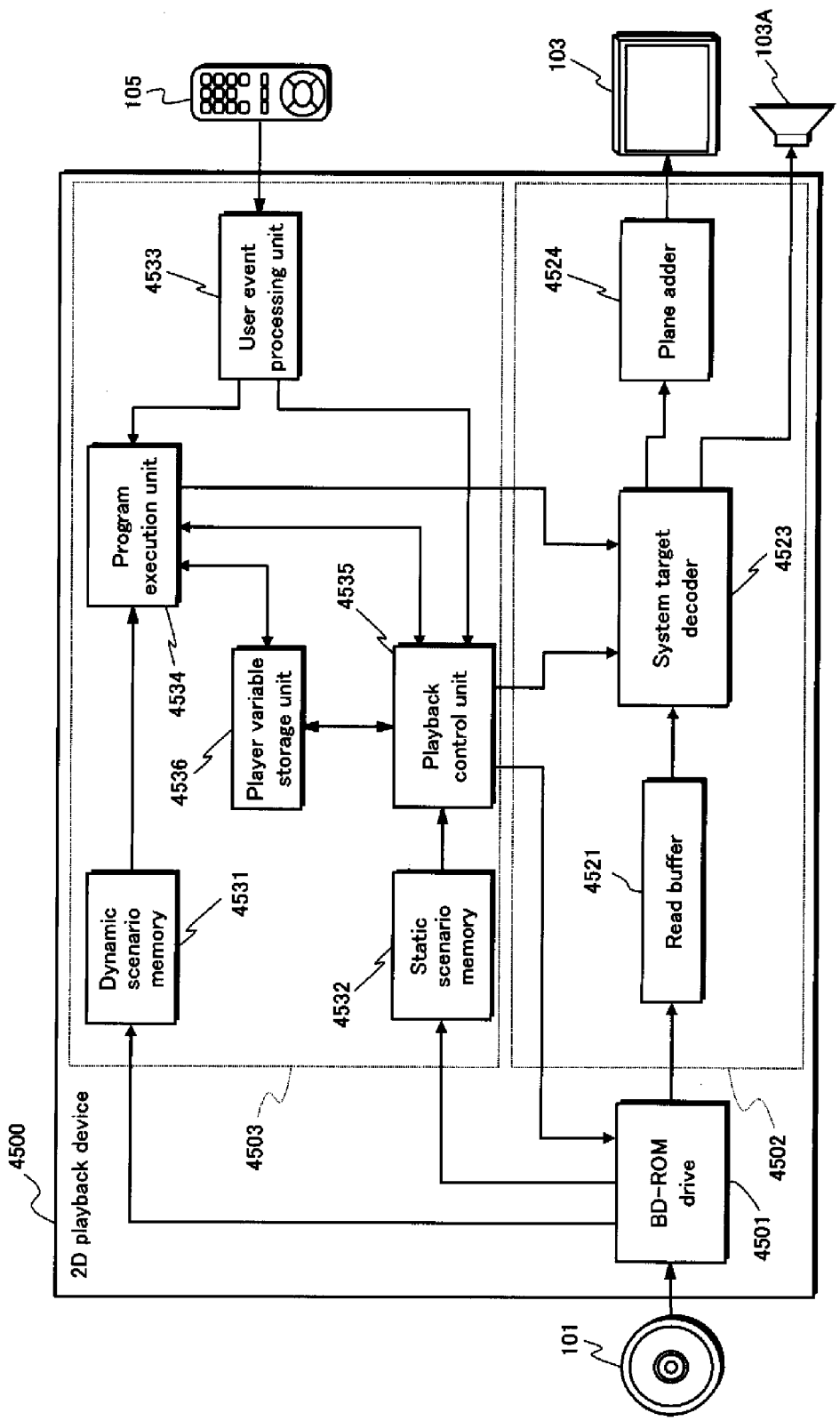
FIG. 45 is a functional block diagram of a 2D playback device 4500.

When playing back 2D video image content from the BD-ROM disc 101 in 2D playback mode, the playback device 102 operates as a 2D playback device. FIG. 45 is a functional block diagram of a 2D playback device 4500. As shown in FIG. 45, the 2D playback device 4500 includes a BD-ROM drive 4501, playback unit 4502, and control unit 4503. The playback unit 4502 includes a read buffer 4521, system target decoder 4523, and plane adder 4524. The control unit 4503 includes a dynamic scenario memory 4531, static scenario memory 4532, user event processing unit 4533, program execution unit 4534, playback control unit 4535, and player variable storage unit 4536. The playback unit 4502 and the control unit 4503 are each implemented on a different integrated circuit, but may alternatively be implemented on a single integrated circuit.

When the BD-ROM disc 101 is loaded into the BD-ROM drive 4501, the BD-ROM drive 3701 radiates laser light to the disc 101 and detects change in the reflected light. Furthermore, using the change in the amount of reflected light, the BD-ROM drive 3701 reads data recorded on the disc 101. Specifically, the BD-ROM drive 4501 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 4501 reads data from the BD-ROM disc 101 based on a request from the playback control unit 4535. Out of the read data, the extents in the file 2D, i.e. the 2D extents, are transferred to the read buffer 4521; dynamic scenario information is transferred to the dynamic scenario memory 4531; and static scenario information is transferred to the static scenario memory 4532. "Dynamic scenario information" includes an index file, movie object file, and BD-J object file. "Static scenario information" includes a 2D playlist file and a 2D clip information file.

The read buffer 4521, dynamic scenario memory 4531, and static scenario memory 4532 are each a buffer memory. A memory element in the playback unit 4502 is used as the read buffer 4521, and memory elements in the control unit 4403 are used as the dynamic scenario memory 4531 and the static scenario memory 4532. Alternatively, different areas in a single memory element may be used as part or all of these buffer memories 4521, 4531, and 4532. The read buffer 4521 stores 2D extents, the dynamic scenario memory 4531 stores dynamic scenario information, and the static scenario memory 4532 stores static scenario information.

The system target decoder 4523 reads 2D extents from the read buffer 4521 in units of source packets and demultiplexes the 2D extents. The system target decoder 4523 then decodes each of the elementary streams obtained by the demultiplexing. At this point, information necessary for decoding each elementary stream, such as the type of codec and attributes of the stream, is transferred from the playback control unit 4535 to the system target decoder 4523. The system target decoder 4523 converts the VAUs in the decoded primary video stream, secondary video stream, IG stream, and PG stream into a primary video plane, secondary video plane, IG plane, and PG plane, and outputs the planes to the plane adder 4524. On the other hand, the system target decoder 4523 mixes the decoded primary audio stream and secondary audio stream and transmits the resultant data to an audio output device, such as an internal speaker 103A of the display device 103. In addition, the system target decoder 4523 receives graphics data from the program execution unit 4534. The graphics data is used for rendering graphics on the screen for a GUI menu or the like and is in a raster data format such as JPEG or PNG. The system target decoder 4523 processes the graphics data for conversion to an image plane and outputs the image plane to the plane adder 4524. Details on the system target decoder 4523 are provided below.

The plane adder 4524 reads the primary video plane, secondary video plane, IG plane, PG plane, and image plane from the system target decoder 4523 and superimposes these pieces of plane data to generate one combined video frame or field. The combined video data is transferred to the display device 103 for display on the screen.

The user event processing unit 4533 detects a user operation via the remote control 105 or the front panel of the playback device 102. Based on the type of operation, the user event processing unit 4533 requests the program execution unit 4534 or the playback control unit 4535 to perform processing. For example, when a user instructs to display a pop-up menu by pushing a button on the remote control 105, the user event processing unit 4533 detects the push and identifies the button. The user event processing unit 4533 further requests the program execution unit 4534 to execute a command corresponding to the button, i.e. a command to display the pop-up menu. On the other hand, when a user pushes a fast-forward or a rewind button on the remote control 105, the user event processing unit 4533 detects the push and identifies the button. The user event processing unit 4533 then requests the playback control unit 4535 to fast-forward or rewind the playlist currently being played back.

The program execution unit 4534 is a processor that reads programs from movie object files and BD-J object files stored in the dynamic scenario memory 4531 and executes these programs. Furthermore, the program execution unit 4534 performs the following operations in accordance with the programs: (1) The program execution unit 4534 orders the playback control unit 4535 to perform playlist playback processing. (2) The program execution unit 4534 generates graphics data for a menu or game as PNG or JPEG raster data and transfers the generated data to the system target decoder 4523 to be combined with other video data. Via program design, specific details on these processes can be designed relatively flexibly. In other words, during the authoring process of the BD-ROM disc 101, the nature of these processes is determined while programming the movie object files and BD-J object files.

The playback control unit 4535 controls transfer of different types of data, such as 2D extents, an index file, etc. from the BD-ROM disc 101 to the read buffer 4521, dynamic scenario memory 4531, and static scenario memory 4532. A file system managing the directory file structure shown in FIG. 2 is used for this control. That is, the playback control unit 4535 causes the BD-ROM drive 4501 to transfer the files to each of the buffer memories 4521, 4531, and 4532 using a system call for opening files. The "file opening" is composed of a sequence of the following processes. First, a file name to be detected is provided to the file system by a system call, and an attempt is made to detect the file name from the directory/file structure. When the detection is successful, the file entry for the target file to be transferred is first transferred to memory in the playback control unit 4535, and a File Control Block (FCB) is generated in the memory. Subsequently, a file handle for the target file is returned from the file system to the playback control unit 4535. Afterwards, the playback control unit 4435 can cause the BD-ROM drive 4501 to transfer the target file from the BD-ROM disc 101 to each of the buffer memories 4521, 4531, and 4532 by showing the file handle to the BD-ROM drive 4501.

The playback control unit 4535 decodes the file 2D to output video data and audio data by controlling the BD-ROM drive 4501 and the system target decoder 4523. Specifically, the playback control unit 4535 first reads a 2D playlist file from the static scenario memory 4532, in response to an instruction from the program execution unit 4534 or a request from the user event processing unit 4533, and interprets the content of the file. In accordance with the interpreted content, particularly with the playback path, the playback control unit 4535 then specifies a file 2D to be played back and instructs the BD-ROM drive 4501 and the system target decoder 4523 to read and decode this file. Such playback processing based on a playlist file is called "playlist playback processing".

In addition, the playback control unit 4535 sets various types of player variables in the player variable storage unit 4536 using the static scenario information. With reference to the player variables, the playback control unit 4535 further specifies to the system target decoder 4523 elementary streams to be decoded and provides the information necessary for decoding the elementary streams.

The player variable storage unit 4536 is composed of a group of registers for storing player variables. Types of player variables include system parameters (SPRM) and general parameters (GPRM). An SPRM indicates the status of the playback device 102. FIG. 46 is a list of SPRMs. As shown in FIG. 46, each SPRM is assigned a serial number 4601, and each serial number 4601 is associated with a unique variable value 4602. There may, for example, be 64 SPRMs that have the meanings listed below. The numbers in parentheses indicate the serial numbers 4601.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24)-SPRM(63): Reserved The SPRM(10) indicates the PTS of the picture currently being decoded and is updated every time a picture is decoded and written into the primary video plane memory. Accordingly, the current playback point can be known by referring to the SPRM(10).

The parental level in SPRM(13) indicates a predetermined restricted age and is used for parental control of viewing of titles recorded on the BD-ROM disc 101. A user of the playback device 102 sets the value of the SPRM(13) via, for example, an OSD of the playback device 102. "Parental control" refers to restricting viewing of a title in accordance with the viewer's age. The following is an example of how the playback device 102 performs parental control. The playback device 102 first reads, from the BD-ROM disc 101, the lower limit of the age for which viewing of a title is permitted and compares the lower limit with the value of the SPRM(13). If the lower limit is equal to or less than the value of the SPRM (13), the playback device 102 continues with playback of the title. If the lower limit is greater than the value of the SPRM (13), the playback device 102 stops playback of the title.

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 4434. For example, if the SPRM(16) shows "English", then during playback processing of a playlist, the playback control unit 4535 first searches the STN table in the PI showing the current playback section, i.e. the current PI, for a stream entry having the language code for "English". The playback control unit 4535 then extracts the PID from the stream identification information of the stream entry and transmits the extracted PID to the system target decoder 4523. As a result, an audio stream having the PID is selected and decoded by the system target decoder 4523. These processes can be executed by the playback control unit 4535 with use of the movie object file or the BD-J object file.

During playback processing, the playback control unit 4535 updates the player variables in accordance with the status of playback. The playback control unit 3735 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 4534. In this case, the playback control unit 4535 first refers to the STN shown by the new SPRM(1) and retrieves the stream entry that includes this STN from the STN table in the current PI. The playback control unit 4535 then extracts the PID from the stream identification information of the stream entry and transmits the extracted PID to the system target decoder 4523. As a result, an audio stream having the PID is selected and decoded by the system target decoder 4523. This is how the audio stream to be played back is switched. The subtitle stream and the secondary video stream to be played back can be similarly switched.

<<2D Playlist Playback Processing>>

Figure 47:
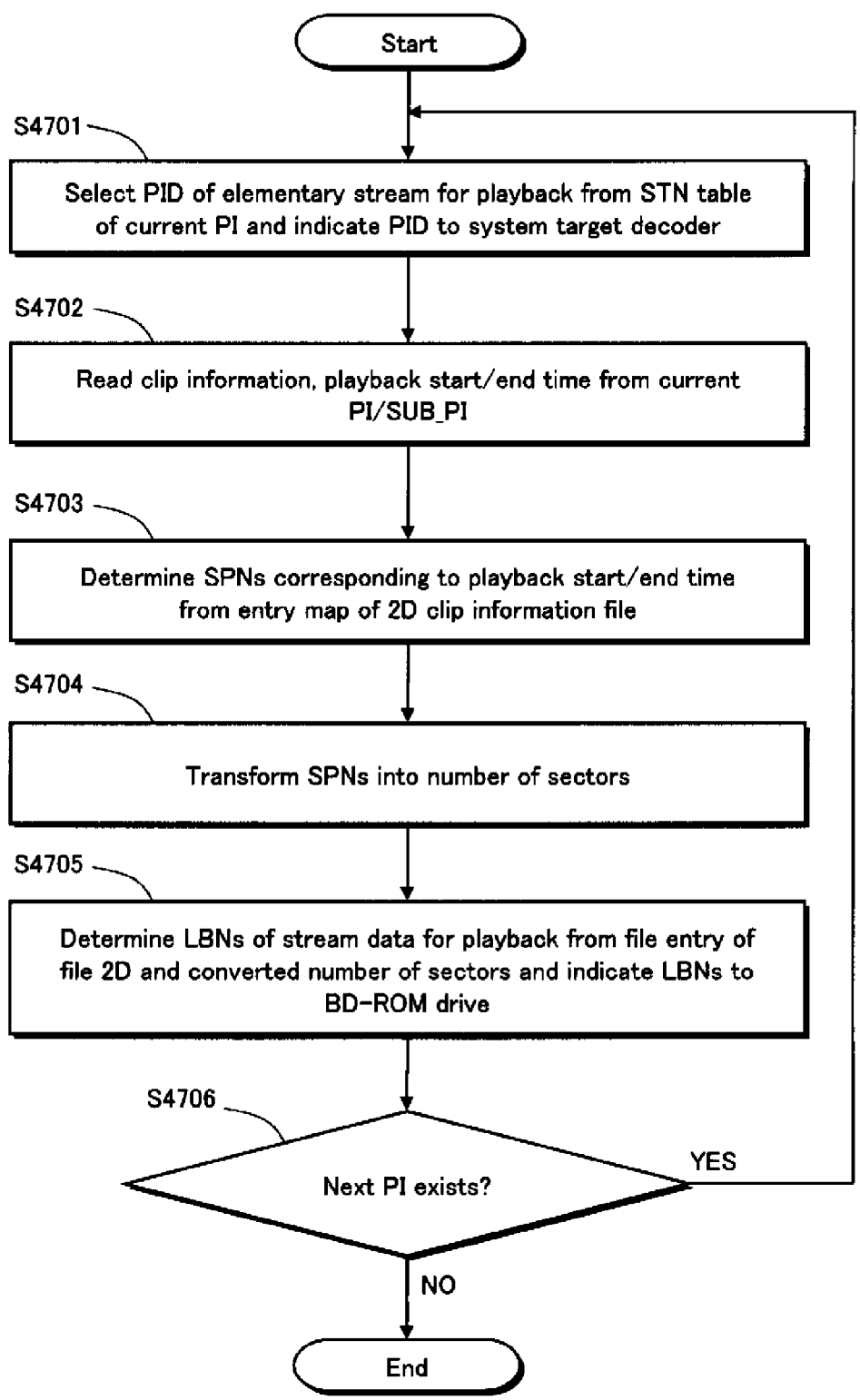
FIG. 47 is a flowchart of 2D playlist playback processing by the playback control unit 4535 shown in FIG. 45.

FIG. 47 is a flowchart of 2D playlist playback processing by a playback control unit 4535. 2D playlist playback processing is performed according to a 2D playlist file and is started by the playback control unit 4535 reading a 2D playlist file from the static scenario memory 4532.

In step S4701, the playback control unit 4535 first reads a single PI from a main path in the 2D playlist file and then sets the PI as the current PI. Next, from the STN table of the current PI, the playback control unit 4535 selects PIDs of elementary streams to be played back and specifies attribute information necessary for decoding the elementary streams. The selected PIDs and attribute information are indicated to the system target decoder 4523. The playback control unit 4535 further specifies a SUB_PI associated with the current PI from the sub-paths in the 2D playlist file. Thereafter, processing proceeds to step S4702.

In step S4702, the playback control unit 4535 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, processing proceeds to step S4703.

In step S4703, with reference to the entry map of the 2D clip information file, the playback control unit 4535 retrieves the SPN #1 and the SPN #2 in the file 2D corresponding to the PTS #1 and the PTS #2. The pair of PTSs indicated by the SUB_PI is also converted to a pair of SPNs. Thereafter, processing proceeds to step S4704.

In step S4704, from the SPN #1 and the SPN #2, the playback control unit 4535 calculates a number of sectors corresponding to the SPN #1 and the SPN #2. Specifically, the playback control unit 4535 first obtains the product of each of the SPN #1 and the SPN #2 multiplied by the data amount per source packet, i.e. 192 bytes. Next, the playback control unit 4535 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, processing proceeds to step S4705.

In step S4705, the playback control unit 4535 specifies, from the numbers of sectors N1 and N2 obtained in step S4704, LBNs of the top and end of the 2D extent group to be played back. Specifically, with reference to the file entry of the file 2D to be played back, the playback control unit 4535 counts from the top of the sector group in which the 2D extent group is recorded so that the LBN of the $(N1+1)^{th}$ sector=LBN #1, and the LBN of the $(N2+1)^{th}$ sector=LBN #2. The playback control unit 4535 further specifies a range from the LBN#1 to the LBN#2 to the BD-ROM drive 4501. The pair of numbers of sectors converted from the pair of PTSs indicated by the SUB_PI is similarly converted to a pair of LBNs and specified to the BD-ROM drive 4501. As a result, from the sector group in the specified range, a source packet group belonging to a 2D extent group is read in aligned units. Thereafter, processing proceeds to step S4706.

In step S4706, the playback control unit 4535 checks whether an unprocessed PI remains in the main path. When an unprocessed PI remains, processing is repeated from step S4701. When no unprocessed PI remains, processing ends.

<<System Target Decoder>>

Figure 48:
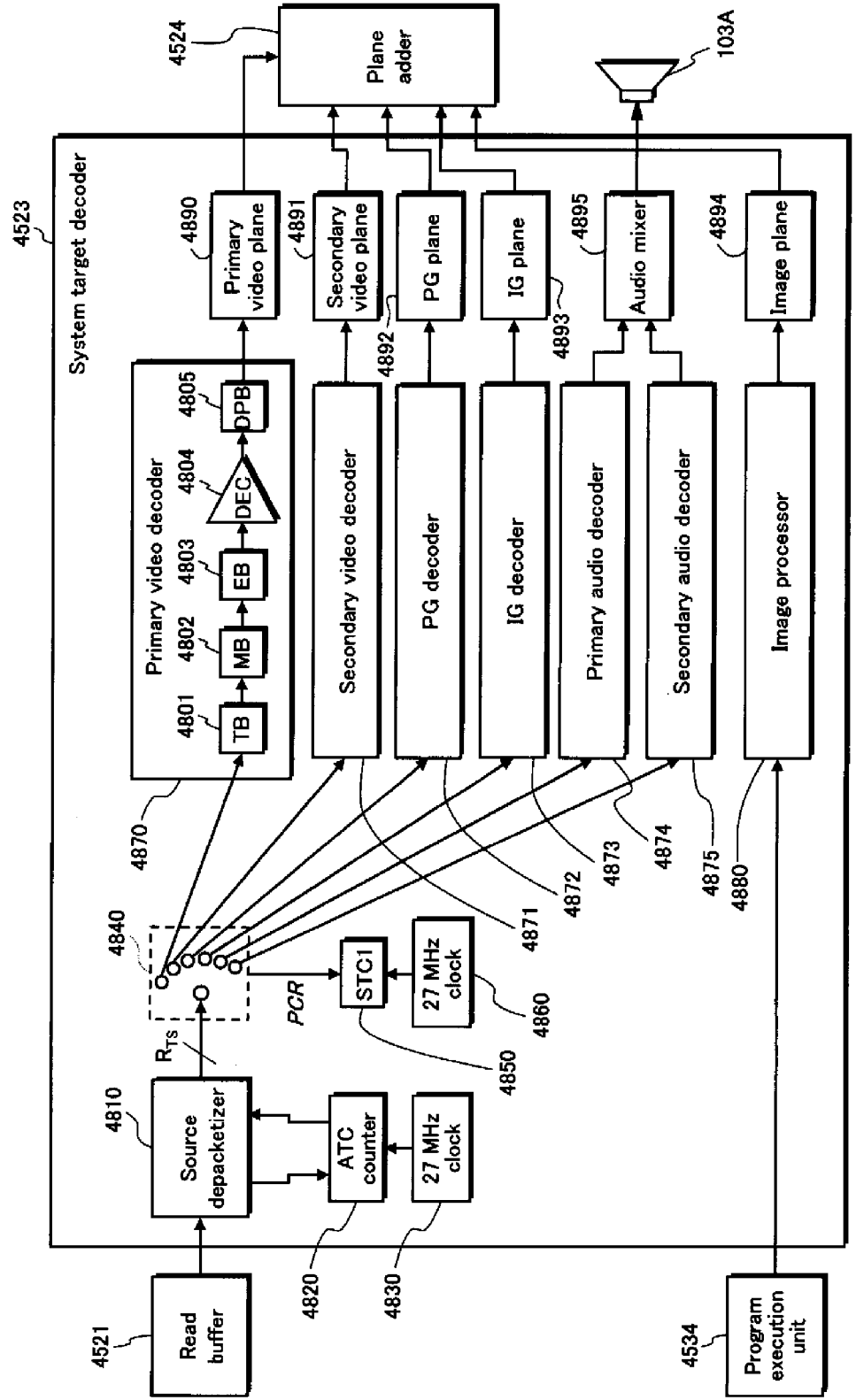
FIG. 48 is a functional block diagram of a system target decoder 4523 shown in FIG. 45.

FIG. 48 is a functional block diagram of a system target decoder 4523. As shown in FIG. 48, the system target decoder 4523 includes a source depacketizer 4810, ATC counter 4820, first 27 MHz clock 4830, PID filter 4840, STC counter (STC1) 4850, second 27 MHz clock 4860, primary video decoder 4870, secondary video decoder 4871, PG decoder 4872, IG decoder 4873, primary audio decoder 4874, secondary audio decoder 4875, image processor 4880, primary video plane memory 4890, secondary video plane memory 4891, PG plane memory 4892, IG plane memory 4893, image plane memory 4894, and audio mixer 4895.

The source depacketizer 4810 reads source packets from the read buffer 4521, extracts the TS packets from the read source packets, and transfers the TS packets to the PID filter 4840. Furthermore, the source depacketizer 4810 synchronizes the time of the transfer with the time shown by the ATS of each source packet. Specifically, the source depacketizer 4810 first monitors the value of the ATC generated by the ATC counter 4820. In this case, the value of the ATC depends on the ATC counter 4820 and is incremented in accordance with a pulse of a clock signal from the first 27 MHz clock 4830. Subsequently, at the instant the value of the ATC matches the ATS of a source packet, the source depacketizer 4810 transfers the TS packets extracted from the source packet to the PID filter 4840. By adjusting the time of transfer in this way, the mean transfer rate of TS packets from the source depacketizer 4810 to the PID filter 4840 does not surpass the value $R_{TS}$ specified by the system rate 3011 in the 2D clip information file 231 shown in FIG. 30.

The PID filter 4840 first monitors a PID that includes each TS packet outputted by the source depacketizer 4810. When the PID matches a PID pre-specified by the playback control unit 4535, the PID filter 4840 selects the TS packet and transfers it to the decoder 4870-4875 appropriate for decoding of the elementary stream indicated by the PID. For example, if a PID is 0x1011, the TS packets are transferred to the primary video decoder 4870. TS packets with PIDs ranging from 0x1B00-0x1B1F, 0x1100-0x111F, 0x1A00-0x1A1F, 0x1200-0x121F, and 0x1400-0x141F are transferred to the secondary video decoder 4871, primary audio decoder 4874, secondary audio decoder 4875, PG decoder 4872, and IG decoder 4873, respectively.

The PID filter 4840 further detects a PCR from TS packets using the PIDs of the TS packets. At each detection, the PID filter 4840 sets the value of the STC counter 4850 to a predetermined value. Then, the value of the STC counter 4850 is incremented in accordance with a pulse of the clock signal of the second 27 MHz clock 4860. In addition, the value to which the STC counter 4850 is set is indicated to the PID filter 4840 from the playback control unit 4535 in advance. The decoders 4870-4875 each use the value of the STC counter 4850 as the STC. Specifically, the decoders 4870-4875 first reconstruct the TS packets received from the PID filter 4840 into PES packets. Next, the decoders 4870-4875 adjust the timing of the decoding of data included in the PES payloads in accordance with the times indicated by the PTSs or the DTSs included in the PES headers.

The primary video decoder 4870, as shown in FIG. 48, includes a transport stream buffer (TB) 4801, multiplexing buffer (MB) 4802, elementary stream buffer (EB) 4803, compressed video decoder (DEC) 4804, and decoded picture buffer (DPB) 4805.

The TB 4801, MB 4802, and EB 4803 are each a buffer memory and use an area of a memory element internally provided in the primary video decoder 4870. Alternatively, some or all of the buffer memories may be separated in discrete memory elements. The TB 4801 stores the TS packets received from the PID filter 4840 as they are. The MB 4802 stores PES packets reconstructed from the TS packets stored in the TB 4801. Note that when the TS packets are transferred from the TB 4801 to the MB 4802, the TS header is removed from each TS packet. The EB 4803 extracts encoded VAUs from the PES packets and stores the VAUs therein. A VAU includes a compressed picture, i.e., an I picture, B picture, or P picture. Note that when data is transferred from the MB 4802 to the EB 4803, the PES header is removed from each PES packet.

The DEC 4804 is a hardware decoder specifically for decoding of compressed pictures and is composed of an LSI that includes, in particular, a function to accelerate the decoding. The DEC 4804 decodes a picture from each VAU in the EB 4803 at the time shown by the DTS included in the original PES packet. During decoding, the DEC 4804 first analyzes the VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4804 transmits the decoded, uncompressed picture to the DPB 4805.

Like the TB 4801, MB 4802, and EB 4803, the DPB 4805 is a buffer memory that uses an area of a built-in memory element in the primary video decoder 4870. Alternatively, the DPB 4805 may be located in a memory element separate from the other buffer memories 4801, 4802, and 4803. The DPB 4805 temporarily stores the decoded pictures. When a P picture or B picture is to be decoded by the DEC 4804, the DPB 4805 retrieves reference pictures, in response to an instruction from the DEC 4804, from among stored, decoded pictures. The DPB 4005 then provides the reference pictures to the DEC 4804. Furthermore, the DPB 4805 writes the stored pictures into the primary video plane memory 4890 at the time shown by the PTSs included in the original PES packets.

The secondary video decoder 4871 includes the same structure as the primary video decoder 4870. The secondary video decoder 4871 first decodes the TS packets of the secondary video stream received from the PID filter 4840 into uncompressed pictures. Subsequently, the secondary video decoder 4871 writes the uncompressed pictures into the secondary video plane memory 4891 at the time shown by the PTSs included in the PES packets.

The PG decoder 4872 decodes the TS packets received from the PID filter 4840 into an uncompressed graphics object and writes the uncompressed graphics object to the PG plane memory 4892 at the time shown by the PTSs included in the PES packets.

FIG. 49A is a flowchart of processing by which the PG decoder 4872 decodes a graphics object from one data entry in the PG stream. This processing begins when the PG decoder 4872 receives, from the PID filter 4840, a TS packet group constituting one data entry shown in FIG. 6. FIGS. 49B through 49E are schematic diagrams showing how the graphics object changes in accordance with the processing.

In step S4901, the PG decoder 4872 first specifies the ODS having the same object ID as the reference object ID 605 in the PCS. Next, the PG decoder 4872 decodes the graphics object from the specified ODS and writes the graphics object into the object buffer. The "object buffer" is a buffer memory internal to the PG decoder 4872. The "smiley face" FOB shown in FIG. 49B is an example of a graphics object written into the object buffer.

In step S4902, the PG decoder 4872 performs cropping processing in accordance with the cropping information 602 in the PCS to extract a section of the graphics object and write the extracted section into the object buffer. In FIG. 49C, the strips LST and RST respectively at the left and right edges of the smiley face FOB are cut off, and the remaining section OBJ is written into the object buffer.

In step S4903, the PG decoder 4872 first specifies the WDS having the same window ID as the reference window ID 603 in the PCS. Next, the PG decoder 4872 determines the presentation position of the graphics object in the graphics plane from the window position 612 indicated by the specified WDS and the object presentation position 601 in the PCS. In FIG. 49D, the position of the upper-left corner of the window WIN in the graphics plane GPL and the position DSP of the upper-left corner of the graphics object OBJ are determined.

In step S4904, the PG decoder 4872 writes the graphics object in the object buffer at the presentation position determined in step S4903. At that point, the PG decoder 4872 refers to the window size 613 indicated by the WDS to determine the range for rendering the graphics object. In FIG. 49D, the graphics object OBJ is written into the graphics plane GPL within the range of the window WIN starting at the position DSP of the upper-left corner.

In step S4905, the PG decoder 4872 first specifies the PDS having the same palette ID as the reference palette ID 604 in the PCS. Next, the PG decoder 4872 refers to the CLUT 622 in the PDS to determine the chromatic coordinate value that each piece of pixel data in the graphics object is to indicate. In FIG. 49E, the color of each pixel in the graphics object OBJ is determined. Rendering of one graphics object included in one data entry is thus complete. Steps S4901-4905 are performed during the time indicated by PTSs included in the same PES packet as the graphics object.

The IG decoder 4873 decodes the TS packets received from the PID filter 4840 into an uncompressed graphics object. The IG decoder 4873 then writes the uncompressed graphics object to the IG plane memory 4893 at the time shown by the PTSs included in the PES packets decoded from the TS packets. Details on these processes are the same as in the PG decoder 4872.

The primary audio decoder 4874 first stores the TS packets received from the PID filter 4840 in a buffer provided therein. Subsequently, the primary audio decoder 4874 removes the TS header and the PES header from each TS packet in the buffer, and decodes the remaining data into uncompressed LPCM audio data. Furthermore, the primary audio decoder 4874 transmits the resultant audio data to the audio mixer 4895 at the time shown by the PTS included in the original PES packet. The primary audio decoder 4874 selects the decoding method for compressed audio data in accordance with the compression encoding method and stream attributes for the primary audio stream included in the TS packets. Compression encoding methods include, for example, AC-3 and DTS.

The secondary audio decoder 4875 has the same structure as the primary audio decoder 4874. The secondary audio decoder 4875 first reconstructs PES packets from the TS packets of the secondary audio stream received from the PID filter 4840 and then decodes the data included in the PES payloads into uncompressed LPCM audio data. Subsequently, the secondary audio decoder 4875 transmits the uncompressed LPCM audio data to the audio mixer 4895 at the times shown by the PTSs included in the PES headers. The secondary audio decoder 4875 selects the decoding method for compressed audio data in accordance with the compression encoding method and stream attributes for the secondary audio stream included in the TS packets. Compression encoding methods include, for example, Dolby Digital Plus and DTS-HD LBR.

The audio mixer 4895 receives uncompressed audio data from both the primary audio decoder 4874 and the secondary audio decoder 4875 and then mixes the received data. The audio mixer 4895 also transmits the synthesized sound yielded by mixing audio data to, for example, an internal speaker 103A of the display device 103.

The image processor 4880 receives graphics data, i.e., PNG or JPEG raster data, from the program execution unit 4534. Upon receiving the graphics data, the image processor 4880 renders the graphics data and writes the graphics data to the image plane memory 4894.

<Structure of 3D Playback Device>

When playing back 3D video image content from the BD-ROM disc 101 in 3D playback mode, the playback device 102 operates as a 3D playback device. The fundamental part of the device's structure is identical to the 2D playback device shown in FIGS. 45 and 48. Therefore, the following is a description of structural sections that have been enlarged or modified as compared to the 2D playback device. Details on the fundamental parts of the 3D playback device can be found in the above description of the 2D playback device. Note that the 3D playback device uses the same structure as the 2D playback device for 2D playlist playback processing. Accordingly, the details on this structure can be found in the description of the 2D playback device. The following description assumes playback processing of 3D video images in accordance with 3D playlist files, i.e. 3D playlist playback processing.

Figure 50:
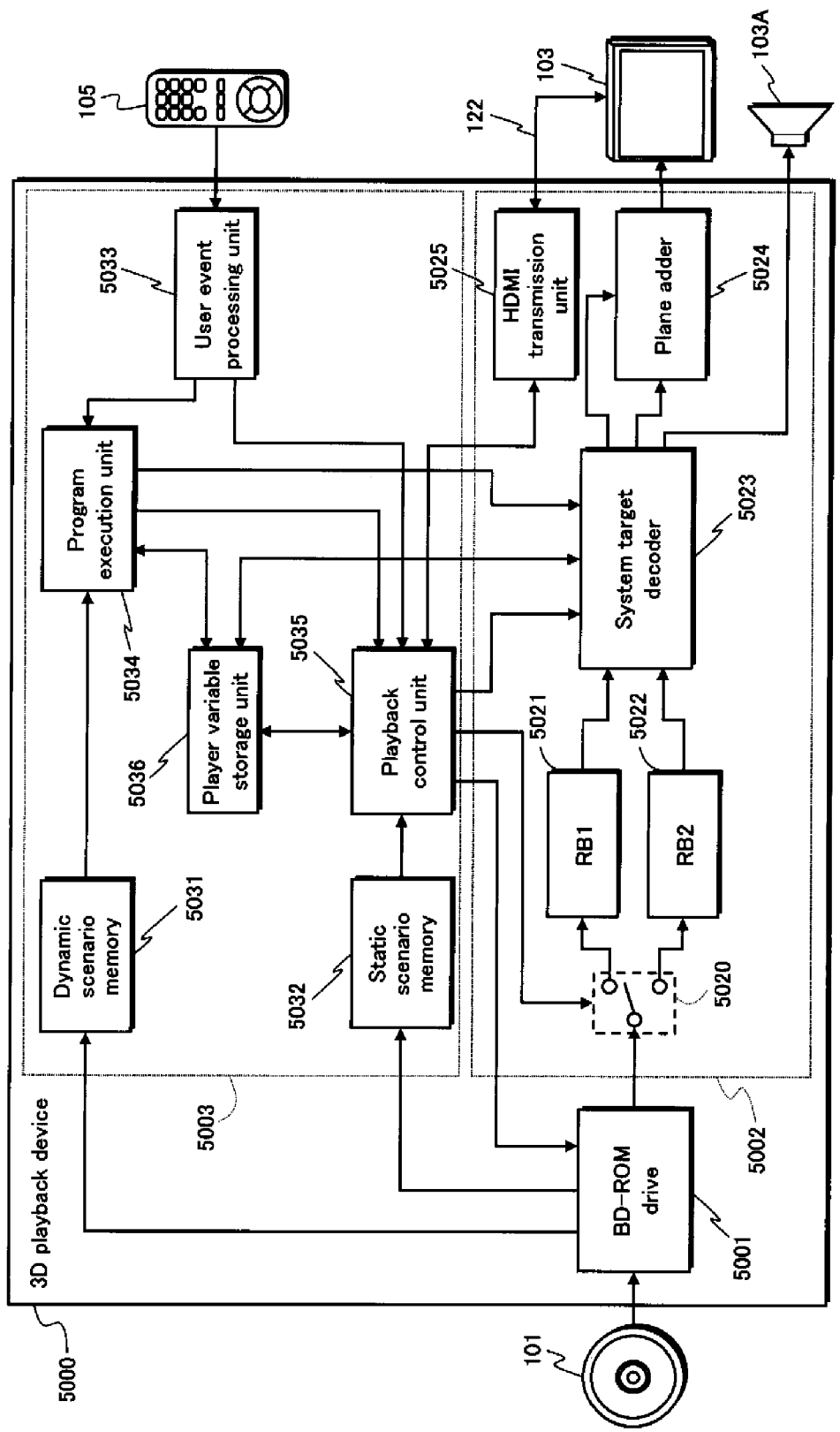
FIG. 50 is a functional block diagram of a 3D playback device 5000.

FIG. 50 is a functional block diagram of a 3D playback device 5000. The 3D playback device 5000 includes a BD-ROM drive 5001, playback unit 5002, and control unit 5003. The playback unit 5002 includes a switch 5020, first read buffer (RB1) 5021, second read buffer (RB2) 5022, system target decoder 5023, plane adder 5024, and HDMI transmission unit 5025. The control unit 5003 includes a dynamic scenario memory 5031, static scenario memory 5032, user event processing unit 5033, program execution unit 5034, playback control unit 5035, and player variable storage unit 5036. The playback unit 5002 and the control unit 5003 are each implemented on a different integrated circuit, but may alternatively be implemented on a single integrated circuit. In particular, the dynamic scenario memory 5031, static scenario memory 5032, user event processing unit 5033, and program execution unit 5034 have an identical structure with the 2D playback device shown in FIG. 45. Accordingly, details thereof can be found in the above description of the 2D playback device.

When instructed by the program execution unit 5034 or other unit to perform 3D playlist playback processing, the playback control unit 5035 reads a PI from the 3D playlist file stored in the static scenario memory 5032 in order, setting the read PI as the current PI. Each time the playback control unit 5035 sets a current PI, it sets operation conditions on the system target decoder 5023 and the plane adder 5024 in accordance with the STN table of the PI and the STN table SS in the 3D playlist file. Specifically, the playback control unit 5035 selects the PID of the elementary stream for decoding and transmits the PID, together with the attribute information necessary for decoding the elementary stream, to the system target decoder 5023. If a PG stream or IG stream is included in the elementary stream indicated by the selected PID, the playback control unit 5035 specifies the reference offset ID 4001 allocated to the stream data and sets the SPRM(27) in the player variable storage unit 5036 to the reference offset ID 4001. The playback control unit 5035 also selects the presentation mode of each piece of plane data in accordance with the offset during pop-up 4111 indicated by the STN table SS, indicating the selected presentation mode to the system target decoder 5023 and plane adder 5024.

Next, in accordance with the current PI, the playback control unit 5035 indicates the range of the LBNs in the sector group recorded in the extent SS to be read to the BD-ROM drive 5001 via the procedures indicated in the description of FIG. 32E. Meanwhile, the playback control unit 5035 refers to the extent start points in the clip information file stored in the static scenario memory 5032 to generate information indicating the boundary of the data blocks in each extent SS. Hereinafter, this information is referred to as "data block boundary information". The data block boundary information indicates, for example, the number of source packets from the top of the extent SS to each boundary. The playback control unit 5035 then transmits the data block boundary information to the switch 5020.

The player variable storage unit 5036 includes SPRMs like the player variable storage unit 4536 in the 2D playback device. However, unlike FIG. 46, the SPRM(24) and SPRM(25) respectively include the first flag and second flag shown in FIG. 44. In this case, when the SPRM(24) is "0", the playback device 102 only supports playback of 2D video images, and when the SPRM(24) is "1", the playback device 102 also supports playback of 3D video images. The playback device 102 is in L/R mode when the SPRM(25) is "0" and is in depth mode when the SPRM(25) is "1". The playback device 102 is in 2D playback mode when the SPRM(25) is "2". The SPRM(27) includes a storage area in the reference offset ID 4001 allocated to each piece of plane data. Specifically, the SPRM(27) includes an area for storing four types of reference offset IDs. These reference offset IDs are respectively for a PG plane (PG_ref_offset_id), IG plane (IG_ref_offset id), secondary video plane (SV_ref_offset_id), and image plane (IM_ref_offset_id).

The BD-ROM drive 5001 includes the same structural elements as the BD-ROM drive 4501 in the 2D playback device shown in FIG. 45. Upon receiving an indication from the playback control unit 5035 of a range of LBNs, the BD-ROM drive 5001 reads data from the sectors on the BD-ROM disc 101 as indicated by the range. In particular, a source packet group belonging to an extent in the file SS, i.e. belonging to an extent SS, are transmitted from the BD-ROM drive 5001 to the switch 5020. Each extent SS includes one or more pairs of a base-view and dependent-view data block, as shown in FIG. 15. These data blocks have to be transferred in parallel to the RB1 5021 and RB2 5022. Accordingly, the BD-ROM drive 5001 is required to have at least the same access speed as the BD-ROM drive 4501 in the 2D playback device.

The switch 5020 receives an extent SS from the BD-ROM drive 5001. On the other hand, the switch 5020 receives the data block boundary information for the extent SS from the playback control unit 5035. The switch 5020 then refers to the data block boundary information (i) to extract base-view extents from each extent SS and transmit the base-view extents to the RB1 5021, and (ii) to extract dependent-view extents and transmit the dependent-view extents to the RB2 5022.

Both the RB1 5021 and RB2 5022 are buffer memories that use a memory element in the playback unit 5002. In particular, different areas in a single memory element are used as the RB1 5021 and RB2 5022. Alternatively, different memory elements may be used as the RB1 5021 and RB2 5022. The RB1 5021 receives base-view extents from the switch 5020 and stores these extents. The RB2 5022 receives dependent-view extents from the switch 5020 and stores these extents.

In 3D playlist playback processing, the system target decoder 5023 first receives PIDs for stream data to be decoded, as well as attribute information necessary for decoding the stream data, from the playback control unit 5035. The system target decoder 5023 then reads source packets alternately from base-view extents stored in the RB1 5021 and dependent-view extents stored in the RB2 5022. Next, the system target decoder 5023 separates, from each source packet, elementary streams indicated by the PIDs received from the playback control unit 5035 and decodes the elementary streams. The system target decoder 5023 then writes the decoded elementary streams in internal plane memory according to the type thereof. The base-view video stream is written in the left-video plane memory, and the dependent-view video stream is written in the right-video plane memory. On the other hand, the secondary video stream is written in the secondary video plane memory, the IG stream in the IG plane memory, and the PG stream in the PG plane memory. When stream data other than the video stream, such as the PG stream shown in FIGS. 3B and 3C, is composed of a pair of base-view and dependent-view pieces of stream data, separate plane memories are prepared for both the base-view plane and dependent-view plane so as to correspond to the pieces of stream data. The system target decoder 5023 additionally renders graphics data from the program execution unit 5034, such as JPEG, PNG, etc. raster data, and writes this data in the image plane memory.

The system target decoder 5023 associates the output mode of plane data from the left-video and right-video plane memories with B-D presentation mode and B-B presentation mode as follows. When the playback control unit 5035 indicates B-D presentation mode, the system target decoder 5023 alternately outputs plane data from the left-video and right-video plane memories. On the other hand, when the playback control unit 5035 indicates B-B presentation mode, the system target decoder 5023 outputs plane data from only the left-video or right-video plane memory twice per frame while maintaining the operation mode in 3D playback mode.

The system target decoder 5023 associates the output mode of plane data from the graphics plane memory and the secondary video plane memory with two plane mode, one plane+offset mode, and one plane+zero offset mode as described below. In this context, the term "graphics plane memory" includes the PG plane memory, IG plane memory, and image plane memory.

When the playback control unit 5035 indicates two plane mode, the system target decoder 5023 alternately outputs a base-view plane and a dependent-view plane from each plane memory to the plane adder 5024.

When the playback control unit 5035 indicates one plane+offset mode, the system target decoder 5023 outputs plane data representing 2D video images from each plane memory to the plane adder 5024. In parallel, each time the system target decoder 5023 reads the VAU at the top of each video sequence from the dependent-view video stream, the system target decoder 5023 reads the offset metadata 1110 from the VAU. In the playback section of the video sequence, the system target decoder 5023 first specifies the PTS stored in the same PES packet along with each VAU and specifies the number of the frame represented by the compressed picture data of the VAU. The system target decoder 5023 then reads, from the offset metadata, the offset information associated with the frame number and transmits the offset information to the plane adder 5024 at the time indicated by the specified PTS.

When the playback control unit 5035 indicates one plane+ zero offset mode, the system target decoder 5023 outputs plane data representing 2D video images from each plane memory to the plane adder 5024. In parallel, the system target decoder 5023 transmits offset information for which the offset value is set to "0" to the plane adder 5024.

The plane adder 5024 receives each type of plane data from the system target decoder 5023 and superimposes these pieces of plane data on one another to create one combined frame or field. In particular, in L/R mode, the left-video plane represents a left-view video plane, and the right-video plane represents a right-view video plane. Accordingly, the plane adder 5024 superimposes other plane data representing the left view on the left-video plane and superimposes other plane data representing the right view on the right-video plane. On the other hand, in depth mode, the right-video plane represents a depth map corresponding to video images represented by the left-video plane. Accordingly, the plane adder 5024 first generates a pair of left-view and right-view video planes from the two video planes. Subsequent combination processing is the same as in L/R mode.

When the playback control unit 5035 indicates one plane+ offset mode as the presentation mode of the secondary video plane or graphics plane (PG plane, IG plane, image plane), the plane adder 5024 performs offset control on the plane data. Specifically, the plane adder 5024 first reads the reference offset ID corresponding to the plane data from the SPRM(27) in the player variable storage unit 5036. Next, the plane adder 5024 refers to the offset information received from the system target decoder 5023 to retrieve from the offset information belonging to the offset sequence 1113 indicated by the reference offset ID, i.e. the offset direction 1122 and the offset value 1123. The plane adder 5024 then uses the retrieved offset value to perform offset control on the corresponding plane data. In this way, the plane adder 5024 generates a pair of a left-view plane and a right-view plane from a single piece of plane data, combining the pair of planes with the corresponding video planes.

When the playback control unit 5035 indicates one plane+ zero offset mode, the plane adder 5024 does not refer to the SPRM(27), but rather sets the offset value for each piece of plane data to "0". In this way, the plane adder 5024 temporarily suspends offset control for each piece of plane data. Accordingly, the same plane data is combined with both the left-view video plane and the right-view video plane.

When the playback control unit 5035 indicates two plane mode, the plane adder 5024 receives a pair of a base-view plane and a dependent-view plane from the system target decoder 5023. In L/R mode, the base-view plane represents the left-view plane, and the dependent-view plane represents the right-view plane. Accordingly, the plane adder 5024 superimposes the base-view plane on the left-video plane and superimposes the dependent-view plane on the right-video plane. On the other hand, in depth mode, the dependent-view plane represents a depth map for the video images represented by the base-view plane. Accordingly, the plane adder 5024 first generates a pair of a left-view plane and a right-view plane from the pair of the base-view plane and the dependent-view plane, then combining the generated pair of planes with the video planes.

Additionally, the plane adder 5024 converts the output format of the combined plane data into a format that complies with the display method of 3D video images adopted in a device, such as the display device 103, to which the data is output. If an alternate-frame sequencing method is adopted in the device, for example, the plane adder 5024 outputs the combined plane data pieces as one video frame or one field. On the other hand, if a method that uses a lenticular lens is adopted in the device, the plane adder 5024 combines a pair of a left-view plane and a right-view plane as one video frame or field with use of internal buffer memory. Specifically, the plane adder 5024 temporarily stores and holds in the buffer memory the left-view plane that has been combined first. Subsequently, the plane adder 5024 combines the right-view plane and further combines the result with the left-view plane held in the buffer memory. During combination, the left-view plane and right-view plane are each divided, in a vertical direction, into small rectangular areas that are long and thin, and the small rectangular areas are arranged alternately in the horizontal direction in one frame or field so as to re-constitute the frame or field. In this way, the pair of the left-view plane and right-view plane is combined into one video frame or field. The plane adder 5024 then outputs the combined video frame or field to the corresponding device.

The HDMI transmission unit 5025 is connected to the display device 103 by the HDMI cable 122 and exchanges CEC messages with the display device 103 via the HDMI cable 122. The HDMI transmission unit 5025 thus performs HDMI authentication on the display device 103 and asks the display device 103 whether it supports playback of 3D video images.

<<3D Playlist Playback Processing>>

Figure 51:
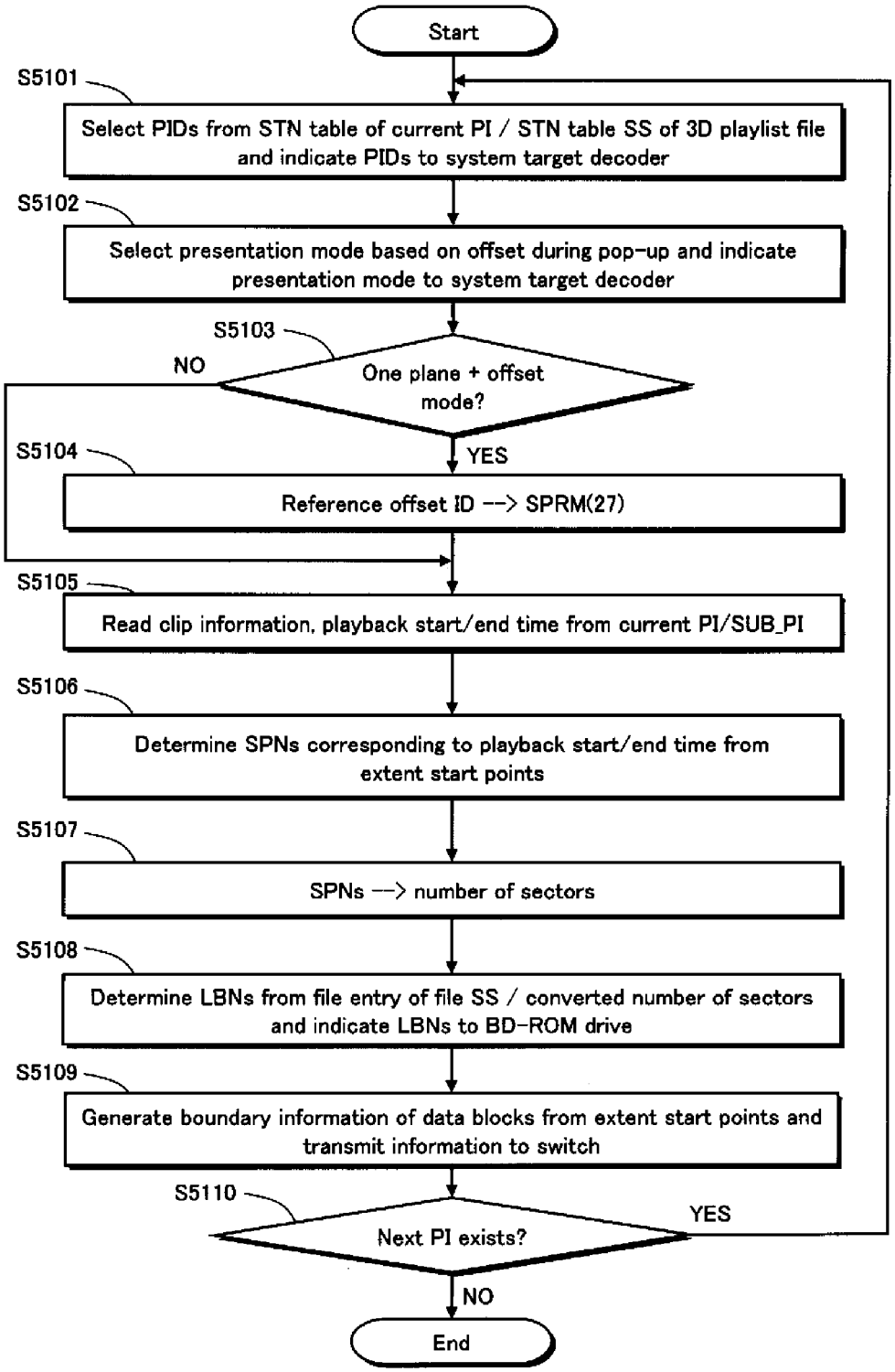
FIG. 51 is a flowchart of 3D playlist playback processing by the playback control unit 5035 shown in FIG. 50.

FIG. 51 is a flowchart of 3D playlist playback processing by a playback control unit 5035. 3D playlist playback processing is started by the playback control unit 5035 reading a 3D playlist file from the static scenario memory 5032.

In step S5101, the playback control unit 5035 first reads a single PI from a main path in the 3D playlist file and then sets the PI as the current PI. Next, from the STN table of the current PI, the playback control unit 5035 selects PIDs of elementary streams to be played back and specifies attribute information necessary for decoding the elementary streams. The playback control unit 5035 further selects, from among the elementary streams corresponding to the current PI in the STN table SS 3930 in the 3D playlist file, PIDs of additional elementary streams for playback, and the playback control unit 5035 specifies attribute information necessary for decoding these elementary streams. The selected PIDs and attribute information are indicated to the system target decoder 5023. The playback control unit 5035 additionally specifies, from among sub-paths in the 3D playlist file, a SUB_PI to be referenced at the same time as the current PI, specifying this SUB_PI as the current SUB_PI. Thereafter, processing proceeds to step S5102.

In step S5102, the playback control unit 5035 selects the display mode for each piece of plane data based on the offset during pop-up 4111 indicated by the STN table SS and indicates the display mode to the system target decoder 5023 and the plane adder 5024. In particular, when the value of the offset during pop-up is "0", B-D presentation mode is selected as the video plane presentation mode, and two plane mode or one plane+offset mode is selected as the presentation mode for the graphics plane. On the other hand, when the value of the offset during pop-up is "1", B-B presentation mode is selected as the video plane presentation mode, and one plane+zero offset mode is selected as the presentation mode for the graphics plane.

Thereafter, processing proceeds to step S5103.

In step S5103, the playback control unit 5035 checks whether one plane+offset mode has been selected as the presentation mode of the graphics plane. If one plane+offset mode has been selected, processing proceeds to step S5104. On the other hand, if two plane mode or one plane+zero offset mode has been selected, processing proceeds to step S5105.

In step S5104, the playback control unit 5035 refers to the STN table of the current PI and retrieves the PG stream or IG stream from among the elementary streams indicated by the selected PIDs. Furthermore, the playback control unit 5035 specifies the reference offset ID allocated to the pieces of stream data, setting the SPRM(27) in the player variable storage unit 5036 to the reference offset ID. Thereafter, processing proceeds to step S5105.

In step S5105, the playback control unit 5035 reads reference clip information, a PTS #1 indicating a playback start time IN1, and a PTS #2 indicating a playback end time OUT1 from the current PI and the SUB_PI. From this reference clip information, a clip information file corresponding to each of the file 2D and the file DEP to be played back is specified. Thereafter, processing proceeds to step S5106.

In step S5106, with reference to the entry map in each of the clip information files specified in step S5105, the playback control unit 5035 retrieves the SPN #1 and SPN #2 in the file 2D, and the SPN #11 and SPN #12 in the file DEP, corresponding to the PTS #1 and the PTS #2, as shown in FIG. 42. Referring to extent start points of each clip information file, the playback control unit 5035 further calculates, from the SPN #1 and the SPN #11, the number of source packets SPN #21 from the top of the file SS to the playback start position. The playback control unit 5035 also calculates, from the SPN #2 and the SPN #12, the number of source packets SPN #22 from the top of the file SS to the playback end position. Specifically, the playback control unit 5035 first retrieves, from among SPNs shown by extent start points of the 2D clip information files, a value "Am" that is the largest value less than or equal to SPN #1, and retrieves, from among the SPNs shown by extent start points of dependent-view clip information files, a value "Bm" that is the largest value less than or equal to the SPN #11. Next, the playback control unit 5035 obtains the sum of the retrieved SPNs Am+Bm and sets the sum as SPN #21. Next, the playback control unit 5035 retrieves, from among SPNs shown by the extent start points of the 2D clip information files, a value "An" that is the smallest value that is larger than the SPN #2. The playback control unit 5035 also retrieves, from the SPNs of the extent start points of the dependent-view clip information files, a value "Bn" that is the smallest value that is larger than the SPN #12. Next, the playback control unit 5035 obtains the sum of the retrieved SPNs An+Bn and sets the sum as SPN #22. Thereafter, processing proceeds to step S5107.

In step S5107, the playback control unit 5035 converts the SPN #21 and the SPN #22, determined in step S5106, into a pair of numbers of sectors N1 and N2. Specifically, the playback control unit 5035 first obtains the product of SPN #21 and the data amount per source packet, i.e. 192 bytes. Next, the playback control unit 5035 divides this product by the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 5035 calculates SPN #22×192/2048. The resulting quotient is the same as the number of sectors N2 from the top of the file SS to immediately before the playback end position. Thereafter, processing proceeds to step S5108.

In step S5108, the playback control unit 5035 specifies, from the numbers of sectors N1 and N2 obtained in step S5107, LBNs of the top and end of the extent SS group to be played back. Specifically, with reference to the file entry of the file SS to be played back, the playback control unit 5035 counts from the top of sector group in which the extent SS group is recorded so that the LBN of the $(N1+1)^{th}$ sector=LBN #1, and the LBN of the $(N2+1)^{th}$ sector=LBN #2. The playback control unit 5035 further specifies a range from the LBN#1 to the LBN#2 to the BD-ROM drive 5001. As a result, from the sector group in the specified range, a source packet group belonging to an extent SS group is read in aligned units. Thereafter, processing proceeds to step S5109.

In step S5109, referring to the extent start points of the clip information file used in step S5106, the playback control unit 5035 generates data block boundary information for the extent SS group, transmitting the data block boundary information to the switch 5020. As a specific example, assume that the SPN #21 indicating the playback start position is the same as the sum of SPNs indicating the extent start points, An+Bn, and that the SPN# 22 indicating the playback end position is the same as the sum of SPNs indicating the extent start points, Am+Bm. In this case, the playback control unit 5035 obtains a sequence of differences between SPNs from the respective extent start points, A(n+1)−An, B(n+1)−Bn, A(n+2)−A(n+1), B(n+2)−B(n+1), . . . , Am−A(m−1), and Bm−B(m−1), and transmits the sequence to the switch 5020 as the data block boundary information. As shown in FIG. 32E, this sequence indicates the number of source packets of data blocks included in the extent SS. The switch 5020 counts, from zero, the number of source packets of the extents SS received from the BD-ROM drive 5001. Each time the count is the same as the difference between SPNs indicated by the data block boundary information, the switch 5020 switches the destination of output of the source packets between the RB1 5021 and RB2 5022 and resets the count to zero. As a result, {B(n+1)−Bn} source packets from the top of the extent SS are transmitted to the RB2 5022 as the first dependent-view extent, and the following {A(n+1)−An} source packets are transmitted to the RB1 5021 as the first base-view extent. Thereafter, dependent-view extents and base-view extents are extracted from the extent SS alternately in the same way, alternating each time the number of source packets received by the switch 5020 is the same as the difference between SPNs indicated by the data block boundary information.

In step S5110, the playback control unit 5035 checks whether an unprocessed PI remains in the main path. When an unprocessed PI remains, processing is repeated from step S5101. When no unprocessed PI remains, processing ends.

<<System Target Decoder>>

Figure 52:
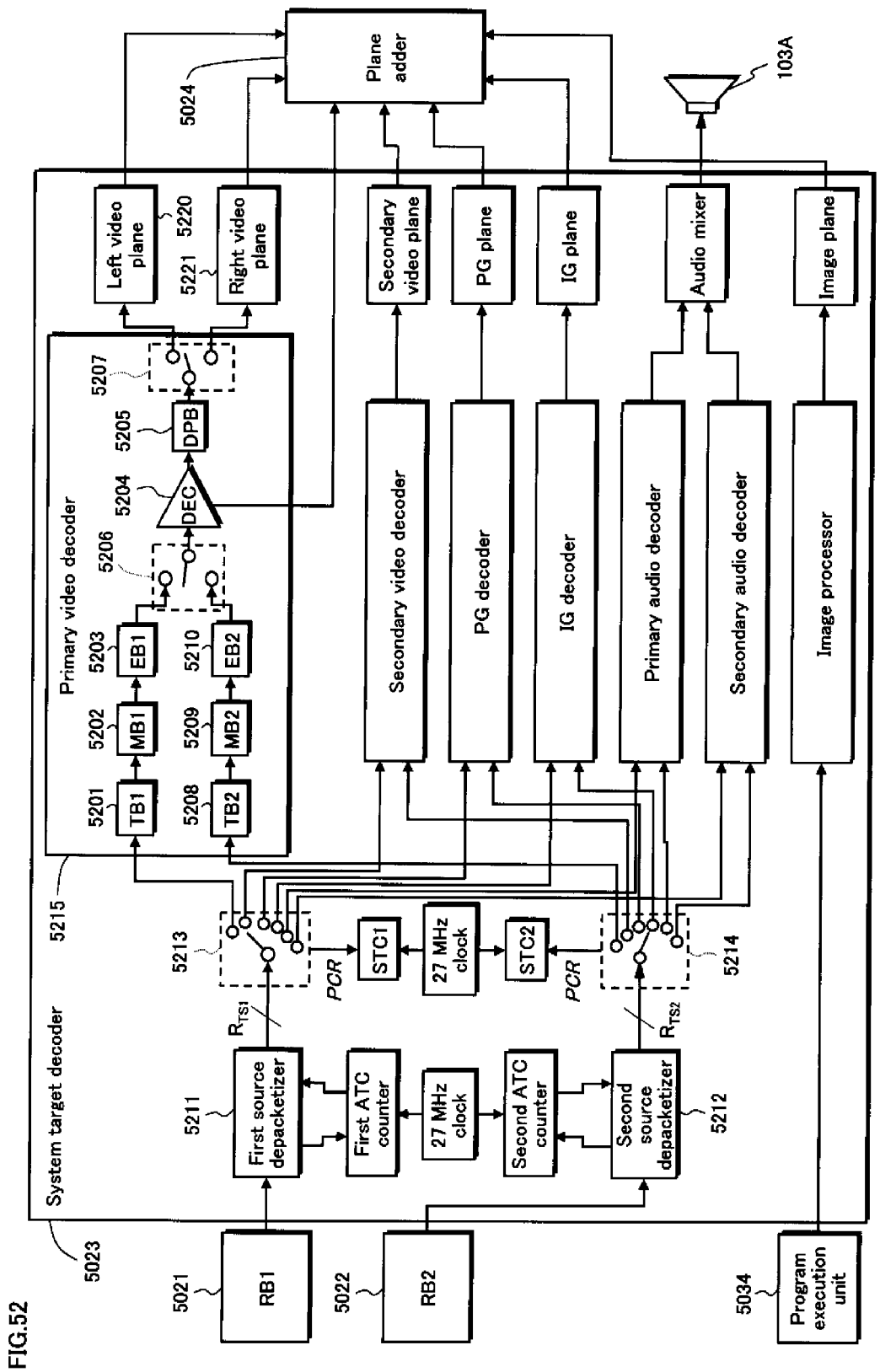
FIG. 52 is a functional block diagram of the system target decoder 5023 shown in FIG. 50.

FIG. 52 is a functional block diagram of a system target decoder 5023. The structural elements shown in FIG. 52 differ from the structural elements of the system target decoder 4523 in the 2D playback device shown in FIG. 48 in the following two points. (1) The input system from the read buffer to each of the decoders is doubled. (2) The primary video decoder supports 3D playback mode, and the secondary video decoder, PG decoder, and IG decoder support two plane mode. In other words, all of these video decoders can alternately decode the base-view video stream and the dependent-view video stream. In particular, the section within each decoder in two plane mode that decodes the base-view plane and the section that decodes the dependent-view plane may be separated. On the other hand, the primary audio decoder, secondary audio decoder, audio mixer, image processor, and plane memories are the same as those in the 2D playback device shown in FIG. 48. Accordingly, among the structural elements shown in FIG. 52, those differing from the structural elements shown in FIG. 48 are described below. Details on similar elements can be found in the above description of FIG. 48. Furthermore, since the video decoders each have a similar structure, only the structure of the primary video decoder 5215 is described below. This description is also valid for the structure of other video decoders.

The first source depacketizer 5211 reads source packets from the RB1 5021, furthermore extracting TS packets included in the source packets and transmitting the TS packets to the first PID filter 5213. The second source depacketizer 5212 reads source packets from the RB2 5022, furthermore extracting TS packets included in the source packets and transmitting the TS packets to the second PID filter 5214. Each of the source depacketizers 5211 and 5212 further synchronizes the time of transfer the TS packets with the time shown by the ATS of each source packet. This synchronization method is the same method as the source depacketizer 4810 shown in FIG. 48. Accordingly, details thereof can be found in the description provided for FIG. 48. With this sort of adjustment of transfer time, the mean transfer rate $R_{TS1}$ of TS packets from the first source depacketizer 5211 to the first PID filter 5213 does not exceed the system rate indicated by the 2D clip information file. Similarly, the mean transfer rate $R_{TS2}$ of TS packets from the second source depacketizer 5212 to the second PID filter 5214 does not exceed the system rate indicated by the dependent-view clip information file.

The first PID filter 5213 compares the PID of each TS packet received from the first source depacketizer 5211 with the selected PID. The playback control unit 5035 designates the selected PID beforehand in accordance with the STN table in the 3D playlist file. When the two PIDs match, the first PID filter 5013 transfers the TS packets to the decoder assigned to the PID. For example, if a PID is 0x1011, the TS packets are transferred to TB1 5201 in the primary video decoder 5215. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 5214 compares the PID of each TS packet received from the second source depacketizer 5212 with the selected PID. The playback control unit 5035 designates the selected PID beforehand in accordance with the STN table SS in the 3D playlist file. When the two PIDs match, the second PID filter 5214 transfers the TS packets to the decoder assigned to the PID. For example, if a PID is 0x1012 or 0x1013, the TS packets are transferred to TB2 5208 in the primary video decoder 5215. On the other hand, TS packets with PIDs ranging from 0x1B20-0x1B3F, 0x1220-0x127F, and 0x1420-0x147F are transferred to the secondary video decoder, PG decoder, or IG decoder respectively.

The primary video decoder 5215 includes a TB1 5201, MB1 5002, EB1 5023, TB2 5208, MB2 5209, EB2 5210, buffer switch 5206, DEC 5204, DPB 5205, and picture switch 5207. The TB1 5201, MB1 5202, EB1 5203, TB2 5208, MB2 5209, EB2 5210 and DPB 5205 are all buffer memories. Each of these buffer memories uses an area of a memory element included in the primary video decoder 5215. Alternatively, some or all of these buffer memories may be separated on different memory elements.

The TB1 5201 receives TS packets that include a base-view video stream from the first PID filter 5213 and stores the TS packets as they are. The MB1 5202 reconstructs PES packets from the TS packets stored in the TB1 5201 and stores the PES packets. The TS headers of the TS packets are removed at this point. The EB1 5203 extracts encoded VAUs from the PES packets stored in the MB1 5202 and stores the VAUs. The PES headers of the PES packets are removed at this point.

The TB2 5208 receives TS packets that include a dependent-view video stream from the second PID filter 5214 and stores the TS packets as they are. The MB2 5202 reconstructs PES packets from the TS packets stored in the TB2 5208 and stores the PES packets. The TS headers of the TS packets are removed at this point. The EB2 5210 extracts encoded VAUs from the PES packets stored in the MB2 5209 and stores the VAUs. The PES headers of the PES packets are removed at this point.

The buffer switch 5206 transfers the headers of the VAUs stored in the EB1 5203 and the EB2 5210 in response to a request from the DEC 5204. Furthermore, the buffer switch 5206 transfers the compressed picture data for the VAUs to the DEC 5204 at the times indicated by the DTSs included in the original TS packets. In this case, the DTSs are equal for a pair of pictures belonging to the same 3D VAU between the base-view video stream and dependent-view video stream. Accordingly, for a pair of VAUs that have the same DTS, the buffer switch 5206 first transmits the VAU stored in the EB1 5203 to the DEC 5204.

Like the DEC 4804 shown in FIG. 48, the DEC 5204 is a hardware decoder specifically for decoding of compressed pictures and is composed of an LSI that includes, in particular, a function to accelerate the decoding. The DEC 5204 decodes the compressed picture data transferred from the buffer switch 5206 in order. During decoding, the DEC 5204 first analyzes each VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 5204 transmits the decoded, uncompressed picture to the DPB 5205.

Each time the DEC 5204 reads the VAU at the top of a video sequence in the dependent-view video stream, the DEC 5204 also reads the offset metadata from the VAU. In the playback section of the video sequence, the DEC 5204 first specifies the PTS stored in a PES packet along with the VAU and specifies the number of the frame represented by the compressed picture data of the VAU. The DEC 5204 then reads, from the offset metadata, the offset information associated with the frame number and transmits the offset information to the plane adder 5024 at the time indicated by the specified PTS.

The DPB 5205 temporarily stores the decoded, uncompressed pictures. When the DEC 5204 decodes a P picture or a B picture, the DPB 5205 retrieves reference pictures from among the stored, uncompressed pictures in response to a request from the DEC 5204 and supplies the retrieved reference pictures to the DEC 5204.

The picture switch 5207 writes the uncompressed pictures from the DPB 5205 to either the left-video plane memory 5220 or the right-video plane memory 5221 at the time indicated by the PTS included in the original TS packet. In this case, the PTSs are equal between a base-view picture and a dependent-view picture belonging to the same 3D VAU. Accordingly, for a pair of pictures that have the same PTS and that are stored by the DPB 5205, the picture switch 5207 first writes the base-view picture in the left-video plane memory 5220 and then writes the dependent-view picture in the right-video plane memory 5221.

<<Plane Adders in One Plane+(Zero) Offset Mode>>

Figure 53:
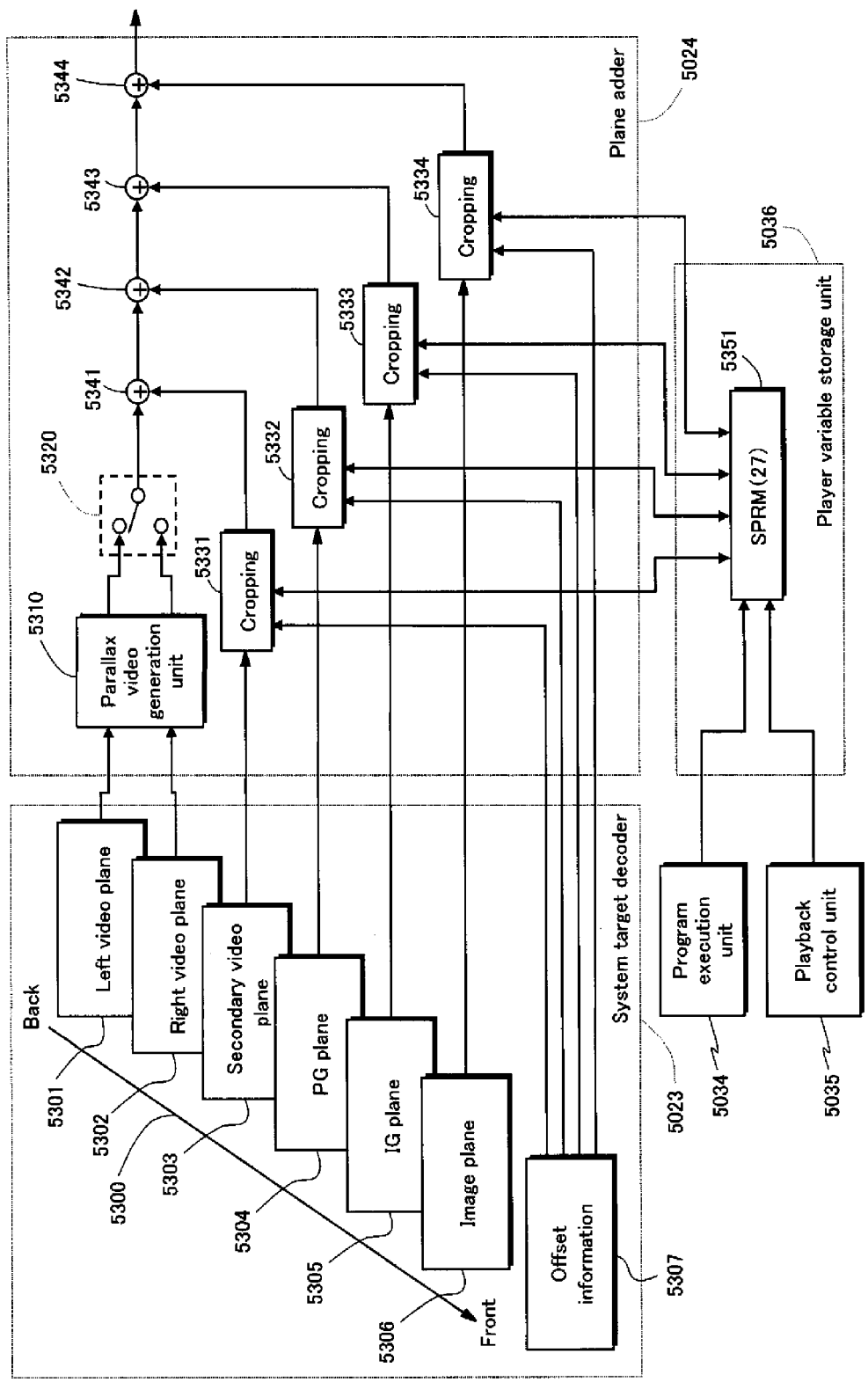
FIG. 53 is a functional block diagram of the plane adder 5024 shown in FIG. 50 in one plane+offset mode and one plane+zero offset mode.

FIG. 53 is a functional block diagram of the plane adder 5024 in one plane+offset mode and one plane+zero offset mode. As shown in FIG. 53, the plane adder 5024 includes a parallax video generation unit 5310, switch 5320, four cropping units 5331-5334, and four adders 5341-5344.

The parallax video generation unit 5310 receives a left-video plane 5301 and right-video plane 5302 from the system target decoder 5023. In the playback device 102 in L/R mode, the left-video plane 5301 represents the left-view video plane, and the right-video plane 5302 represents the right-view video plane. The parallax video generation unit 5310 in L/R mode transmits the received video planes 5301 and 5302 as they are to the switch 5320. On the other hand, in the playback device 102 in depth mode, the left-video plane 5301 represents the video plane for 2D video images, and the right-video plane 5302 represents a depth map for the 2D video images. The parallax video generation unit 5310 in depth mode first calculates the binocular parallax for each element in the 2D video images using the depth map.

Next, the parallax video generation unit 5310 processes the left-video plane 5301 to shift the presentation position of each element in the video plane for 2D video images to the left or right according to the calculated binocular parallax. This generates a pair of a left-view video plane and a right-view video plane. Furthermore, the parallax video generation unit 5310 transmits the generated pair of video planes to the switch 5320 as a pair of a left-video plane and right-video plane.

When the playback control unit 5035 indicates B-D presentation mode, the switch 5320 transmits the left-video plane 5301 and right-video plane 5302 having the same PTS to the first adder 5341 in that order. When the playback control unit 5035 indicates B-B presentation mode, the switch 5320 transmits one of the left-video plane 5301 and right-video plane 5302 having the same PTS to the first adder 5341 twice per frame, discarding the other video plane.

When the playback control unit 5035 indicates one plane+offset mode, the first cropping unit 5331 performs the following offset control on the secondary video plane 5303. The first cropping unit 5331 first receives offset information 5307 from the system target decoder 5023. At this point, the first cropping unit 5331 reads the reference offset ID corresponding to the secondary video plane from the SPRM(27) 5351 in the player variable storage unit 5036. Next, the first cropping unit 5331 retrieves the offset information belonging to the offset sequence indicated by the reference offset ID from the offset information 5307 received from the system target decoder 5023. The first cropping unit 5331 then refers to the retrieved offset information to perform offset control on the secondary video plane 5303. As a result, the secondary video plane 5303 is converted into a pair of pieces of plane data representing a left view and a right view. These left-view and right-view secondary video planes are alternately output to the first adder 5341.

The playback control unit 5035 generally updates the value of the SPRM(27) 5351 each time the current PI changes. Additionally, the program execution unit 5034 may set the value of the SPRM(27) 5351 in accordance with a movie object or BD-J object.

Similarly, the second cropping unit 5332 converts the PG plane 5304 into a pair of left-view and right-view PG planes. These PG planes are alternately output to the second adder 5342. The third cropping unit 5333 converts the IG plane 5305 into a pair of left-view and right-view IG planes. These IG planes are alternately output to the third adder 5343. The fourth cropping unit 5334 converts the image plane 5306 into a pair of left-view and right-view image planes. These image planes are alternately output to the fourth adder 5344.

When the playback control unit 5035 indicates one plane+zero offset mode, the first cropping unit 5331 does not perform offset control on the secondary video plane 5303, but rather transmits the secondary video plane 5303 as is twice to the first adder 5341. The same is true for the other cropping units 5332-5334 as well.

The first adder 5341 receives a video plane from the switch 5320 and receives a secondary video plane from the first cropping unit 5331. At this point, the first adder 5341 superimposes each pair of the received video plane and secondary video plane and transmits the result to the second adder 5342. The second adder 5342 receives a PG plane from the second cropping unit 5332, superimposes the PG plane on the plane data received from the first adder 5341, and transmits the result to the third adder 5343. The third adder 5343 receives an IG plane from the third cropping unit 5333, superimposes the IG plane on the plane data received from the second adder 5342, and transmits the result to the fourth adder 5344. The fourth adder 5344 receives an image plane from the fourth cropping unit 5334, superimposes the image plane on the plane data received from the third adder 5343, and outputs the result to the display device 103. The adders 5341-5344 each make use of alpha blending when superimposing plane data. In this way, the secondary video plane 5303, PG plane 5304, IG plane 5305, and image plane 5306 are superimposed on the left-video plane 5301 or right-video plane 5302 in the order shown by the arrow 5300 in FIG. 53. As a result, the video images indicated by each piece of plane data are displayed on the screen of the display device 103 so that the left-video plane or right-video plane appears to overlap with the secondary video plane, IG plane, PG plane, and image plane in that order.

[Flowchart of Offset Control]

Figure 54:
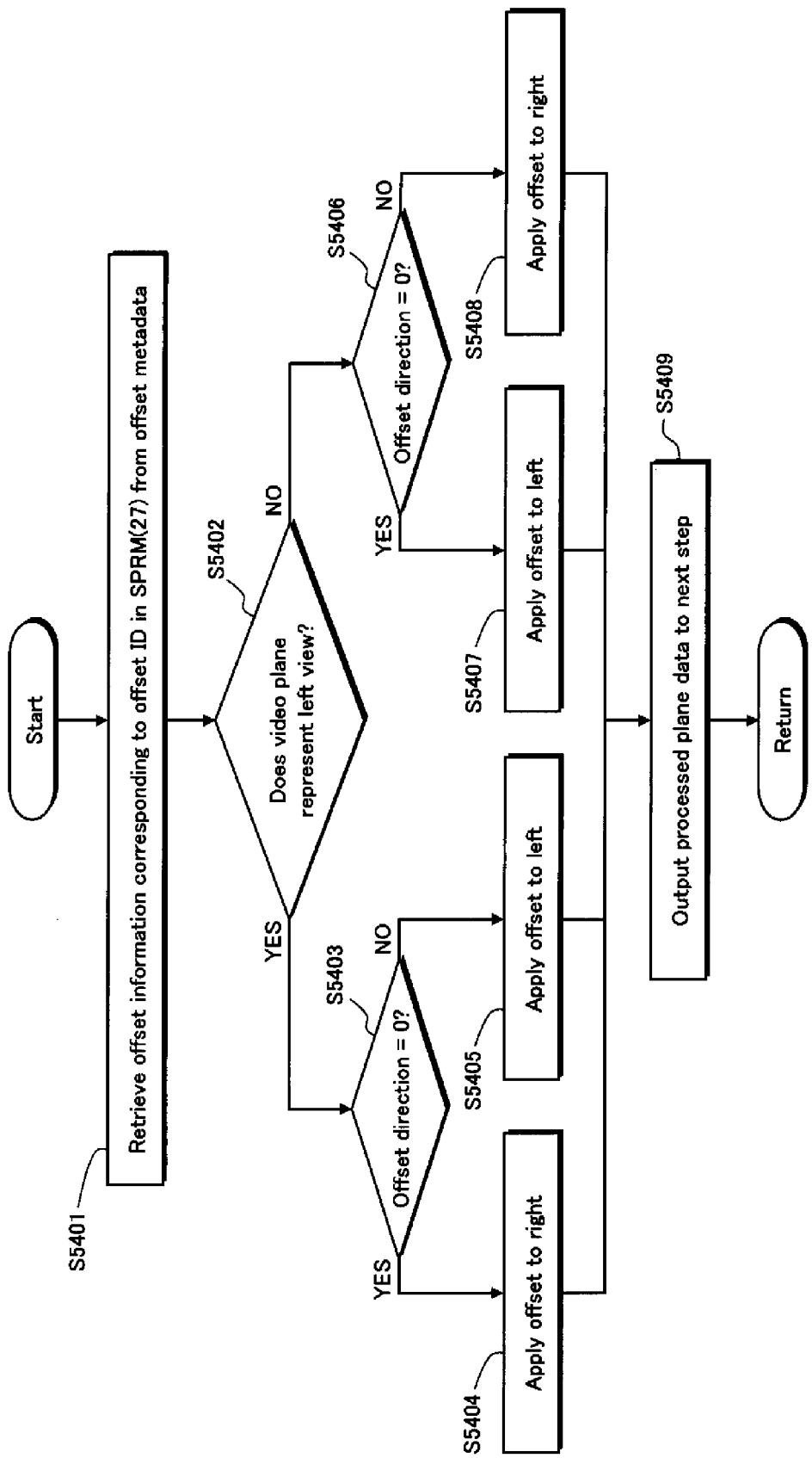
FIG. 54 is a flowchart of offset control by cropping units 5331-5334 shown in FIG. 53.

FIG. 54 is a flowchart of offset control by the cropping units 5331-5334. Each of the cropping units 5331-5334 begins offset control upon receiving offset information 5307 from the system target decoder 5023. In the following description, it is assumed that the second cropping unit 5332 performs offset control on the PG plane 5304. The other cropping units 5331, 5333, and 5334 perform similar processing respectively on the secondary video plane 5303, IG plane 5305, and image plane 5306.

In step S5401, the second cropping unit 5332 first receives a PG plane 5304 from the system target decoder 5023. At this point, the second cropping unit 5332 reads the reference offset ID for the PG plane from the SPRM(27) 5351. Next, the second cropping unit 5331 retrieves the offset information belonging to the offset sequence indicated by the reference offset ID from the offset information 5307 received from the system target decoder 5023. Thereafter, processing proceeds to step S5402.

In step S5402, the second cropping unit 5332 checks whether the video plane selected by the switch 5320 represents a left view or a right view. If the video plane represents a left view, processing proceeds to step S5403. If the video plane represents a right view, processing proceeds to step S5406.

In step S5403, the second cropping unit 5332 checks the value of the retrieved offset direction. The following is assumed: if the offset direction value is "0", the 3D graphics image is closer to the viewer than the screen, and if the offset direction value is "1", the image is further back than the screen. In this context, when the offset direction value is "0", processing proceeds to step S5404. If the offset direction value is "1", processing proceeds to step S5405.

In step S5404, the second cropping unit 5332 provides a right offset to the PG plane 5304. In other words, the position of each piece of pixel data included in the PG plane 5304 is shifted to the right by the offset value. Thereafter, processing proceeds to step S5409.

In step S5405, the second cropping unit 5332 provides a left offset to the PG plane 5304. In other words, the position of each piece of pixel data included in the PG plane 5304 is shifted to the left by the offset value. Thereafter, processing proceeds to step S5409.

In step S5406, the second cropping unit 5332 checks the value of the retrieved offset direction. If the offset direction value is "0", processing proceeds to step S5407. If the offset direction value is "1", processing proceeds to step S5408.

As opposed to step S5404, in step S5407, the second cropping unit 5332 provides a left offset to the PG plane 5304. In other words, the position of each piece of pixel data included in the PG plane 5304 is shifted to the left by the offset value. Thereafter, processing proceeds to step S5409.

As opposed to step S5405, in step S5408, the second cropping unit 5332 provides a right offset to the PG plane 5304. In other words, the position of each piece of pixel data included in the PG plane 5304 is shifted to the right by the offset value. Thereafter, processing proceeds to step S5409.

In step S5409, the second cropping unit 5332 outputs the processed PG plane 5304 to the third cropping unit 5334. Processing then terminates.

[Changes in Plane Data Via Offset Control]

FIG. 55B is a schematic diagram showing a PG plane GP before offset control is applied by the second cropping unit 5332. As shown in FIG. 55B, the PG plane GP includes pixel data representing the subtitle "I love you", i.e. subtitle data STL. This subtitle data STL is located at a distance D0 from the left edge of the PG plane GP.

FIG. 55A is a schematic diagram showing a PG plane RGP to which a right offset has been provided. As shown in FIG. 55A, when providing a right offset to the PG plane GP, the second cropping unit 5332 changes the position of each piece of pixel data in the PG plane data GP from its original position to the right by a number of pixels OFS equal to the offset value. Specifically, the second cropping unit 5332 performs cropping to remove, from the right edge of the PG plane GP, pixel data included in a strip AR1 of a width OFS equal to the offset value. Next, the second cropping unit 5332 forms a strip AU of width OFS by adding pixel data to the left edge of the PG plane GP. The pixel data included in this strip AU is set as transparent. This process yields a PG plane RGP to which a right offset has been provided. The subtitle data STL is actually located at a distance DR from the left edge of this PG plane RGP. This distance DR equals the original distance D0 plus the offset value OFS: DR=D0+OFS.

FIG. 55C is a schematic diagram showing a PG plane LGP to which a left offset has been provided. As shown in FIG. 55C, when providing a left offset to the PG plane GP, the second cropping unit 5332 changes the position of each piece of pixel data in the PG plane data GP from its original position to the left by a number of pixels OFS equal to the offset value. Specifically, the second cropping unit 5332 first performs cropping to remove, from the left edge of the PG plane GP, pixel data included in a strip AL2 of a width OFS equal to the offset value. Next, the second cropping unit 5332 forms a strip AR2 of width OFS by adding pixel data to the right edge of the PG plane GP. The pixel data included in this strip AR2 is set as transparent. This process yields a PG plane LGP to which a left offset has been provided. The subtitle data STL is actually located at a distance DL from the left edge of this PG plane LGP. This distance DL equals the original distance D0 minus the offset value OFS: DL=D0−OFS.

<<Plane Adders in Two Plane Mode>>

Figure 56:
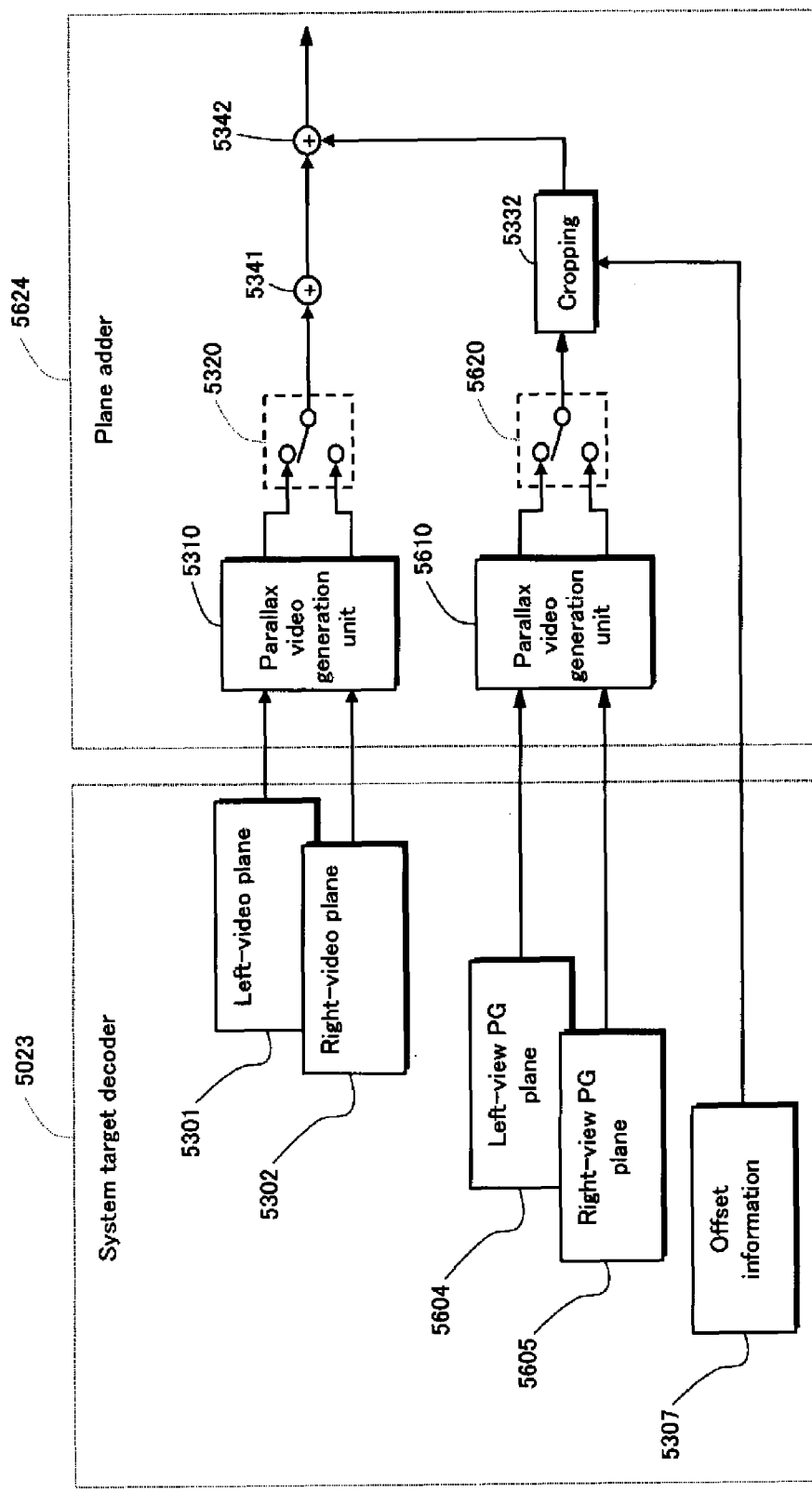
FIG. 56 is a partial functional block diagram of the plane adder 5624 in two plane mode.

FIG. 56 is a partial functional block diagram of the plane adder 5624 in two plane mode. As shown in FIG. 56, the plane adder 5624 in two plane mode includes a parallax video generation unit 5310, switch 5320, first adder 5341, second adder 5342, and second cropping unit 5332 like the plane adder 5324 in one plane+offset mode shown in FIG. 53. While not shown in FIG. 56, the plane adder 5624 in two plane mode further includes the other cropping units 5331, 5333 and 5334, as well as the other adders 5343 and 5344, shown in FIG. 53. In addition to these components, the plane adder 5624 in two plane mode further includes a second parallax video generation unit 5610 and second switch 5620 in the input unit for PG planes 5304 and 5305. While not shown in FIG. 56, a similar structure is included in the units for input of the secondary video plane, IG plane, and image plane.

The second parallax video generation unit 5610 receives a left-view PG plane 5604 and right-view PG plane data 5605 from the system target decoder 5023. In the playback device 102 in L/R mode, a left-view PG plane 5604 and right-view PG plane 5605 respectively represent the left-view PG plane and the right-view PG plane, as their names indicate. Accordingly, the second parallax video generation unit 5610 transmits the pieces of plane data 5604 and 5605 as they are to the second switch 5620. On the other hand, in the playback device 102 in depth mode, the left-view PG plane 5604 represents the PG plane of 2D graphics images, and the right-view PG plane 5605 represents a depth map corresponding to the 2D graphics images. Accordingly, the second parallax video generation unit 5610 first calculates the binocular parallax for each element in the 2D graphics images using the depth map. Next, the second parallax video generation unit 5610 processes the left-view PG plane 5604 to shift the presentation position of each element in the 2D graphics image in the PG plane to the left or right in accordance with the calculated binocular parallax. This generates a pair of a left-view PG plane and a right-view PG plane. Furthermore, the second parallax video generation unit 5610 outputs these PG planes to the second switch 5620.

The second switch 5620 transmits the left-view PG plane 5604 and the right-view PG plane 5605, which have the same PTS, to the second cropping unit 5332 in this order. The second cropping unit 5332 outputs the PG planes 5604 and 5605 as they are to the second adder 5342. The second adder 5342 superimposes the PG planes 5604 and 5605 on the plane data received from the first adder 5341 and transmits the result to the third adder 5343. As a result, the left-view PG plane 5604 is superimposed on the left-video plane 5301, and the right-view PG plane 5605 is superimposed on the right-video plane 5302.

[Use of Offset Information in Two Plane Mode]

The second cropping unit 5632 in two plane mode may use the offset information 5307 to perform offset control on the left-view PG plane 5604 or the right-view PG plane 5605. This offset control has the advantages described below.

In L/R mode, instead of the left-view PG stream 312A in the first sub-TS shown in FIG. 3B, the PG stream 303A in the main TS shown in FIG. 3A (hereinafter abbreviated as "2D/PG stream" may be used as the left-view PG plane. In other words, in the base-view stream entry 4143 shown in FIG. 41, the sub-path ID reference information 4151 indicates the main path, the stream file reference information 4152 indicates the file 2D in which the 2D/PG stream is stored, and the PID 4153 indicates the PID of the 2D/PG stream. In this case, the first sub-TS need not include a left-view PG stream, thereby reducing the data amount of the 3D video image content.

Figure 57A:
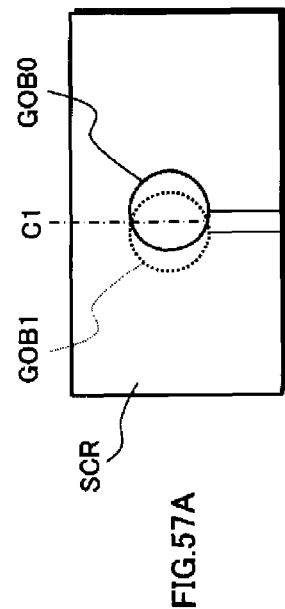
FIGS. 57A, 57B, and 57C are schematic diagrams showing a left-view graphics image GOB0 represented by a 2D/PG stream and right-view graphics images GOB1-3 represented by a right-view PG stream.
Figure 57B:
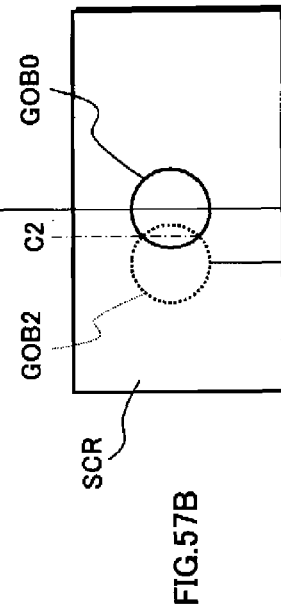
Figure 57C:
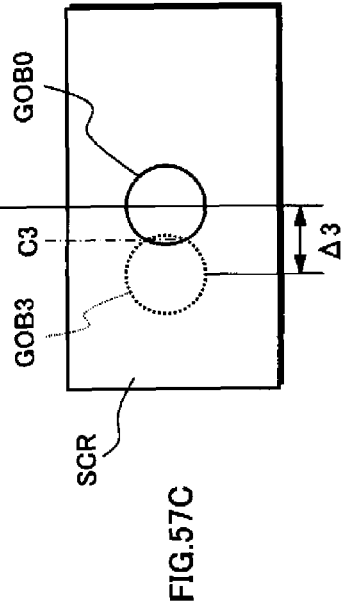

Conversely, however, there is a risk of the following problems occurring in 3D graphics images. FIGS. 57A, 57B, and 57C are schematic diagrams showing a left-view graphics image GOB 0 represented by a 2D/PG stream and right-view graphics images GOB 1-3 represented by a right-view PG stream. In FIGS. 57A, 57B, and 57C, the solid line in the screen SCR indicates the left-view graphics image GOB 0, and the dashed line indicates the right-view graphics images GOB 1-3. The distances Δ1, Δ2, and Δ3 between the graphics images grow larger in the order of FIGS. 57A, 57B, and 57C (Δ1<Δ2<Δ3), and therefore the difference in depth between the 3D graphics image and the screen SCR grows larger. Accordingly, when the pair of graphics images is displayed in the order of FIGS. 57A, 57B and 57C, the 3D graphics image appears to jump out and be closer than the screen SCR. When the left-view graphics image GOB 0 represents a subtitle, the image GOB 0 is also used as a 2D video image, and therefore the presentation position is constant throughout FIGS. 57A, 57B, and 57C. On the other hand, the presentation position of the right-view graphics images GOB 1-3 shifts to the left in the order of FIGS. 57A, 57B, and 57C. Accordingly, the central positions C1, C2, and C3 of the graphics images shift to the left in the order of FIGS. 57A, 57B, and 57C. In other words, the 3D graphics image of the subtitle appears to shift to the left. This sort of shift in the subtitle runs the risk of causing the viewer to feel uncomfortable.

Figure 57D:
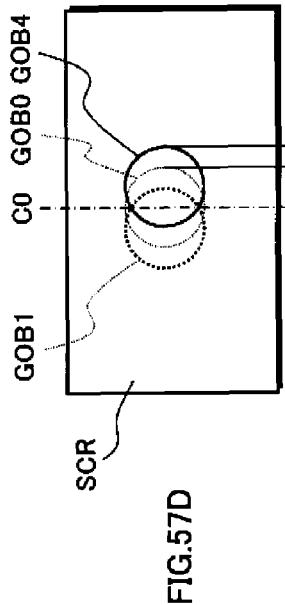
FIGS. 57D, 57E, and 57F are schematic diagrams respectively showing offset control for the left-view graphics images shown in FIGS. 57A, 57B, and 57C.
Figure 57E:
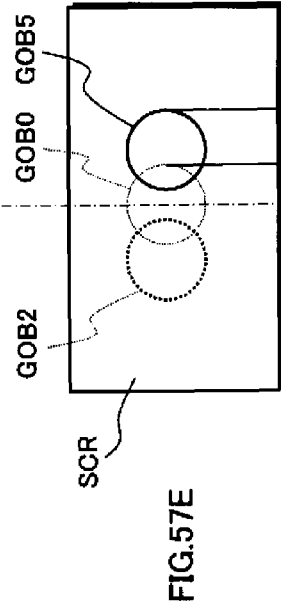
Figure 57F:
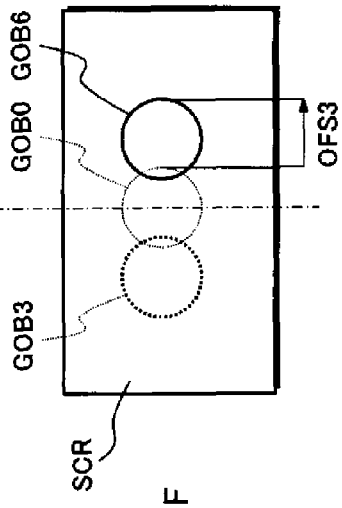

The second cropping unit 5332 in two plane mode uses offset control in accordance with offset information in the following way to prevent a horizontal shift in a 3D graphics image. FIGS. 57D, 57E, and 57F are schematic diagrams respectively showing offset control for the left-view graphics images shown in FIGS. 57A, 57B, and 57C. In FIGS. 57D, 57E, and 57F, the solid line in the screen SCR indicates the left-view graphics images GOB 4-6 after offset control, the thin dashed line indicates the left-view graphics image GOB 0 before offset control, and the thick dashed line indicates the right-view graphics images GOB 1-3. The second cropping unit 5332 provides the offsets OFS1, OFS2, and OFS3 indicated by the arrows in FIGS. 57D, 57E, and 57F to the left-view PG plane in that order. In this way, the left-view graphics images GOB 4-6 after offset control shift further to the right than the image GOB 0 before offset control. As a result, the central position C0 of the graphics images in FIGS. 57D, 57E, and 57F is maintained constant, and the 3D graphics image does not appear to shift horizontally. Using the 2D/PG stream as the left-view PG stream in this way avoids the risk of causing the viewer to feel uncomfortable.

<Effects of Embodiment 1>

On the BD-ROM disc 101 according to Embodiment 1 of the present invention, AV stream files of 3D video images are divided into data blocks that form a plurality of extent blocks. In particular, the sizes of the data blocks and extent blocks satisfy the above conditions. These conditions can be reorganized as the following allocation rules.

[Rule 1] A file base matches a file 2D bit-for-bit. However, the LBNs need not match between base-view extents EXT1[•] and 2D extents EXT2D[•].

[Rule 2] An extent SS EXTSS[•] is a data region in which an integer number of pairs of a base-view extent EXT1[$i$] and a dependent-view extent EXT2[•] are located consecutively in an interleaved arrangement.

[Rule 3] As shown in FIG. 15, the $(i+1)^{th}$ base-view extent EXT1[$i$] from the top of a file base (the letter i represents an integer zero or greater) and the $(i+1)^{th}$ dependent-view extent EXT2[$i$] from the top of a file DEP are located consecutively in a logical address space in the reverse order, i.e., the dependent-view extent EXT2[$i$] is located before the base-view extent EXT1[$i$]: EXT2[$i$]→EXT1[$i$].

[Rule 4] The sizes of base-view extents EXT1[•] and dependent-view extents EXT2[•] are set to integer multiples of the size of an aligned unit (=approximately 6 KB).

[Rule 5] ATSs of source packets belonging to the $(i+1)^{th}$ base-view extent EXT1[$i$] and ATSs of source packets belonging to the $(i+1)^{th}$ dependent-view extent EXT2[$i$] are expressed on the same ATC time axis.

[Rule 6] The $(i+1)^{th}$ base-view extent EXT1[$i$] and the $(i+1)^{th}$ dependent-view extent EXT2[$i$] have the same extent ATC time.

[Rule 7] A base-view extent EXT1[•] satisfies condition 1, except when located at the end of an extent SS EXTSS[•] and when not referred to by the file entry of any file 2D. In other words, the size $S_{EXT2D}$[•] of a 2D extent EXT2D[•] satisfies expression (1).

[Rule 8] A base-view extents EXT1[•] satisfies condition 2 except when located at the end of an extent SS EXTSS[•]. In other words, the size $S_{EXT1}$[•] of a base-view data block satisfies expression (2).

[Rule 9] A dependent-view extent EXT2[•] satisfies condition 3 except when located at the end of an extent SS EXTSS[•]. In other words, the size $S_{EXT2}$[•] of a dependent-view data block satisfies expression (3).

[Rule 10] When the $(i+1)^{th}$ extent SS EXTSS[i] and the $(i+2)^{th}$ extent SS EXTSS[i+1] from the top of a file SS are seamlessly connected with each other, the $(i+1)^{th}$ extent SS EXTSS[i] satisfies condition 4. In other words, the size $S_{EXTSS}$[i] of the $(i+1)^{th}$ extent block satisfies expression (4).

[Rule 11] The $(i+1)^{th}$ base-view extent EXT1[$i$] and the $(i+1)^{th}$ dependent-view extent EXT2[$i$] satisfy condition 5. In other words, the sizes of base-view data blocks and dependent-view data blocks are equal to or less than the maximum extent size specified by the table in FIG. 28A.

In particular, by satisfying rule 11, when the system rate for a file DEP rises above a predetermined threshold value (for example, 32 Mbps), the maximum extent size of data blocks of type (B) to be read immediately before a long jump is reduced. As a result, the BD-ROM disc 101 enables the playback device 102 to maintain the lower limit of the capacity of RB2 within an acceptable range, while satisfying other rules. Thus, the disc enables the read buffers in the playback device in either 2D playback mode or 3D playback mode to have more reduced capacities without causing underflow in the read buffers.

<MODIFICATIONS>

(1-A) In L/R mode according to Embodiment 1 of the present invention, the base-view video stream represents the left view, and the dependent-view video stream represents the right view. Conversely, however, the base-view video stream may represent the right view and the dependent-view video stream the left view. On the BD-ROM disc 101 according to Embodiment 1 of the present invention, the base-view video stream and the dependent-view video stream are multiplexed in different TSs. Alternatively, the base-view video stream and the dependent-view video stream may be multiplexed into a single TS.

(1-B) In the AV stream files representing 3D video images, 3D descriptors may be added to the PMT 1410 shown in FIG. 14. The "3D descriptors" are information on the playback format of 3D video images, are shared by the entire AV stream file, and particularly include 3D format information. The "3D format information" indicates the playback format, such as L/R mode or depth mode, of the 3D video images in the AV stream file. Furthermore, 3D stream descriptors may be added to each piece of stream information 1403 included in the PMT 1410. "3D stream descriptors" indicate information on the playback format of 3D video images for each elementary stream included in the AV stream file. In particular, the 3D stream descriptors of the video stream include a 3D display type. The "3D display type" indicates whether the video images in the video stream are a left view or a right view when the video images are played back in L/R mode. The 3D display type also indicates whether the video images in the video stream are 2D video images or depth maps when the video images are played back in depth mode. When the PMT 1410 thus includes information regarding the playback format of 3D video images, the playback system of these video images can acquire such information simply from the AV stream file. This sort of data structure is therefore useful when distributing 3D video image content via a broadcast.

(1-C) The dependent-view clip information file may include a predetermined flag in the video stream attribute information allocated to PID=0x1012, 0x1013 of the dependent-view video stream. When turned on, this flag indicates that the dependent-view video stream refers to the base-view video stream. Furthermore, the video stream attribute information may include information regarding the base-view video stream to which the dependent-view video stream refers. This information can be used to confirm the correspondence between video streams when verifying, via a predetermined tool, whether the 3D video image content has been created in accordance with a prescribed format.

In Embodiment 1 of the present invention, the sizes of base-view extents and of dependent-view extents can be calculated from the extent start points included in the clip information file. Alternatively, a list of the size of each extent may be stored in, for example, the clip information file as part of the metadata.

(1-D) The 3D playlist file 222 shown in FIG. 39 includes one sub-path 3902. Alternatively, the 3D playlist file may include a plurality of sub-paths. For example, if the sub-path type of one sub-path is "3D L/R", then the sub-path type of the other sub-path may be "3D depth". If the sub-path for playback switches between these two types of sub-paths when 3D video images are played back in accordance with the 3D playlist file, the playback device 102 can easily switch between L/R mode and depth mode. In particular, such switching can be performed more rapidly than switching the 3D playlist file itself.

The 3D playlist file may include a plurality of sub-paths having the same sub-path type. For example, when 3D video images having different binocular parallax for the same scene are represented by different right views for a common left view, the plurality of files DEP representing the different right-views are recorded on the BD-ROM disc 101. In this case, the 3D playlist file includes a plurality of sub-paths having a sub-path type of "3D L/R". These sub-paths individually specify playback paths of the different files DEP. When 3D video images are played back in accordance with this 3D playlist file, the sub-path for playback can rapidly be switched by, for example, user operation. Therefore, the binocular parallax of 3D video images is changed without substantially interrupting the 3D video images. Accordingly, the user can easily be allowed to select the binocular parallax of 3D video images.

In the 3D playlist file 222 shown in FIG. 39, the base-view video stream is registered in the STN table in the main path 3901, and the dependent-view video stream is registered in the STN table SS 3930 in the extension data 3903. Alternatively, the dependent-view video stream may be registered in the STN table. In this case, the STN table may include a flag indicating whether the registered video stream represents a base view or a dependent view.

The 2D playlist file and 3D playlist file are recorded separately on the BD-ROM disc 101 according to Embodiment 1 of the present invention. Alternatively, the sub-path 3902 shown in FIG. 39 may, like the extension data 3903, be recorded in an area only referred to by the playback device 102 in 3D playback mode. In this case, the sub-path 3902 does not run the risk of causing the playback device 102 in 2D playback mode to malfunction, and the 3D playlist file can be used as is as a 2D playlist file. This simplifies the authoring process of the BD-ROM disc.

(1-E) The index file 211 shown in FIG. 43 includes a 3D existence flag 4320 and a 2D/3D preference flag 4330 that are shared by all titles. Alternatively, the index file may set a different 3D existence flag or 2D/3D preference flag for each title.

(1-F) In the 3D playback device, in addition to the parental level being set in SPRM(13), a 3D parental level may be set in the SPRM(30). The 3D parental level indicates a predetermined restricted age and is used for parental control of viewing of 3D video titles recorded on the BD-ROM disc 101. Like the value of the SPRM(13), the user of the 3D playback device sets the value of the SPRM(30) via, for example, an OSD of the 3D playback device. The following is an example of how the 3D playback device performs parental control on each 3D video title. First, the 3D playback device reads, from the BD-ROM disc 101, the age at which viewers are permitted to view the title in 2D playback mode and compares this age with the value of the SPRM(13). If the age is greater than the value of the SPRM(13), the 3D playback device stops playback of the title. If the age is equal to or less than the value of the SPRM(13), the 3D playback device then reads, from the BD-ROM disc 101, the age at which viewers are permitted to view the title in 3D playback mode and compares this age with the value of the SPRM(30). If the age is equal to or less than the value of the SPRM(30), the 3D playback device plays the title back in 3D playback mode. If the age is equal is greater than the value of the SPRM(30), the 3D playback device plays the title back in 2D playback mode. This takes differences in interpupillary distance due to age into consideration, allowing for parental control in which, for example, "children under a certain age can only view 3D video images as 2D video images". Preferably, this parental control is performed when, during selection of the playlist file for playback shown in FIG. 44, it is determined that "the display device supports 3D video images", i.e. when the result of step S4405 is "Yes". Note that instead of a restricted age, a value indicating whether to permit or prohibit 3D playback mode may be set in the SPRM(30), the 3D playback device then determining whether 3D playback mode is valid or invalid in accordance with this value.

(1-G) In the 3D playback device, a value indicating that "either 2D playback mode or 3D playback mode is to be prioritized" may be set in the SPRM(31). The user of the 3D playback device sets the value of the SPRM(31) via, for example, an OSD of the 3D playback device. The 3D playback device refers to both the 2D/3D preference flag and the SPRM(31) in step S4403 show in FIG. 44, i.e. the processing to select a playlist file for playback. If both indicate 2D playback mode, the 3D playback device selects 2D playback mode. If both the 2D/3D preference flag and the SPRM(31) indicate 3D playback mode, the 3D playback device performs step S4405, i.e. HDMI authentication, without displaying a playback mode selection screen. As a result, if the display device supports playback of 3D video images, the 3D playback device selects 3D playback mode. If the 2D/3D preference flag and the SPRM(31) indicate different playback modes, the 3D playback device performs step S4404, i.e.

displays a playback mode selection screen for the user to select the playback mode. Alternatively, an application program may be caused to select the playback mode. In this way, even if the 2D/3D preference flag is set for 3D video image content, the user is only asked to select the playback mode again when the playback mode indicated by the SPRM(31), i.e. the playback mode that the user has already set, does not match the playback mode indicated by the value of the 2D/3D preference flag.

An application program, such as a BD-J object, may refer to the SPRM(31) and select the playback mode. Furthermore, when asking the user to select the playback mode in step S4404, the initial condition of the menu displayed on the selection screen may be determined in accordance with the value of the SPRM(31). For example, if the value of the SPRM(31) indicates to prioritize 2D playback mode, the menu is displayed with the cursor positioned over the selection button for 2D playback mode, whereas if the value of the SPRM(31) indicates to prioritize 3D playback mode, the menu is displayed with the cursor positioned over the selection button for 3D playback mode. Additionally, when the 3D playback device has a function for managing a plurality of user accounts, such as father, mother, child, etc., the 3D playback device may set the value of the SPRM(31) in conjunction with the account of the user that is currently logged in.

In addition to indicating that "either 2D playback mode or 3D playback mode is to be prioritized", the value of the SPRM(31) may indicate that "either 2D playback mode or 3D playback mode is to be set as a default". If the value of the SPRM(31) indicates that "2D playback mode is to be set as a default", the 3D playback device always selects 2D playback mode, regardless of the value of the 2D/3D preference flag. In this case, the value of the SPRM(25) is set to indicate 2D playback mode. If the value of the SPRM(31) indicates that "3D playback mode is to be set as a default", the 3D playback device performs HDMI authentication without displaying a playback mode selection screen, regardless of the value of the 2D/3D preference flag. In this case, the value of the SPRM (25) is set to indicate 3D playback mode (L/R mode or depth mode). Even if the 2D/3D preference flag is set for 3D video image content, the playback mode that the user has already set is thus always prioritized.

(1-H) When the system rate $R_{TS2}$ for the file DEP is set as high as the system rate $R_{TS1}$ for the file 2D, the dependent-view transfer rate $R_{EXT2}$ can also rise to the same level. When the transfer rate $R_{EXT2}[n]$ for the $(n+1)^{th}$ dependent-view data block rises in this way, then based on the limit on the sum of the mean transfer rates $R_{EXT1}[n]$ and $R_{EXT2}[n]$, the transfer rate $R_{EXT1}[n]$ for the $(n+1)^{th}$ base-view data block falls conspicuously below the maximum value $R_{MAX1}$. On the other hand, the mean transfer rate $R_{EXT2D}$ included in the denominator in the right-hand side of expression (7) is estimated at the maximum value thereof, $R_{MAX2D}$. Furthermore, the upper limit of the extent ATC time of the $(n+1)^{th}$ base-view data block is the value expressed by the ratio of the maximum extent size of the data block to the base-view transfer rate $R_{EXT1}[n]$. Accordingly, the upper limit is conspicuously longer than the actual extent ATC time. Since the extent ATC time is the same for the $(n+1)^{th}$ base-view data block and the $(n+1)^{th}$ dependent-view data block, the size of the dependent-view data block equals, at most, the product of the dependent-view transfer rate $R_{EXT2}[n]$ and the above upper limit of the extent ATC time. This size is conspicuously larger than the actual value required for seamless playback, thus preventing further reduction of the capacity of the RB2 2212. Accordingly, when the system rate $R_{TS2}$ for the file DEP can be set as high as the system rate $R_{TS1}$ for the file 2D, expression (7) is changed to expression (12):

$$S_{EXT1}[n] \leq \text{CEIL}\left(\frac{R_{EXT1}[n]}{8} \times \frac{R_{UD54}}{R_{UD54} - \min\left(\begin{array}{c} R_{MAX2D}, R_{MAX1} + \\ R_{MAX2} - R_{EXT2}[n] \end{array}\right)} \times T_{JUMP\_2D\_MIN}\right). \quad (12)$$

In the right-hand side of expression (12), the lower of (i) the maximum value $R_{MAX2D}$ of the mean transfer rate for the 2D extent and (ii) the difference between the sum $R_{MAX1}+R_{MAX2}$ of the maximum values of the transfer rates and the dependent-view transfer rate $R_{EXT2}$ is used as the transfer rate included in the denominator. In this context, the sum $R_{MAX1}+R_{MAX2}$ of the maximum values of the transfer rates equals 192/188 times the sum $R_{TS1}+R_{TS2}$ of the system rates. Accordingly, when the dependent-view transfer rate $R_{EXT2}$ rises to the same level as the system rate, the maximum extent size is estimated at the above difference. The upper limit of the extent ATC time of the base-view data block is thus maintained at a value near the actual extent ATC time. Therefore, the size of the dependent-view data block is maintained at a level actually necessary for seamless playback. The capacity of the RB2 2212 is thus kept sufficiently low.

(1-I) Conditions on Setting ATS during Seamless Playback across PI

Within one playback section (PI), as shown in FIG. 17, when the extent ATC times for the $(i+1)^{th}$ extent pair EXT1[$i$], EXT2[$i$] (i=0, 1, 2, . . . ) are aligned, the ATS A2(0) of the source packet (SP2 #0) at the top of the dependent-view data block EXT2[$i$] is set to be equal to or greater than the ATS A1(0) of the source packet (SP1 #0) at the top of the base-view data block EXT1[$i$]: A2(0)≧A1(0). However, the transfer periods from the RB1 and RB2 to the system target decoder are not strictly aligned between the $(i+1)^{th}$ extent pair EXT1[$i$] and EXT2[$i$]. On the other hand, when different PIs are seamlessly connected under the condition "connection condition (CC)=6", then as shown in FIG. 37B, the ATCs must be consecutive between the PIs. Accordingly, as described below, there is a risk of underflow occurring in the RB2 at the connection point between the different PIs.

FIG. 58A is a schematic diagram indicating times at which data blocks are transferred from RB1 and RB2 to the system target decoder when PI #(N−1) and PI #N are connected seamlessly (the letter N representing an integer one or greater), the data blocks being located before and after the connection point. The $(n+1)^{th}$ extent pair, EXT1[$n$] and EXT2[$n$] (the letter n representing an integer zero or greater), is located at the end of PI #(N−1), and the $(n+2)^{th}$ extent pair, EXT1[$n$+1] and EXT2[$n$+1], is located at the top of PI #N. In this context, the ATC may be discontinuous between the end of EXT1[$n$] and the top of EXT1[$n$+1]. The same is true for the end of EXT2[$n$] and the top of EXT2[$n$+1]. As shown in FIG. 58A, the transfer period $T_{ATC}20[n]$ of EXT2[$n$] finishes later than the transfer period $T_{ATC}1[n]$ of EXT1[$n$]. In other words, the ATS A2(0) of SP2 #0 in EXT2[n+1] is larger than ATS A1(0) of SP1 #0 in EXT1[n+1]. Between ATS A1(0) and A2(0), the transfer period of the end portion 5801 of EXT2[n] overlaps the transfer period of the top portion of EXT1[n+1].

FIGS. 58B and 58C are graphs showing changes over time in the data amounts DA1 and DA2 stored in RB1 and RB2 when the 3D playback device decodes EXT1[n], EXT1[n+1], EXT2[n], and EXT2[n+1] shown in FIG. 58A. As shown in FIG. 58B, the data amount DA1 stored in the RB1 rises during the read period $PR_B[n]$ of EXT1[n] and falls during the period PJ, when either a jump from the end of EXT1[n] to the top of EXT2[n+1] or a zero sector transition occurs, and during the read period $PR_D[n+1]$ of EXT2[n+1]. On the other hand, the length of the transfer period $T_{ATC}1[n]$ of EXT1[n] is set to be equal to or longer than the time from the start time of the read period $PR_B[n]$ of EXT1[n] to the start time of the read period $PR_B[n+1]$ of EXT1[n+1]. Accordingly, the stored data amount DA1 at the latter start time does not fall below the value at the former start time. In other words, underflow does not occur in RB1. As shown in FIG. 58C, the data amount DA2 stored in the RB2 rises during the read period $PR_D[n]$ of EXT2[n] and falls during the read period $PR_B[n]$ of EXT1[n] and during the period PJ of the above jump or zero sector transition. On the other hand, the length of the transfer period $T_{ATC}20[n]$ of EXT2[n] is set to be equal to or longer than the time from the start time of the read period $PR_B[n]$ of EXT1[n] to the start time of the read period $PR_B[n+1]$ of EXT1[n+1]. Accordingly, the stored data amount DA2 at the start time TS1 of the read period $PR_D[n+1]$ of EXT2[n+1] is larger than the value at the start time TS0 of the read period $PR_D[n]$ of EXT2[n]. In other words, underflow does not occur in RB2. As shown in FIG. 58A, then, no problem occurs during connection between different PIs if the transfer period $T_{ATC}20[n]$ of EXT2[n] finishes later than the transfer period $T_{ATC}1[n]$ of EXT1[n].

Like FIG. 58A, FIG. 58D is a schematic diagram indicating times at which data blocks are transferred from RB1 and RB2 to the system target decoder when PI #(N−1) and PI #N are connected seamlessly, the data blocks being located before and after the connection point. Unlike FIG. 58A, however, in FIG. 58D the transfer period $T_{ATC}21[n]$ of EXT2[n] finishes earlier than the transfer period $T_{ATC}1[n]$ of EXT1[n]. In other words, the ATS A2(0) of SP2 #0 in EXT2[n+1] is smaller than the ATS A1(0) of SP1 #0 in EXT1[n+1]. Between the ATS A2(0) and A1(0), the transfer period of the top portion 5811 of EXT2[n+1] formally overlaps the transfer period of the end portion of EXT1[n].

FIGS. 58E and 58F are graphs showing changes over time in the data amounts DA1 and DA2 stored in RB1 and RB2 when the 3D playback device decodes EXT1[n], EXT1[n+1], EXT2[n], and EXT2[n+1] shown in FIG. 58D. The graph in FIG. 58E is the same as the graph in FIG. 58B. Accordingly, underflow does not occur in RB1. As shown in FIG. 58F, the data amount DA2 stored in the RB2 rises during the read period $PR_D[n]$ of EXT2[n] and falls during the read period $PR_B[n]$ of EXT1[n]. In this graph, the transfer period $T_{ATC}21[n]$ of EXT2[n] finishes earlier than the read period $PR_B[n]$ of EXT1[n]. Accordingly, the data amount DA2 stored in the RB2 returns to the value at the start time TS0 of the read period $PR_D[n]$ of EXT2[n] at a time TUF that is before the time when the read period $PR_B[n]$ of EXT1[n] finishes. In this case, EXT2[n+1] cannot be read from the BD-ROM disc to the RB2 during the read period $PR_B[n]$ of EXT1[n] and the period PJ of the jump or zero sector transition. As a result, in contrast with the setting of the ATS in the EXT2[n+1], transfer of data from the RB2 to the system target decoder stops during the period from the end time TUF of the transfer period $T_{ATC}21[n]$ of EXT2[n] to the start time TS1 of the read period $PR_D[n]$ of EXT2[n+1]. In other words, underflow occurs in RB2. As shown in FIG. 58D, then, a problem may occur during connection between different PIs if the transfer period $T_{ATC}21[n]$ of EXT2[n] finishes earlier than the transfer period $T_{ATC}1[n]$ of EXT1[n].

In order to prevent underflow in the RB2 caused by seamless connection between PIs, it suffices to adopt one of the following two methods. The first method is to set the time indicated by the ATS that is set in the dependent-view extent read after the connection point of the PIs to be at or later than the end time of the transfer period of the base-view extent read before the connection point. The second method makes preloading unnecessary during seamless connection between extent blocks.

(1-I-1) First Method

FIGS. 59A and 59B are schematic diagrams showing, when seamless connection is set to CC=6, 5 between PI #(N−1) and PI #N, correspondence between the ATS set for each of the source packets and the transfer period of the source packet according to the first method. The $(n+1)^{th}$ extent pair, EXT1[n] and EXT2[n], is located at the end of PI #(N−1), and the $(n+2)^{th}$ extent pair, EXT1[n+1] and EXT2 [n+1], is located at the top of PI #N. In FIGS. 59A and 59B, the rectangles 5910 in the upper level represent the transfer periods of source packets included in EXT1[n] and EXT1[n+1], and the rectangles 5920 in the lower level represent the transfer periods of source packets included in EXT2[n] and EXT2[n+1]. The ATC axis parallel to the time axis indicates the relationship of ATSs between source packets. In this figure, the position of the top of each rectangle 5910 and 5920 along the ATC axis represents the value of the ATS of the corresponding source packet. Since the CC=6 in FIG. 59A, the ATC is continuous between PI #(N−1) and PI #N. On the other hand, since the CC=5 in FIG. 59B, the ATC is discontinuous between PI #(N−1) and PI #N.

As shown in FIGS. 59A and 59B, the transfer start time T22 of the source packet SP22 located at the top of EXT2[n+1] is equal to or later than the transfer end time T12 of the source packet SP11 located at the end of EXT1[n]: $T22 \geqq T12$. In this case, after all of the source packets in EXT1[n] have been transferred, the source packet SP22 located at the top of EXT2[n+1] should be transferred. The actual transfer period of EXT2[n+1] is thus made to conform to the period indicated by the ATS set in EXT2[n+1]. In other words, underflow is prevented in RB2.

The time AT1 required to transfer one TS packet belonging to the main TS equals 188 bytes, the length of a TS packet, divided by the recording rate RMTS of the main TS: AT1=188/RMTS. Accordingly, the transfer end time T12 of the source packet SP11 located at the end of EXT1[n] is later than the transfer start time T11 of the source packet SP11 by the transfer time AT1 for one TS packet belonging to the main TS: T12=T11+AT1=T11+188/RMTS. In FIG. 59A, the ATC is continuous through PI #(N−1) and PI #N, and therefore the transfer start times T11 and T22 of the source packets SP11 and SP22 can be expressed by the ATSs A11 and A22 of the source packets. In other words, the above condition T22>T12 can be represented as expression (13):

$$A22 \geqq A11 + 188/RMTS. \qquad (13)$$

On the other hand, in FIG. 59B, the ATC is discontinuous between PI #(N−1) and PI #N. In this context, the ATC for PI #(N−1) is referred to as "ATC1", and the ATC for PI #N is referred to as "ATC2". In this case, the difference in ATS A22−A21 between the source packet SP21 located at the end of EXT2[n] and the source packet SP22 located at the top of EXT2[n+1] does not necessarily match ΔT2, the difference in transfer start times T22−T21 between the source packets SP21 and SP22. However, by using ΔA2, which is the difference ΔT2 in transfer start times counted in units of ATC1, the transfer start time T22 of source packet SP22 located at the top of EXT2[n+1] can be expressed as the ATS A21 of source packet SP21 located at the end of EXT2[n]. In other words, the above condition T22≧T12 can be represented as expression (14):

$$A21 + \Delta A2 \geq A11 + 188/R_{MTS}. \qquad (14)$$

(1-I-2) Second Method

Figures 60A, 60B:
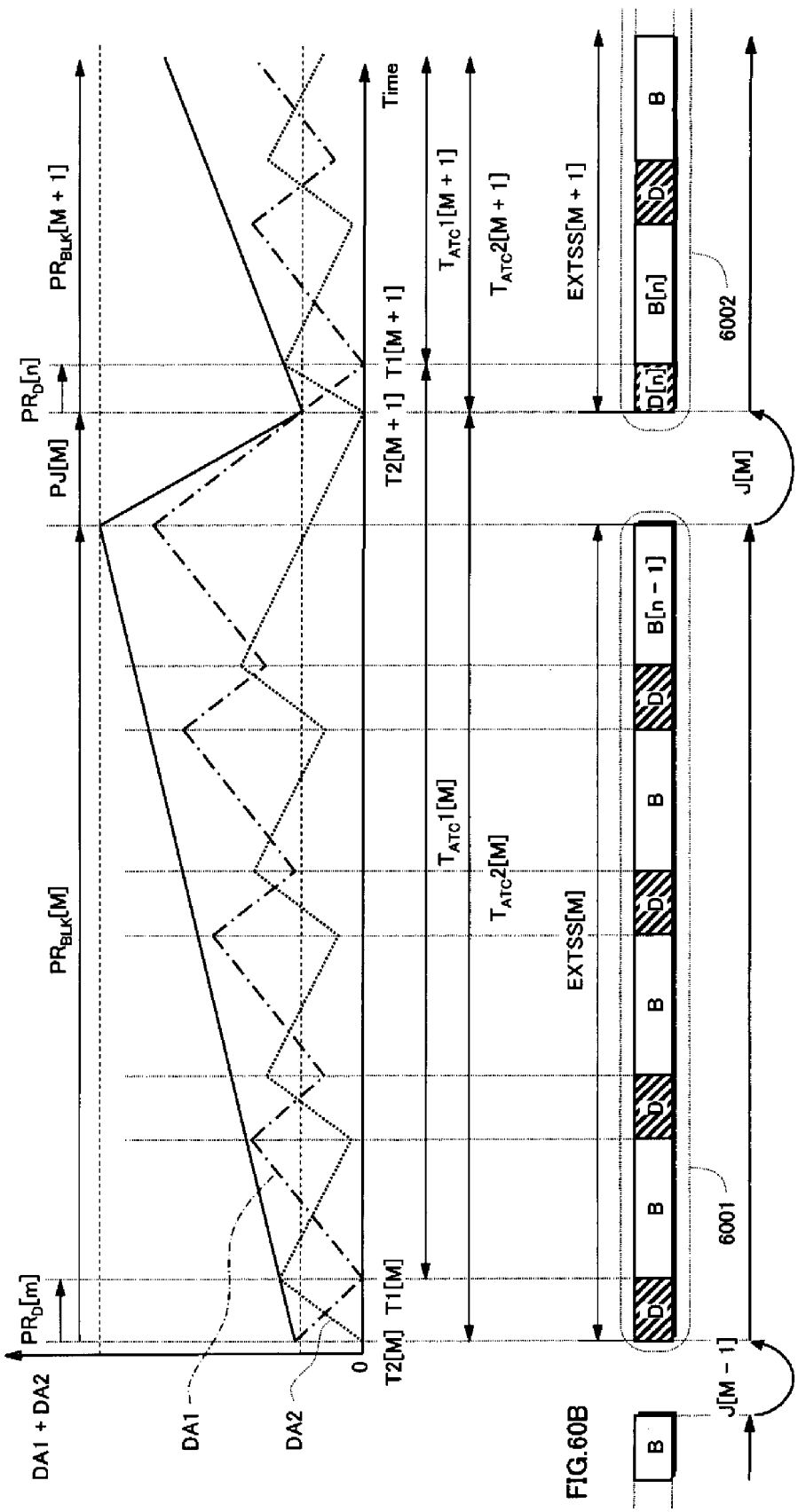
FIG. 60A is a graph showing (i) changes in data amounts DA1 and DA2, respectively stored in RB1 and RB2, when the $(M+1)^{th}$ extent block (EXTSS[M]) 6001 and $(M+2)^{th}$ extent block (EXTSS[M+1]) 6002 are seamlessly connected (the letter M representing an integer one or greater) and (ii) changes in the sum of DA1+DA2.
FIG. 60B is a schematic diagram showing the extent blocks EXTSS[M] 6001 and EXTSS[M+1] 6002 and a playback path 6020 in 3D playback mode.

FIG. 60B is a schematic diagram showing the $(M+1)^{th}$ extent block (EXTSS[M]) 6001 (the letter M representing an integer one or greater), $(M+2)^{th}$ extent block (EXTSS[M+1]) 6002, and playback path 6020 in 3D playback mode. As shown in FIG. 60B, in accordance with the playback path 6020, the entire EXTSS[M] 6001 is first read all at once. A jump J[M] occurs immediately thereafter. Next, the EXTSS [M+1] 6002 is read all at once.

FIG. 60A is a graph showing changes in data amounts DA1 and DA2 in the RB1 and RB2 when EXTSS[M] 6001 and EXTSS[M+1] 6002 are seamlessly connected and changes in the sum of DA1+DA2. In FIG. 60A, the alternating long and short dashed line indicates changes in the data amount DA1 stored in the RB1, the dashed line indicates changes in the data amount DA2 stored in the RB2, and the solid line indicates changes in the sum DA1+DA2 of the two data amounts. In this graph, the solid line is an approximation that averages small changes each time a data block is read. Furthermore, the zero sector transition time is considered to be zero milliseconds.

As shown in FIG. 60A, during the read period $PR_{BLK}[M]$ of EXTSS[M] 6001, the data amounts DA1 and DA2 respectively stored in the RB1 and RB2 increase, and therefore the sum of these amounts DA1+DA2 increases at a rate equaling the difference $R_{UD72} - R_{EXTSS}[M]$ between the read rate $R_{UD72}$ and the mean transfer rate $R_{EXTSS}[M]$. At the point the last base-view data block B in the EXTSS[M] 6001 is read into the RB1, the sum DA1+DA2 of the stored data amount reaches its maximum value. During the immediately subsequent jump period PJ[M], the sum DA1+DA2 of the stored data amount decreases at the mean transfer rate $R_{EXTSS}[M]$. Furthermore, the read period $PR_{BLK}[M+1]$ of EXTSS[M+1] 6002 begins at the end of the jump period PJ[M].

The second method is to place the data section of the dependent-view stream in which the transfer period overlaps with the end portion of the base-view data block B[n−1] located at the end of EXTSS[M] 6001 in the dependent-view data block D[n] located at the top of EXTSS[M+1] 6002. By doing so, preloading is unnecessary during the read period $PR_D[n]$ of the dependent-view data block D[n] located at the top of EXTSS[M+1] 6002. In other words, during the read period $PR_D[n]$, the transfer period $T_{ATC}1[M]$ of the base-view data blocks B[m], ..., B[n−1] included in EXTSS[M] 6001 is caused to overlap with the transfer period $T_{ATC}2[M+1]$ of the dependent-view data blocks D[n], ... included in EXTSS [M+1] 6002. In this case, the bit rate of the dependent-view data block D[n] located at the top of EXTSS[M+1] 6002 is adjusted so that the sum of the base-view transfer rate and the dependent-view transfer rate does not exceed a predetermined threshold value.

Furthermore, condition 4 for preventing underflow in the RB1 and RB2 during a jump J[M] is changed as follows. First, the length of the transfer period $T_{ATC}1[M]$ of the entire base-view data block included in EXTSS[M] 6001 should be equal to or greater than the time from the read start time T1 [M] of the top base-view data block B[m] to the read start time T1[M+1] of the top base-view data block B[n] in EXTSS[M+ 1] 6002. As is clear from FIG. 60A, the period T1[M+1]−T1 [M] equals the sum of the length of the read period $PR_{BLK}[M]$ of the EXTSS[M] 6001, the jump time $T_{JUMP}[M]$ of the jump J[M], and the difference $T_{DIFF}[M]$ in the lengths of the read periods $PR_D[n]$ and $PR_D[m]$ of the top dependent-view data blocks in the two extent blocks 6001 and 6002. Next, the length of the transfer period $T_{ATC}2[M]$ of the entire dependent-view data block included in EXTSS[M] 6001 should be equal to or greater than the time from the read start time T2[M] of the top dependent-view data block D[m] to the read start time T2[M+1] of the top dependent-view data block D[n] in EXTSS[M+1] 6002. As is clear from FIG. 60A, the period T2[M+1]−T2[M] equals the sum of the length of the read period $PR_{BLK}[M]$ of the EXTSS[M] 6001 and the jump time $T_{JUMP}[M]$ of the jump J[M]. The length of the read period $PR_{BLK}[M]$ of the EXTSS[M] 6001 equals $S_{EXTSS}[M]/R_{UD72}$, the value obtained by dividing the size $S_{EXTSS}[M]$ of the EXTSS[M] 6001 by the read rate $R_{UD72}$. Accordingly, condition 4 is represented as expression (15):

$$T_{ATC}1[M] \geq \left(\frac{S_{EXTSS}[M]}{R_{UD72}} + T_{JUMP}[M] + T_{DIFF}[M]\right), \qquad (15)$$

$$T_{ATC}2[M] \geq \left(\frac{S_{EXTSS}[M]}{R_{UD72}} + T_{JUMP}[M]\right).$$

(I-J) Order of Base-view and Dependent-view Data Blocks

FIG. 61A is a table showing maximum extent sizes max-$S_{EXT1}[n]$ and max$S_{EXT2}[n]$ for different combinations of the base-view transfer rate $R_{EXT1}[n]$ and dependent-view transfer rate $R_{EXT2}[n]$ for one extent pair (the letter n representing an integer zero or greater). In this figure, it is assumed that the sum of the mean transfer rates $R_{EXT1}[n]$ and $R_{EXT2}[n]$ is 60 Mbps, and that each transfer rate $R_{EXT1}[n]$ and $R_{EXT2}[n]$ is equal to or less than 45 Mbps: $R_{EXT1}[n] + R_{EXT2}[n] \leq 60$ Mbps, $R_{EXT1}[n] \leq 45$ Mbps, $R_{EXT2}[n] \leq 45$ Mbps. The maximum extent sizes max$S_{EXT2}[n]$ and max$S_{EXT2}[n]$ are calculated by expression (7). As is clear by how expression (7) includes the read rate $R_{UD54}$ of the BD-ROM drive in 2D playback mode, the maximum extent sizes max$S_{EXT2}[n]$ and max$S_{EXT2}[n]$ depend on the performance of the BD-ROM drive. Accordingly, the values shown in FIG. 61A are merely examples.

As shown in FIG. 61A, when the base-view transfer rate $R_{EXT1}[n]$ is 45 Mbps and the dependent-view transfer rate $R_{EXT2}[n]$ is 15 Mbps, the maximum extent size max$S_{EXT2}[n]$ of a dependent-view extent is 6 MB. Conversely, when the base-view transfer rate $R_{EXT1}[n]$ is 15 Mbps and the dependent-view transfer rate $R_{EXT2}[n]$ is 45 Mbps, the maximum extent size max$S_{EXT2}[n]$ of a dependent-view extent is 8 MB. As in the above description of expressions (5) and (6), as the size of the dependent-view data block located at the top of each extent block increases, the capacity required of the read buffer increases. Accordingly, it is not preferable for the dependent-view transfer rate $R_{EXT2}[n]$ to rise during the preload period of the extent block, since this prevents further reduction in the capacity of the read buffer due to an increase in the maximum extent size max$S_{EXT2}[n]$ of the dependent-view extent.

In order to prevent an increase in the capacity of the read buffer due to a rise in the dependent-view transfer rate $R_{EXT2}$ [n], the maximum extent size should be set in accordance with the table shown in FIG. 28A, as per the above description. Additionally, in the extent pair EXT1[n] and EXT2[n] located at the top of the extent block, when the dependent-view transfer rate $R_{EXT2}[n]$ exceeds the base-view transfer rate $R_{EXT1}[n]$, the base-view data block B[n] may be placed before the dependent-view data block D[n]. In other words, within the extent pair, the data block with the smaller size is placed before the data block with the larger size. By doing so, the capacity of the read buffer can be kept low, as described below.

FIG. 61B is a schematic diagram showing the case when the above arrangement is adapted in the $(M+1)^{th}$ extent block (EXTSS[M]) 6101 and the $(M+2)^{th}$ extent block (EXTSS[M+1]) 6102 respectively located before and after a layer boundary LB (the letter M representing an integer zero or greater). As shown in FIG. 61B, the $(n+1)^{th}$ base-view extent EXT1[$n$] included in the file base 6111 and the $(n+1)^{th}$ dependent-view extent EXT2[$n$] included in the file DEP 6112 are placed in EXTSS[M+1] 6102. In this extent pair EXT1[$n$] and EXT2[$n$], the dependent-view transfer rate $R_{EXT2}[n]$ is higher than the base-view transfer rate $R_{EXT1}[n]$. Accordingly, the base-view data block B[n] is placed before the dependent-view data block D[n]. On the other hand, in the $(n-1)^{th}$, $n^{th}$, and $(n+2)^{th}$ extent pairs EXT1[$k$] and EXT2[$k$] (k=n-2, n-1, n+1), the dependent-view transfer rate $R_{EXT2}[k]$ is lower than the base-view transfer rate $R_{EXT1}[k]$. Accordingly, the dependent-view data block D[k] is placed before the base-view data block B[k].

Figures 62A, 62B:
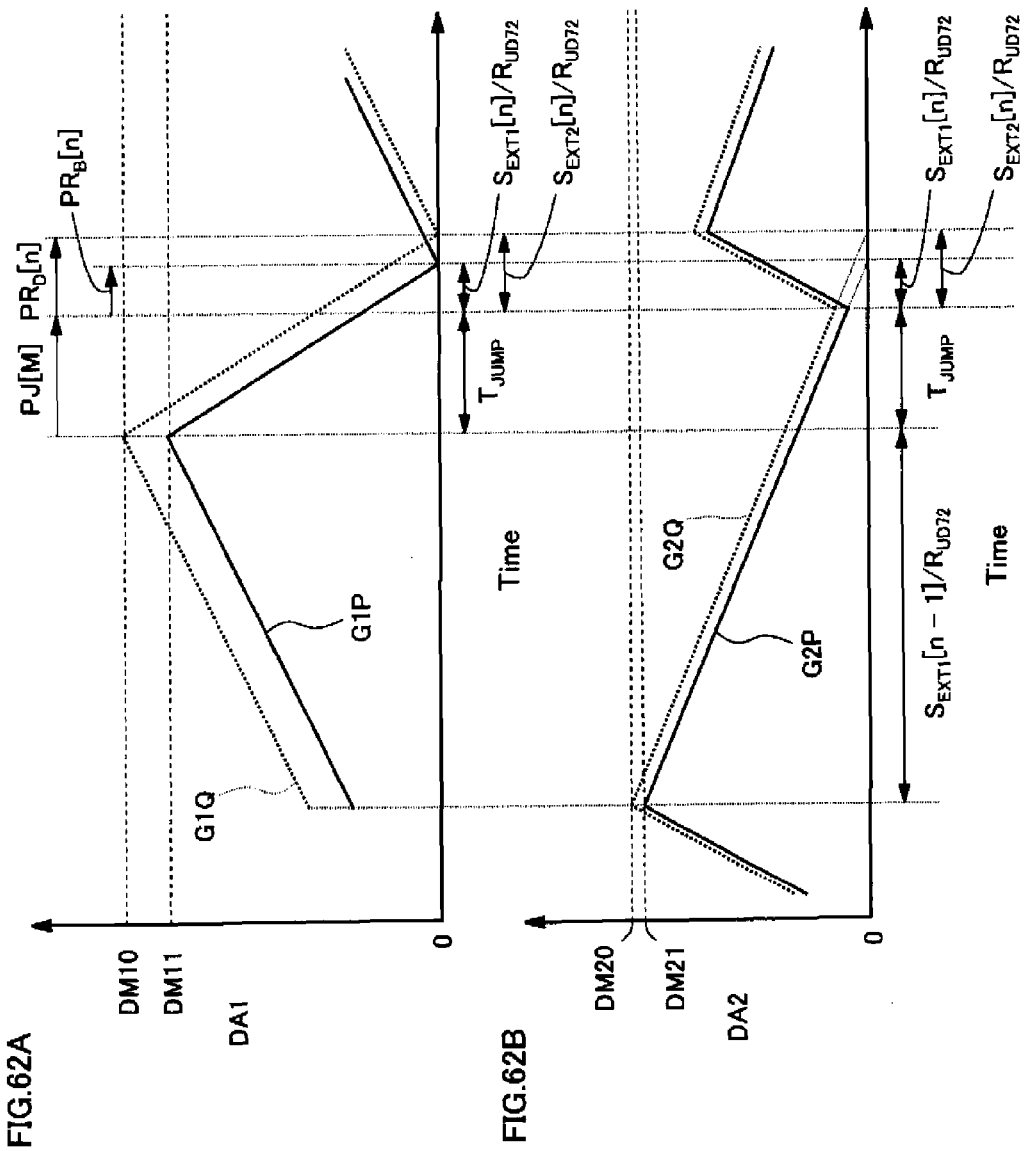
FIGS. 62A and 62B are graphs showing changes in data amounts DA1 and DA2, respectively stored in RB1 and RB2, when 3D video images are continually played back seamlessly from EXTSS[M] 6101 and EXTSS[M+1] 6102 shown in FIG. 61B.

FIGS. 62A and 62B are graphs showing changes in data amounts DA1 and DA2, respectively stored in RB1 and RB2, when 3D video images are continually played back seamlessly from EXTSS[M] 6101 and EXTSS[M+1] 6102 shown in FIG. 61B. The straight lines G1P and G2P indicate changes in the stored data amounts DA1 and DA2 when the base-view data block B[n] is placed before the dependent-view data block D[n] in the $(n+1)^{th}$ extent pair EXT1[$n$] and EXT2[$n$] located at the top of EXTSS[M+1]. The dashed lines G1Q and G2Q indicate changes in the stored data amounts DA1 and DA2 when the dependent-view data block D[n] is placed before the base-view data block B[n] in this extent pair EXT1[$n$] and EXT2[$n$].

As shown in FIG. 62A, the data amount DA1 stored in the RB1 is at a peak value of DM10 or DM11 in the respective lines G1P and G1Q at the time when the last base-view data block B[n-1] in EXTSS[M] 6101 is read into the RB1. Furthermore, the stored data amount DA1 decreases at the base-view transfer rate $R_{EXT1}[n-1]$ from the immediately subsequent jump period PJ[M] through the preload periods $PR_B[n]$ and $PR_D[n]$ of EXTSS[M+1] 6102. In this context, the size of the base-view data block B[n] is smaller than the dependent-view data block D[n] in the $(n+1)^{th}$ extent pair EXT1[$n$] and EXT2[$n$]. Accordingly, the length $S_{EXT1}[n]/R_{UD72}$ of the preload period $PR_B[n]$ when the base-view data block B[n] is placed before the dependent-view data block D[n] is shorter than the length $S_{EXT2}[n]/R_{UD72}$ of the preload period $PR_D[n]$ when the order of placement is reversed.

As a result, the peak value DM11 of the stored data amount DA1 indicated by the solid line G1P is lower than the peak value DM10 indicated by the dashed line G1Q.

As shown in FIG. 62B, the data amount DA2 stored in the RB2 is at a peak value of DM20 or DM21 in the respective lines G2P and G2Q at the time when reading of the last base-view data block B[n-1] in EXTSS[M] 6101 starts. Furthermore, the stored data amount DA2 decreases at a dependent-view transfer rate $R_{EXT2}[n-1]$ from the read period of the base-view data block B[n-1] through the preload periods $PR_B[n]$ and $PR_D[n]$ of EXTSS[M+1] 6102. The length $S_{EXT1}[n]/R_{UD72}$ of the preload period $PR_B[n]$ when the base-view data block B[n] is placed before the dependent-view data block D[n] is shorter than the length $S_{EXT2}[n]/R_{UD72}$ of the preload period $PR_D[n]$ when the order of placement is reversed. As a result, the peak value DM21 of the stored data amount DA2 indicated by the solid line G2P is lower than the peak value DM20 indicated by the dashed line G2Q.

The capacities of the RB1 and RB2 should be equal to or greater than the peak values DM10, DM11, DM20, and DM21 indicated by the lines G1P, G1Q, G2P, and G2Q. Accordingly, when the smaller data block is placed before the larger data block in the extent pair located at the top of the extent block, the capacities of the RB1 and RB2 can be kept low.

Similarly, in the extent pair located at a position where interrupt playback can start, the smaller data block is placed before the larger data block. This keeps the capacity of the read buffer low. In this case, the order of data blocks may be reversed not only at the top of an extent block, but also in any extent pair located within the extent block. FIG. 63A is a schematic diagram showing data structure (syntax) of extent start points for such an arrangement. These extent start points (Extent_Start Point) are set in both the file 2D and the file DEP, like the extent start points shown in FIGS. 32A and 32B. As shown in FIG. 63A, in these extent start points, an extent start flag (is_located_first_in_extent_pair) is allocated for each pair of an extent ID (extent_id) and SPN (SPN_extent_start).

FIG. 63B is a schematic diagram showing correspondence between base-view extents EXT1[$k$] (k=0, 1, 2, ...) belonging to the file base and extent start flags indicated by extent start points. FIG. 63C is a schematic diagram showing correspondence between dependent-view extents EXT2[$k$] belonging to the file DEP and extent start flags. FIG. 63D is a schematic diagram showing correspondence between an extent SS EXTSS[0] belonging to a file SS and extent blocks on the BD-ROM disc. As shown in FIGS. 63B and 63C, a base-view extent EXT1[$k$] and dependent-view extent EXT2[$k$] having the same extent ID form an extent pair. In this extent pair, the values of the extent start flags 6301 and 6302 are reversed. In particular, the extent whose extent start flag is "1" has fewer source packets than the extent whose flag is "0". As shown in FIG. 63D, the extent whose extent start flag is "1" is placed before the extent whose flag is "0". The extent start flags 6301 and 6302 thus indicate which extent in the extent pair EXT1[$n$] and EXT2[$n$] is placed first. Accordingly, the arrangement of data blocks within the extent pair EXT1[$n$] and EXT2[$n$] can be known from the values of the extent start flags 6301 and 6302.

Therefore, even if the order of data blocks differs between extent pairs, the playback control unit 5035 can refer to the extent start points to inform the switch 5020 of the number of source packets from the top of each extent SS to each boundary between data blocks. As a result, the switch 5020 can separate base-view extents and dependent-view extents from the extent SS.

When the order of data blocks is constant within each extent pair, the lower limits of the capacities of the RB1 and RB2 are represented by expressions (5) and (6). By contrast, when the order of data blocks can be reversed within an extent pair located in the middle of an extent block, the lower limits of the capacities of the RB1 and RB2 change as follows.

FIG. 64C is a schematic diagram showing the arrangement of data blocks requiring the largest capacity for RB1. As shown in FIG. 64C, a layer boundary LB is located between the $(M+1)^{th}$ extent block (EXTSS[M]) 6401 and the $(M+2)^{th}$ extent block 6402 (the letter M representing an integer zero or greater). The $(n+1)^{th}$ extent pair D[n] and B[n] is placed at the top of EXTSS[M+1] 6402, and in particular the dependent-view data block D[n] is placed before the base-view data block B[n] (the letter n representing an integer zero or greater). On the other hand, the $n^{th}$ extent pair D[n−1] and B[n−1] is placed at the end of EXTSS[M] 6401, and in particular the base-view data block B[n−1] is placed before the dependent-view data block D[n−1].

FIGS. 64A and 64B are graphs showing changes in data amounts DA1 and DA2, respectively stored in RB1 and RB2, when 3D video images are continually played back seamlessly from EXTSS[M] 6401 and EXTSS[M+1] 6402 shown in FIG. 64C. As shown in FIG. 64A, once the $n^{th}$ base-view data block B[n−1] is read into the RB1, the data amount DA1 stored in the RB1 reaches its peak value DM1. Since no data block is read into RB1 from the read period AT1 of the immediately subsequent dependent-view data block D[n−1] through the period ΔT2 of the long jump to skip the layer boundary LB and the preload period ΔT3 of EXTSS[M+1] 6402, the stored data amount DA1 decreases. During these periods ΔT1-ΔT3, the base-view data blocks B[k] (k= . . . , n−3, n−2) up to the $(n-1)^{th}$ base-view data block are respectively transferred at mean transfer rates $R_{EXT1}$[ . . . , n−3, n−2], and then the $n^{th}$ base-view data block B[n−1] is transferred at a mean transfer rate $R_{EXT1}$[n−1]. To prevent the stored data amount DA1 from reaching zero by the end of the preload period ΔT3, the stored data amount DA1 should at least equal the size $S_{EXT1}$[n−1] of the $n^{th}$ base-view data block B[n−1] at a time that is earlier than the end of the preload period ΔT3 by the extent ATC time $T_{EXT1}$[n−1] of the base-view data block B[n−1]. Accordingly, the peak value DM1 of the stored data amount DA1 should be larger than the size $S_{EXT1}$[n−1] by at least the data amount transferred from the RB1 to the system target decoder during the remaining period ΔT1+ΔT2+ΔT3−$T_{EXT1}$[n−1], i.e. $R_{EXT1}$[ . . . , n−3, n−2] multiplied by (ΔT1+ΔT2+ΔT3−$T_{EXT1}$[n−1]). In other words, the capacity RB1 of the RB1 should at least equal the peak value DM1: RB1≧$S_{EXT1}$[n−1]+$R_{EXT1}$[ . . . , n−3, n−2]×(ΔT1+ΔT2+ΔT3−$T_{EXT1}$[n−1]). In this context, the time ΔT2 of the long jump is estimated at the maximum jump time $T_{JUMP\_MAX}$ of the long jump.

FIG. 64F is a schematic diagram showing the arrangement of data blocks requiring the largest capacity for RB2. As shown in FIG. 64F, a layer boundary LB is located between the $(N+1)^{th}$ extent block (EXTSS[N]) 6403 and the $(N+2)^{th}$ extent block (EXTSS[N+1]) 6404 (the letter N representing an integer zero or greater). The $(n+1)^{th}$ extent pair D[n] and B[n] is placed at the top of EXTSS[N+1] 6404, and in particular the dependent-view data block D[n] is placed after the base-view data block B[n]. On the other hand, the $n^{th}$ extent pair D[n−1] and B[n−1] is placed at the end of EXTSS[N] 6403, and in particular the base-view data block B[n−1] is placed after the dependent-view data block D[n−1].

FIGS. 64D and 64E are graphs showing changes in data amounts DA1 and DA2, respectively stored in RB1 and RB2, when 3D video images are continually played back seamlessly from EXTSS[N] 6403 and EXTSS[N+1] 6404 shown in FIG. 64F. As shown in FIG. 64E, once the $n^{th}$ dependent-view data block D[n−1] is read into the RB2, the data amount DA2 stored in the RB2 reaches its peak value DM2. Since no data block is read into RB2 from the read period ΔT4 of the immediately subsequent base-view data block B[n−1] through the period ΔT5 of the long jump to skip the layer boundary LB and the preload period ΔT6 of EXTSS[N+1] 6404, the stored data amount DA2 decreases. During these periods ΔT4-ΔT6, the dependent-view data blocks D[k] (k= . . . , n−3, n−2) up to the $(n-1)^{th}$ dependent-view data block are respectively transferred at mean transfer rates $R_{EXT2}$[ . . . , n−3, n−2], and then the $n^{th}$ dependent-view data block D[n−1] is transferred at a mean transfer rate $R_{EXT2}$[n−1]. To prevent the stored data amount DA2 from reaching zero by the end of the preload period ΔT6, the stored data amount DA2 should at least equal the size $S_{EXT2}$[n−1] of the $n^{th}$ dependent-view data block D[n−1] at a time that is earlier than the end of the preload period ΔT6 by the extent ATC time $T_{EXT2}$[n−1] of the dependent-view data block D[n−1]. Accordingly, the peak value DM2 of the stored data amount DA2 should be larger than the size $S_{EXT2}$[n−1] by at least the data amount transferred from the RB2 to the system target decoder during the remaining period ΔT4+ΔT5+ΔT6−$T_{EXT2}$[n−1], i.e. $R_{EXT2}$[ . . . , n−3, n−2] multiplied by (ΔT4+ΔT5+ΔT6−$T_{EXT2}$[n−1]). In other words, the capacity RB2 of the RB2 should at least equal the peak value DM2: RB2≧$S_{EXT2}$[n−1]+$R_{EXT2}$[ . . . , n−3, n−2]×(ΔT4+ΔT5+ΔT6−$T_{EXT2}$[n−1]). In this context, the time ΔT5 of the long jump is estimated at the maximum jump time $T_{JUMP\_MAX}$ of the long jump.

When the order of data blocks can be reversed within an extent pair located in the middle of an extent block, conditions 2 and 3, i.e. expressions (2) and (3), for the extent pair are changed as follows.

FIG. 65C is a schematic diagram showing an extent block 6510 that includes therein an extent pair in which the order of data blocks is reversed. As shown in FIG. 65C, in the $(n+2)^{th}$ extent pair D[n+1] and B[n+1], the dependent-view data block D[n+1] is located after the base-view data block B[n]. In the immediately subsequent extent pairs D[n], B[n], D[n+1], B[n+1], the base-view data blocks B[n] and B[n+1] are respectively located after the dependent-view data blocks D[n] and D[n+1].

FIGS. 65A and 65B are graphs showing changes in data amounts DA1 and DA2, stored in RB1 and RB2, when 3D video images are continually played back seamlessly from the extent block 6501 shown in FIG. 65C. In this context, the zero sector transition period is shorter enough than other periods to be ignored. As shown in FIGS. 65A and 65B, during the read period $PR_D$[n] of the $(n+1)^{th}$ dependent-view data block D[n], the data amount DA2 stored in the RB2 increases at a rate equal to $R_{UD72}-R_{EXT2}$[n], the difference between the read rate $R_{UD72}$ and the dependent-view transfer rate $R_{EXT2}$[n], whereas the data amount DA1 stored in the RB1 decreases at the base-view transfer rate $R_{EXT1}$[n−1]. During the read period $PR_B$[n] of the $(n+1)^{th}$ base-view data block B[n], the data amount DA1 stored in the RB1 increases at a rate equal to $R_{UD72}-R_{EXT1}$[n], the difference between the read rate $R_{UD72}$ and the base-view transfer rate $R_{EXT1}$[n]. On the other hand, the data amount DA2 stored in the RB2 decreases at the dependent-view transfer rate $R_{EXT2}$[n]. During the read period $PR_B$[n+1] of the $(n+2)^{th}$ base-view data block B[n+1], the data amount DA1 stored in the RB1 continues to increase at a rate equal to $R_{UD72}-R_{EXT1}$[n+1], the difference between the read rate $R_{UD72}$ and the base-view transfer rate $R_{EXT1}$[n+1]. On the other hand, the data amount DA2 stored in the RB2 continues to decrease at the dependent-view transfer rate $R_{EXT2}$[n+1]. During the read period $PR_D$[n+1] of the (n+2) dependent-view data block D[n+1], the data amount DA2 stored in the RB2 increases at a rate equal to $R_{UD72}-R_{EXT2}$[n+1], the difference between the read rate $R_{UD72}$ and the dependent-view transfer rate $R_{EXT2}$[n+1], whereas the data amount DA1 stored in the RB1 decreases at the base-view transfer rate $R_{EXT1}$[n]. During the read period $PR_D$[n+2] of the $(n+3)^{th}$ dependent-view data block D[n+2], the data amount DA2 stored in the RB2 further continues to increase at a rate equal to $R_{UD72}-R_{EXT2}$[n+2], the difference between the read rate $R_{UD72}$ and the dependent-view transfer rate $R_{EXT2}$[n+2], whereas the data amount DA1 stored in the RB1 further continues to decrease at the base-view transfer rate $R_{EXT1}$[n+1].

In this case, in order to play back 3D video images seamlessly from the extent block 6410, first the extent ATC time of the $(n+1)^{th}$ dependent-view data block D[n] should be equal to or greater than the time from the start of the read period $PR_D[n]$ until the start of the read period $PR_D[n+1]$ of the next dependent-view data block D[n+1]. Next, the extent ATC times of the $(n+1)^{th}$ and $(n+2)^{th}$ base-view data blocks B[n] and B[n+1] should be equal to or greater than the time from the start of the respective read periods $PR_B[n]$ and $PR_B[n+1]$ until the start of the read period $PR_B[n+2]$ of the next base-view data block B[n+2]. Assuming that extent B (EXT B) is placed before extent A (EXT A) in the $n^{th}$ extent pair, these conditions are represented by expressions (2A) and (3A) instead of expressions (2) and (3).

$$S_{EXTA}[n] \geq \text{CEIL}\left\{R_{EXTA}[n] \times \frac{R_{UD72}}{R_{UD72} - R_{EXTA}[n]} \times \frac{S_{EXTB}[n+1]}{R_{UD72}}\right\}, \quad (2A)$$

$$S_{EXTB}[n] \geq \text{CEIL}\left\{R_{EXTB}[n] \times \frac{R_{UD72}}{R_{UD72} - R_{EXTB}[n]} \times \frac{S_{EXTA}[n]}{R_{UD72}}\right\}. \quad (3B)$$

Expression (2A) is derived by replacing the size $S_{EXT1}[n]$ of the base-view data block B[n], size $S_{EXT2}[n+1]$ of the dependent-view data block D[n+1], and base-view transfer rate $R_{EXT1}[n]$ in expression (2) respectively with the size $S_{EXTA}[n]$ of extent A, size $S_{EXTB}[n+1]$ of extent B, and mean transfer rate $R_{EXTA}[n]$ for extent A. Expression (3A) is derived by replacing the size $S_{EXT1}[n]$ of the base-view data block B[n], size $S_{EXT2}[n]$ of the dependent-view data block D[n], and dependent-view transfer rate $R_{EXT2}[n]$ in expression (3) respectively with the size $S_{EXTA}[n]$ of extent A, size $S_{EXTB}[n]$ of extent B, and mean transfer rate $R_{EXTB}[n]$ for extent B. Note that in expressions (2A) and (3A), the length of the zero sector transition period $T_{JUMP0}$ is considered to be zero.

Figure 66:
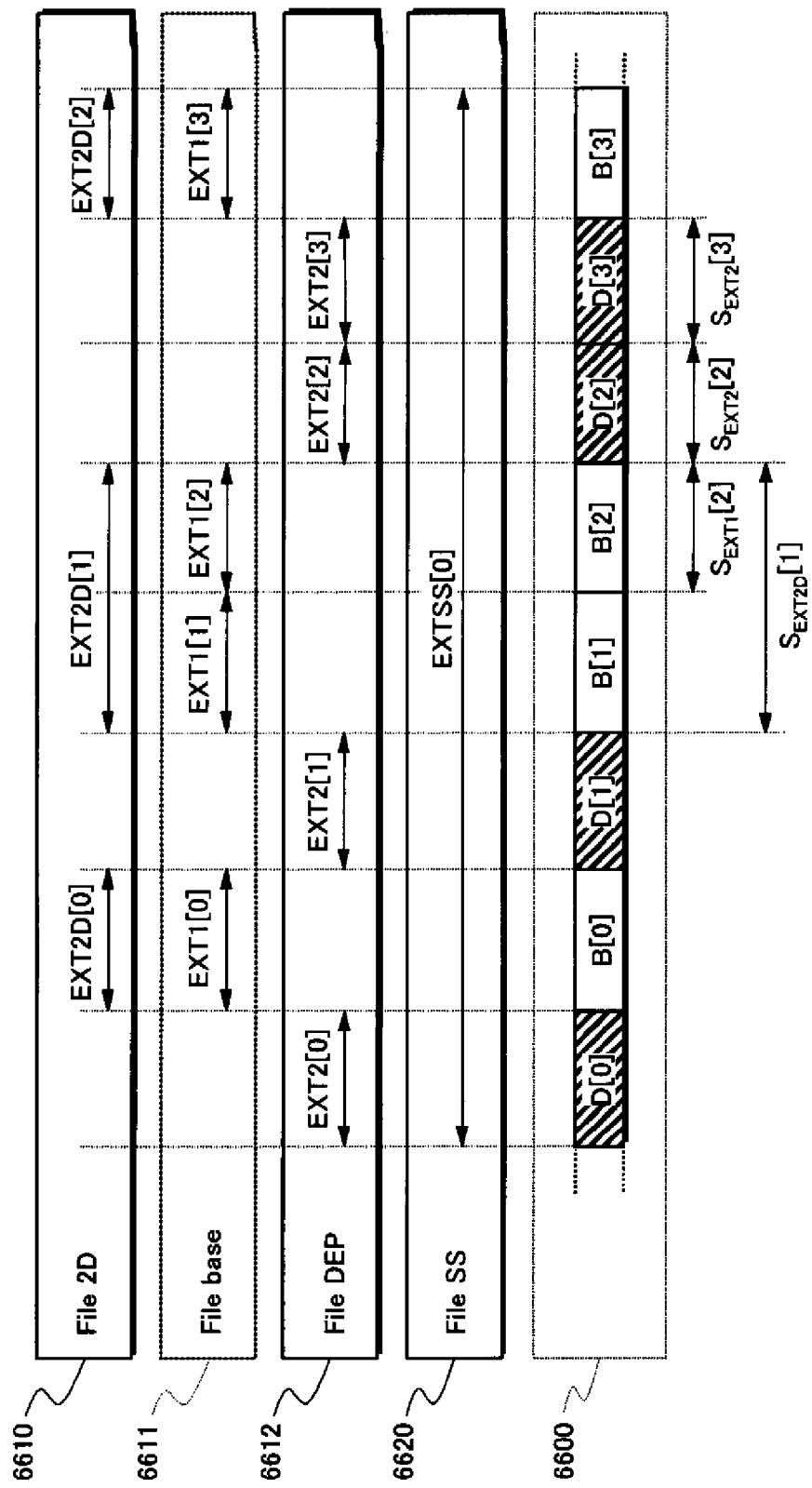
FIG. 66 is a schematic diagram showing correspondence between (i) an extent block 6600 that includes therein an extent pair in which the order of data blocks is reversed and (ii) AV stream files 6610-6620.

FIG. 66 is a schematic diagram showing correspondence between (i) an extent block 6600 that includes therein an extent pair in which the order of data blocks is reversed and (ii) AV stream files 6610-6620. As shown in FIG. 66, in the third extent pair D[2] and B[2], the dependent-view data block D[2] is placed after the base-view data block B[2]. In other extent pairs D[k] and B[k] (k=0, 1, 3), the base-view data block B[k] is placed after the dependent-view data block D[k]. These base-view data blocks B[n] (n=0, 1, 2, 3, ...) respectively belong to a file base 6611 each as one base-view extent EXT1[*n*]. The dependent-view data blocks D[n] respectively belong to a file DEP 6612 each as one dependent-view extent EXT2[*n*]. The entirety of the extent block 6600 belongs to a file SS 6620 as one extent SS EXTSS[0]. The base-view data blocks B[n] (n=0, 1, 2, 3, ...) further belong to a file 2D 6610 as 2D extents EXT2D[n]. In this context, two consecutive base-view data blocks B[1] and B[2] are referred to as one 2D extent EXT2D[1]. Accordingly, even if the size $S_{EXT2D}[1]$ of the 2D extent EXT2D[1] is larger than the total $S_{EXT2}[2]+S_{EXT2}[3]$ of the sizes of the two dependent-view data blocks D[2] and D[3] located immediately thereafter, the size $S_{EXT2D}[1]$ satisfies expression (1).

<<Embodiment 2>>

In a BD-ROM disc according to Embodiment 2 of the present invention, data blocks are arranged so that the playback path in 2D playback mode and playback path in 3D playback mode are separated at the end of an extent block read immediately before a long jump and at the top of an extent block read immediately after a long jump. Apart from this point, the BD-ROM disc and playback device according to Embodiment 2 have the same structure and functions as in Embodiment 1. Accordingly, the following is a description of the BD-ROM disc and playback device according to Embodiment 2 insofar as these have been changed or expanded as compared to Embodiment 1. Details on the parts of the BD-ROM disc and playback device that are the same as in Embodiment 1 can be found in the description of Embodiment 1.

<Separation of a Playback Path Before and After a Long Jump>

In FIG. 18, the playback path 1801 in 2D playback mode and the playback path 1802 in 3D playback mode both traverse the second base-view data block B[1] immediately before a jump $J_{NAV}$ to skip a recording area NAV for data other than multiplexed stream data, and these playback paths both traverse the fourth base-view data block B[3] located immediately after the jump $J_{LY}$ to skip the layer boundary LB. When the number of sectors of the recording area NAV exceeds a predetermined threshold value, such as 40000 sectors, the jumps $J_{NAV}$ and $J_{LY}$ are long jumps. The data amount to be processed by the system target decoder during the long jumps $J_{NAV}$ and $J_{LY}$ is guaranteed in 2D playback mode via condition 1, by the size of the base-view data blocks B[1] and B[3] read immediately before the long jumps. On the other hand, in 3D playback mode, the data amount is guaranteed via condition 4 by the size of the entire extent blocks 1501 and 1502 read immediately before the long jump. Accordingly, the minimum extent size of the base-view data blocks B[1] and B[3] as required by condition 1 is generally larger than the minimum extent size as required by condition 2. Therefore, the capacity of the RB1 has to be larger than the minimum value necessary for seamless playback in 3D playback mode. Furthermore, the extent ATC times are the same for the base-view data blocks B[1] and B[3] and the immediately prior dependent-view data blocks D[1] and D[3]. Accordingly, the size of the dependent-view data blocks D[1] and D[3] is generally larger than the minimum extent size required as per condition 2. Therefore, the capacity of the RB2 is generally larger than the minimum value necessary for seamless playback in 3D playback mode. In the arrangement shown in FIG. 18, then, seamless connection is possible between the extent blocks 1501-1503, but a sufficiently large capacity has to be guaranteed in the RB1 and RB2.

Furthermore, as shown in FIG. 28A, when the system rate $R_{TS2}$ for the file DEP is higher than a predetermined threshold value (for example 32 Mbps), the data blocks of type (B) and (C) read immediately before and after the long jumps $J_{NAV}$ and $J_{LY}$ are reduced. In particular, there is a risk that due to the reduction in size, the base-view data block will no longer satisfy condition 1.

To further reduce the capacity of the RB1 and RB2 while still permitting seamless playback of video images during the long jumps $J_{NAV}$ and $J_{LY}$, changes may be made in the interleaved arrangement of data blocks before and after a position where the long jumps $J_{NAV}$ and $J_{LY}$ are necessary, such as a recording area NAV, layer boundary LB, etc., in order to separate the playback paths in 2D playback mode and 3D playback mode. These changes are represented, for example, by the following types of arrangements, numbered 1, 2, and 3. In any of the arrangements 1-3, the playback paths in 2D playback mode and 3D playback mode traverse different base-view data blocks. Accordingly, the data blocks in an extent block read immediately before or after a long jump in 3D playback mode, in particular base-view data blocks of type (B) or (C), do not need to satisfy condition 1. This enables the playback device 102 to easily perform seamless playback of video images during the long jumps $J_{NAV}$ and $J_{LY}$ while keeping the necessary capacity of the RB1 and RB2 to a minimum.

In the following description, for ease of explanation, arrangements 1-3 are assumed to be used in extent blocks recorded immediately before and after a layer boundary LB on the BD-ROM disc 101. Note that the following description holds true when, instead of being separated by a layer boundary, extent blocks are separated by a recording area for other data that exceeds a predetermined number of sectors (such as 40000 sectors).

<<Arrangement One>>

Figure 67:
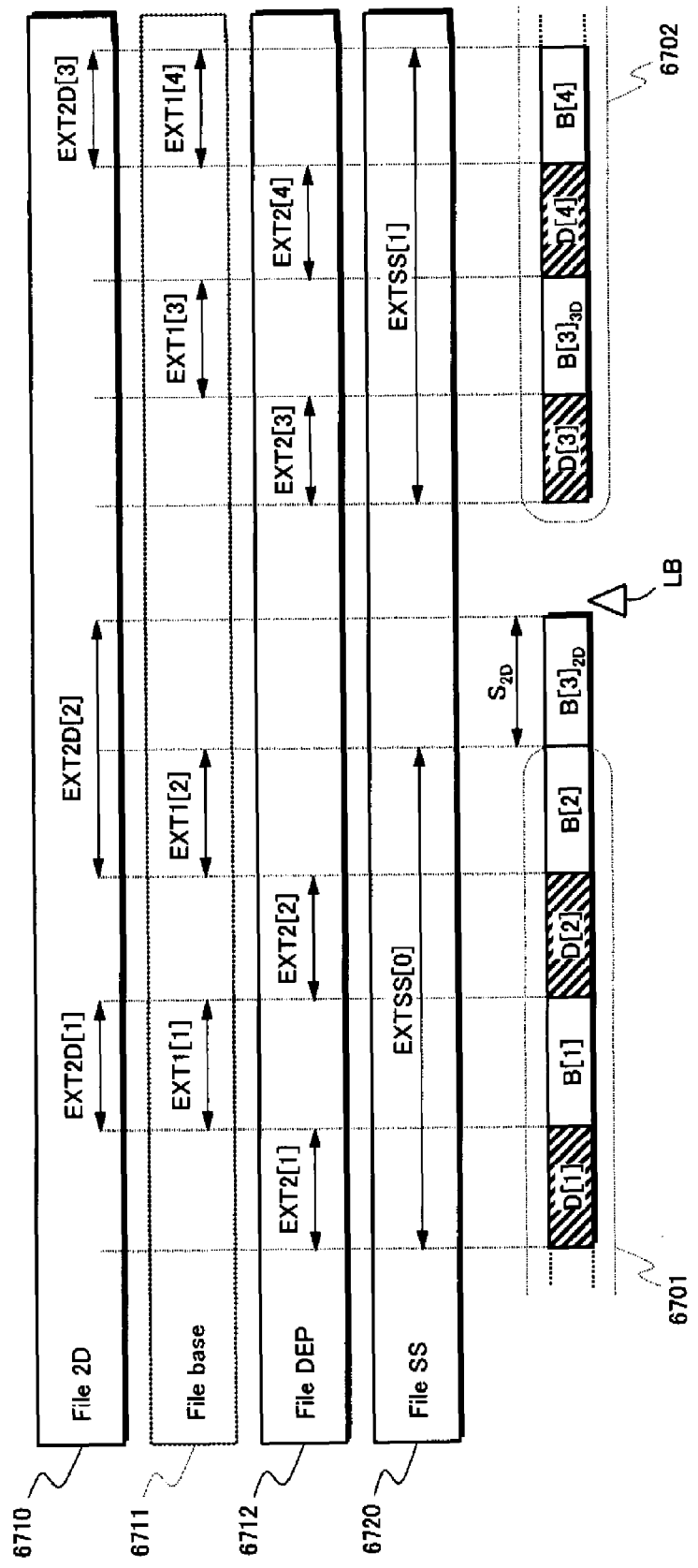
FIG. 67 is a schematic diagram showing arrangement one of a data block group recorded before and after a layer boundary LB on the BD-ROM disc 101.

FIG. 67 is a schematic diagram showing arrangement one of a data block group recorded before and after a layer boundary LB on the BD-ROM disc 101. As shown in FIG. 67, a first extent block 6701 is recorded immediately before the layer boundary LB, and a second extent block 6702 is recorded immediately after the layer boundary LB. In the extent blocks 6701 and 6702, dependent-view data blocks D[n] and base-view data blocks B[n] form an interleaved arrangement (n=1, 2, 3, ... ). The $(n+1)^{th}$ pair of data blocks D[n] and B[n] constitute an extent pair and in particular have the same extent ATC time. In arrangement one, one base-view data block $B[3]_{2D}$ is further placed between the end B[2] of the first extent block 6701 and the layer boundary LB. This base-view data block $B[3]_{2D}$ matches bit-for-bit with a base-view data block $B[3]_{3D}$ at the top of the second extent block 6702. Hereinafter, $B[3]_{2D}$ is referred to as a "block exclusively for 2D playback", and $B[3]_{3D}$ is referred to as a "block exclusively for 3D playback".

The base-view data blocks B[n] shown in FIG. 67 can be accessed as extents in a file 2D 6710, i.e. as 2D extents EXT2D[n], with the exception of the block exclusively for 3D playback $B[3]_{3D}$. For example, the base-view data block B[1] second from the end of the first extent block 6701, the pair $B[2]+B[3]_{2D}$ of the last base-view data block B[2] and the block exclusively for 2D playback $B[3]_{2D}$, and the second base-view data block B[4] in the second extent block 6702 can respectively be accessed as individual 2D extents EXT2D[1], EXT2D[2], and EXT2D[3]. On the other hand, the dependent-view data blocks D[n] shown in FIG. 67 can each be accessed as a single extent in the file DEP 6712, i.e. as dependent-view extents EXT2[n].

For the data block groups shown in FIG. 67, cross-linking of AV stream files is performed as follows. The entire extent blocks 6701 and 6702 can respectively be accessed as one extent EXTSS[0] and EXTSS[1] in the file SS 6720. Accordingly, the base-view data blocks B[1], B[2], and B[4] in the extent blocks 6701 and 6702 are shared by the file 2D 6710 and file SS 6720. On the other hand, the block exclusively for 2D playback $B[3]_{2D}$ can only be accessed as part of the 2D extent EXT2D[2] located immediately before the layer boundary LB, and the block exclusively for 3D playback $B[3]_{3D}$ can only be accessed as part of the extent SS EXTSS[1] located immediately after the layer boundary LB. Therefore, the base-view data blocks other than the block exclusively for 2D playback $B[3]_{2D}$, i.e. B[1], B[2], $B[3]_{3D}$, and B[4], can be extracted from extents SS EXTSS[0], EXTSS[1] as extents in a file base 6711, i.e. base-view extents EXT1[n] (n=1, 2, 3).

Figure 68:
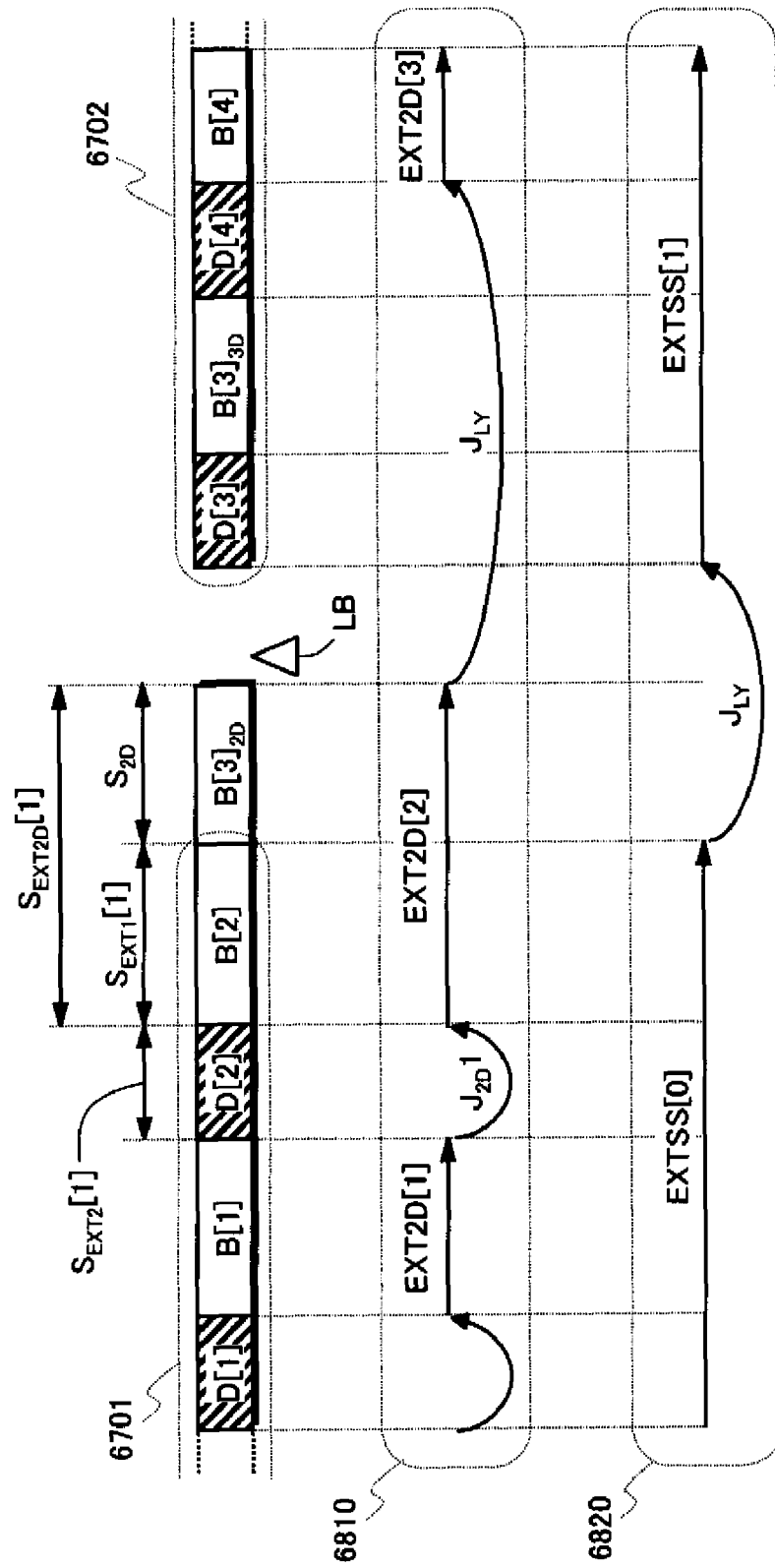
FIG. 68 is a schematic diagram showing a playback path 6810 in 2D playback mode and a playback path 6820 in 3D playback mode for the data block group in arrangement one shown in FIG. 67.

FIG. 68 is a schematic diagram showing a playback path 6810 in 2D playback mode and a playback path 6820 in 3D playback mode for the data block group in arrangement one shown in FIG. 67. The playback device 102 in 2D playback mode plays back the file 2D 6710. Accordingly, as shown by the playback path 6810 in 2D playback mode, the base-view data block B[1] second from the end of the first extent block 6701 is read as the second 2D extent EXT2D[1], and then reading of the immediately subsequent dependent-view data block D[2] is skipped by a jump $J_{2D}1$. Next, a pair $B[2]+B[3]_{2D}$ of the last base-view data block B[2] in the first extent block 6701 and the immediately subsequent block exclusively for 2D playback $B[3]_{2D}$ is read continuously as the third 2D extent EXT2D[2]. A long jump $J_{LY}$ occurs at the immediately subsequent layer boundary LB, and reading of the three data blocks D[3], $B[3]_{3D}$, and D[4] located at the top of the second extent block 6702 is skipped. Subsequently, the second base-view data block B[4] in the second extent block 6702 is read as the fourth 2D extent EXT2D[3]. Conversely, the playback device 102 in 3D playback mode plays back the file SS 6720. Accordingly, as shown by the playback path 6820 in 3D playback mode, the entire first extent block 6701 is continuously read as the first extent SS EXTSS[0]. Immediately thereafter, a long jump $J_{LY}$ occurs, and reading of the block exclusively for 2D playback $B[3]_{2D}$ is skipped. Subsequently, the entire second extent block 6702 is read continuously as the second extent SS EXTSS[1].

As shown in FIG. 68, in 2D playback mode, the block exclusively for 2D playback $B[3]_{2D}$ is read, whereas reading of the block exclusively for 3D playback $B[3]_{3D}$ is skipped. Conversely, in 3D playback mode, reading of the block exclusively for 2D playback $B[3]_{2D}$ is skipped, whereas the block exclusively for 3D playback $B[3]_{3D}$ is read. However, since the data blocks $B[3]_{2D}$ and $B[3]_{3D}$ match bit-for-bit, the base-view video frames that are played back are the same in both playback modes. In arrangement one, the playback path 6810 in 2D playback mode and the playback path 6820 in 3D playback mode are divided before and after the long jump $J_{LY}$ in this way. Accordingly, unlike the arrangement shown in FIG. 15, the size $S_{EXT2D}[2]$ of the 2D extent EXT2D[2] located immediately before the layer boundary LB and the size $S_{EXT2}[2]$ of the immediately preceding dependent-view data block D[2] can be determined separately as follows.

The size $S_{EXT2D}[2]$ of the 2D extent EXT2D[2] equals $S_{EXT1}[2]+S_{2D}$, the sum of the size $S_{EXT1}[2]$ of the third base-view data block B[2] and the size $S_{2D}$ of the block exclusively for 2D playback $B[3]_{2D}$. Accordingly, for seamless playback of 2D video images, this sum $S_{EXT1}[2]+S_{2D}$ should satisfy condition 1. The maximum jump time $T_{JUMP\_MAX}$ of the long jump $J_{LY}$ is substituted into the right-hand side of expression (1) as the jump time $T_{JUMP\_2D}$. Next, the number of sectors from the end of the block exclusively for 2D playback $B[3]_{2D}$ to the first 2D extent EXT2D[3]=B[4] in the second extent block 6702 should be equal to or less than the maximum jump distance $S_{JUMP\_MAX}$ for the long jump $J_{LY}$ specified in accordance with the capabilities of the 2D playback device.

On the other hand, for seamless playback of 3D video images, the size of each extent pair in the first extent SS EXTSS[0] should satisfy conditions 2, 3, and 5. The size $S_{EXT1}[2]$ of the last base-view data block B[2] does not need to satisfy condition 1. Next, the size of the entire first extent SS EXTSS[0] should satisfy condition 4. Furthermore, the number of sectors from the end of this extent SS EXTSS[0] to the top of the extent SS EXTSS[1] should be equal to or less than the maximum jump distance $S_{JUMP\_MAX}$ for a long jump $J_{LY}$ specified in accordance with the capabilities of the 3D playback device.

Within the 2D extent EXT2D[2] located immediately before a layer boundary LB, only the base-view data block B[2] located at the front of the 2D extent EXT2D[1] is shared with the first extent SS EXTSS[0]. In particular, when considered alone, the base-view data block B[2] does not need to satisfy condition 1. Accordingly, by appropriately enlarging the size $S_{2D}$ of the block exclusively for 2D playback $B[3]_{2D}$, the size $S_{EXT1}[2]$ of the base-view data block B[2] can be further limited while keeping the size $S_{EXT2D}[2]=S_{EXT1}[2]+S_{2D}$ of the 2D extent EXT2D[2] constant. In this case, the extent ATC time of the base-view data block B[2] is shortened. As a result, the size $S_{EXT2}[2]$ of the dependent-view data block D[2] located immediately before can also be further limited. It is therefore easy to set the maximum extent size in accordance with the table in FIG. 28A.

Since the block exclusively for 3D playback $B[3]_{3D}$ and the block exclusively for 2D playback $B[3]_{2D}$ match bit for bit, enlarging the size $S_{2D}$ of the block exclusively for 2D playback $B[3]_{2D}$ enlarges the size of the dependent-view data block D[3] located immediately before the block exclusively for 3D playback $B[3]_{3D}$. However, this size can be made sufficiently smaller than the size of the dependent-view data block D[3] located immediately before the layer boundary LB shown in FIG. 15. The capacity of the RB1 and RB2 can thus be brought even closer to the minimum amount necessary for seamless playback of 3D video images.

In arrangement one, duplicate data of the block exclusively for 2D playback $B[3]_{2D}$ is arranged in the second extent block 6702 as a single block exclusively for 3D playback $B[2]_{3D}$. Alternatively, this duplicate data may be divided into two or more blocks exclusively for 3D playback.

<<Arrangement Two>>

Figure 69:
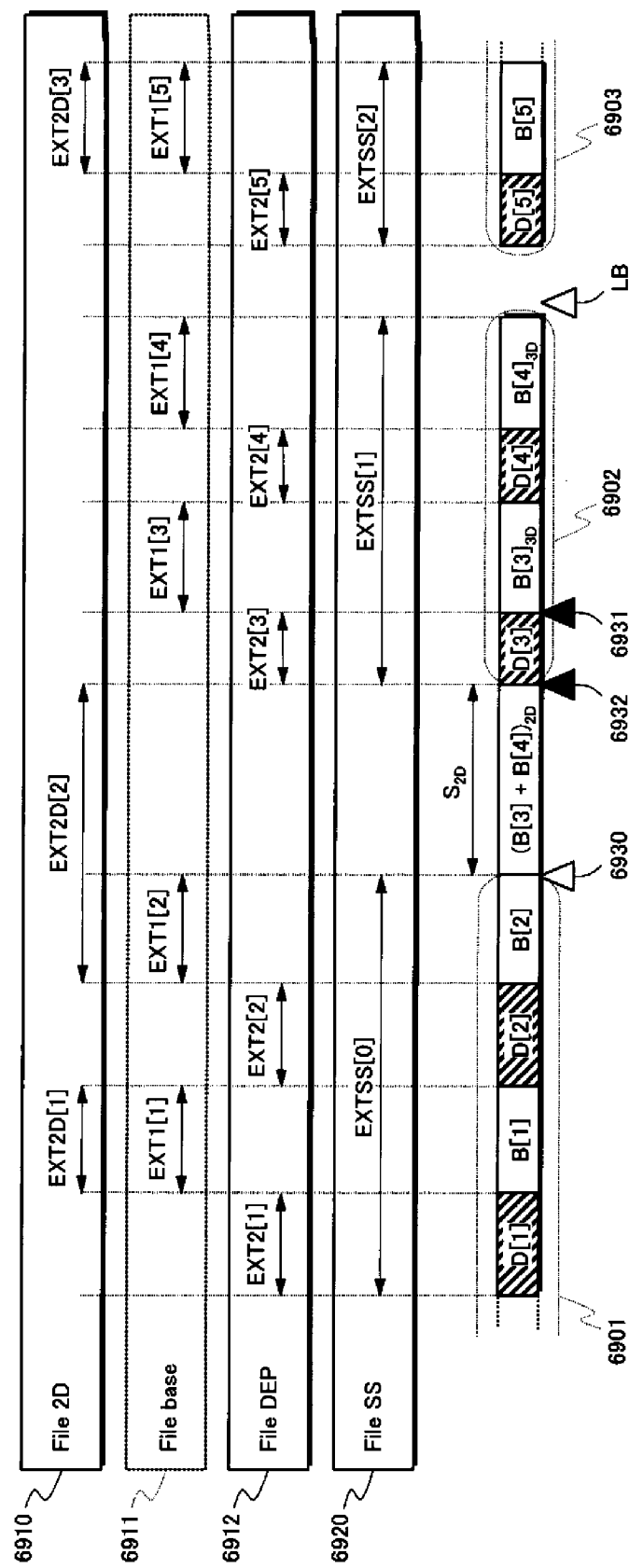
FIG. 69 is a schematic diagram showing arrangement two of a data block group recorded before and after a layer boundary LB on the BD-ROM disc 101.

FIG. 69 is a schematic diagram showing arrangement two of a data block group recorded before and after a layer boundary LB on the BD-ROM disc 101. As shown by comparing FIG. 69 with FIG. 67, arrangement two differs from arrangement one in that an extent block 6902, which includes blocks exclusively for 3D playback $B[3]_{3D}$ and $B[4]_{3D}$, is located immediately before a layer boundary LB.

As shown in FIG. 69, a first extent block 6901, block exclusively for 2D playback $(B[3]+B[4])_{2D}$, and second extent block 6902 are located before a layer boundary LB in this order, and a third extent block 6903 is located after the layer boundary LB. In the extent blocks 6901-6903, dependent-view data blocks D[n] and base-view data blocks B[n] form an interleaved arrangement (n=1, 2, 3, 4, ...). The $n^{th}$ pair of data blocks D[n] and B[n] constitute an extent pair and in particular have the same extent ATC time. In the second extent block 6902, stream data is continuous with the extent pair D[2] and B[2] located at the end of the first extent block 6901 and with the extent pair D[4] and B[4] located at the top of the third extent block 6903. The base-view data blocks included in the second extent block 6902 are both blocks exclusively for 3D playback, $B[3]_{3D}$ and $B[4]_{3D}$, and the combination of these blocks $B[3]_{3D}+B[4]_{3D}$ matches bit-for-bit with the block exclusively for 2D playback $(B[3]+B[4])_{2D}$ located before the second extent block 6902.

Among the base-view data blocks shown in FIG. 69, data blocks other than the blocks exclusively for 3D playback $B[3]_{3D}$ and $B[4]_{3D}$ can be accessed as extents EXT2D[1], EXT2D[2], and EXT2D[3] in a file 2D 6910. In particular, the pair of the last base-view data block B[2] in the first extent block 6901 and the block exclusively for 2D playback $(B[3]+B[4])_{2D}$ can be accessed as a single 2D extent EXT2D[2]. Furthermore, the base-view data blocks B[1], B[2], and B[5] in the first extent block 6901 and the third extent block 6903 can also be extracted as extents EXT1[1], EXT1[2], and EXT1[5] in a file base 6911 from the extents EXTSS[0] and EXTSS[1] in a file SS 6920. Conversely, the block exclusively for 2D playback $(B[3]+B[4])_{2D}$ can only be accessed as part of the 2D extent EXT2D[2], and the blocks exclusively for 3D playback $B[3]_{3D}$ and $B[4]_{3D}$ can be extracted from the extent SS EXTSS[1] as base-view extents EXT1[3] and EXT1[4].

Figure 70:
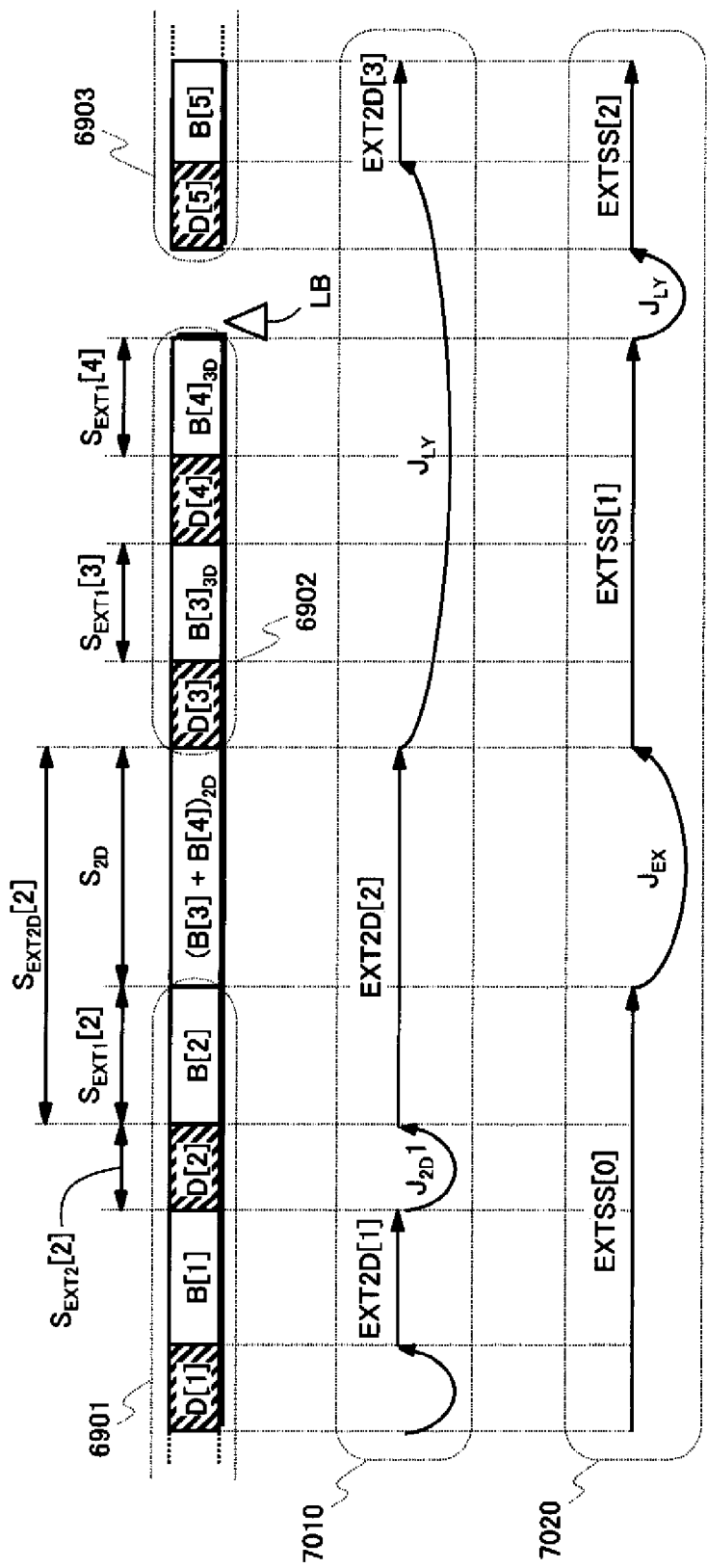
FIG. 70 is a schematic diagram showing a playback path 7010 in 2D playback mode and a playback path 7020 in 3D playback mode for the data block group in arrangement two shown in FIG. 69.

FIG. 70 is a schematic diagram showing a playback path 7010 in 2D playback mode and a playback path 7020 in 3D playback mode for the data block group in arrangement two shown in FIG. 69. The playback device 102 in 2D playback mode plays back the file 2D 6910. Accordingly, as shown by the playback path 7010 in 2D playback mode, the base-view data block B[1] second from the end of the first extent block 6901 is read as the second 2D extent EXT2D[1], and then reading of the immediately subsequent dependent-view data block D[2] is skipped by a jump $J_{2D}1$. Next, the pair of the last base-view data block B[2] in the first extent block 6901 and the immediately subsequent block exclusively for 2D playback $(B[3]+B[4])_{2D}$ are continuously read as the third 2D extent EXT2D[2]. A long jump $J_{LY}$ occurs immediately thereafter, and reading of the second extent block 6902 and the dependent-view data block D[5] located at the top of the third extent block 6903 is skipped. Subsequently, the first base-view data block B[5] in the third extent block 6903 is read as the fourth 2D extent EXT2D[3]. The playback device 102 in 3D playback mode plays back the file SS 6920. Accordingly, as shown by the playback path 7020 in 3D playback mode, the entire first extent block 6901 is continuously read as the first extent SS EXTSS[0]. A jump $J_{Ex}$ occurs immediately thereafter, and reading of the block exclusively for 2D playback $(B[3]+B[4])_{2D}$ is skipped. Next, the entire second extent block 6902 is read continuously as the second extent SS EXTSS[1]. Immediately thereafter, a long jump $J_{LY}$ to skip over a layer boundary LB occurs. Subsequently, the entire third extent block 6903 is read continuously as the third extent SS EXTSS[2].

As shown in FIG. 70, in 2D playback mode, the block exclusively for 2D playback $(B[3]+B[4])_{2D}$ is read, whereas reading of the blocks exclusively for 3D playback $B[3]_{3D}$ and $B[4]_{3D}$ is skipped. Conversely, in 3D playback mode, reading of the block exclusively for 2D playback $(B[3]+B[4])_{2D}$ is skipped, whereas the blocks exclusively for 3D playback $B[3]_{3D}$ and $B[4]_{3D}$ are read. However, since the block exclusively for 2D playback $(B[3]+B[4])_{2D}$ matches the entirety of the blocks exclusively for 3D playback $B[3]_{3D}+B[4]_{3D}$ bit-for-bit, the base-view video frames that are played back are the same in both playback modes. In arrangement two, the playback path 7010 in 2D playback mode and the playback path 7020 in 3D playback mode are divided immediately before the long jump $J_{LY}$ in this way. Accordingly, the size $S_{EXT2D}[2]$ of the 2D extent EXT2D[2] located immediately before the layer boundary LB and the size $S_{EXT2}[2]$ of the immediately preceding dependent-view data block D[2] can be determined separately as follows.

The size $S_{EXT2D}[2]$ of the 2D extent EXT2D[2] equals $S_{EXT1}[2]+S_{2D}$, the sum of the size $S_{EXT1}[2]$ of the third base-view data block B[2] and the size $S_{2D}$ of the block exclusively for 2D playback $(B[3]+B[4])_{2D}$. Accordingly, for seamless playback of 2D video images, this sum $S_{EXT1}[2]+S_{2D}$ should satisfy condition 1. The maximum jump time $T_{JUMP\_MAX}$ of the long jump $J_{LY}$ is substituted into the right-hand side of expression (1) as the jump time $T_{JUMP\_2D}$. Next, the number of sectors from the end of the block exclusively for 2D playback $(B[3]+B[4])_{2D}$ to the first 2D extent EXT2D[3]=B[5] in the third extent block 6903 should be equal to or less than the maximum jump distance $S_{JUMP\_MAX}$ for the long jump $J_{LY}$ specified in accordance with the capabilities of the 2D playback device.

On the other hand, for seamless playback of 3D video images, the size of each extent pair included in the first extent SS EXTSS[0] and the second extent SS EXTSS[1] should satisfy conditions 2, 3, and 5. The size $S_{EXT1}[2]$ of the base-view data block located at the end of the first extent SS EXTSS[0] and the sizes $S_{EXT1}[3]$ and $S_{EXT1}[4]$ of the base-view data blocks $B[3]_{3D}$ and $B[4]_{3D}$ in the second extent SS EXTSS[1] do not need to satisfy condition 1. Next, the size of the entire second extent SS EXTSS[1] should satisfy condition 4. Furthermore, the number of sectors from the end of the second extent SS EXTSS[1] to the next extent SS EXTSS[2] should be equal to or less than the maximum jump distance $S_{JUMP\_MAX}$ for the long jump $J_{LY}$ specified in accordance with the capabilities of the 3D playback device.

Only the third base-view data block B[2] located at the front of the 2D extent EXT2D[2] is shared with the extent SS EXTSS[0]. Accordingly, by appropriately enlarging the size $S_{2D}$ of the block exclusively for 2D playback $(B[3]+B[4])_{2D}$, the size $S_{EXT1}[2]$ of the third base-view data block B[2] can be further limited while keeping the size $S_{EXT2D}[2]=S_{EXT1}[2]+S_{2D}$ of the 2D extent EXT2D[2] constant. As a result, the size $S_{EXT2}[2]$ of the dependent-view data block D[2] located immediately before can also be further limited.

The blocks exclusively for 3D playback $B[3]_{3D}+B[4]_{3D}$ entirely match the block exclusively for 2D playback $(B[3]+B[4])_{2D}$ bit for bit. Accordingly, enlarging the size $S_{2D}$ of the block exclusively for 2D playback $(B[3]+B[4])_{2D}$ enlarges the sizes of the dependent-view data blocks D[3] and D[4] respectively located immediately before the blocks exclusively for 3D playback $B[3]_{3D}$ and $B[4]_{3D}$. However, the blocks exclusively for 3D playback $B[3]_{3D}$ and $B[4]_{3D}$ do not have to satisfy condition 1. Accordingly, even if the block exclusively for 2D playback is a single data block $(B[3]+B[4])_{2D}$, the block exclusively for 3D playback may be divided into two data blocks, $B[3]_{3D}$ and $B[4]_{3D}$. As a result, the size of the blocks exclusively for 3D playback $B[3]_{3D}$ and $B[4]_{3D}$ can be sufficiently reduced, thus making it easy to set the maximum extent size in accordance with the table in FIG. 28A. The capacity of the RB1 and RB2 can thus be further reduced to a minimum amount necessary for seamless playback of 3D video images.

As in the above description of expression (6), as the size of the base-view data block read immediately before a long jump decreases, the lower limit of the capacity of the RB2 decreases. Accordingly, it is preferable that arrangement two be designed to satisfy the following two conditions. If these conditions are satisfied, the size of each data block in the second extent block 6902 is reduced, in particular the sizes of the blocks exclusively for 3D playback $B[3]_{3D}$ and $B[4]_{3D}$. As a result, the lower limit of the capacity of the RB2 can be further reduced.

The first condition is to place an upper limit on the size of the block exclusively for 2D playback $(B[3]+B[4])_{2D}$ located immediately before the second extent block 6902. This upper limit depends on the jump capabilities of the 2D playback device. For example, if the jump capabilities are in accordance with the table in FIG. 21, the size $S_{2D}$ of the block exclusively for 2D playback $(B[2]+B[3])_{2D}$ is limited to 20000 sectors or less. The second condition is to place an upper limit $T_{EXT\_3D\_MAX}$ on the extent ATC times of the blocks exclusively for 3D playback $B[3]_{3D}$ and $B[4]_{3D}$. In other words, the blocks exclusively for 3D playback $B[3]_{3D}$ and $B[4]_{3D}$ satisfy condition 6 instead of condition 5. Condition 6 is represented by the following expression, instead of expression (7): $S_{EXT1}[n] \leq R_{EXT1}[n] \times T_{EXT\_3D\_MAX}$. This upper limit $T_{EXT\_3D\_MAX}$ is set, for example, to 0.5 seconds.

Figure 71:
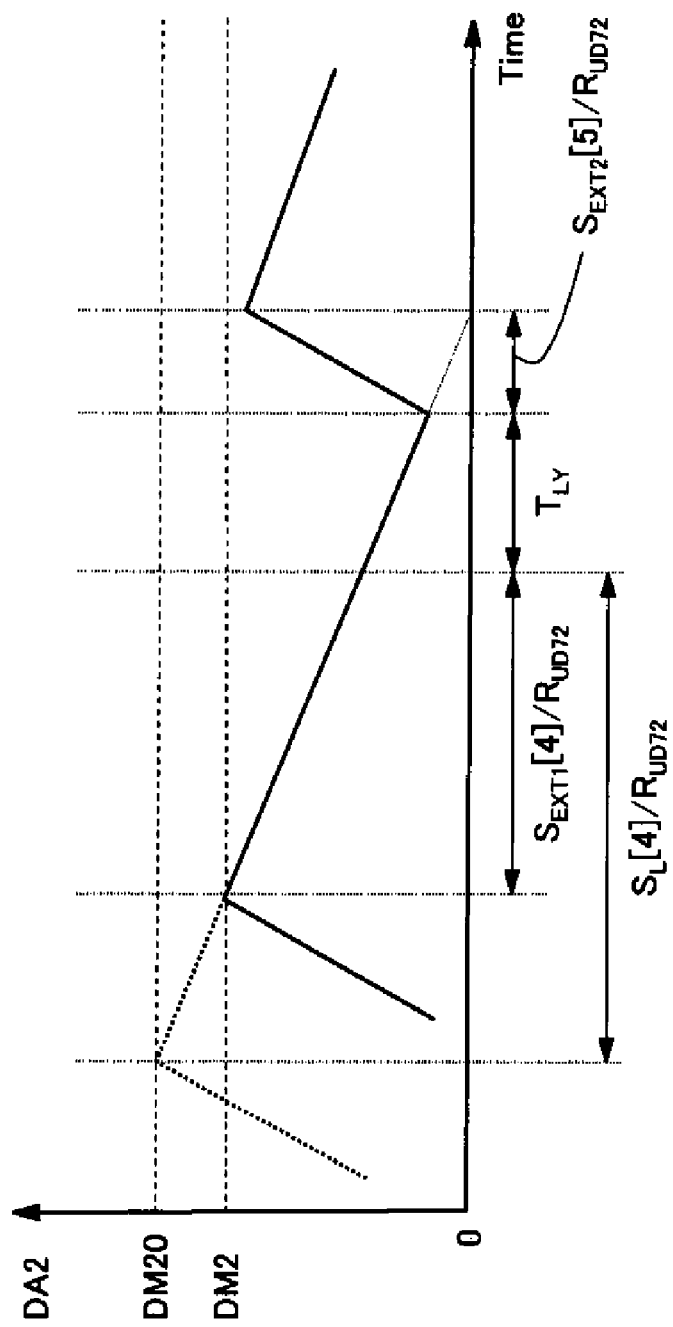
FIG. 71 is a graph showing correspondence between read time $S_{EXT1}[4]/R_{UD72}$ of a block exclusively for 3D playback $B[4]_{3D}$ located at the end of the second extent block 6902 shown in FIG. 70 and the data amount DA2 stored in RB2.

FIG. 71 is a graph showing correspondence between read time $S_{EXT1}[4]/R_{UD72}$ of a block exclusively for 3D playback $B[4]_{3D}$, located at the end of the second extent block 6902 shown in FIG. 70, and the data amount DA2 stored in RB2. As shown in FIG. 71, when reading of the block exclusively for 3D playback $B[4]_{3D}$ into the RB2 begins, the data amount DA2 stored in the RB2 is at its peak value DM2. This peak value DM2 at least equals the sum of $S_{EXT1}[4]/R_{UD72}$, i.e. the length of the read period of the block exclusively for 3D playback $B[4]_{3D}$, $T_{LY}$, i.e. the time required for a long jump, and $S_{EXT2}[5]/R_{UD72}$, i.e. the length of the preload period immediately after the long jump, multiplied by the dependent-view transfer rate $R_{EXT2}[4]$: $DM2 \geq (S_{EXT1}[4]/R_{UD72}+T_{LY}+S_{EXT2}[5]/R_{UD72}) \times R_{EXT2}[4]$. Supposing the size of the block exclusively for 3D playback $B[4]_{3D}$ is a larger value $S_L[4]$, the length of the corresponding read period $S_L[4]/R_{UD72}$ thereby increases. As shown by the dashed line in FIG. 71, then, the peak value DM20 of the data amount DA2 stored in the RB2 increases. For this reason, the sizes of the blocks exclusively for 3D playback $B[3]_{3D}$ and $B[4]_{3D}$ are restricted by the above two conditions. As a result, the lower limit of the capacity of the RB2 can be further reduced.

Note that to satisfy condition 4, the size of the extent pair located at the top of an extent block, and in particular the length of the preload period, needs to be guaranteed to be sufficiently large. Therefore, when an extent pair that includes a block exclusively for 3D playback is located at the top of an extent block, the block exclusively for 3D playback does not need to satisfy condition 6. In other words, the extent ATC time may exceed the upper limit of $T_{EXT\_MAX}$.

Arrangement two may be adopted not only before a layer boundary LB, but also at any position where interrupt playback can start. FIG. 69 shows positions where interrupt playback can start, i.e. entry points that are recorded on a BD-ROM disc and located at the top of triangles 6930, 6931, and 6932. The entry point shown by the white triangle 6930 is a position where interrupt playback can start during 2D playback mode. The entry points shown by the black triangles 6931 and 6932 are positions where interrupt playback can start during 3D playback mode. The individual blocks exclusively for 3D playback $B[3]_{3D}$ and $B[4]_{3D}$ are much smaller than the block exclusively for 2D playback $(B[3]+B[4])_{2D}$. Accordingly, the dependent-view data blocks D[3] and D[4] belonging to the same extent pair also have a small size. As a result, during interrupt playback in 3D playback mode, the amount of time required from the start of access to the entry points 6931 and 6932 until the start of decoding of the extent pair D[3], $B[3]_{3D}$ is short. In other words, interrupt playback in 3D playback mode starts quickly.

In arrangement two, duplicate data of the block exclusively for 2D playback $(B[3]+B[4])_{2D}$ is divided into two blocks exclusively for 3D playback $B[3]_{3D}$ and $B[4]_{3D}$. Alternatively, this duplicate data may be one block exclusively for 3D playback or may be divided into three or more blocks exclusively for 3D playback. Furthermore, the second extent block 6902 may be contiguous with the end of the first extent block 6901, and the block exclusively for 2D playback $(B[3]+B[4])_{2D}$ may be located between the end of the second extent block 6902 and the layer boundary LB.

<<Arrangement Three>>

Figure 72:
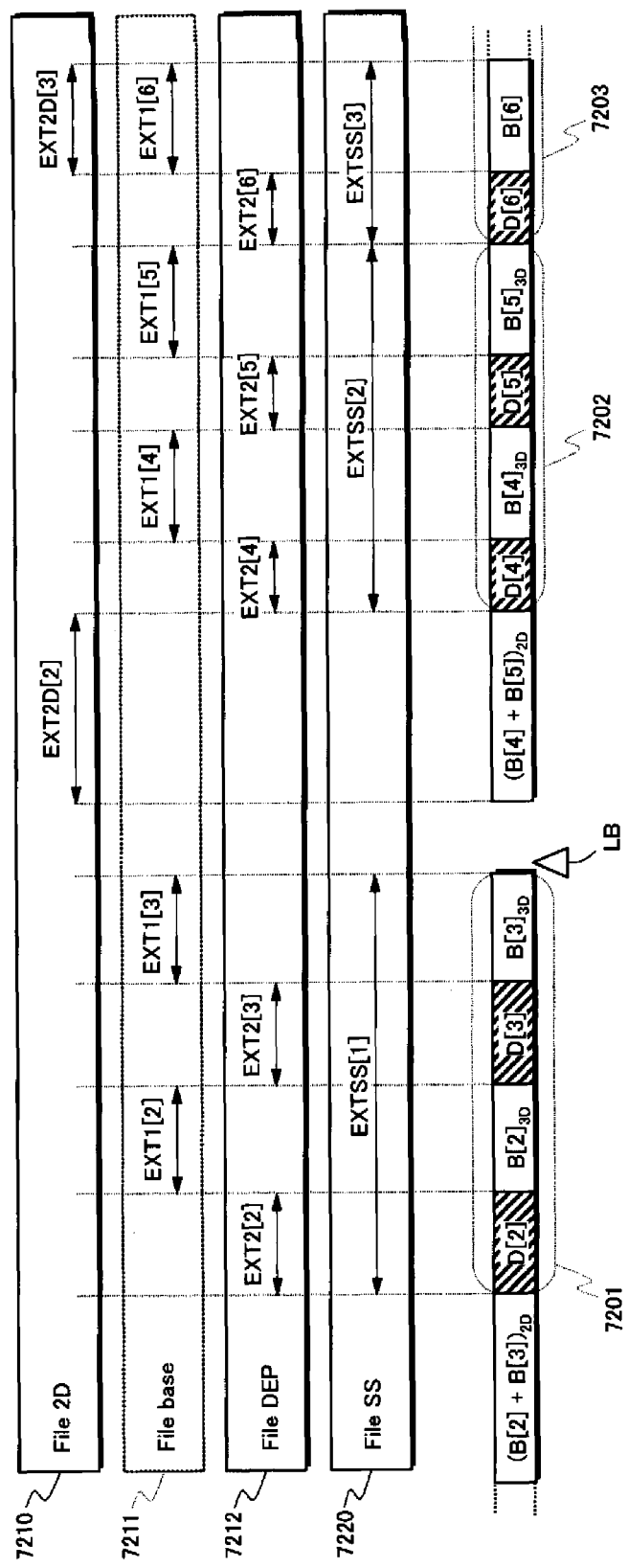
FIG. 72 is a schematic diagram showing arrangement three of a data block group recorded before and after a layer boundary LB on the BD-ROM disc 101.

FIG. 72 is a schematic diagram showing arrangement three of a data block group recorded before and after a layer boundary LB on the BD-ROM disc 101. As is clear from a comparison of FIGS. 72 and 69, in addition to the data blocks in arrangement two, arrangement three includes a new block exclusively for 2D playback and a new block exclusively for 3D playback. These data blocks are placed immediately after the layer boundary LB.

As shown in FIG. 72, a first block exclusively for 2D playback $(B[2]+B[3])_{2D}$ and a first extent block 7201 are placed in this order before the layer boundary LB. A second block exclusively for 2D playback $(B[4]+B[5])_{2D}$, a second extent block 7202, and a third extent block 7203 are placed in this order after the layer boundary LB. In the extent blocks 7201-7203, dependent-view data blocks D[n] and base-view data blocks B[n] form an interleaved arrangement (n= 2, 3, 4, . . . ). The $n^{th}$ pair of data blocks D[n] and B[n] constitute an extent pair and in particular have the same extent ATC time. In the second extent block 7202, stream data is continuous with the extent pair D[3] and B[3]$_{3D}$ located at the end of the first extent block 7201 and with the extent pair D[6] and B[6] located at the top of the third extent block 7203. The base-view data blocks included in the first extent block 7201 are both blocks exclusively for 3D playback, B[2]$_{3D}$ and B[3]$_{3D}$, and the combination of these blocks B[2]$_{3D}$+B[3]$_{3D}$ matches bit-for-bit with the first block exclusively for 2D playback (B[2]+B[3])$_{2D}$ located before the first extent block 7201. The base-view data blocks included in the second extent block 7202 are both blocks exclusively for 3D playback, B[4]$_{3D}$ and B[5]$_{3D}$, and the combination of these blocks B[4]$_{3D}$+B[5]$_{3D}$ matches bit-for-bit with the second block exclusively for 2D playback (B[4]+B[5])$_{2D}$ located before the second extent block 7202.

Among the base-view data blocks shown in FIG. 72, data blocks other than the blocks exclusively for 3D playback B[2]$_{3D}$-B[5]$_{3D}$ can be accessed as extents in a file 2D 7210. In particular, the second block exclusively for 2D playback (B[4]+B[5])$_{2D}$ can be accessed as one 2D extent EXT2D[2]. Furthermore, the base-view data block B[6] in the third extent block 7203 can be extracted from the extent EXTSS[3] in a file SS 7220 as an extent in a file base 7211. Conversely, the blocks exclusively for 2D playback (B[2]+B[3])$_{2D}$ and (B[4]+B[5])$_{2D}$ can only be accessed as 2D extents. The blocks exclusively for 3D playback B[2]$_{3D}$-B[5]$_{3D}$ can be extracted from the extents SS EXTSS[1], EXTSS[2] as base-view extents.

Figure 73:
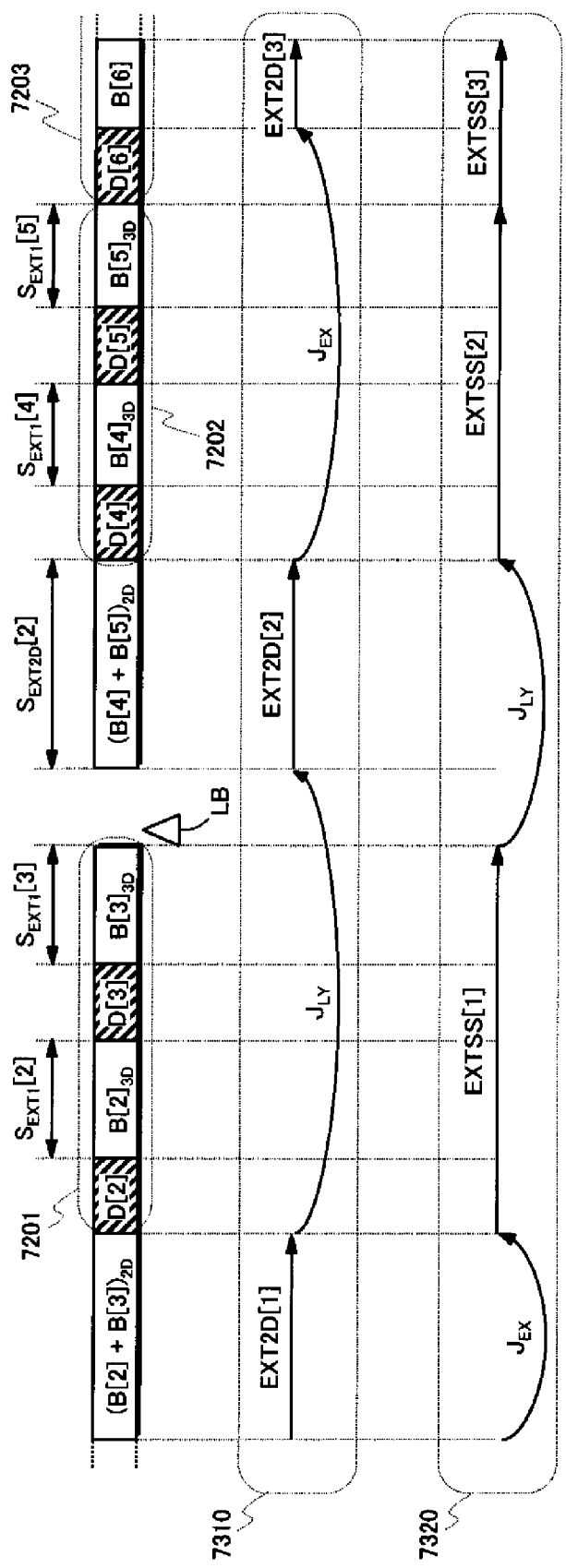
FIG. 73 is a schematic diagram showing a playback path 7310 in 2D playback mode and a playback path 7320 in 3D playback mode for the data block group in arrangement three shown in FIG. 72.

FIG. 73 is a schematic diagram showing a playback path 7310 in 2D playback mode and a playback path 7320 in 3D playback mode for the data block group in arrangement three shown in FIG. 72. The playback device 102 in 2D playback mode plays back the file 2D 7210. Accordingly, as shown by the playback path 7310 in 2D playback mode, the first block exclusively for 2D playback (B[2]+B[3])$_{2D}$ is read as the second 2D extent EXT2D[1], and reading of the immediately subsequent second extent block 7201 is skipped by a long jump $J_{LY}$. Next, the second block exclusively for 2D playback (B[4]+B[5])$_{2D}$ is read as the third 2D extent EXT2D[2], and reading of the immediately subsequent second extent block 7202, as well as of the dependent-view data block D[6] located at the top of the third extent block 7203, is skipped. Subsequently, the first base-view data block B[6] in the third extent block 7203 is read as the fourth 2D extent EXT2D[3]. The playback device 102 in 3D playback mode plays back the file SS 7220. Accordingly, as shown by the playback path 7320 in 3D playback mode, reading of the first block exclusively for 2D playback (B[2]+B[3])$_{2D}$ is skipped by a jump $J_{EX}$. Next, the entire first extent block 7201 is read continuously as the second extent SS EXTSS[1]. Immediately thereafter, a long jump $J_{LY}$ occurs, and reading of the second block exclusively for 2D playback (B[4]+B[5])$_{2D}$ is skipped. Subsequently, the second extent block 7202 and third extent block 7203 are continually read respectively as the third extent SS EXTSS[2] and fourth extent SS EXTSS[3].

As shown in FIG. 73, in 2D playback mode, the blocks exclusively for 2D playback (B[2]+B[3])$_{2D}$ and (B[4]+B[5])$_{2D}$ are read, whereas reading of the blocks exclusively for 3D playback B[2]$_{3D}$-B[5]$_{3D}$ is skipped. Conversely, in 3D playback mode, reading of the blocks exclusively for 2D playback (B[2]+B[3])$_{2D}$ and (B[4]+B[5])$_{2D}$ is skipped, whereas the blocks exclusively for 3D playback B[2]$_{3D}$-B[5]$_{3D}$ are read. However, since the entirety of the blocks exclusively for 2D playback (B[2]+B[3])$_{2D}$ and (B[4]+B[5])$_{2D}$ match the entirety of the blocks exclusively for 3D playback B[2]$_{3D}$+ . . . +B[5]$_{3D}$ bit-for-bit, the base-view video frames that are played back are the same in both playback modes. In arrangement three, the playback path 7310 in 2D playback mode and the playback path 7320 in 3D playback mode are divided immediately before the long jump $J_{LY}$ in this way. Accordingly, as in arrangement two, the size $S_{EXT2D}$[1] of the 2D extent EXT2D[1] located immediately before the layer boundary LB and the size $S_{EXT2}$[1] of the immediately preceding dependent-view data block D[1] can be determined separately as follows. Furthermore, immediately after a layer boundary LB, the playback path 7310 in 2D playback mode does not traverse the second extent block 7202. Accordingly, the data blocks D[4], B[4]$_{3D}$, D[5], and B[5]$_{3D}$ in the second extent block 7202 do not need to satisfy condition 1, and the size of each data block can be reduced. As a result, it is easy to set the maximum extent size in accordance with the table in FIG. 28A. It is thus possible to further reduce the capacities of the RB1 and RB2.

Note that arrangement one may be changed so as to place the block exclusively for 3D playback within the extent block that is located adjacent to and before the block exclusively for 2D playback. Arrangement three may be changed so that the extent block located immediately before a layer boundary only includes a regular interleaved arrangement. Arrangement three may also be combined with arrangement one. Furthermore, arrangement three may be changed so that the order of the second block exclusively for 2D playback (B[4]+B[5])$_{2D}$ and the immediately subsequent second extent block 7202 is reversed. A variety of changes to arrangements 1-3 such as these will be obvious to a person of ordinary skill in the art.

<Modifications>

(2-A) Extent Pair Flag

Figure 74:
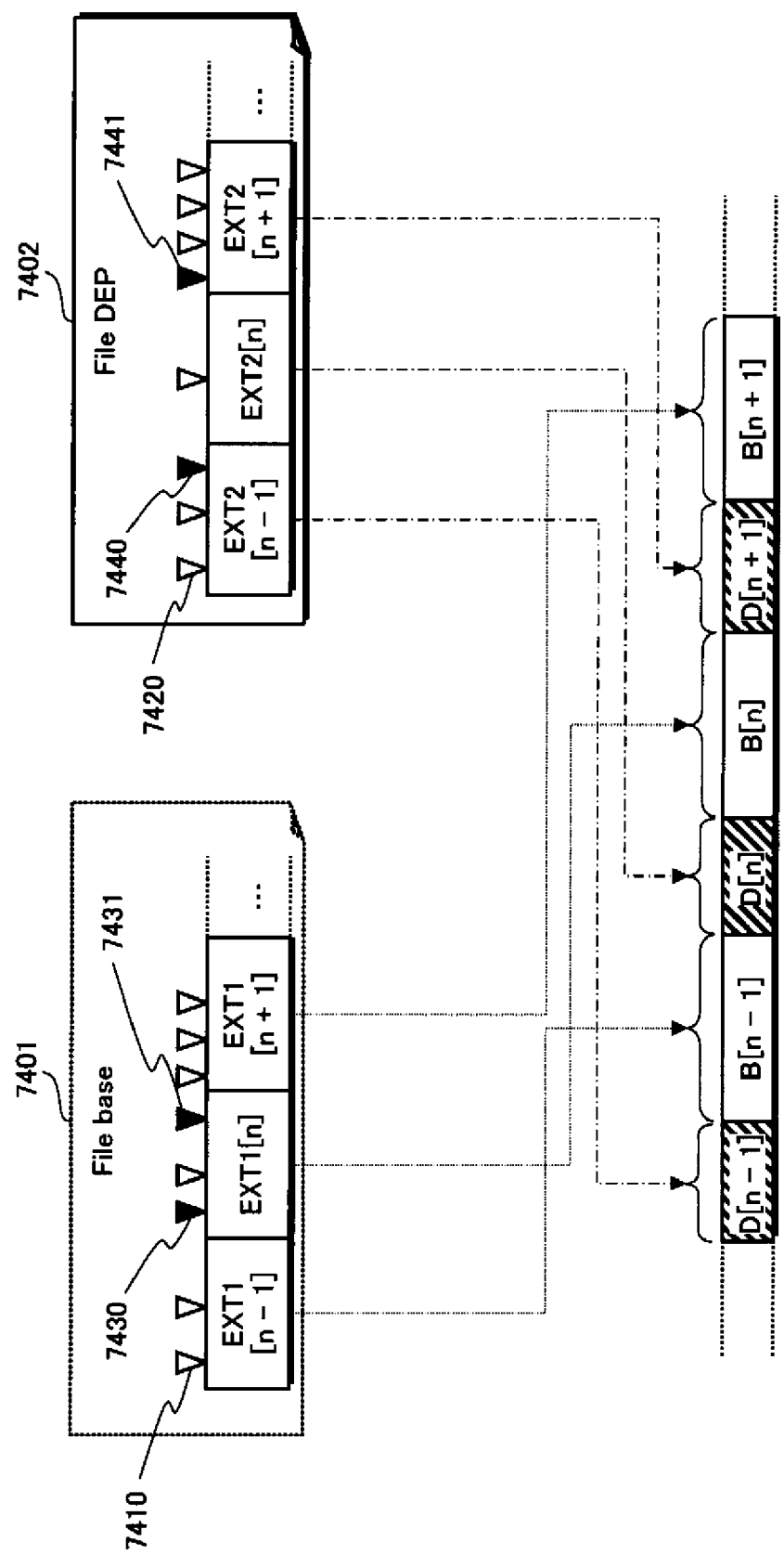
FIG. 74 is a schematic diagram showing entry points 7410 and 7420 respectively set for extents EXT1[k] and EXT2[k] (the letter k representing an integer zero or greater) in a file base 7401 and a file DEP 7402.

FIG. 74 is a schematic diagram showing entry points 7410 and 7420 respectively set for extents EXT1[k] and EXT2[k] (the letter k representing an integer zero or greater) in a file base 7401 and a file DEP 7402. The entry point 7410 in the file base 7401 is defined by the entry map in the 2D clip information file, and the entry point 7420 in the file DEP 7402 is defined by the entry map in the dependent-view clip information file. Each entry point 7410 and 7420 particularly includes an extent pair flag. When an entry point in the file base 7401 and an entry point in the file DEP 7402 indicate the same PTS, an "extent pair flag" indicates whether or not the extents in which these entry points are set EXT1[i] and EXT2[j] are in the same order from the top of the files 7401 and 7402 (i=j or i≠j). As shown in FIG. 74, the PTS of the first entry point 7430 set in the (n+1)$^{th}$ (the letter n representing an integer one or greater) base-view extent EXT1[n] equals the PTS of the last entry point 7440 set in the (n−1)$^{th}$ dependent-view extent EXT2[n−1]. Accordingly, the value of the extent pair flag for the entry points 7430 and 7440 is set to "0". Similarly, the PTS of the last entry point 7431 set in the (n+1)$^{th}$ base-view extent EXT1[n] equals the PTS of the first entry point 7441 set in the (n+1)$^{th}$ dependent-view extent EXT2[n+1]. Accordingly, the value of the extent pair flag for the entry points 7431 and 7441 is set to "0". For other entry points 7410 and 7420, when the PTSs are equal, the order of the extents EXT1[•] and EXT2[•] in which these points are set is also equal, and thus the value of the extent pair flag is set to "1".

When the playback device 102 in 3D playback mode begins interrupt playback, it refers to the extent pair flag in the entry point of the playback start position. When the value of the flag is "1", playback actually starts from that entry point.

When the value is "0", the playback device 102 searches, before or after that entry point, for another entry point that has an extent pair flag with a value of "1". Playback starts from that other entry point. This ensures that the $n^{th}$ dependent-view extent EXT2[n] is read before the $n^{th}$ base-view extent EXT1[n]. As a result, interrupt playback can be simplified.

The presentation time corresponding to the distance between entry points having an extent pair flag=0 may be limited to be no greater than a constant number of seconds. For example, the time may be limited to be less than or equal to twice the maximum value of the presentation time for one GOP. Alternatively, the value of the extent pair flag for the entry point following an entry point with an extent pair flag=0 may be limited to a value of "1". Furthermore, it may be specified that "each extent has at least one entry point". In either case, the interval between entry points is sufficiently small so that, at the start of interrupt playback, the wait time until playback begins, which is caused by searching for an entry point having an extent pair flag=1, is shortened. An angle switching flag may also be used as a substitute for an extent pair flag. An "angle switching flag" is a flag prepared within the entry map for content that supports multi-angle. The angle switching flag indicates the angle switching position within multiplexed stream data (see below for a description of multi-angle).

(2-B) Matching Playback Periods Between Extent Pair Flags

For pairs of data blocks with equal extent ATC times, i.e. for extent pairs, the playback period may also match, and the playback time of the video stream may be equal. In other words, the number of VAUs between extents in an extent pair may be equal. The significance of such equality is explained below.

Figure 75A:
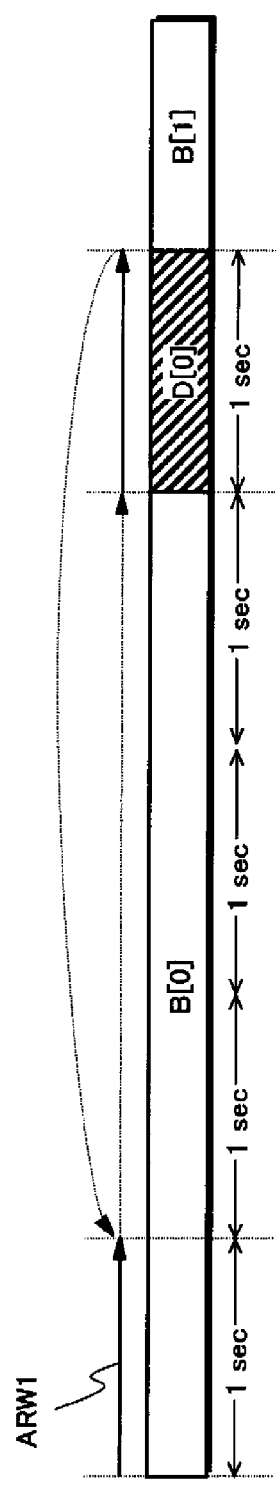
FIG. 75A is a schematic diagram showing a playback path when extent ATC times and playback times of the video stream differ between consecutive base-view data blocks and dependent-view data blocks.

FIG. 75A is a schematic diagram showing a playback path when extent ATC times and playback times of the video stream differ between contiguous base-view data blocks and dependent-view data blocks. As shown in FIG. 75A, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device, it is preferable, as shown by the arrow ARW1 in FIG. 75A, to have the playback device alternately read the base-view data block B[0] and the dependent-view data block D[0] by the same amount of playback time, for example one second at a time. In that case, however, as shown by the dashed lines in FIG. 75A, jumps occur during read processing. As a result, it is difficult to cause read processing to keep up with decoding processing, and thus it is difficult to stably maintain seamless playback.

Figure 75B:
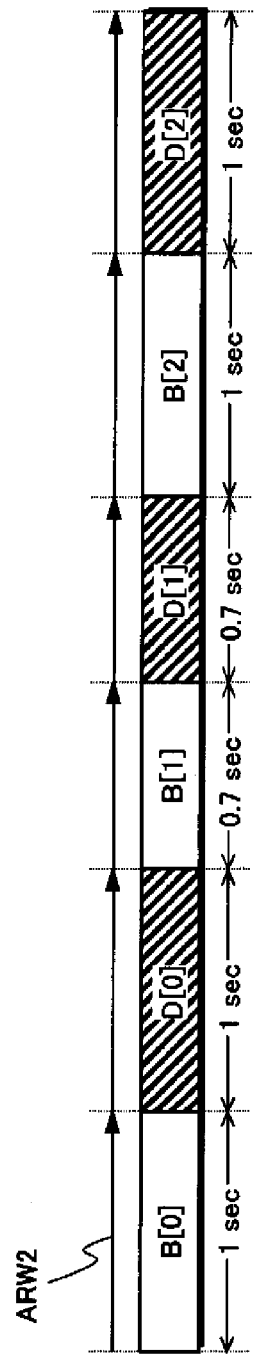
FIG. 75B is a schematic diagram showing a playback path when the playback times of the video stream are the same for consecutive base-view and dependent-view data blocks.

FIG. 75B is a schematic diagram showing a playback path when the playback times of the video stream are equal for contiguous base-view and dependent-view data blocks. As shown in FIG. 75B, the playback time of the video stream between a pair of adjacent data blocks may be the same. For example, for the pair of the top data blocks B[0] and D[0], the playback times of the video stream both equal one second, and the playback times of the video stream for the second pair of data blocks B[1] and D[1] both equal 0.7 seconds. In this case, during 3D playback mode, the playback device reads data blocks B[0], D[0], B[1], D[1], . . . in order from the top, as shown by arrow ARW2 in FIG. 75B. By simply reading these data blocks in order, the playback device can smoothly read the main TS and sub-TS alternately in the same increments of playback time. In particular, since no jump occurs during read processing, seamless playback of 3D video images can be stably maintained.

If the extent ATC time is actually the same between contiguous base-view and dependent-view data blocks, jumps do not occur during reading, and synchronous decoding can be maintained. Accordingly, even if the playback period or the playback time of the video stream are not equal, the playback device can reliably maintain seamless playback of 3D video images by simply reading data block groups in order from the top, as in the case shown in FIG. 75B.

In an extent pair, the number of headers in any VAU, or the number of PES headers, may be equal. These headers are used to synchronize decoding within an extent pair. Accordingly, if the number of headers is equal in an extent pair, it is relatively easy to maintain synchronous decoding, even if the number of VAUs is not equal. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

The number of entry points may be equal between extents in an extent pair. Referring again to FIG. 74, in the file base 7401 and the file DEP 7402, the extents EXT1[k] and EXT2[k], located in the same order from the top, have the same number of entry points 7410 and 7420, after excluding the entry points 7430, 7440, 7431, 7441 with an extent pair flag=0. Whether jumps are present differs between 2D playback mode and 3D playback mode. When the number of entry points is equal between extents in an extent pair, however, the playback time is substantially equal. Accordingly, it is easy to maintain synchronous decoding regardless of jumps. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

(2-C) Multi-Angle

Figures 76A, 76B, 76C:
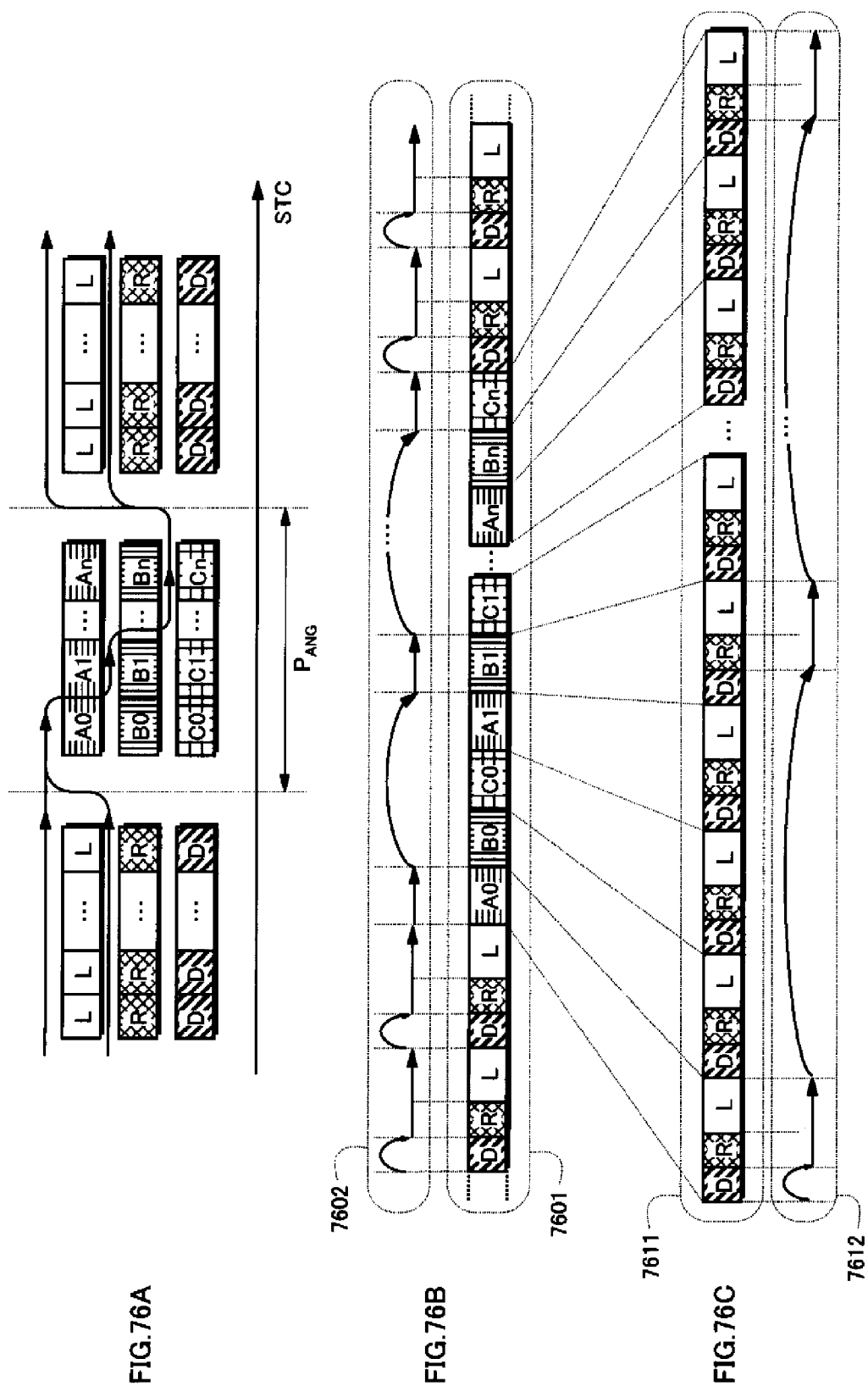
FIG. 76A is a schematic diagram showing a playback path for multiplexed stream data supporting multi-angle.
FIG. 76B is a schematic diagram showing a data block group 7601 recorded on a BD-ROM disc and a corresponding playback path 7602 in L/R mode.
FIG. 76C is a schematic diagram showing an extent block composed of stream data Ak, Bk, and Ck for different angles.

FIG. 76A is a schematic diagram showing a playback path for multiplexed stream data supporting multi-angle. As shown in FIG. 76A, three types of pieces of stream data L, R, and D respectively for a base view, right view, and depth map are multiplexed in the multiplexed stream data. For example, in L/R mode the base-view and right-view pieces of stream data L and R are played back in parallel. Furthermore, pieces of stream data Ak, Bk, and Ck (k=0, 1, 2, . . . , n) for different angles (viewing angles) are multiplexed in the section played back during a multi-angle playback period $P_{ANG}$. The stream data Ak, Bk, and Ck for different angles is divided into sections for which the playback time equals the angle change interval. Furthermore, stream data for the base view, right view and depth map is multiplexed in each of the pieces of data Ak, Bk, and Ck. During the multi-angle playback period $P_{ANG}$, playback can be switched between the pieces of stream data Ak, Bk, and Ck for different angles in response to user operation or instruction by an application program.

FIG. 76B is a schematic diagram showing a data block group 7601 recorded on a BD-ROM disc and a corresponding playback path 7602 in L/R mode. This data block group 7601 includes the pieces of stream data L, R, D, Ak, Bk, and Ck shown in FIG. 76A. As shown in FIG. 76B, in the data block group 7601, in addition to the regular pieces of stream data L, R, and D, the pieces of stream data Ak, Bk, and Ck for different angles are recorded in an interleaved arrangement. In L/R mode, as shown in the playback path 7602, the right-view and base-view data blocks R and L are read, and reading of the depth map data blocks D is skipped by jumps.

Furthermore, from among the pieces of stream data Ak, Bk, and Ck for different angles, the data blocks for the selected angles A0, B1, ..., Cn are read, and reading of other data blocks is skipped by jumps.

FIG. 76C is a schematic diagram showing an extent block formed by stream data Ak, Bk, and Ck for different angles. As shown in FIG. 76C, the pieces of stream data Ak, Bk, and Ck for each angle are composed of three types of data blocks L, R, and D recorded in an interleaved arrangement. In L/R mode, as shown by the playback path 7602, from among the pieces of stream data Ak, Bk, and Ck for different angles, right-view and base-view data blocks R and L are read for selected angles A0, B1, ..., Cn. Conversely, reading of the other data blocks is skipped by jumps.

Note that in the pieces of stream data Ak, Bk, and Ck for each angle, the stream data for the base view, right view, and depth map may be stored as a single piece of multiplexed stream data. However, the recording rate has to be limited to the range of the system rate for which playback is possible in the 2D playback device. Also, the number of pieces of stream data (TS) to be transferred to the system target decoder differs between such pieces of multiplexed stream data and multiplexed stream data for other 3D video images. Accordingly, each PI in the 3D playlist file may include a flag indicating the number of TSs to be played back. By referring to this flag, the 3D playback device can switch between these pieces of multiplexed stream data within one 3D playlist file. In the PI that specifies two TSs for playback in 3D playback mode, this flag indicates "2TS". On the other hand, in the PI that specifies a single TS for playback, such as the above pieces of multiplexed stream data, the flag indicates "1TS". The 3D playback device can switch the setting of the system target decoder in response to the value of the flag. Furthermore, this flag may be expressed by the value of the connection condition (CC). For example, a CC of "7" indicates a transition from 2TS to 1TS, whereas a CC of "8" indicates a transition from 1TS to 2TS.

Figure 77:
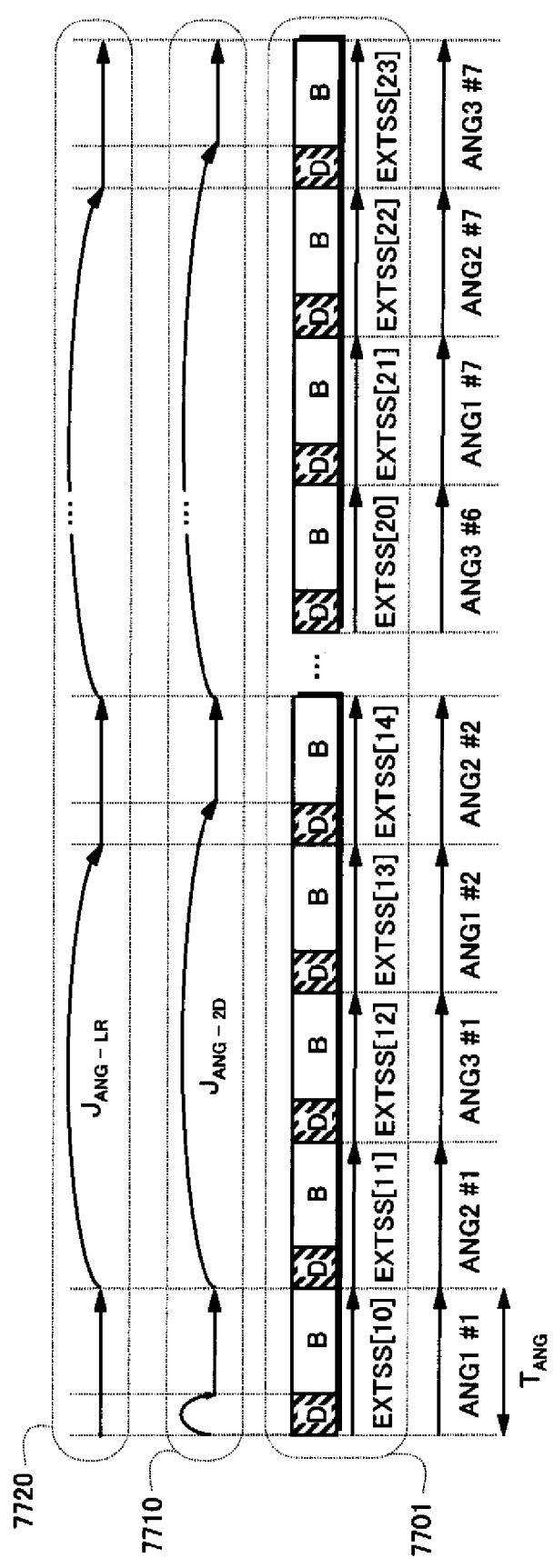
FIG. 77 is a schematic diagram showing (i) a data block group 7701 constituting a multi-angle period and (ii) a playback path 7710 in 2D playback mode and playback path 7720 in L/R mode that correspond to the data block group 7701.

FIG. 77 is a schematic diagram showing (i) a data block group 7701 constituting a multi-angle period and (ii) a playback path 7710 in 2D playback mode and playback path 7720 in L/R mode that correspond to the data block group 7701. As shown in FIG. 77, this data block group 7701 is formed by three types of angle change sections ANG1 #k, ANG2 #k, and ANG3 #k (k=1, 2, ..., 6, 7) in an interleaved arrangement. An "angle change section" is a group of consecutive data blocks in which stream data for video images seen from a single angle is stored. The angle of video images differs between different types of angle change sections. The $k^{th}$ sections of each type of angle change section ANG1 #k, ANG2 #k, and ANG3 #k are contiguous. Each angle change section ANGm #k (m=1, 2, 3) is formed by one extent block, i.e. is referred to as one extent SS EXTSS[k] (k=10, 11, ..., 23). The capacity of the read buffer can thus be reduced as compared to when a plurality of angle change sections form one extent SS EXTSS [k]. Furthermore, each extent block includes one dependent-view data block R and one base-view data block L. This pair of data blocks R and L is referred to as a pair of the $n^{th}$ dependent-view extent EXT2[n] and the $n^{th}$ base-view extent EXT1[n] (the letter n representing an integer zero or greater).

The size of each extent block satisfies conditions 1-4. In particular, the jump that should be taken into consideration in condition 1 is the jump $J_{ANG-2D}$ to skip reading of other angle change sections, as shown by the playback path 7710 in 2D playback mode. On the other hand, the jump that should be taken into consideration in condition 4 is the jump $J_{ANG-LR}$ to skip reading of other angle change sections, as shown by the playback path 7720 in L/R mode. As shown by the playback paths 7710 and 7720, both of these jumps $J_{ANG-2D}$ and $J_{ANG-LR}$ generally include an angle switch, i.e. a switch between the type of angle change section to be read.

Further referring to FIG. 77, each angle change section includes one base-view data block L. Accordingly, the extent ATC time of the base-view extent EXT1[•] is limited to being no greater than the maximum value $T_{ANG}$ of the length of the angle change section. For example, in order to make it possible to switch angles at a rate of once every two seconds of presentation time, the maximum value $T_{ANG}$ of the length of the angle change section has to be limited to two seconds. As a result, the extent ATC time of the base-view extent EXT1[•] is limited to two seconds or less. Therefore, condition 5 is changed so that the size $S_{EXT1}$ of a base-view extent satisfies expression (16) instead of expression (7):

$$S_{EXT1}[k] \le \max\left( R_{EXT1}[k] \times \frac{R_{UD54}}{R_{UD54} - R_{MAX1}} \times T_{JUMP-2D\_MIN}, \; R_{EXT1}[k] \times T_{ANG} \right). \quad (16)$$

Note that in the right-hand side of expression (16), the right-hand side of expression (10A) or (10B) may be used instead of the right-hand side of expression (7). Like the extension time ΔT for the extent ATC time of a 2D extent shown in expression (10A) or (10B), the maximum value $T_{ANG}$ of the length of an angle change section may be determined by the length of a GOP, or by the upper limit of the number of extents that can be played back during a predetermined time. Furthermore, the extension time ΔT may be set to zero for multi-angle.

When a long jump occurs during a multi-angle period, the extent blocks before and after the long jump are arranged for seamless connection. Specifically, when stream data for the base-view and dependent-view in each angle is multiplexed in a single TS (hereinafter referred to as 1TS multi-angle), the angle change sections located immediately before the long jump are set to have a larger size than other angle change sections. On the other hand, when stream data for the base-view and dependent-view in each angle is multiplexed in separate TSs (hereinafter referred to as 2TS multi-angle), the playback paths are separated in the angle change sections located immediately before the long jump.

FIG. 78A is a schematic diagram showing correspondence between an extent block group 7810 constituting a 1TS multi-angle period $P_{ANG}$ and a playback path 7820 corresponding to the extent block group 7810. As shown in FIG. 78A, the extent block group 7810 includes angle change sections Ak, Bk, and Ck (k=0, 1, ..., n, the letter n representing an integer zero or greater) in an interleaved arrangement in a multi-angle period $P_{ANG}$. Furthermore, a layer boundary LB separates these angle change sections Ak, Bk, and Ck from the subsequent extent blocks, and therefore a long jump $J_{LY}$ occurs at the layer boundary LB. In this case, the size Sn of each of the $(n+1)^{th}$ angle change sections An, Bn, and Cn located immediately before the long jump $J_{LY}$ is larger than the size Sk of each of the angle change sections Ak, Bk, and Ck (k=0, 1, ..., n−1) from the top to the $n^{th}$ angle change section: Sn>Sk. Accordingly, immediately before the long jump $J_{LY}$, the stored data amount in the read buffer increases sufficiently to prevent underflow in the read buffer during the long jump $J_{LY}$.

FIG. 78B is a schematic diagram showing correspondence between an extent block group 7830 constituting a 2TS multi-angle period $P_{ANG}$ and a playback path 7840 in 2D playback mode and playback path 7850 in 3D playback mode that correspond to the extent block group 7830. As shown in FIG. 78B, the extent block group 7830 includes angle change sections Ak, Bk, and Ck (k=0, 1, . . . , n, the letter n representing an integer zero or greater) in an interleaved arrangement in a multi-angle period $P_{ANG}$. Furthermore, a layer boundary LB separates these angle change sections Ak, Bk, and Ck from the subsequent extent blocks, and therefore a long jump $J_{LY}$ occurs at the layer boundary LB. In this context, each data block Ak, Bk, and Ck (k=0, 1, n−1) in the angle change section from the top until the $n^{th}$ data block includes one extent pair D, B. On the other hand, the $(n+1)^{th}$ angle change sections An, Bn, and Cn located immediately before the layer boundary LB include two types of data blocks: blocks exclusively for 2D playback $An_{2D}$, $Bn_{2D}$, and $Cn_{2D}$, and blocks exclusively for 3D playback $An_{3D}$, $Bn_{3D}$, and $Cn_{3D}$. Generally, the blocks exclusively for 3D playback $An_{3D}$, $Bn_{3D}$, and $Cn_{3D}$ include a plurality of extent pairs D1, $B1_{3D}$, D2, $B2_{3D}$ in an interleaved arrangement. The blocks exclusively for 2D playback $An_{2D}$, $Bn_{2D}$, and $Cn_{2D}$ are duplicates $(B1+B2)_{2D}$ that entirely match the base-view data blocks $B1_{3D}$ and $B2_{3D}$ included in the blocks exclusively for 3D playback $An_{3D}$, $Bn_{3D}$, and $Cn_{3D}$ for the same angle bit-for-bit. The playback path 7840 in 2D playback mode traverses one of the blocks exclusively for 2D playback $An_{2D}$, $Bn_{2D}$, and $Cn_{2D}$ as the $(n+1)^{th}$ angle change section and skips all of the blocks exclusively for 3D playback $An_{3D}$, $Bn_{3D}$, and $Cn_{3D}$. By contrast, the playback path 7850 in 3D playback mode traverses one of the blocks exclusively for 3D playback $An_{3D}$, $Bn_{3D}$, and $Cn_{3D}$ as the $(n+1)^{th}$ angle change section and skips all of the blocks exclusively for 2D playback $An_{2D}$, $Bn_{2D}$, and $Cn_{2D}$. The stored data amount necessary to prevent underflow in the read buffer during the long jump $J_{LY}$ is guaranteed in 2D playback mode by the blocks exclusively for 2D playback $An_{2D}$, $Bn_{2D}$, and $Cn_{2D}$ satisfying condition 1 and is guaranteed in 3D playback mode by the blocks exclusively for 3D playback $An_{3D}$, $Bn_{3D}$, and $Cn_{3D}$ satisfying conditions 2-4. Furthermore, since the blocks exclusively for 3D playback $An_{3D}$, $Bn_{3D}$, and $Cn_{3D}$ do not have to satisfy condition 1, it is easy to set the maximum extent size in accordance with the table in FIG. 28A. As a result, seamless connection can be realized for the extent block 7830 while keeping the capacity of the read buffer sufficiently low.

<<Embodiment 3>>

The following describes, as Embodiment 3 of the present invention, a recording device and recording method for the recording media of Embodiments 1 and 2 of the present invention. The recording device described here is called an authoring device. The authoring device is generally located at a creation studio and used by authoring staff to create movie content to be distributed. First, in response to operations by the authoring staff, the recording device converts movie content into AV stream files using a predetermined compression encoding method. Next, the recording device generates a scenario. A "scenario" is information defining how each title included in the movie content is to be played back. Specifically, a scenario includes dynamic scenario information and static scenario information. Then, the recording device generates a volume image for a BD-ROM disc from the AV stream files and scenario. Lastly, the recording device records the volume image on the recording medium.

FIG. 79 is a functional block diagram of a recording device 7900. As shown in FIG. 79, the recording device 7900 includes a database unit 7901, video encoder 7902, material creation unit 7903, scenario generation unit 7904, BD program creation unit 7905, multiplex processing unit 7906, and format processing unit 7907.

The database unit 7901 is a nonvolatile storage device embedded in the recording device and is in particular a hard disk drive (HDD). Alternatively, the database unit 7901 may be an external HDD connected to the recording device, or a nonvolatile semiconductor memory device internal or external to the recording device.

The video encoder 7902 receives video data, such as uncompressed bit map data, from the authoring staff and compresses the received video data in accordance with a compression encoding method such as MPEG-4 AVC or MPEG-2. This process converts primary video data into a primary video stream and secondary video data into a secondary video stream. In particular, 3D video image data is converted into a pair of a base-view video stream and a dependent-view video stream, as shown in FIG. 7, using a multiview coding method such as MVC. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream. The converted video streams 7912 are stored in the database unit 7901.

During the process of inter-picture predictive encoding, the video encoder 7902 detects motion vectors between individual images in the left view and right view and calculates depth information of each 3D video image based on the detected motion vectors. FIGS. 80A and 80B are schematic diagrams respectively showing a left-view picture and a right-view picture used to display one scene of 3D video images, and FIG. 80C is a schematic diagram showing depth information calculated from these pictures by the video encoder 7902.

The video encoder 7902 compresses left-view and right-view pictures using the redundancy between the pictures. In other words, the video encoder 7902 compares both uncompressed pictures on a per-macroblock basis, i.e. per matrices of 8×8 or 16×16 pixels, so as to detect a motion vector for each image in the two pictures. Specifically, as shown in FIGS. 80A and 80B, a left-view picture 8001 and a right-view picture 8002 are first each divided into macroblocks 8003. Next, the areas occupied by the image data in picture 8001 and picture 8002 are compared for each macroblock 8003, and a motion vector for each image is detected based on the result of the comparison. For example, the area occupied by video image 8004 showing a "house" in picture 8001 is substantially the same as that in picture 8002. Accordingly, a motion vector is not detected from these areas. On the other hand, the area occupied by video image 8005 showing a "circle" differs between picture 8001 and picture 8002. Accordingly, a motion vector of the video image 8005 is detected from these areas.

The video encoder 7902 uses the detected motion vector to compress the pictures 8001 and 8002. On the other hand, video encoder 7902 uses the motion vector to calculate the binocular parallax of the each video image, such as the "house" video image 8004 and "circle" video image 8005. The video encoder 7902 further calculates the depth of each video image from the video image's binocular parallax. The information indicating the depth may be organized into a matrix 8006 the same size as the matrix of the macroblocks in pictures 8001 and 8002, as shown in FIG. 80C. In this matrix

8006, blocks 8007 are in one-to-one correspondence with the macroblocks 8003 in pictures 8001 and 8002. Each block 8007 indicates the depth of the video image shown by the corresponding macroblocks 8003 by using, for example, a depth of 8 bits. In the example shown in FIGS. 80A to 80C, the depth of the video image 8005 of the "circle" is stored in each of the blocks in an area 8008 in the matrix 8006. This area 8008 corresponds to the entire areas in the pictures 8001 and 8002 that represent the video image 8005.

The video encoder 7902 may use depth information to generate a depth map for the left view or right view. In this case, the video encoder 7902 uses inter-picture predictive encoding on the pictures in the left-view or right-view stream data and the depth map stream to convert these into a base-view video stream and a depth map stream. The converted video streams 7912 are stored in the database unit 7901.

The video encoder 7902 may further use the depth information to calculate the width of vertical strips and the height of horizontal strips included only in one of the left-view video plane and right-view video plane (see the <<Supplementary Explanation>> for details). If a video image is actually included in these strips, the motion vector of this video image is detected as indicating "frame out" from the left view to the right view or vice-versa. The video encoder 7902 can calculate the width or height of each strip from this motion vector. Information 7911 (hereinafter referred to as "mask area information") indicating the calculated width and height is stored in the database unit 7901.

When encoding a secondary video stream from 2D video image data, the video encoder 7902 may also create offset information 7910 for a secondary video plane in accordance with operations of the authoring staff. The generated offset information 7910 is stored in the database unit 7901.

The material creation unit 7903 creates elementary streams other than video streams, such as an audio stream 7913, PG stream 7914, and IG stream 7915 and stores the created streams in the database unit 7901. For example, the material creation unit 7903 receives uncompressed LPCM audio data from the authoring staff, encodes the uncompressed LPCM audio data in accordance with a compression encoding method such as AC-3, and converts the encoded LPCM audio data into the audio stream 7913. The material creation unit 7903 additionally receives a subtitle information file from the authoring staff and creates the PG stream 7914 in accordance with the subtitle information file. The subtitle information file defines image data or text data for showing subtitles, display timings of the subtitles, and visual effects to be added to the subtitles, such as fade-in/out. Furthermore, the material creation unit 7903 receives bit map data and a menu file from the authoring staff and creates the IG stream 7915 in accordance with the bit map data and the menu file. The bit map data shows images that are to be displayed on a menu. The menu file defines how each button on the menu is to be transitioned from one status to another and defines visual effects to be added to each button.

In response to operations by the authoring staff, the material creation unit 7903 furthermore creates offset information 7910 corresponding to the PG stream 7914 and IG stream 7915. In this case, the material creation unit 7903 may use the depth information DPI generated by the video encoder 7902 to align the depth of 3D graphics images with the depth of 3D video images. When the depth of 3D video images changes drastically from frame to frame, the material creation unit 7903 may further use a low-pass filter to process a sequence of offset values created with reference to the depth information DPI, thereby reducing the amount of change from frame to frame. The offset information 7910 thus generated is stored in the database unit 7901.

The scenario generation unit 7904 creates BD-ROM scenario data 7917 in response to an instruction received from the authoring staff via GUI and then stores the created BD-ROM scenario data 7917 in the database unit 7901. The BD-ROM scenario data 7917 defines methods of playing back the elementary streams 7912-7916 stored in the database unit 7901. Of the file group shown in FIG. 2, the BD-ROM scenario data 7917 includes the index file 211, the movie object file 212, and the playlist files 221-223. The scenario generation unit 7904 further creates a parameter file PRF and transfers the created parameter file PRF to the multiplex processing unit 7906. The parameter file PRF defines, from among the elementary streams 7912-7915 stored in the database unit 7901, stream data to be multiplexed into the main TS and sub-TS.

The BD program creation unit 7905 provides the authoring staff with a programming environment for programming BD-J objects and Java application programs. The BD program creation unit 7905 receives a request from a user via GUI and creates each program's source code according to the request. The BD program creation unit 7905 further creates a BD-J object file 251 from the BD-J objects and compresses the Java application programs in the JAR file 261. The program files BDP are transferred to the format processing unit 7907.

In this context, it is assumed that a BD-J object is programmed in the following way: the BD-J object causes the program execution unit 5034 shown in FIG. 50 to transfer graphics data for GUI to the system target decoder 5023. Furthermore, the BD-J object causes the system target decoder 5023 to process graphics data as image plane data and to output image plane data to the plane adder 5024 in one plane+offset mode. In this case, the BD program creation unit 7905 may create offset information 7910 corresponding to the image plane and store the offset information 7910 in the database unit 7901. The BD program creation unit 7905 may use the depth information DPI generated by the video encoder 7902 when creating the offset information 7910.

In accordance with the parameter file PRF, the multiplex processing unit 7906 multiplexes each of the elementary streams 7912-7915 stored in the database unit 7901 to form a stream file in MPEG-2 TS format. Specifically, as shown in FIG. 4, each of the elementary streams 7912-7915 is first converted into a source packet sequence. Next, the source packets included in each sequence are assembled into a single piece of multiplexed stream data. In this way, the main TS and sub-TS are created. These pieces of multiplexed stream data MSD are output to the format processing unit 7907.

Furthermore, the multiplex processing unit 7906 creates offset metadata based on the offset information 7910 stored in the database unit 7901. As shown in FIG. 11, the created offset metadata 1110 is stored in the dependent-view video stream. At this point, the mask area information 7911 stored in the database unit 7901 is stored in the dependent-view video stream together with the offset metadata. The multiplex processing unit 7906 may process each piece of graphics data to adjust the arrangement of the graphics elements in the left and right video image frames. By doing so, the multiplex processing unit 7906 can prevent 3D graphics images represented by each graphics plane from overlapping with 3D graphics images represented by the other graphics planes in the same visual direction. The multiplex processing unit 7906 can also adjust the offset value for each graphics plane so that each 3D graphics image is displayed at a different depth.

The multiplex processing unit 7906 then creates a 2D clip information file and a dependent-view clip information file via the following four steps (I)-(IV). (I) The multiplex processing unit 7906 creates the entry maps 3030 shown in FIG. 30 for the file 2D and file DEP. (II) Using each file's entry map, the multiplex processing unit 7906 creates the extent start points 3042 and 3220 shown in FIGS. 32A and 32B. At this point, the multiplex processing unit 7906 aligns extent ATC times between consecutive data blocks. Furthermore, the multiplex processing unit 7906 arranges 2D extents, base-view extents, dependent-view extents, and extents SS so that the sizes of these extents satisfy conditions 1-5. (III) The multiplex processing unit 7906 extracts the stream attribute information 3020 shown in FIG. 30 from elementary streams to be multiplexed into the main TS and sub-TS. (IV) The multiplex processing unit 7906 associates a combination of an entry map 3030, 3D meta data 3040, and stream attribute information 3020 with a piece of clip information 3010, as shown in FIG. 30. Each clip information file CLI is thus created and transmitted to the format processing unit 7907.

The format processing unit 7907 creates a BD-ROM disc image 7920 of the directory structure shown in FIG. 2 from (i) the BD-ROM scenario data 7917 stored in the database unit 7901, (ii) a group of program files BDP such as BD-J object files created by the BD program creation unit 7905, and (iii) multiplexed stream data MSD and clip information files CLI generated by the multiplex processing unit 7906. In this directory structure, UDF is used as the file system.

When creating file entries for each of the files 2D, files DEP, and files SS, the format processing unit 7907 refers to the entry maps and 3D metadata included in the 2D clip information files and dependent-view clip information files. Each SPN for entry points and extent start points is thereby used in creating allocation descriptors. In particular, the value of the LBN and the extent size to be represented by each allocation descriptor are determined so as to express an interleaved arrangement of data blocks like the one shown in FIG. 15. As a result, each base-view data block is shared by a file SS and file 2D, and each dependent-view data block is shared by a file SS and file DEP.

<Recording Method of BD-ROM Disc Image>

Figure 81:
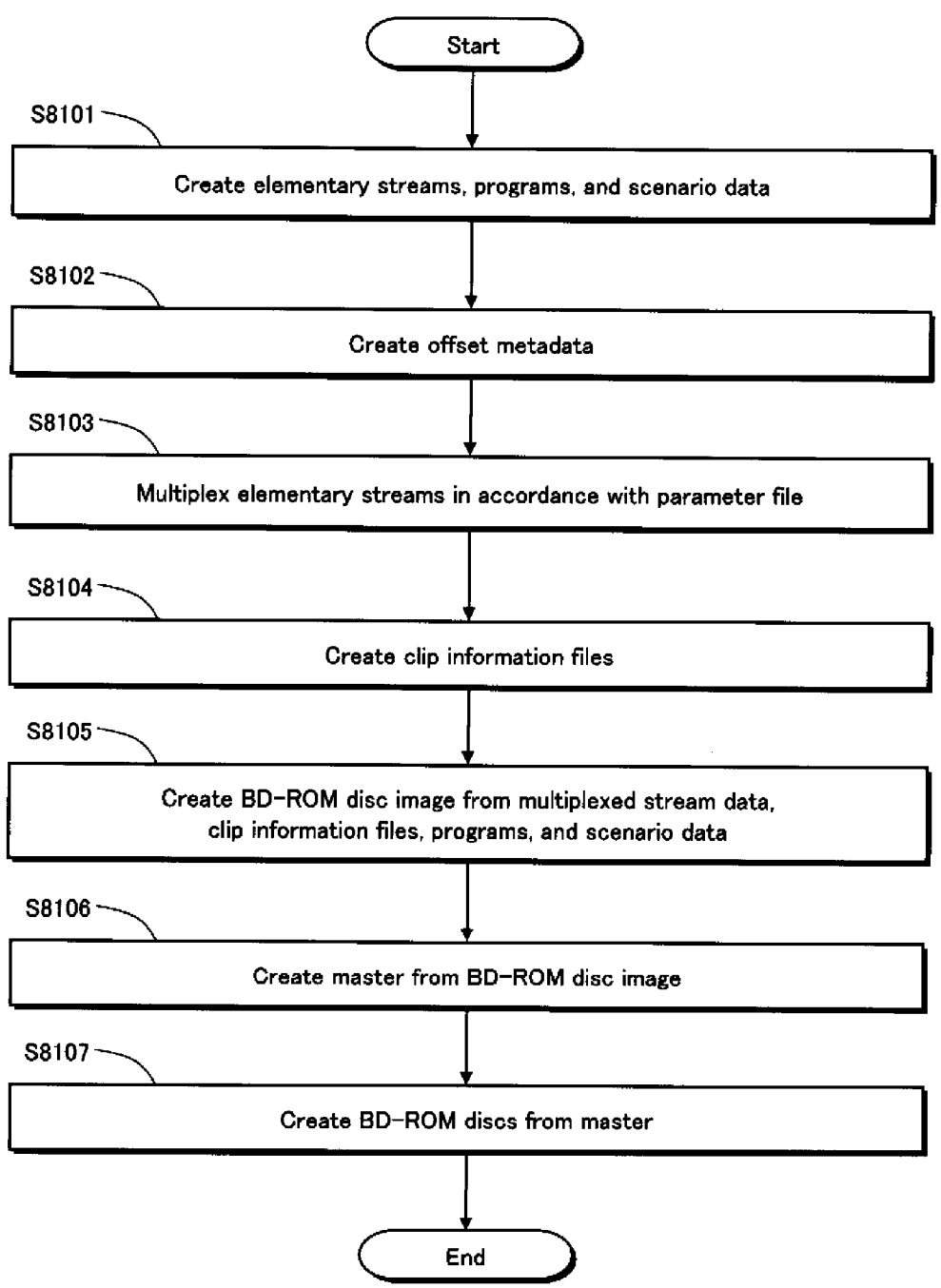
FIG. 81 is a flowchart of a method for recording movie content on a BD-ROM disc using the recording device 7900 shown in FIG. 79.

FIG. 81 is a flowchart of a method for recording movie content on a BD-ROM disc using the recording device 7900 shown in FIG. 79. This method begins, for example, when power to the recording device 7900 is turned on.

In step S8101, the elementary streams, programs, and scenario data to be recorded on a BD-ROM disc are created. In other words, the video encoder 7902 creates a video stream 7912. The material creation unit 7903 creates an audio stream 7913, PG stream 7914, and IG stream 7915. The scenario generation unit 7904 creates BD-ROM scenario data 7917. These created pieces of data 7912-7917 are stored in the database unit 7901. On the other hand, the video encoder 7902 creates offset information 7910 and mask area information 7911 and stores these pieces of information in the database unit 7901. The material creation unit 7903 creates offset information 7910 and stores this information in the database unit 7901. The scenario generation unit 7904 creates a parameter file PRF and transfers this file to the multiplex processing unit 7906. The BD program creation unit 7905 creates a group of program files BDP, which include a BD-J object file and a JAR file, and transfers this group BDP to the format processing unit 7907. The BD program creation unit 7905 also creates offset information 7910 and stores this information in the database unit 7901. Thereafter, processing proceeds to step S8102.

In step S8102, the multiplex processing unit 7906 creates offset metadata based on the offset information 7910 stored in the database unit 7901. The created offset metadata is stored in the dependent-view video stream along with the mask area information 7911. Thereafter, processing proceeds to step S8103.

In step S8103, the multiplex processing unit 7906 reads the elementary streams 7912-7915 from the database unit 7901 in accordance with the parameter file PRF and multiplexes these streams into a stream file in MPEG2-TS format. Thereafter, processing proceeds to step S8104.

In step S8104, the multiplex processing unit 7906 creates a 2D clip information file and a dependent-view clip information file. In particular, during creation of the entry map and extent start points, the extent ATC time is aligned in an extent pair. Furthermore, the sizes of 2D extents, base-view extents, dependent-view extents, and extents SS are set to satisfy conditions 1-5. Thereafter, processing proceeds to step S8105.

In step S8105, the format processing unit 7907 creates a BD-ROM disc image 7920 from the BD-ROM scenario data 7917, group of program files BDP, multiplexed stream data MDS, and clip information file CLI. Thereafter, processing proceeds to step S8106.

In step S8106, the BD-ROM disc image 7920 is converted into data for BD-ROM pressing. Furthermore, this data is recorded on a master BD-ROM disc. Thereafter, processing proceeds to step S8107.

In step S8107, BD-ROM discs 101 are mass produced by pressing the master obtained in step S8106. Processing thus concludes.

<<Embodiment 4>>

Figure 82:
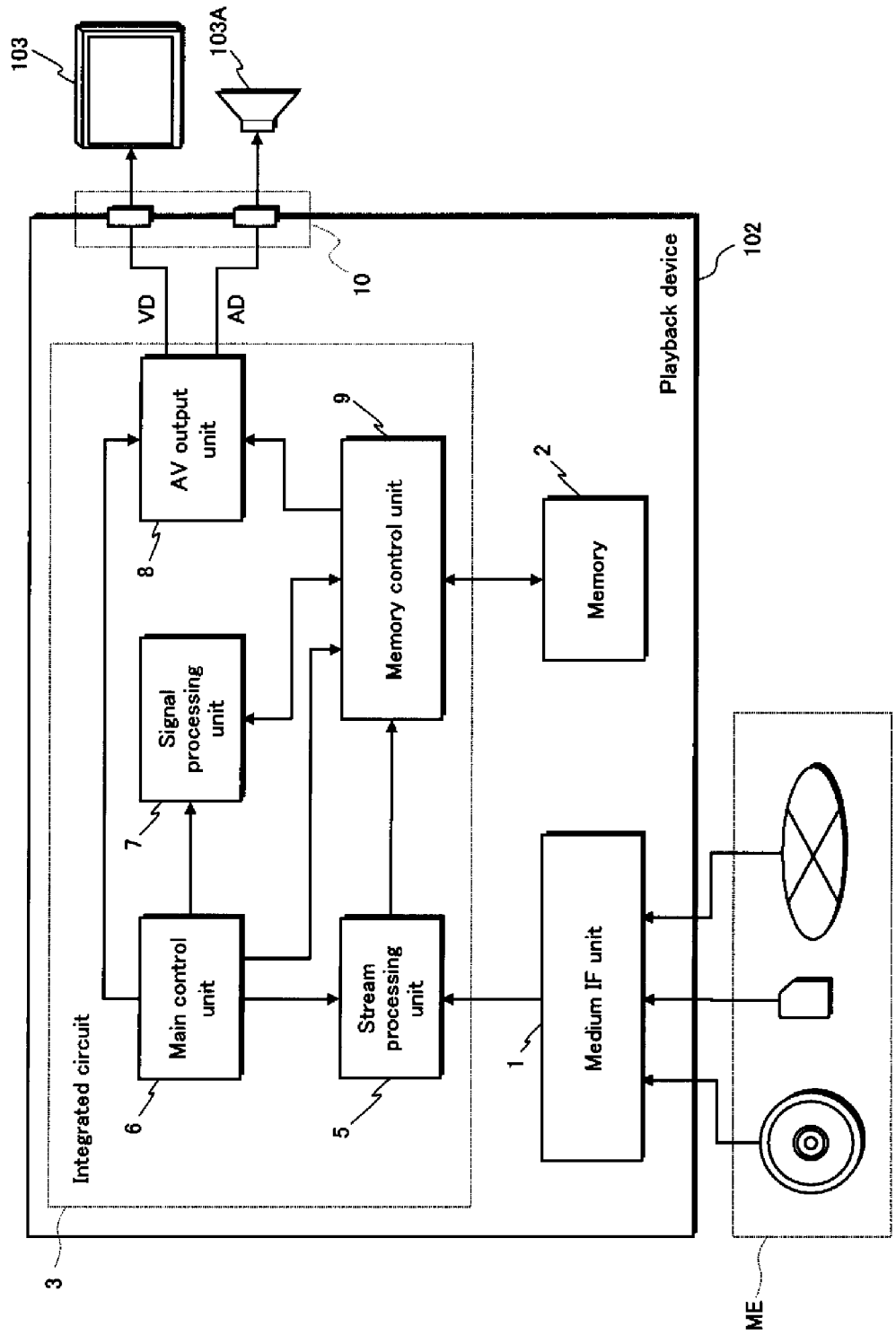
FIG. 82 is a functional block diagram of an integrated circuit 3 according to Embodiment 4 of the present invention.

FIG. 82 is a functional block diagram of an integrated circuit 3 according to Embodiment 4 of the present invention. As shown in FIG. 82, the integrated circuit 3 is mounted on the playback device 102 according to Embodiments 1 or 2. In this case, the playback device 102 includes a medium interface (IF) unit 1, memory 2, and output terminal 10 in addition to the integrated circuit 3.

The medium IF unit 1 receives or reads data from an external medium ME and transmits the data to the integrated circuit 3. The structure of this data is the same as the structure of data on the BD-ROM disc 101 according to Embodiments 1 or 2. The medium IF unit 1 includes a variety of functional units in accordance with the type of medium ME. For example, if the medium ME is a disc recording medium such as an optical disc, hard disk, etc., the medium IF unit 1 includes a disc drive. IF the medium ME is a semiconductor memory such as an SD card, USB memory, etc., the medium IF unit 1 includes a card IF. If the medium ME is a broadcast wave such as CATV, the medium IF unit 1 includes a CAN tuner or Si tuner. If the medium ME is a network such as the Ethernet™, a wireless LAN, wireless public network, etc., the medium IF unit 1 includes a network IF.

The memory 2 temporarily stores both the data that is received or read by the medium IF unit 1 and data that is being processed by the integrated circuit 3. A Synchronous Dynamic Random Access Memory (SDRAM), Double-Data-Rate x Synchronous Dynamic Random Access Memory (DDRx SDRAM; x=1, 2, 3, ... ), etc. is used as the memory 2. The memory 2 is a single a memory element. Alternatively, the memory 2 may include a plurality of memory elements.

The integrated circuit 3 is a system LSI and performs video and audio processing on the data transmitted from the medium IF unit 1. As shown in FIG. 82, the integrated circuit 3 includes a main control unit 6, stream processing unit 5, signal processing unit 7, memory control unit 9, and AV output unit 8.

The main control unit 6 includes a processor core and a program memory. The processor core has a timer function and an interrupt function. The program memory stores fundamental software such as the OS. The processor core controls the entire integrated circuit 3 in accordance with programs stored in, for example, the program memory.

Under the control of the main control unit 6, the stream processing unit 5 receives data from the medium ME transmitted via the medium IF unit 1. The stream processing unit 5 stores the received data in the memory 2 via a data bus in the integrated circuit 3. Additionally, the stream processing unit 5 separates the received data into visual data and audio data. As described above, the data received from the medium ME includes data structured according to Embodiments 1 or 2. In this case, "visual data" includes a primary video stream, secondary video stream, PG stream, and IG stream. "Audio data" includes a primary audio stream and secondary audio stream. In the data structured according to Embodiments 1 or 2, main-view data and sub-view data are each divided into a plurality of extents which are placed in an interleaved arrangement to form a sequence of extent blocks. When receiving an extent block, the stream processing unit 5 is controlled by the main control unit 6 to extract main-view data and sub-view data from the extent block and store the main-view data and sub-view data respectively in a first region and a second region in the memory 2. The main-view data includes a left-view video stream, and the sub-view data includes a right-view video stream, or vice-versa. Also, the combination of a main view and a sub view may be a combination of a 2D video image and a depth map. The first and second regions in the memory 2 are logical divisions of the area in a single memory element. Alternatively, each region may be included in a physically separate memory element.

The visual data and audio data separated by the stream processing unit 5 are compressed by encoding. The type of encoding methods for the visual data include MPEG-2, MPEG-4 AVC, MPEG4-MVC, SMPTE VC-1, etc. The type of encoding methods for the audio data include Dolby AC-3, Dolby Digital Plus, MLP, DTS, DTS-HD, linear PCM, etc. Under the control of the main control unit 6, the signal processing unit 7 decodes the visual data and audio data with a method appropriate for the respective encoding method. The signal processing unit 7 corresponds, for example, to the decoders shown in FIG. 52.

The memory control unit 9 arbitrates access to the memory 2 by the function blocks 5-8 in the integrated circuit 3.

Under the control of the main control unit 6, the AV output unit 8 processes the visual data and audio data decoded by the signal processing unit 7 into respective appropriate formats and outputs the visual data and audio data to the display device 103 and the internal speaker of the display device 103 respectively via separate output terminals 10. Types of processing include superimposition of visual data, format conversion for each piece of data, mixing of audio data, etc.

Figure 83:
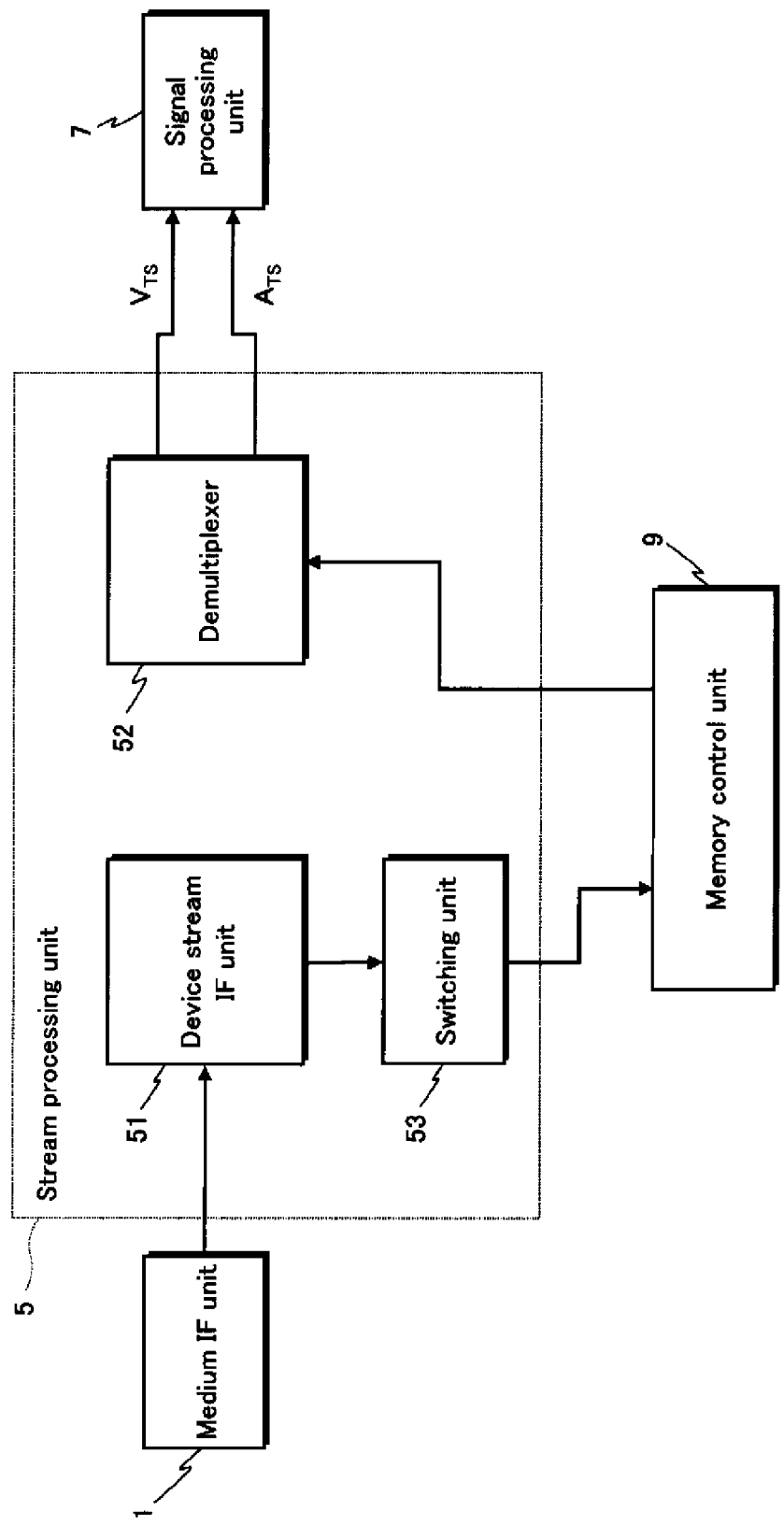
FIG. 83 is a functional block diagram showing a representative structure of the stream processing unit 5 shown in FIG. 82.

FIG. 83 is a functional block diagram showing a representative structure of the stream processing unit 5. As shown in FIG. 83, the stream processing unit 5 is provided with a device stream IF unit 51, a demultiplexer 52, and a switching unit 53.

The device stream IF unit 51 is an interface that transfers data between the medium IF unit 1 and other function blocks 6-9 in the integrated circuit 3. For example, if the medium ME is an optical disc or a hard disk, the device stream IF unit 51 includes a Serial Advanced Technology Attachment (SATA), Advanced Technology Attachment Packet Interface (ATAPI), or Parallel Advanced Technology Attachment (PATA). If the medium ME is a semiconductor memory such as an SD card, USB memory, etc., the device stream IF unit 51 includes a card IF. If the medium ME is a broadcast wave such as CATV, the device stream IF unit 51 includes a tuner IF. If the medium ME is a network such as the Ethernet™, a wireless LAN, wireless public network, etc., the device stream IF unit 51 includes a network IF. Depending on the type of medium ME, the device stream IF unit 51 may perform part of the functions of the medium IF unit 1. Conversely, if the medium IF unit 1 is internal to the integrated circuit 3, the device stream IF unit 51 may be omitted.

The demultiplexer 52 receives, from the memory control unit 9, data transmitted from the medium ME to the memory 2 and separates the data into visual data and audio data. Each extent included in the data structured according to Embodiments 1 or 2 is composed of source packets of a video stream, audio stream, PG stream, IG stream, etc., as shown in FIG. 4. In some cases, however, sub-view data may not include an audio stream. The demultiplexer 52 reads a PID from a source packet and, in accordance with the PID, separates a source packet group into visual TS packets $Y_{TS}$ and audio TS packets $A_{TS}$. The separated TS packets $Y_{TS}$ and $A_{TS}$ are transmitted to the signal processing unit 7 either directly or after temporary storage in the memory 2. The demultiplexer 52 corresponds, for example, to the source depacketizers 5211 and 5212 and to the PID filters 5213 and 5214 shown in FIG. 52.

In response to the type of data received by the device stream IF unit 51, the switching unit 53 switches the output destination of the data. For example, if the device stream IF unit 51 receives main-view data, the switching unit 53 switches the storage location of the data to the first region in the memory 2. On the other hand, if the device stream IF unit 51 receives sub-view data, the switching unit 53 switches the storage location of the data to the second region in the memory 2.

Figure 84:
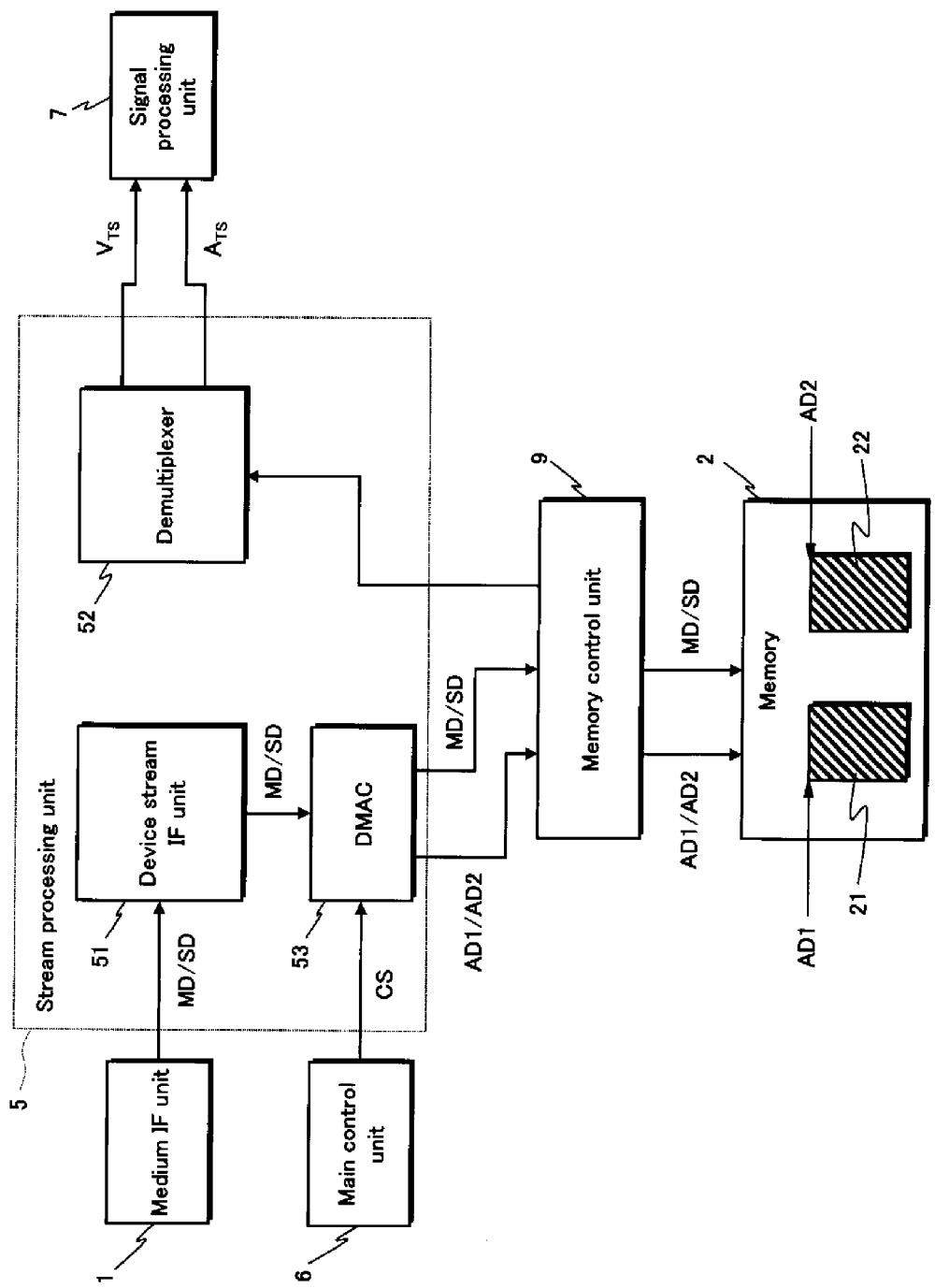
FIG. 84 is a schematic diagram showing the surrounding structure when the switching unit 53 shown in FIG. 83 is a DMAC.

The switching unit 53 is, for example, a Direct Memory Access Controller (DMAC). FIG. 84 is a schematic diagram showing the surrounding structure of the switching unit 53 in this case. Under the control of the main control unit 6, the DMAC 53 transmits the data received by the device stream IF unit 51 and the address of the storage location of the data to the memory control unit 9. Specifically, when the device stream IF unit 51 receives main-view data MD, the DMAC 53 transmits the main-view data MD as well as address 1 AD1. "Address 1" AD1 is data indicating the top address AD1 in the first storage area 21 of the memory 2. On the other hand, when the device stream IF unit 51 receives sub-view data SD, the DMAC 53 transmits the sub-view data SD as well as address 2 AD2. "Address 2" AD2 is data indicating the top address AD2 in the second storage area 22 of the memory 2. In response to the type of data received by the device stream IF unit 51, the DMAC 53 thus switches the output destination of the data, in particular switching the storage destination in the memory 2. The memory control unit 9 stores the main-view data MD and sub-view data SD received from the DMAC 53 respectively in the regions 21 and 22 in the memory 2 as indicated by the simultaneously received addresses AD1 and AD2.

The main control unit 6 uses the extent start points in the clip information file to control switching of the storage location by the switching unit 53. This clip information file is received before both the main-view data MD and the sub-view data SD and is stored in the memory 2. In particular, the main control unit 6 uses the file base to identify data received by the device stream IF unit 51 as the main-view data MD. On the other hand, the main control unit 6 uses the file DEP to identify data received by the device stream IF unit 51 as the sub-view data SD. The main control unit 6 additionally sends a control signal CS to the switching unit 53 in response to the results of identification and causes the switching unit 53 to switch the storage location of data. Note that the switching unit 53 may be controlled by a dedicated control circuit separate from the main control unit 6.

In addition to the function blocks 51, 52, and 53 shown in FIG. 83, the stream processing unit 5 may be provided with an encryption engine, secure management unit, and direct memory access controller. The encryption engine decrypts encrypted data, key data, etc. received by the device stream IF unit 51. The secure management unit stores a private key and uses the private key for execution control, such as a device authentication protocol between the medium ME and the playback device 102.

In the above example, when data received from the medium ME is stored in the memory 2, the storage location of the data switches depending on whether the data is main-view data MD or sub-view data SD. Alternatively, regardless of the type of the data received from the medium ME, the data may be temporarily stored in the same region of the memory 2 and subsequently divided into main-view data MD and sub-view data SD when transmitted from the memory 2 to the demultiplexer 52.

Figure 85:
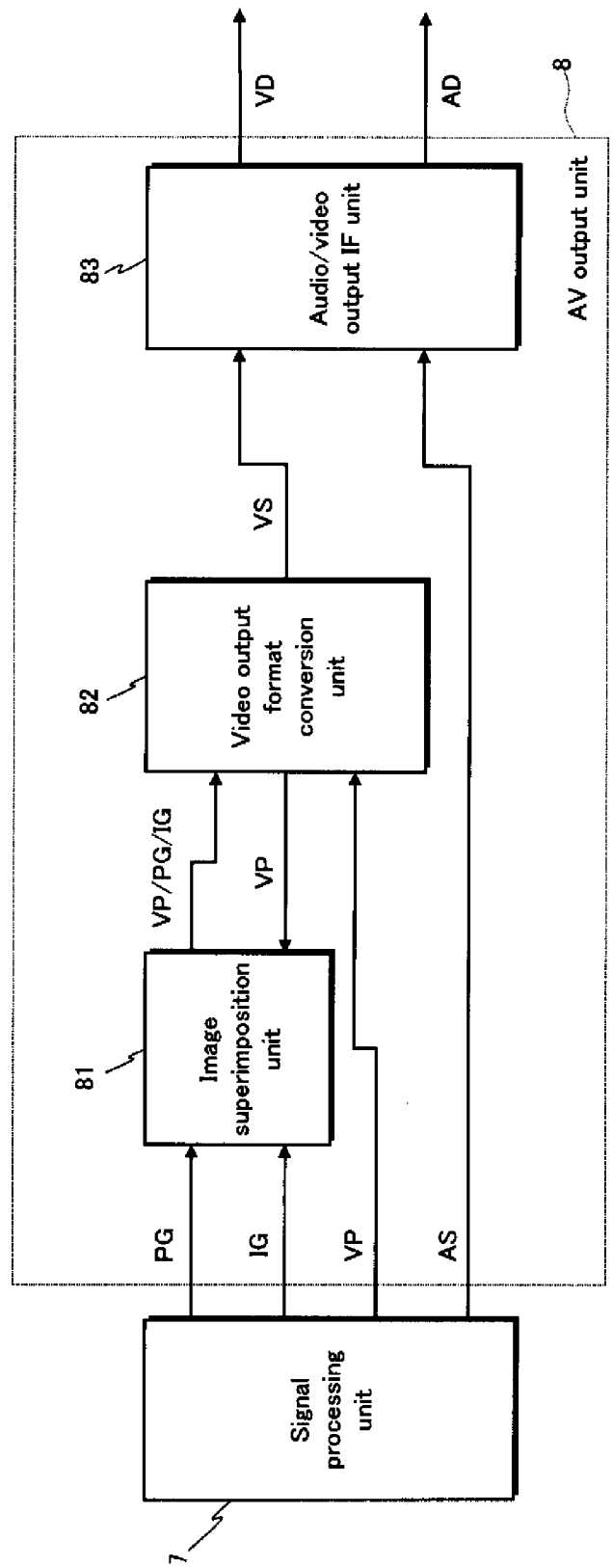
FIG. 85 is a functional block diagram showing a representative structure of the AV output unit 8 shown in FIG. 82.

FIG. 85 is a functional block diagram showing a representative structure of the AV output unit 8. As shown in FIG. 85, the AV output unit 8 is provided with an image superimposition unit 81, video output format conversion unit 82, and audio/video output IF unit 83.

The image superimposition unit 81 superimposes visual data VP, PG, and IG, decoded by the signal processing unit 7, on each other. Specifically, the image superimposition unit 81 first receives processed left-view or right-view video plane data VP from the video output format conversion unit 82 and receives decoded PG plane data PG and IG plane data IG from the signal processing unit 7. Next, the image superimposition unit 81 superimposes the PG plane data PG and the IG plane data IG on the video plane data VP picture by picture. The image superimposition unit 81 corresponds, for example, to the plane adder 5024 shown in FIG. 50.

The video output format conversion unit 82 receives decoded video plane data VP from the signal processing unit 7 and receives superimposed visual data VP/PG/IG from the image superimposition unit 81. Furthermore, the video output format conversion unit 82 performs a variety of processing on the visual data VP and VP/PG/IG as necessary. Types of processing include resizing, IP conversion, noise reduction, and frame rate conversion. Resizing is processing to enlarge or reduce the size of a video image. IP conversion is processing to convert a scanning method between progressive and interlaced. Noise reduction is processing to remove noise from a video image. Frame rate conversion is processing to convert the frame rate. The video output format conversion unit 82 outputs the processed video plane data VP to the image superimposition unit 81 and outputs the processed visual data VS to the audio/video output IF unit 83.

The audio/video output IF unit 83 receives the visual data VS from the video output format conversion unit 82 and receives decoded audio data AS from the signal processing unit 7. Furthermore, the audio/video output IF unit 83 performs processing such as encoding on the received data VS and AS in accordance with the data transmission format. As described below, part of the audio/video output IF unit 83 may be provided externally to the integrated circuit 3.

Figure 86:
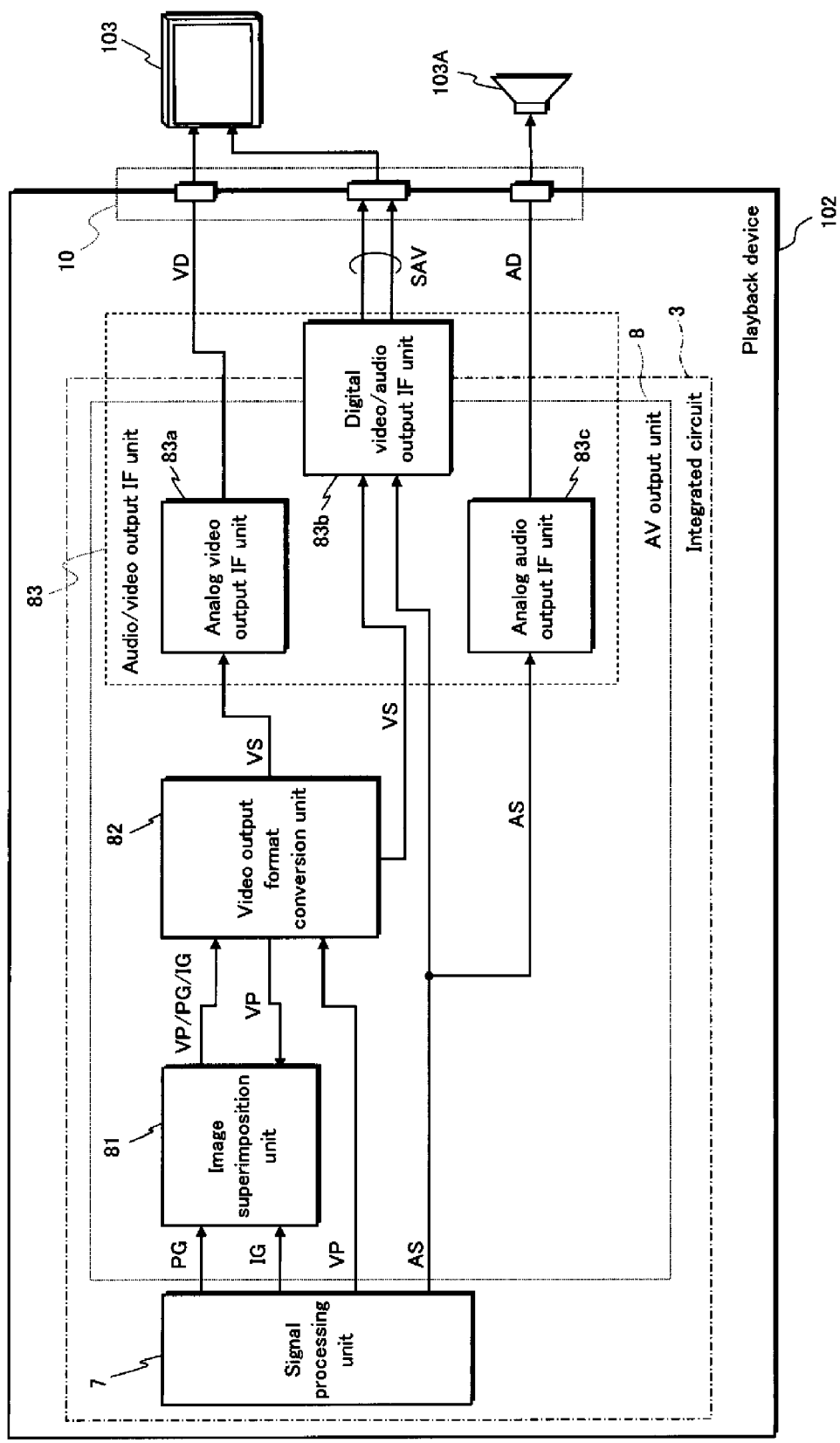
FIG. 86 is a schematic diagram showing details on sections related to data output in a playback device 102 that includes the AV output unit 8 shown in FIG. 85.

FIG. 86 is a schematic diagram showing details on sections related to data output in the playback device 102 that includes the AV output unit 8. As shown in FIG. 86, the audio/video output IF unit 83 includes an analog video output IF unit 83a, digital audio/video output IF unit 83b, and analog audio output IF unit 83c. As described below, the integrated circuit 3 and playback device 102 thus support a variety of data transmission formats for visual data and audio data.

The analog video output IF unit 83a receives visual data VS from the video output format conversion unit 82, converts/codes the data VS to data VD in analog video signal format, and outputs the data. The analog video output IF unit 83a includes a composite video encoder, S video signal (Y/C separation) encoder, component video signal encoder, D/A converter (DAC), etc. that is compatible with a format such as NTSC, PAL, or SECAM.

The digital audio/video output IF unit 83b receives the audio data AS from the signal processing unit 7 and receives the visual data VS from the video output format conversion unit 82. Furthermore, the digital audio/video output IF unit 83b integrates and encrypts the data AS and VS. Subsequently, the digital audio/video output IF unit 83b encodes the encrypted data SAV in accordance with data transmission standards and outputs the data SAV. The digital audio/video output IF unit 83b corresponds, for example, to the HDMI transmission unit 5025 shown in FIG. 50.

The analog audio output IF unit 83c receives decoded audio data AS from the signal processing unit 7, converts the data into analog audio data AD via D/A conversion, and outputs the data. The analog audio output IF unit 83c corresponds, for example, to the audio DAC.

The transmission format of the visual data and audio data can be switched to match the type of data transmission device/data input terminal provided in the display device 103/speaker 103A, and can also be switched by user selection. Furthermore, the playback device 102 can receive data for the same content not only in one transmission format, but in a plurality of transmission formats in parallel.

In addition to the function blocks 81, 82, and 83 shown in FIGS. 85 and 86, the AV output unit 8 may be provided with a graphics engine. The graphics engine performs graphics processing such as filtering, screen combination, curve rendering, and 3D presentation on the data decoded by the signal processing unit 7.

The function blocks shown in FIGS. 82, 83, 85, and 86 are incorporated in the integrated circuit 3. Such incorporation is not required, however, and part of the function blocks may be externally attached to the integrated circuit 3. Unlike the structure shown in FIG. 82, the memory 2 may be incorporated in the integrated circuit 3. Furthermore, the main control unit 6 and the signal processing unit 7 need not be completely separate function blocks. For example, the main control unit 6 may perform part of the processing of the signal processing unit 7.

Figure 87A:
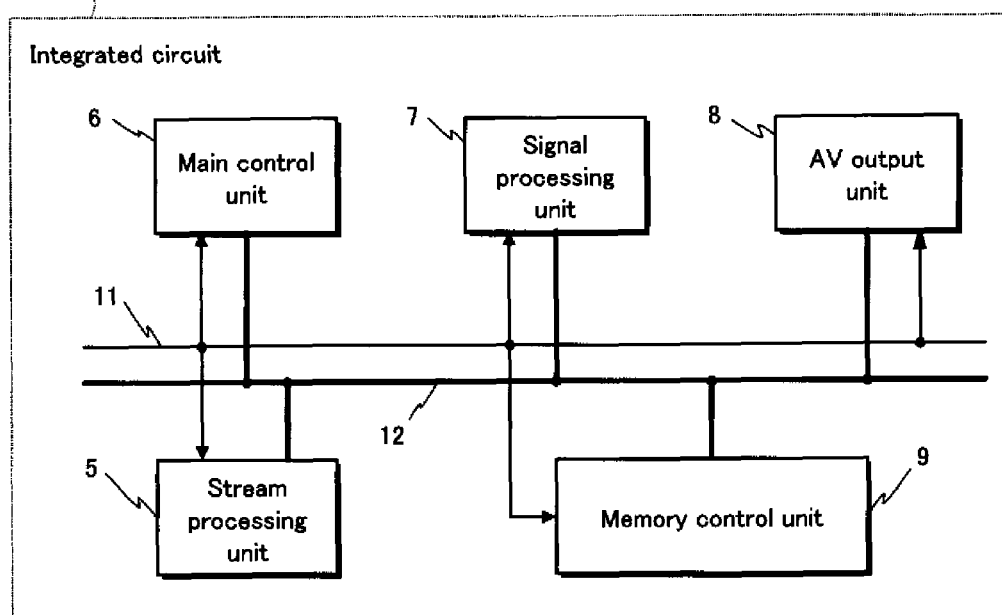
FIGS. 87A and 87B are schematic diagrams showing examples of topology of a control bus and data bus in the integrated circuit 3 shown in FIG. 82.
Figure 87B:
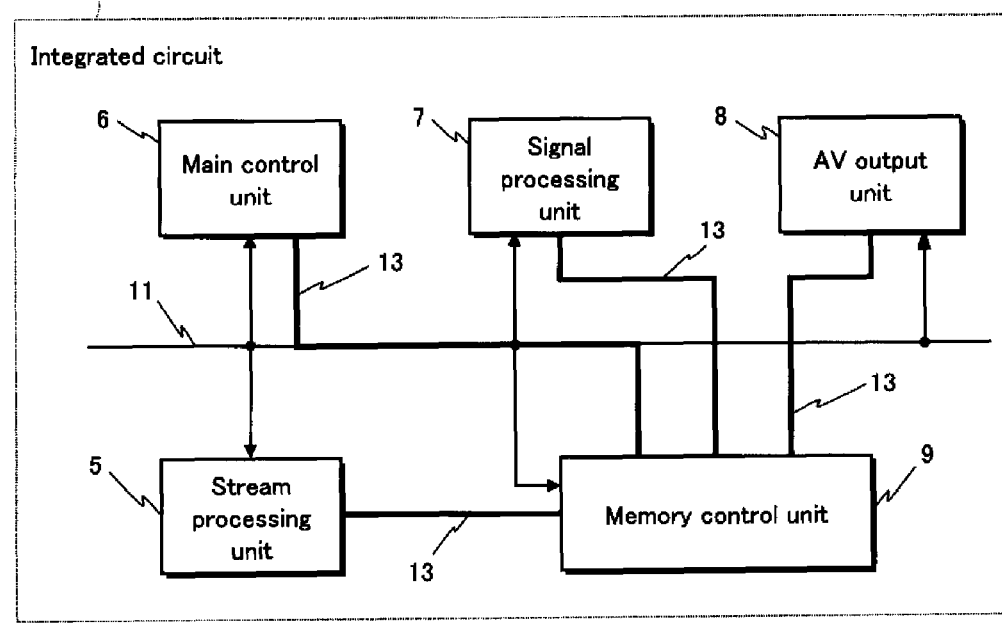

The topology of the control bus and data bus that connect the function blocks in the integrated circuit 3 may be selected in accordance with the order and the nature of the processing by each function block. FIGS. 87A and 87B are schematic diagrams showing examples of topology of the control bus and data bus in the integrated circuit 3. As shown in FIG. 87A, the control bus 11 and the data bus 12 are arranged so that each of the function blocks 5-9 is directly connected to all of the other function blocks. Alternatively, as shown in FIG. 87B, the data bus 13 may directly connect each of the function blocks 5-8 only to the control unit 9. In this case, each of the function blocks 5-8 transmits data to other function blocks via the control unit 9 and furthermore via the memory 2.

The integrated circuit 3 may be a multi-chip module instead of an LSI integrated on a single chip. In this case, the plurality of chips forming the integrated circuit 3 are sealed in a single package, so that the integrated circuit 3 looks like a single LSI. Alternatively, the integrated circuit 3 may formed with a Field Programmable Gate Array (FPGA) or a reconfigurable processor. An FPGA is an LSI that can be programmed after manufacturing. A reconfigurable processor is an LSI whose connections between internal circuit cells and settings for each circuit cell can be reconfigured.

<Mounting the Integrated Circuit 3 on a Display Device>

Figure 88:
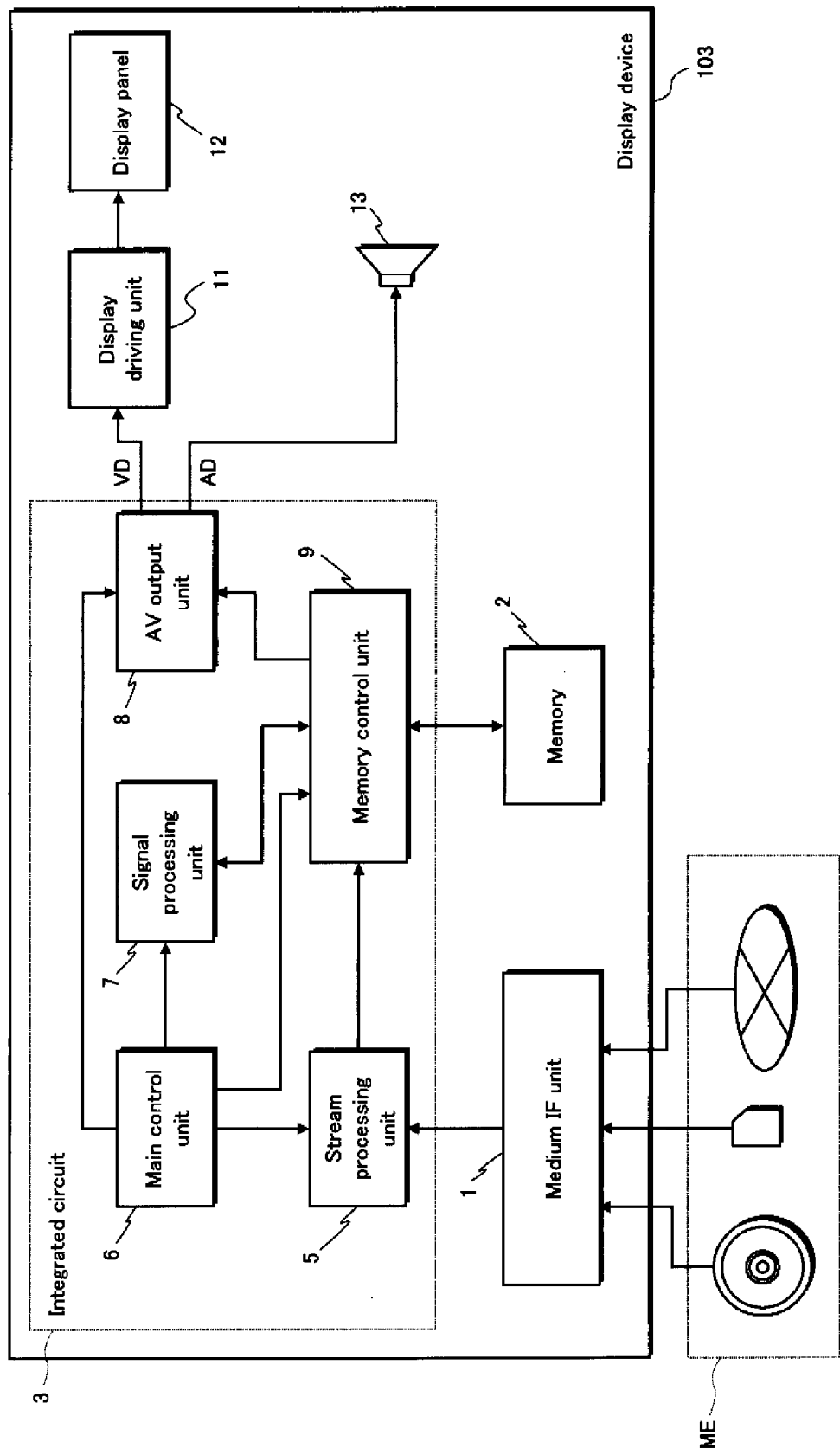
FIG. 88 is a functional block diagram showing the structure of the integrated circuit 3 and surrounding components in Embodiment 4 of the present invention when mounted on a display device 103.

An integrated circuit similar to the integrated circuit 3 may be mounted on a display device to cause the display device to perform processing performed by the playback device according to Embodiment 4. FIG. 88 is a functional block diagram showing the structure of the integrated circuit 3 and surrounding components when mounted on a display device 103. The structure shown in FIG. 88 differs from the structure shown in FIG. 82 in that the output terminals 10 are replaced by a display driving unit 11, display panel 12, and speaker 13. Other structural elements are similar to as those shown in FIG. 82. Accordingly, details of the similar structural elements can be found in the above description. As shown in FIG. 88, the integrated circuit 3 uses the medium IF unit 1 and memory 2 to perform processing similar to the above signal processing on the data received by the medium IF unit 1. Visual data processed by the integrated circuit 3 is output to the display driving unit 11. The display driving unit 11 controls the display panel 12 in accordance with the visual data. As a result, the visual data is output on the screen of the display panel 12 as video images. The display panel 12 is a liquid crystal display panel. Alternatively, the display panel 12 may be in another format, such as a plasma display panel, an organic EL display panel, etc. Audio data processed by the integrated circuit 3 is output via the speaker 13 as sound. Note that instead of the speaker 13, a speaker externally attached to the display device 103 may be used via an output terminal similar to the output terminal 10 shown in FIG. 82.

Figure 89:
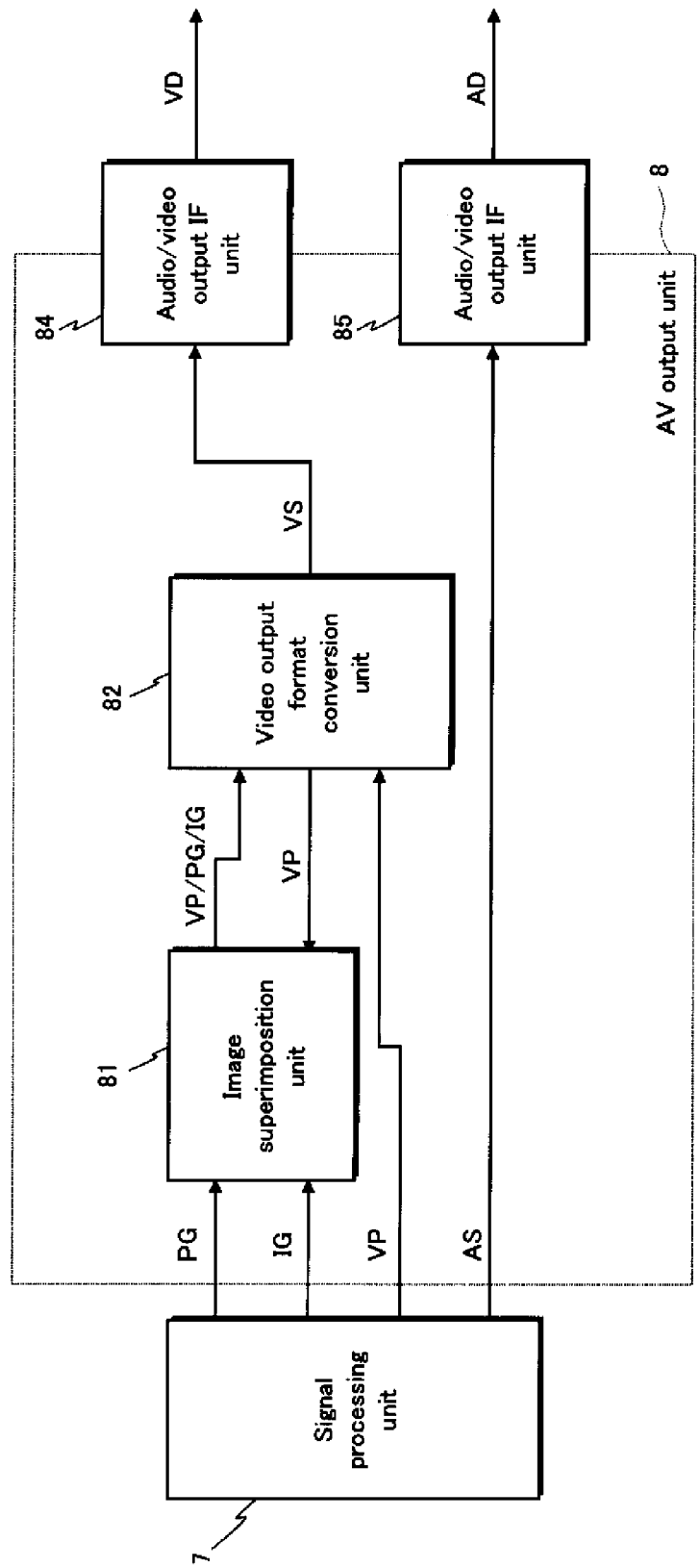
FIG. 89 is a detailed functional block diagram of the AV output unit 8 shown in FIG. 88.

FIG. 89 is a detailed functional block diagram of the AV output unit 8 shown in FIG. 88. Unlike the counterpart shown in FIG. 85, the AV output unit 8 is provided with a video output IF unit 84 and an audio output IF unit 85 instead of the audio/video output IF unit 83. The video output IF unit 84 and the audio output IF unit 85 may be provided either internally or externally with respect to the integrated circuit 3. The video output IF unit 84 transmits visual data from the video output format conversion unit 82 to the display driving unit 11. The audio output IF unit 85 transmits audio data from the signal processing unit 7 to the speaker 12. Note that a plurality of each of the video output IF unit 84 and the audio output IF unit 85 may be provided. Also, the video output IF unit 84 and the audio output IF unit 85 may be integrated.

<Playback Processing by the Playback Device 102 Using the Integrated Circuit 3>

Figure 90:
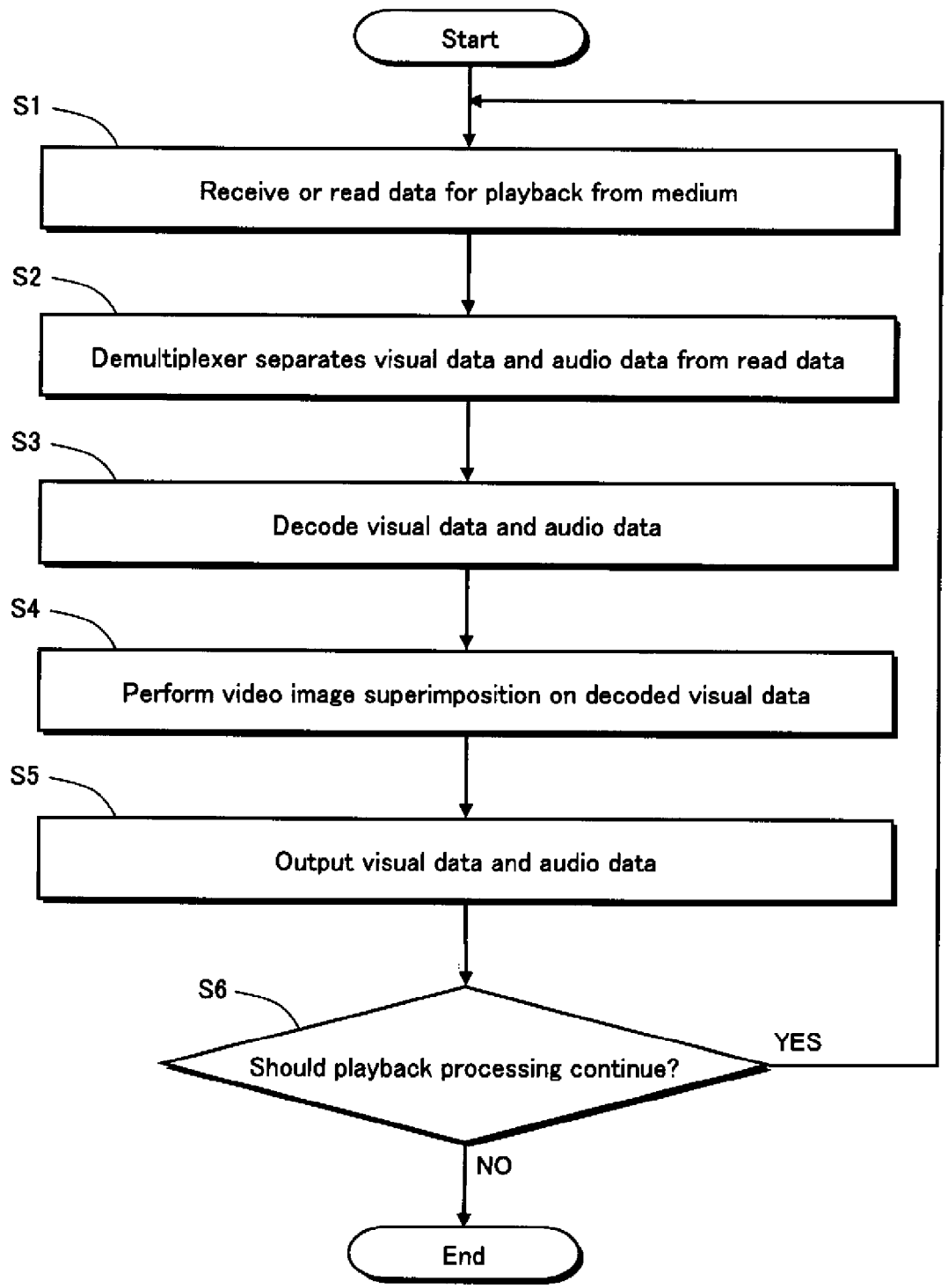
FIG. 90 is a flowchart of playback processing by a playback device 102 that uses the integrated circuit 3 shown in FIG. 82.

FIG. 90 is a flowchart of playback processing by the playback device 102 that uses the integrated circuit 3. The playback processing begins when the medium IF unit 1 is connected to the medium ME so as to permit data reception, such as when an optical disc is inserted in the disc drive. During the playback processing, the playback device 102 receives data from the medium ME and decodes the data. Subsequently, the playback device 102 outputs the decoded data as a video signal and an audio signal.

In step S1, the medium IF unit 1 receives or reads data from the medium ME and transmits the data to the stream processing unit 5. Thereafter, processing proceeds to step S2.

In step S2, the stream processing unit 5 separates the data received or read in step S1 into visual data and audio data. Thereafter, processing proceeds to step S3.

In step S3, the signal processing unit 7 decodes each type of data separated by the stream processing unit 5 in step S2 with a method appropriate for the respective encoding method. Thereafter, processing proceeds to step S4.

In step S4, the AV output unit 8 superimposes the visual data decoded by the signal processing unit 7 in step S3. Thereafter, processing proceeds to step S5.

In step S5, the AV output unit 8 outputs the visual data and audio data processed in steps S2-4. Thereafter, processing proceeds to step S6.

In step S6, the main control unit 6 determines whether playback processing is to continue. When, for example, data that is to be newly received or read from the medium ME by the medium IF unit 1 remains, processing is repeated from step S1. On the other hand, processing terminates when receiving or reading of data from the medium ME by the medium IF unit 1 has been terminated, such as when the optical disc has been removed from the disc drive, when the user has instructed to stop playback, etc.

Figure 91:
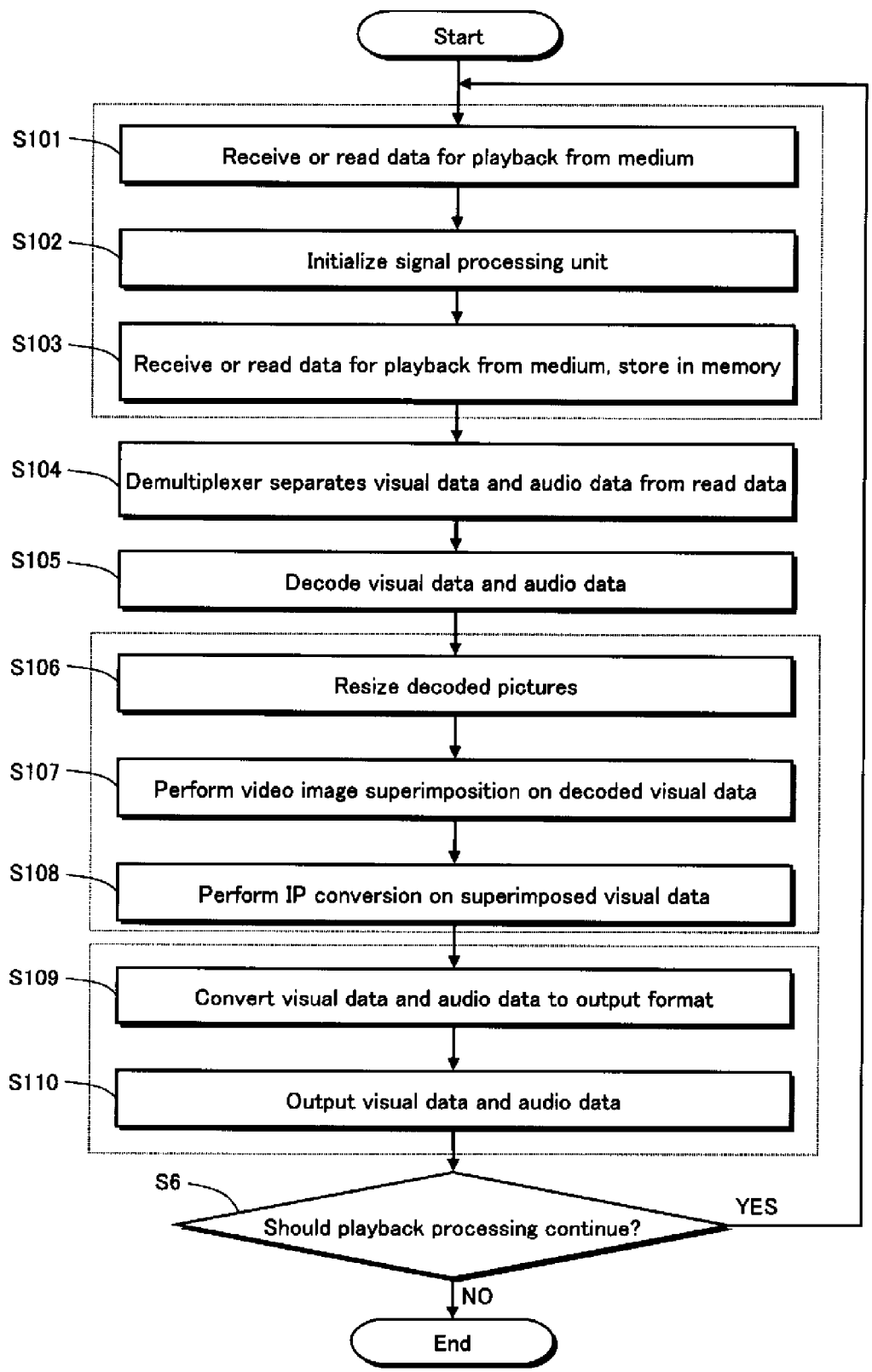
FIG. 91 is a flowchart showing details on steps S1-6 shown in FIG. 90.

FIG. 91 is a flowchart showing details on steps S1-6 shown in FIG. 90. Each of the steps S101-110 shown in FIG. 91 is performed under the control of the main control unit 6. Step S101 mainly corresponds to details on step S1, steps S102-104 mainly correspond to details on step S2, step S105 mainly corresponds to details on step S3, steps S106-108 mainly correspond to details on step S4, and steps S109 and S110 mainly correspond to details on step S5.

In step S101, before receiving data to be played back, the device stream IF unit 51 receives or reads, from the medium ME via the medium IF unit 1, other data necessary in order to play back the data, such as a playlist file and clip information file. Furthermore, the device stream IF unit 51 stores the data to be played back in the memory 2 via the memory control unit 9. Thereafter, processing proceeds to step S102.

In step S102, the main control unit 6 uses the stream attribute information included in the clip information file to identify the respective coding formats of the video data and audio data stored in the medium ME. Furthermore, the control unit 6 initializes the signal processing unit 7 so that decoding corresponding to the identified coding method can be performed. Thereafter, processing proceeds to step S103.

In step S103, the device stream IF unit 51 receives or reads, from the medium ME via the medium IF unit 1, video data and audio data to be played back. In particular, this data is received or read in units of extents. Furthermore, the device stream IF unit 51 stores the data in the memory 2 via the switching unit 53 and the memory control unit 9. In particular, when main-view data is received or read, the main control unit 6 controls the switching unit 53 to switch the storage location of the data to the first region in the memory 2. On the other hand, when sub-view data is received or read, the main control unit 6 controls the switching unit 53 to switch the storage location of the data to the second region in the memory 2. Thereafter, processing proceeds to step S104.

In step S104, the data stored in the memory 2 is transmitted to the demultiplexer 52 in the stream processing unit 5. The demultiplexer 52 first reads a PID from each source packet composing the data. Next, in accordance with the PID, the demultiplexer 52 identifies whether TS packets included in the source packet are visual data or audio data. The demultiplexer 52 then transmits the TS packets to the corresponding decoder in the signal processing unit 7 in accordance with the results of identification. Thereafter, processing proceeds to step S105.

In step S105, each decoder in the signal processing unit 7 decodes the transmitted TS packets with an appropriate method. Thereafter, processing proceeds to step S106.

In step S106, the pictures in the left-view video stream and the right-view video stream decoded by the signal processing unit 7 are transmitted to the video output format conversion unit 82. The video output format conversion unit 82 resizes the pictures to match the resolution of the display device 103. Thereafter, processing proceeds to step S107.

In step S107, the image superimposition unit 81 receives video plane data composed of pictures resized in step S106 from the video output format conversion unit 82. The image superimposition unit 81 receives decoded PG plane data and IG plane data from the signal processing unit 7. Furthermore, the image superimposition unit 81 superimposes these pieces of plane data. Thereafter, processing proceeds to step S108.

In step S108, the video output format conversion unit 82 receives the plane data superimposed in step S107 from the image superimposition unit 81. Furthermore, the video output format conversion unit 82 performs IP conversion on the plane data. Thereafter, processing proceeds to step S109.

In step S109, the audio/video output IF unit 83 receives the visual data that underwent IP conversion in step S108 from the video output format conversion unit 82 and receives decoded audio data from the signal processing unit 7. Furthermore, the audio/video output IF unit 83 performs coding, D/A conversion, etc. on these pieces of data in accordance with the data output format of the display device 103/speaker 103A or with the data transmission format to the display device 103/speaker 103A. The visual data and audio data are thus converted to analog output format or digital output format. For example, visual data in analog output format includes a composite video signal, S video signal, component video signal, etc. Visual data/audio data in digital output format includes HDMI or the like. Thereafter, processing proceeds to step S110.

In step S110, the audio/video output IF unit 83 outputs the visual data and audio data processed in step S109 to the display device 103/speaker 103A. Thereafter, processing proceeds to step S6. Details on step S6 can be found in the above description.

In each of the above steps, each time data is processed, the results may be temporarily stored in the memory 2. Resizing and IP conversion by the video output format conversion unit 82 in steps S106 and S108 may be omitted as necessary. Furthermore, in addition to these processes, or instead of these processes, other processing such as noise reduction or frame rate conversion may be performed. Insofar as possible, the order of processing may be changed.

Even when playback processing is performed by the display device 103 shown in FIG. 88, the flowchart for playback processing is essentially similar to the flowcharts shown in FIGS. 90 and 91. The function blocks shown in FIGS. 88 and 89 operate similarly to the function blocks shown in FIGS. 82 and 85.

<<Supplementary Explanation>>
<Principle of 3D Video Image Playback>

Playback methods of 3D video images are roughly classified into two categories: methods using a holographic technique, and methods using parallax video.

A method using a holographic technique is characterized by allowing the viewer to perceive objects in video as stereoscopic by giving the viewer's visual perception substantially the same information as optical information provided to visual perception by human beings of actual objects. A technical theory for utilizing these methods for moving video display has been established. However, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of the viewer's eyes for the same scene, i.e. the pair of a left view and a right view. A method using parallax video is characterized by playing back the left view and right view of a single scene so that the viewer sees each view in only one eye, thereby allowing the user to perceive the scene as stereoscopic.

Figure 92B:
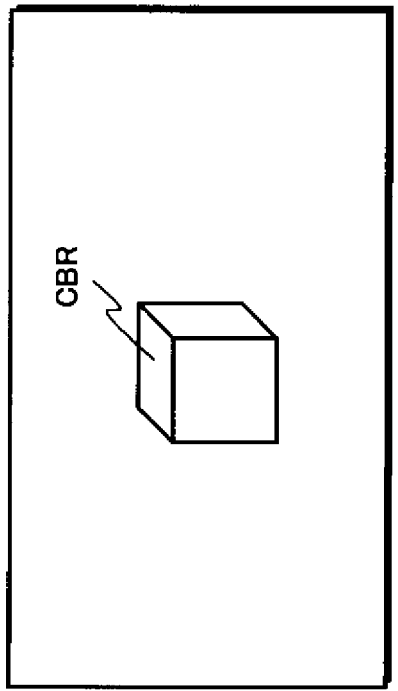
FIGS. 92A, 92B, and 92C are schematic diagrams illustrating the principle behind playback of 3D video images (stereoscopic video images) in a method using parallax video images.
Figure 92C:
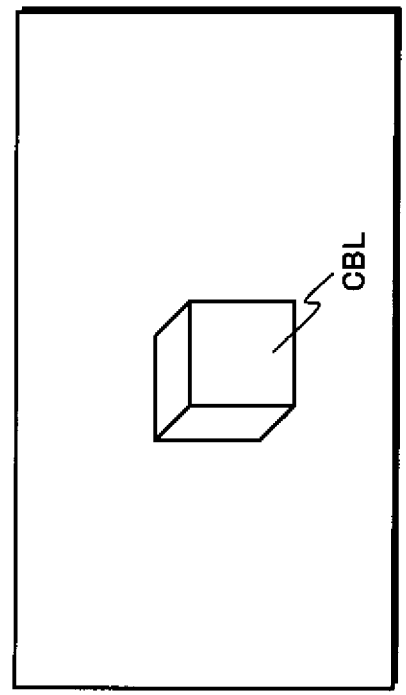
Figure 92A:
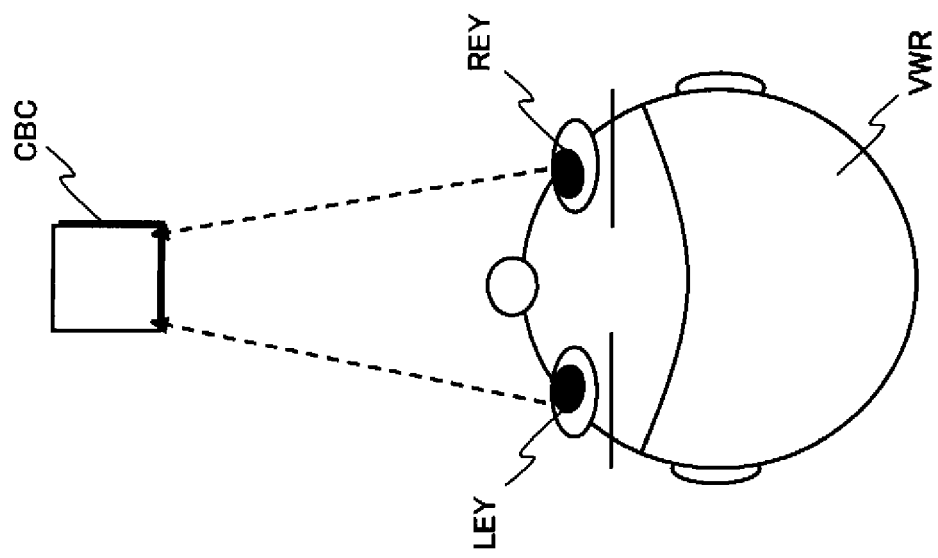

FIGS. 92A, 92B, and 92C are schematic diagrams illustrating the principle behind playback of 3D video images (stereoscopic video images) in a method using parallax video images. FIG. 92A is a top view of the viewer VWR looking at a cube CBC placed directly in front of the viewer's face. FIGS. 92B and 92C are schematic diagrams showing the outer appearance of the cube CBC as a 2D video image as perceived respectively by the left eye LEY and the right eye REY of the viewer VWR. As is clear from comparing FIG. 92B and FIG. 92C, the outer appearances of the cube CBC as perceived by the eyes are slightly different. The difference in the outer appearances, i.e., the binocular parallax allows the viewer VWR to recognize the cube CBC as three-dimensional. Thus, according to a method using parallax video, left and right 2D video images with different viewpoints are first prepared for a single scene. For example, for the cube CBC shown in FIG. 92A, the left view of the cube CBC shown in FIG. 92B, and the right view shown in FIG. 92C are prepared. In this context, the position of each viewpoint is determined by the binocular parallax of the viewer VWR. Next, each 2D video image is played back so as to be perceived only by the corresponding eye of the viewer VWR. Consequently, the viewer VWR recognizes the scene played back on the screen, i.e., the video image of the cube CBC, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, two-color separation methods, etc.

In the alternate frame sequencing method, left and right 2D video images are alternately displayed on a screen for a predetermined time, while the viewer watches the screen using shutter glasses. Each lens in the shutter glasses is formed by a liquid crystal panel, for example. The lenses pass or block light in a uniform and alternate manner in synchronization with switching of the 2D video images on the screen. That is, each lens functions as a shutter that periodically blocks an eye of the viewer. More specifically, while a left-video image is displayed on the screen, the shutter glasses make the left-side lens transmit light and the right-hand side lens block light. Conversely, while a right-video image is displayed on the screen, the shutter glasses make the right-side lens transmit light and the left-side lens block light. As a result, the viewer sees afterimages of the right and left-video images overlaid on each other and thus perceives a single 3D video image.

According to the alternate-frame sequencing method, as described above, right and left-video images are alternately displayed in a predetermined cycle. For example, when 24 video frames are displayed per second for playing back normal 2D video images, 48 video frames in total for both right and left eyes need to be displayed for 3D video images. Accordingly, a display device capable of quickly executing rewriting of the screen is preferred for this method.

In a method using a lenticular lens, a right-video frame and a left-video frame are respectively divided into vertically long and narrow rectangular shaped small areas. The small areas of the right-video frame and the small areas of the left-video frame are alternately arranged in a horizontal direction on the screen and displayed at the same time. The surface of the screen is covered by a lenticular lens. The lenticular lens is a sheet-shaped lens constituted from multiple long and thin hog-backed lenses arranged in parallel. Each hog-backed lens lies in the longitudinal direction on the surface of the screen. When the viewer sees the left and right-video frames through the lenticular lens, only the viewer's left eye perceives light from the display areas of the left-video frame, and only the viewer's right eye perceives light from the display areas of the right-video frame. The viewer thus sees a 3D video image from the binocular parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the screen through polarization glasses. In the polarization glasses, a longitudinal polarization filter is provided for the left lens, and a lateral polarization filter is provided for the right lens. Consequently, the right and left-video images are each perceived only by the corresponding eye, thereby allowing the viewer to perceive 3D video images.

In a method using parallax video, in addition to being constructed from the start by a combination of left and right-video images, the 3D video content can also be constructed from a combination of 2D video images and a depth map. The 2D video images represent 3D video images projected on a hypothetical 2D screen, and the depth map represents the depth of each pixel in each portion of the 3D video images as compared to the 2D screen. When the 3D content is constructed from a combination of 2D video images with a depth map, the 3D playback device or display device first constructs left and right-video images from the combination of 2D video images with a depth map and then creates 3D video images from these left and right-video images using one of the above-described methods.

FIG. 93 is a schematic diagram showing an example of constructing a left-view LVW and a right-view RVW from the combination of a 2D video image MVW and a depth map DPH. As shown in FIG. 93, a circular plate DSC is shown in the background BGV of the 2D video image MVW. The depth map DPH indicates the depth for each pixel in each portion of the 2D video image MVW. According to the depth map DPH, in the 2D video image MVW, the display area DA1 of the circular plate DSC is closer to the viewer than the screen, and the display area DA2 of the background BGV is deeper than the screen. The parallax video generation unit PDG in the playback device first calculates the binocular parallax for each portion of the 2D video image MVW using the depth of each portion indicated by the depth map DPH. Next, the parallax video generation unit PDG shifts the presentation position of each portion in the 2D video image MVW to the left or right in accordance with the calculated binocular parallax to construct the left-view LVW and the right-view RVW. In the example shown in FIG. 93, the parallax video generation unit PDG shifts the presentation position of the circular plate DSC in the 2D video image MVW as follows: the presentation position of the circular plate DSL in the left-view LVW is shifted to the right by half of its binocular parallax, S1, and the presentation position of the circular plate DSR in the right-view RVW is shifted to the left by half of its binocular parallax, S1. In this way, the viewer perceives the circular plate DSC as being closer than the screen. Conversely, the parallax video generation unit PDG shifts the presentation position of the background BGV in the 2D video image MVW as follows: the presentation position of the background BGL in the left-view LVW is shifted to the left by half of its binocular parallax, S2, and the presentation position of the background BGR in the right-view RVW is shifted to the right by half of its binocular parallax, S2. In this way, the viewer perceives the background BGV as being deeper than the screen.

A playback system for 3D video images with use of parallax video is in general use, having already been established for use in movie theaters, attractions in amusement parks, and the like. Accordingly, this method is also useful for implementing home theater systems that can play back 3D video images. In the Embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the Embodiments.

<File System on the BD-ROM Disc>

When UDF is used as the file system for the BD-ROM disc 101, the volume area 202B shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and a subordinate file group.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 202B can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are a generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent on the volume area 202B, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0", an extent has been assigned to the sector and has been actually recorded thereat. When the two most significant bits are "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<Decoding Switch Information>

FIG. 94A is a schematic diagram showing a data structure of decoding switch information A050. The decoding switch information A050 is stored in the supplementary data 831D and 832D in each VAU in both the base-view video stream and the dependent-view video stream shown in FIG. 8. However, different supplementary data than the supplementary data 832D, which includes offset metadata, is stored in the decoding switch information A050 in the VAU #1832 located at the top of each GOP in the dependent-view video stream. In particular in MPEG-4 AVC and MVC, supplementary data 831D and 832D correspond to a type of NAL unit, "SEI". The decoding switch information A050 is information to cause the decoder in the playback device 102 to easily specify the next VAU to decode. As described below, the decoder alternately decodes the base-view video stream and the dependent-view video stream in units of VAUs. When doing so, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information A050 in addition to a DTS.

As shown in FIG. 94A, the decoding switch information A050 includes a subsequent access unit type A051, subsequent access unit size A052, and decoding counter A053. The subsequent access unit type A051 indicates whether the next VAU to be decoded belongs to a base-view video stream or a dependent-view video stream. For example, when the value of the subsequent access unit type A051 is "1", the next VAU to be decoded belongs to a base-view video stream, and when the value of the subsequent access unit type A051 is "2", the next VAU to be decoded belongs to a dependent-view video stream. When the value of the subsequent access unit type A051 is "0", the current VAU is located at the end of the stream targeted for decoding, and the next VAU to be decoded does not exist. The subsequent access unit size A052 indicates the size of the next VAU that is to be decoded. By referring to the subsequent access unit size A052, the decoder in the playback device 102 can specify the size of a VAU without analyzing its actual structure. Accordingly, the decoder can easily extract VAUs from the buffer. The decoding counter A053 shows the decoding order of the VAU to which it belongs. The order is counted from a VAU that includes an I picture in the base-view video stream.

FIG. 94B is a schematic diagram showing sequences of decoding counters A010 and A020 allocated to each picture in a base-view video stream A001 and a dependent-view video stream A002. As shown in FIG. 94B, the decoding counters A010 and A020 are incremented alternately between the two video streams A001 and A002. For example, for VAU A011 that includes an I picture in the base-view video stream A001, a value of "1" is assigned to the decoding counter A010. Next, a value of "2" is assigned to the decoding counter A020 for the VAU A021 that includes the P picture to be decoded next in the dependent-view video stream A002. Furthermore, a value of "3" is assigned to the decoding counter A010 for the VAU A012 that includes the P picture to be decoded next in the base-view video stream A001. By assigning values in this way, even when the decoder in the playback device 102 fails to read one of the VAUs due to some error, the decoder can immediately specify the missing picture using the decoding counters A010 and A020. Accordingly, the decoder can perform error processing appropriately and promptly.

In the example shown in FIG. 94B, an error occurs during the reading of the third VAU A013 in the base-view video stream A001, and the Br picture is missing. During decoding processing of the P picture contained in the second VAU A022 in the dependent-view video stream A002, however, the decoder has read the decoding counter A020 for this VAU A022 and retained the value. Accordingly, the decoder can predict the decoding counter A010 for the next VAU to be processed. Specifically, the decoding counter A020 in the VAU A022 that includes the P picture is "4". Therefore, the decoding counter A010 for the next VAU to be read can be predicted to be "5". The next VAU that is actually read, however, is the fourth VAU A014 in the base-view video stream A001, whose decoding counter A010 is "7". The decoder can thus detect that it failed to read a VAU. Accordingly, the decoder can execute the following processing: "skip decoding processing of the B picture extracted from the third VAU A023 in the dependent-view video stream A002, since the Br picture to be used as a reference is missing". In this way, the decoder checks the decoding counters A010 and A020 during each decoding process. Consequently, the decoder can promptly detect errors during reading of VAUs and can promptly execute appropriate error processing. As a result, the decoder can prevent noise from contaminating the playback video.

FIG. 94C is a schematic diagram showing other examples of the decoding counters A030 and A040 allocated to each picture in the base-view video stream A001 and dependent-view video stream A002. As shown in FIG. 94C, the decoding counters A030 and A040 are incremented separately for the video streams A001 and A002. Therefore, the decoding counters A030 and A040 are the same for a pair of pictures in the same 3D VAU. In this case, when the decoder has decoded a VAU in the base-view video stream A001, it can predict that "the decoding counter A030 is the same as the decoding counter A040 for the next VAU to be decoded in the dependent-view video stream A002". Conversely, when the decoder has decoded a VAU in the dependent-view video stream A002, it can predict that "the decoding counter A030 for the next VAU to be decoded in the base-view video stream A001 is the same as the decoding counter A040 plus one". Accordingly, at any point in time, the decoder can promptly detect an error in reading a VAU using the decoding counters A030 and A040 and can promptly execute appropriate error processing. As a result, the decoder can prevent noise from contaminating the playback video.

In the system target decoder 5023 shown in FIG. 52, the DEC 5204 may refer to the decoding switch information A050 to decode pictures from VAUs sequentially, regardless of the DTSs. Additionally, the buffer switch 5206 may cause the DEC 5204 to return the decoding switch information A050 in the VAU. In such a case, the buffer switch 5206 can determine if it should transfer the next VAU from the EB1 5203 or the EB2 5210 by referring to the decoding switch information A050.

<Compensation for Misalignment Between Left View and Right View>

"Misalignment" may occur between a left view and a right view. The playback device 102 and display device 103 according to Embodiment 1 of the present invention compensate for this misalignment using the method described below. This avoids the risk of the misalignment causing the viewer to feel uncomfortable.

Figure 95:
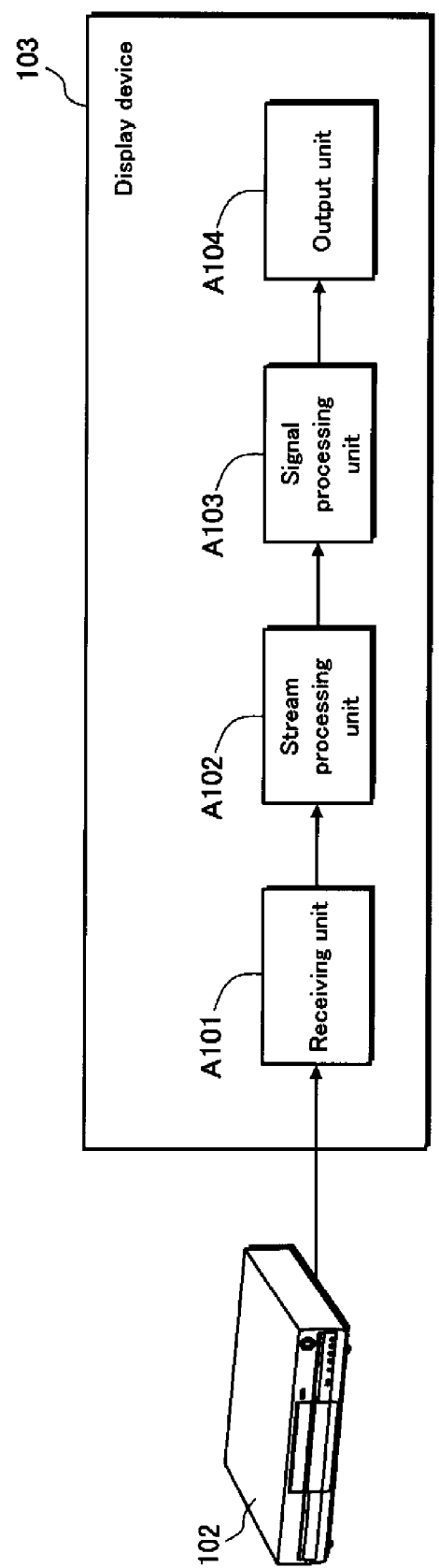
FIG. 95 is a functional block diagram of the display device 103 that performs processing to compensate for misalignment between the left view and the right view.

The playback device 102 uses the function units shown in FIG. 50 to compensate for misalignment. Alternatively, the display device 103 may compensate for misalignment. FIG. 95 is a functional block diagram of the display device 103 that compensates for misalignment. As shown in FIG. 95, the display device 103 is provided with a receiving unit A101, stream processing unit A102, signal processing unit A103, and output unit A104. In addition to receiving multiplexed stream data from the playback device 102, the receiving unit A101 receives multiplexed stream data from a medium such as a BD-ROM disc, semiconductor memory device, external network, or broadcast wave and transmits the multiplexed stream data to the stream processing unit A102. The stream processing unit A102 separates each type of data from the multiplexed stream data, such as video, audio, graphics, etc., and transmits the resulting pieces of data to the signal processing unit A103. The signal processing unit A103 individually decodes these pieces of data and transmits the decoded pieces of data to the output unit A104. The output unit A104 converts the decoded pieces of data into a predetermined format and outputs the results. Actual video images/audio are output by the output unit A104. Alternatively, a video signal/audio signal in HDMI format or the like may be output. Among the elements A101, A102, A103, and A104 shown in FIG. 95, parts other than the function parts such as a disc drive, display panel, speaker, etc., are implemented on one or more integrated circuits.

<<Horizontal Misalignment Between Left View and Right View>>

Figure 96:
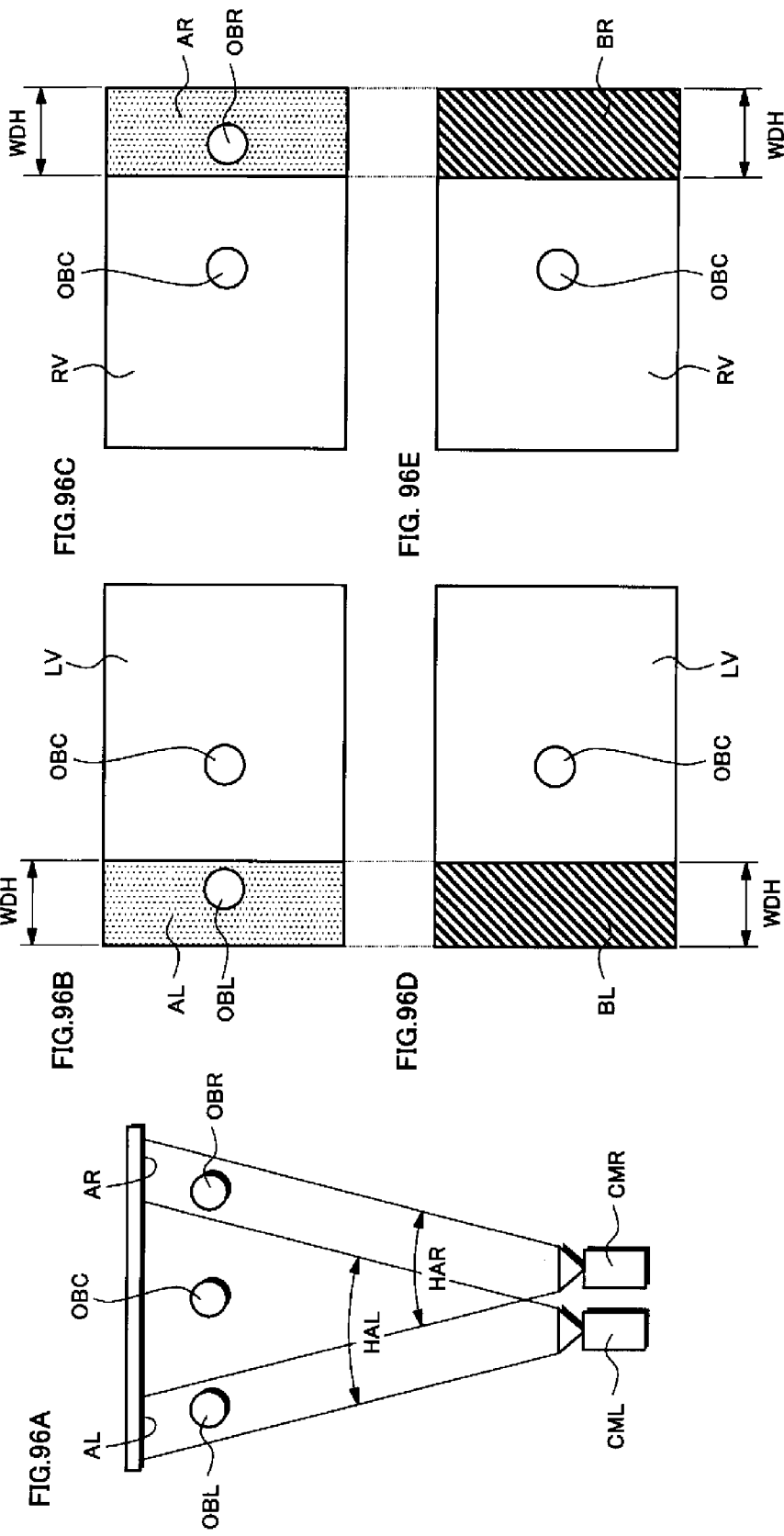
FIG. 96A is a plan view schematically showing horizontal angles of view HAL and HAR for a pair of video cameras CML and CMR filming 3D video images.
FIGS. 96B and 96C are schematic diagrams respectively showing a left view LV filmed by the left-video camera CML and a right view RV filmed by the right-video camera CMR.
FIGS. 96D and 96E are schematic diagrams respectively showing a left view LV represented by a left-video plane and a right view RV represented by a right-video plane after processing.

FIG. 96A is a plan view schematically showing horizontal angles of view HAL and HAR for a pair of video cameras CML and CMR filming 3D video images. As shown in FIG. 96A, the pair of video cameras CML and CMR are placed side by side in the horizontal direction. The left-video camera CML films the left view, and the right-video camera CMR films the right view. The horizontal angles of view HAL and HAR of the video cameras CML and CMR are the same size but differ in location. This yields a strip AL that is only included in the horizontal angle of view HAL of the left-video camera CML and a strip AR that is only included in the horizontal angle of view HAR of the right-video camera CMR. The object OBC located in the section common to both horizontal angles of view HAL and HAR is captured by both video cameras CML and CMR. However, the object OBL located in strip AL, which is included only in the horizontal angle of view HAL of the left-video camera CML, is only captured by the left-video camera CML, and the object OBR located in strip AR, which is included only in the horizontal angle of view HAR of the right-video camera CMR, is only captured by the right-video camera CMR.

FIGS. 96B and 96C are schematic diagrams respectively showing a left view LV filmed by the left-video camera CML and a right view RV filmed by the right-video camera CMR. As shown in FIGS. 96B and 96C, the strip AL, which is included only in the horizontal angle of view HAL of the left-video camera CML, appears as a strip along the left edge of the left view LV. However, this strip AL is not included in the right view RV. On the other hand, the strip AR, which is included only in the horizontal angle of view HAR of the right-video camera CMR, appears as a strip along the right edge of the right view RV. However, this strip AR is not included in the left view LV. Accordingly, among the three objects OBL, OBC, and OBR shown in FIG. 96A, the object on the right OBR is not included in the left view LV, and the object on the left OBL is not included in the right view RV. As a result, the object on the left OBL is only visible to the viewer's left eye, and the object on the right OBR is only visible to the right eye. The left view LV and right view RV thus run the risk of causing the viewer to feel uncomfortable.

On the BD-ROM disc 101, information indicating the width WDH of the above strips AL and AR included in each frame of the left view LV and right view RV is stored in the dependent-view video stream. The storage location is the supplementary data in the VAU located at the top of each video sequence. However, this supplementary data is separate from the correction data that includes the offset metadata 1110 shown in FIG. 11. On the other hand, in the playback device 102, the system target decoder 5023 reads information showing the width WDH of the above strips AL and AR from the dependent-view video stream. Furthermore, the system target decoder 5023 transmits this information to the parallax video generation unit 5310 in the plane adder 5024 or the output unit A104 in the display device 103. When the receiving unit A101 in the display device 103 directly reads 3D video content from the information medium, such as the BD-ROM disc, then the signal processing unit A103 in the display device 103 reads the above information from the dependent-view video stream and transmits the information to the output unit A104. The parallax video generation unit A110 or output unit A104 (hereinafter, "parallax video generation unit A110 or the like") refers to this information to process the left-video plane and the right-video plane, uniformly painting the strips AL and AR a background color or black. In other words, the pixel data included in the strips AL and AR is uniformly overwritten with data that represents a background color or black.

FIGS. 96D and 96E are schematic diagrams respectively showing a left view LV represented by a left-video plane and a right view RV represented by a right-video plane after processing. As shown in FIG. 96D, the strip AL, which is included only in the horizontal angle of view HAL of the left-video camera CML, is hidden by a black strip BL of width WDH. On the other hand, as shown in FIG. 96E, the strip AR, which is included only in the horizontal angle of view HAR of the right-video camera CMR, is hidden by a black strip BR of width WDH. As a result, both of the viewer's eyes see only the area shared by the left view LV and the right view RV, which avoids the risk of causing the viewer to feel uncomfortable.

Figure 55:
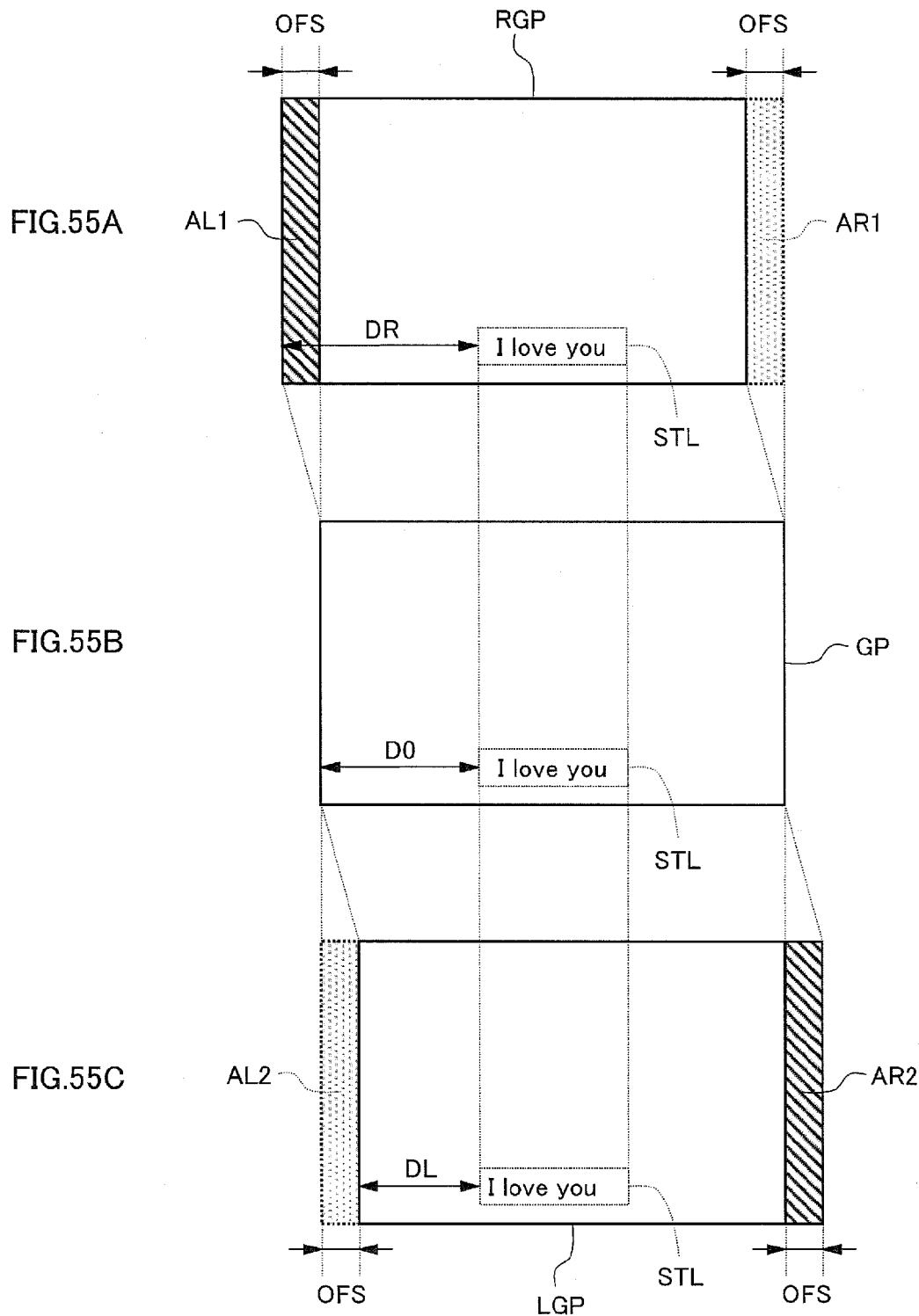
FIGS. 55A, 55B, and 55C are schematic diagrams showing PG planes GP, RGP, and LGP before and after offset control is applied by the second cropping unit 5332 shown in FIG. 53, with FIG. 55A showing the PG plane RGP to which a right offset has been provided, FIG. 55B showing the PG plane GP before offset control is applied, and FIG. 55C showing the PG plane LGP to which a left offset has been provided.

Furthermore, the parallax video generation unit 5310 or the like may perform cropping similar to that shown in FIG. 55 to remove pixel data included in the outer half of the strips AL and AR respectively located in the left-video plane and right-video plane. In this case, the parallax video generation unit 5310 or the like uniformly paints the remaining half of the strips AL and AR a background color or black and, in addition, adds a background-color or black strip of half the width of the strips AL and AR to the opposite side. In this way, both of the viewer's eyes see the area shared by the left view LV and the right view RV in the center of the screen, with background color or black strips at both edges of the screen. This avoids the risk of causing the viewer to feel uncomfortable.

Alternatively, the parallax video generation unit 5310 or the like may process the left-video plane and right-video plane as follows. First, via cropping similar to that shown in FIG. 55, the parallax video generation unit 5310 or the like removes the pixel data in the strips AL and AR from each of the video planes. Next, the parallax video generation unit 5310 or the like resizes each video plane from the pixel data in the remaining area via scaling. The video image shown by the remaining area is thus expanded to fill the entire frame. As a result, both of the viewer's eyes see only the area shared by the left view LV and the right view RV, which avoids the risk of causing the viewer to feel uncomfortable.

<<Vertical Misalignment Between Left View and Right View>>

Figure 97:
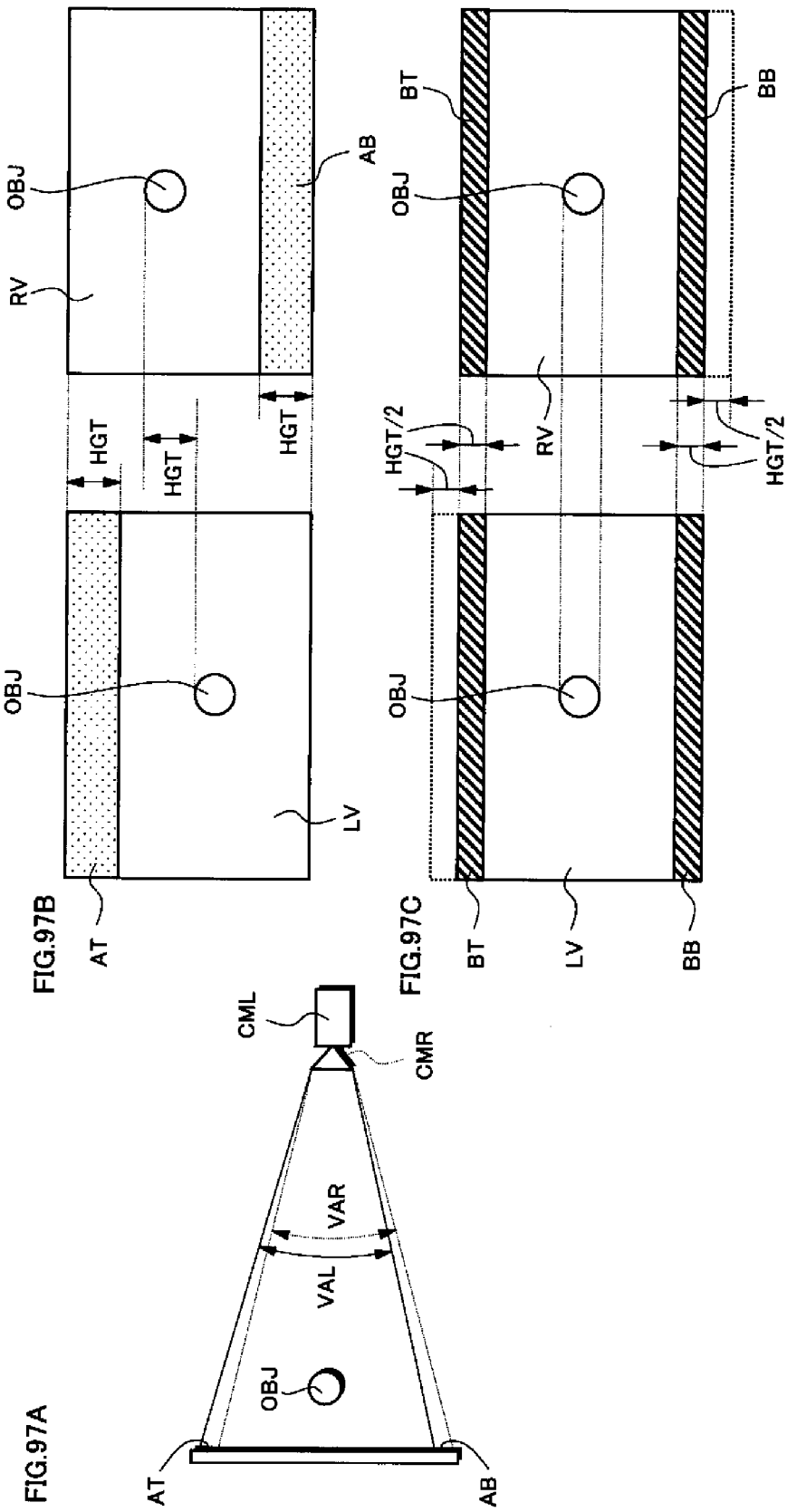
FIG. 97A is a plan view schematically showing horizontal angles of view VAL and VAR for a pair of video cameras CML and CMR filming 3D video images.
FIG. 97B is a schematic diagram showing a left view LV filmed by the left-video camera CML and a right view RV filmed by the right-video camera CMR.
FIG. 97C is a schematic diagram showing a left view LV represented by a left-video plane and a right view RV represented by a right-video plane after processing.

FIG. 97A is a plan view schematically showing vertical angles of view VAL and VAR for a pair of video cameras CML and CMR filming 3D video images. As shown in FIG. 97A, the vertical angles of view VAL and VAR for the video cameras CML and CMR are the same size but differ in location. This yields a strip AT that is only included in the vertical angle of view VAL of the left-video camera CML and a strip AB that is only included in the vertical angle of view VAR of the right-video camera CMR. The object OBJ located in the section common to both vertical angles of view VAL and VAR is captured by both video cameras CML and CMR. However, objects located in strip AT, which is included only in the vertical angle of view VAL of the left-video camera CML, are only captured by the left-video camera CML, and objects located in strip AB, which is included only in the vertical angle of view VAR of the right-video camera CMR, are only captured by the right-video camera CMR.

FIG. 97B is a schematic diagram showing a left view LV filmed by the left-video camera CML and a right view RV filmed by the right-video camera CMR. As shown in FIG. 97B, the strip AT, which is included only in the vertical angle of view VAL of the left-video camera CML, appears as a strip along the top of the left view LV. However, this strip AT is not included in the right view RV. On the other hand, the strip AB, which is included only in the vertical angle of view VAR of the right-video camera CMR, appears as a strip along the bottom edge of the right view RV. However, this strip AB is not included in the left view LV. Note that the positions of the strips AT and AB may be reversed between the left view LV and right view RV. In this way, when the left view LV and right view RV differ with regards to inclusion of the strips AT and AB, the vertical position of the object OBJ shown in FIG. 97A differs between the left view LV and the right view RV by the height HGT of the strips AT and AB. As a result, the vertical position of the object OBJ differs as seen by the viewer's left eye and right eye, which has the risk of causing the viewer to feel uncomfortable.

On the BD-ROM disc 101, mask area information is stored in the dependent-view video stream, in particular in the supplementary data in the VAU located at the top of each video sequence. However, this supplementary data is separate from the correction data that includes the offset metadata 1110 shown in FIG. 11. The mask area information indicates the strips AT and AB and the height HGT for each frame in the left view LV and right view RV. In the playback device 102, the system target decoder 5023 reads the mask area information from the dependent-view video stream and transmits the mask area information to the parallax video generation unit 5310 in the plane adder 5024 or the output unit A104 in the display device 103. When the receiving unit A101 in the display device 103 directly reads 3D video content from the information medium, such as the BD-ROM disc, then the signal processing unit A103 in the display device 103 reads the mask area information from the dependent-view video stream and transmits the mask area information to the output unit A 104.

The parallax video generation unit 5310 or output unit A104 (hereinafter, "parallax video generation unit 5310 or the like") uses the height HGT of the strips AT and AB indicated by the mask area information to process the left-video plane and right-video plane as follows. First, the parallax video generation unit 5310 or the like shifts the position of the pixel data in the left-video plane up by half the height HGT, i.e. HGT/2, and shifts the position of the pixel data in the right-video plane down by HGT/2. The vertical center of the video image shown in the area of the video planes other than the strips AT and AB thus matches the vertical center of the screen. In the left-video plane, half of the strip AT is removed from the top, yielding an empty strip with a height of HDT/2 at the bottom. In the right-video plane, half of the strip AB is removed from the bottom, yielding an empty strip with a height of HDT/2 at the top. Next, the parallax video generation unit 5310 or the like uniformly paints the strips a background color or black. In other words, the pixel data included in the strips is uniformly overwritten with data that represents a background color or black.

FIG. 97C is a schematic diagram showing a left view LV represented by a left-video plane and a right view RV represented by a right-video plane after processing. As shown in FIG. 97C, the vertical centers of the left view LV and the right view RV match. Accordingly, the vertical position of the object OBJ shown in FIG. 97A is the same in the left view LV and the right view RV. At the top of the left view LV, the strip AT, which is included only in the vertical angle of view VAL of the left-video camera CML, is hidden by a black strip BT of height HGT/2, and at the bottom of the right view RV, the strip AB, which is included only in the vertical angle of view VAR of the right-video camera CMR, is hidden by a black strip BB of height HGT/2. Furthermore, a black strip BB of height HGT/2 is added to the bottom of the left view LV, and a black strip BT of height HGT/2 is added to the top of the right view RV. As a result, both of the viewer's eyes see only the area shared by the left view LV and the right view RV, and the vertical positions match between the object seen by each eye. This avoids the risk of causing the viewer to feel uncomfortable.

Alternatively, the parallax video generation unit 5310 or the like may process the left-video plane and right-video plane as follows. First, via cropping similar to that shown in FIG. 55, the plane adder 5024 removes the pixel data in the strips AT and AB from each of the video planes. Next, the parallax video generation unit 5310 resizes each video plane from the pixel data in the remaining area via scaling. The video image shown by the remaining area is thus expanded to fill the entire frame, and as a result, both of the viewer's eyes see only the area shared by the left view LV and the right view RV. Furthermore, the vertical positions match between the object seen by each eye. This avoids the risk of causing the viewer to feel uncomfortable.

<<Misalignment of Graphics Images Between Left View and Right View>>

When a playback device in one plane+offset mode provides a large offset to a graphics plane to generate a pair of graphics planes, a region in the right or left edge of one graphics plane may not be included in the right or left edge of the other graphics plane.

Figure 98:
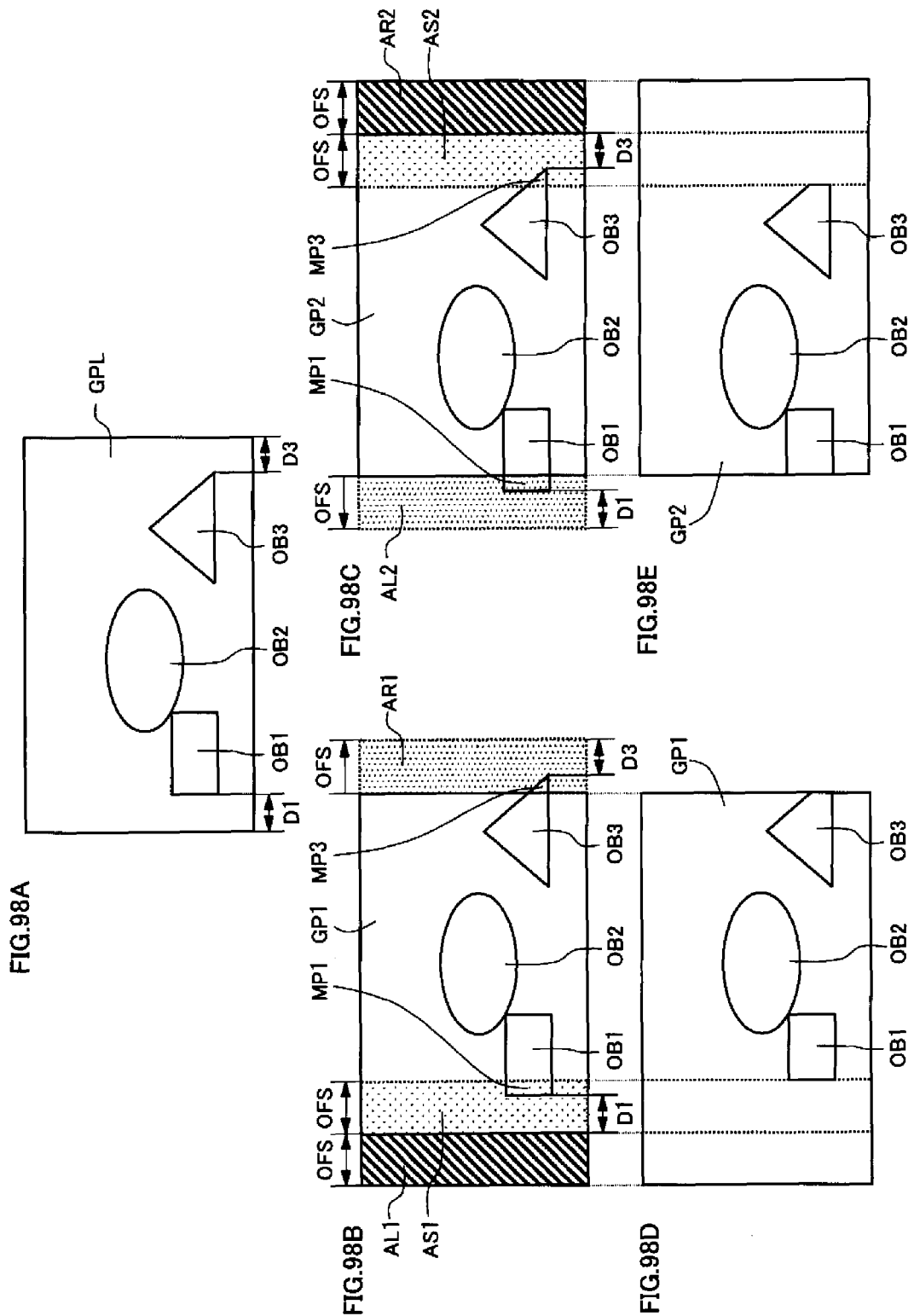
FIG. 98A is a schematic diagram showing an example of graphics images represented by a graphics plane GPL.
FIGS. 98B and 98C are schematic diagrams respectively showing a right and left offset provided to the graphics plane GPL.
FIGS. 98D and 98E are schematic diagrams showing graphics images represented by graphics planes GP1 and GP2 to which the right and left offset have been provided.

FIG. 98A is a schematic diagram showing an example of graphics images represented by a graphics plane GPL. As shown in FIG. 98A, the graphics plane GPL represents three types of graphic elements OB1, OB2, and OB3. In particular, the left edge of the left graphic element OB1 is located at a distance D1 from the left edge of the graphics plane GPL, and the right edge of the right graphic element OB3 is located at a distance D3 from the right edge of the graphics plane GPL. FIGS. 98B and 98C are schematic diagrams respectively showing a right and left offset provided to the graphics plane GPL. As shown in FIG. 98B, a strip AR1 of width OFS equal to the offset value is removed from the right edge of the graphics plane GPL, and a transparent strip AL1 of width OFS is added to the left edge, similar to the cropping shown in FIG. 55. The horizontal positions of the graphic elements OB1-OB3 are thus shifted to the right from their original positions by a distance OFS equal to the offset value. On the other hand, as shown in FIG. 98C, a strip AL2 of width OFS is removed from the left edge of the graphics plane GPL, and a transparent strip AR2 of width OFS is added to the right edge. The horizontal positions of the graphic elements OB1-OB3 are thus shifted to the left from their original positions by the distance OFS.

As shown in FIGS. 98B and 98C, the distance OFS, which is equal to the offset value, is larger than the distance D1 between the left edge of the left graphic element OB1 and the left edge of the graphics plane GPL. The distance OFS is also larger than the distance D3 between the right edge of the right graphic element OB3 and the right edge of the graphics plane GPL. Accordingly, a portion MP3 of the right edge of the right graphic element OB3 is missing in the graphics plane GP1 to which a right offset has been provided. Also, a portion MP1 of the left edge of the left graphic element OB1 is missing in the graphics plane GP2 to which a left offset has been provided. However, the missing portion MP1 of the left graphic element OB1 is included in the graphics plane GP1 with the right offset, and the missing portion MP3 of the right graphic element OB3 is included in the graphics plane GP2 with the left offset. As a result, these missing portions MP1 and MP3 are only seen by one of the viewer's eyes, which may make the viewer feel uncomfortable.

In the playback device 102, each of the cropping units 5331-5334 in the plane adder 5024 refers to the offset information 5307 to perform offset control on the graphics plane GPL. At this point, each of the cropping units 5331-5334 furthermore removes a strip that extends along the left or right edge of the graphics plane GPL. In other words, the pixel data in the strip is overwritten with data representing a transparent color. Each strip extends along the left or right edge of the graphics plane GPL, and the width of each strip equals the offset value. Alternatively, the output unit A104 in the display device 103 may receive offset information from the system target decoder 5023 or the signal processing unit A103 in the display device 103 and refer to the offset information to remove a strip from the left or right edge of the graphics plane GPL. FIGS. 98B and 98C show the strips AS1 and AS2 to be removed. In the graphics plane GP1 with the right offset, the strip AS1 to be removed includes the missing portion MP1 of the left graphic element OB1. In the graphics plane GP2 with the left offset, the strip AS2 to be removed includes the missing portion MP3 of the right graphic element OB3.

FIGS. 98D and 98E are schematic diagrams showing graphics images represented by the graphics planes GP1 and GP2 with the right and left offsets, respectively. As shown in FIGS. 98D and 98E, in the graphics planes GP1 and GP2, the shapes of the three types of graphic elements OB1-0B3 match. As a result, only the shared part of the graphics images is visible to each of the viewer's eyes. This avoids the risk of causing the viewer to feel uncomfortable.

Figure 99:
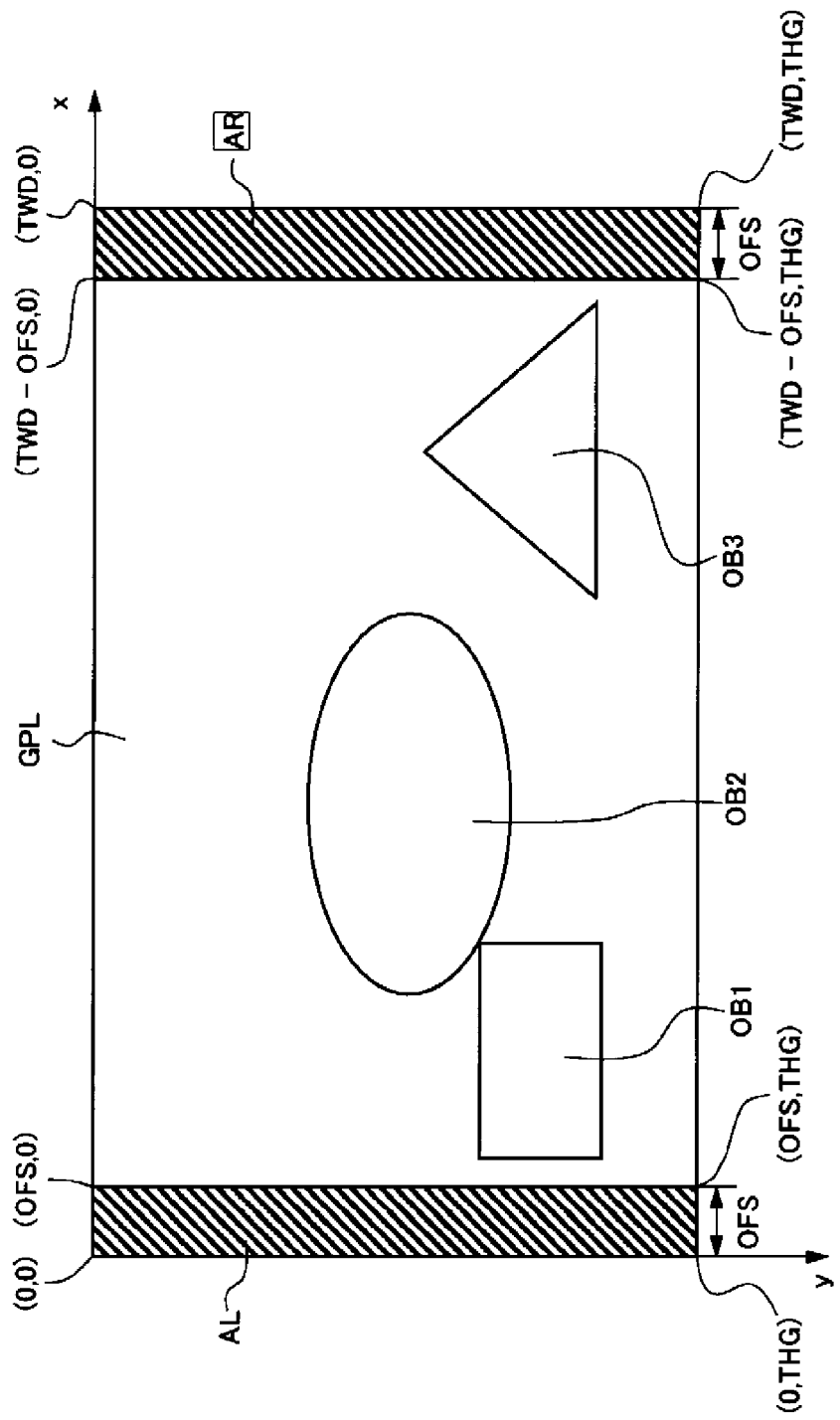
FIG. 99 is a schematic diagram showing a condition imposed on a graphics plane regarding the arrangement of graphics elements.
Figure 100:
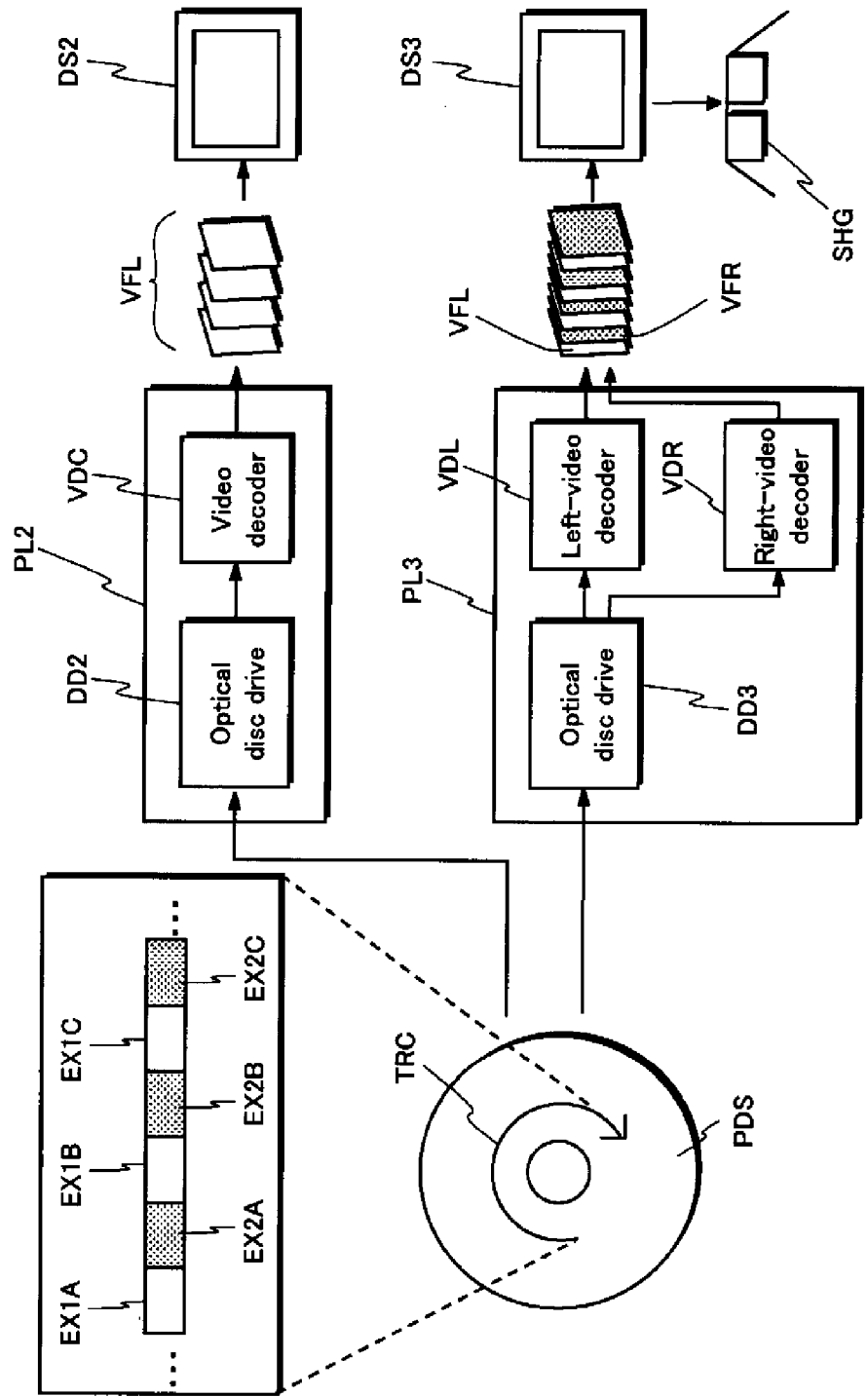
FIG. 100 is a schematic diagram showing technology for ensuring compatibility with 2D playback devices for an optical disc on which 3D video content is recorded.

Alternatively, the following condition may be prescribed regarding the arrangement of graphic elements for graphics planes played back from a PG stream or IG stream on the BD-ROM disc 101 and for a graphics plane generated by the playback device 102. FIG. 99 is a schematic diagram showing such a condition. As shown in FIG. 99, xy orthogonal coordinates are established on the graphics plane GPL, with an origin (0, 0) at the upper-left corner. The x and y coordinates are respectively the horizontal and vertical coordinates of the graphics plane GPL. The coordinates of the lower-right corner of the graphics plane GPL are set to (TWD, THG). Using these xy coordinates, the condition is set as follows: in each frame, the graphic elements OB1, OB2, and OB3 must be positioned within the rectangular area having four points (OFS, 0), (TWD-OFS, 0), (TWD-OFS, THG), and (OFS, THG) as vertices. In other words, graphic elements are prohibited from being placed within the strips AL and AR of width OFS which respectively extend along the left edge and right edge of the graphics plane GPL. As is clear from FIGS. 98B and 98C, these strips AL and AR are removed by offset control. Accordingly, if graphic elements are prohibited from being placed within the strips AL and AR, the shapes of the graphic elements do not change even when an offset is provided to the graphics plane GPL. As a result, both of the viewer's eyes see the same graphics images, which avoids the risk of causing the viewer to feel uncomfortable.

<Data Distribution via Broadcasting or Communication Circuit>

The recording medium according to Embodiments 1 and 2 of the present invention may be, in addition to an optical disc, a general removable medium available as a package medium, such as a portable semiconductor memory device, including an SD memory card. Also, Embodiments 1 and 2 describe an example of an optical disc in which data has been previously recorded, namely, a conventionally available read-only optical disc such as a BD-ROM or a DVD-ROM. However, the Embodiments of the present invention are not limited in this way. For example, when a terminal device writes 3D video content that has been distributed via broadcasting or a network onto a conventionally available writable optical disc such as a BD-RE or a DVD-RAM, arrangement of the extents according to Embodiments 1 or 2 may be used. The terminal device may be incorporated in a playback device or may be a device separate from the playback device.

<Playback of Semiconductor Memory Card>

The following describes a data read unit of a playback device in the case where a semiconductor memory card is used as the recording medium according to Embodiments 1 or 2 of the present invention instead of an optical disc.

The part of the playback device that reads data from an optical disc is composed of, for example, an optical disc drive. Conversely, the part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<Copyright Protection Technique for Data Stored in BD-ROM Disc>

The mechanism for protecting copyright of data recorded on a BD-ROM disc is now described as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decrypted in the following manner.

The playback device has recorded thereon beforehand a part of data necessary for generating a "key" to be used for decrypting the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decrypted. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decrypted using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decrypting the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decrypt the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<Recording Data on a Recording Medium Through Electronic Distribution>

The following describes processing to transmit data, such as an AV stream file for 3D video images (hereinafter, "distribution data"), to the playback device according to Embodiment 1 of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks (1)-(3) are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information? Specifically, is the device key of the playback device excluded from the device list?

If at least any one of the results of the checks (1)-(3) is negative, the playback device stops decryption processing of the encrypted data. Conversely, if all of the results of the checks (1)-(3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<Application to Real-Time Recording>

Embodiment 3 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from an external source, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<Managed Copy>

The playback device according to Embodiment 1 of the present invention may write a digital stream recorded on the BD-ROM disc 101 on another recording medium via a managed copy. "Managed copy" refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory device such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<Method for Describing Data Structure>

Among the data structures in Embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in Embodiment 1 is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<Management of Playlist File and Clip Information File by Playback Program>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory element of a computer and is then executed by the computer. The loading process includes compile processing or link processing. By these processes, the playback program is divided into a plurality of sections in the memory element. The sections include a text section, a data section, a bss section, and a stack section. The text section includes a code array of the playback program, an initial value, and non-rewritable data. The data section includes variables with initial values and rewritable data. In particular, the data section includes a file, recorded on the recording medium, that can be accessed at any time. The bss section includes variables having no initial value. The data included in the bss section is referenced in response to commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording medium into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-transitory computer-readable recording medium on which a main-view stream, a sub-view stream, and management information are recorded,
    the main-view stream having multiplexed therein a main-view video stream that constitutes main views of stereoscopic video images,
    the sub-view stream having multiplexed therein a sub-view video stream that constitutes sub-views of stereoscopic video images,
    the sub-view video stream encoded with reference to the main-view video stream,
    the management information including a system rate of each of the main-view stream and the sub-view stream,
    the non-transitory computer-readable recording medium including a long jump region that is one of a region having at least a predetermined number of sectors and a region having a layer boundary,
    the main-view stream divided and arranged into a plurality of main-view data blocks,
    the sub-view stream divided and arranged into a plurality of sub-view data blocks,
    the non-transitory computer-readable recording medium including a plurality of extent blocks, each of the extent blocks having main-view data blocks and sub-view data blocks in a continuous interleaved arrangement and being referred to as a single extent when stereoscopic video images are played back,
    each extent block having a sub-view data block at the top of the extent block and including at least one pair of a sub-view data block and a main-view data block,
    a first extent block to be read immediately before a second extent block or immediately after a third extent block,
    a main-view data block and a sub-view data block constituting a single pair in the first extent block and each having a maximum size that is determined by the following factors: the system rate of the sub-view stream; whether the single pair is at the top of the first extent block; and whether the long jump region exists between recording areas of the first extent block and the second extent block, or between recording areas of the first extent block and the third extent block.

2. The non-transitory computer-readable recording medium of claim 1, wherein
    combinations of the maximum sizes of the main-view data block and the sub-view data block constituting the single pair are classified into a first pattern, a second pattern, a third pattern, and a fourth pattern,
    the first pattern is a combination adopted when the system rate of the sub-view stream is less than a predetermined value,
    the second pattern is a combination adopted when the system rate of the sub-view stream exceeds the predetermined value, the single pair is positioned in the first extent block as the second or subsequent pair counting from the top pair, and the long jump region exists between the recording areas of the first extent block and the second extent block,
    the third pattern is a combination adopted when the system rate of the sub-view stream exceeds the predetermined value, the single pair is the top pair in the first extent block, and the long jump region exists between the recording areas of the first extent block and the third extent block, and
    the fourth pattern is a combination adopted when none of the first pattern, second pattern, and third pattern applies.

3. The non-transitory computer-readable recording medium of claim 2, wherein
    the first pattern indicates that the maximum size of the main-view data block is a first value and the maximum size of the sub-view data block is a second value,
    the second pattern indicates that both the maximum sizes of the main-view data block and the sub-view data block are a third value,
    the third pattern indicates that the maximum size of the main-view data block is the first value and the maximum size of the sub-view data block is the second value,
    the fourth pattern indicates that the maximum size of the main-view data block is the first value and the maximum size of the sub-view data block is a fourth value, and
    the first value, the fourth value, the second value, and the third value decrease in this order.

4. A playback device for playing back video images from a recording medium on which a main-view stream, a sub-view stream, and management information are recorded,
    the main-view stream having multiplexed therein a main-view video stream that constitutes main views of stereoscopic video images,
    the sub-view stream having multiplexed therein a sub-view video stream that constitutes sub-views of stereoscopic video images,
    the sub-view video stream encoded with reference to the main-view video stream,
    the management information including a system rate of each of the main-view stream and the sub-view stream,
    the recording medium including a long jump region that is one of a region having at least a predetermined number of sectors and a region having a layer boundary,
    the main-view stream divided and arranged into a plurality of main-view data blocks,
    the sub-view stream divided and arranged into a plurality of sub-view data blocks,
    the recording medium including a plurality of extent blocks, each of the extent blocks having main-view data blocks and sub-view data blocks in a continuous interleaved arrangement and being referred to as a single extent when stereoscopic video images are played back,
    each extent block having a sub-view data block at the top of the extent block and including at least one pair of a sub-view data block and a main-view data block, and
    a first extent block to be read immediately before a second extent block or immediately after a third extent block,
    a main-view data block and a sub-view data block constituting a single pair in the first extent block and each having a maximum size that is determined by the following factors: the system rate of the sub-view stream; whether the single pair is at the top of the first extent block; and whether the long jump region exists between recording areas of the first extent block and the second extent block, or between recording areas of the first extent block and the third extent block, the playback device comprising:

a read unit operable to read extent blocks from the recording medium;

a switching unit operable to extract the main-view stream and the sub-view stream from the extent blocks read by the read unit;

a first read buffer for storing the main-view stream extracted by the switching unit;

a second read buffer for storing the sub-view stream extracted by the switching unit; and a decoding unit operable to read and decode the main-view stream from the first read buffer, and the sub-view stream from the second read buffer, wherein the first read buffer has a capacity equaling at least a minimum value determined by the following factors: a jump time required for the playback device to jump over the long jump region; a rate at which the read unit reads the extent block during stereoscopic playback; a size of a sub-view data block recorded immediately after the long jump region; and the system rate of the main-view stream, and the second read buffer has a capacity equaling at least a minimum value determined by the following factors: a size of a main-view data block recorded immediately before the long jump region; a size of a sub-view data block recorded immediately after the long jump region; the jump time; and the system rate of the sub-view stream.

* * * * *